(12) United States Patent
Abergel et al.

(10) Patent No.: US 12,479,792 B2
(45) Date of Patent: *Nov. 25, 2025

(54) COMPOSITIONS OF CHELATING MOLECULES

(71) Applicant: The Regents of the University of California, Oakland, CA (US)

(72) Inventors: Rebecca J. Abergel, Oakland, CA (US); Julian Rees, Oakland, CA (US); Ilya Captain, Oakland, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 16/336,665

(22) PCT Filed: Aug. 28, 2017

(86) PCT No.: PCT/US2017/048910
§ 371 (c)(1),
(2) Date: Mar. 26, 2019

(87) PCT Pub. No.: WO2018/063638
PCT Pub. Date: Apr. 5, 2018

(65) Prior Publication Data
US 2021/0009510 A1    Jan. 14, 2021

Related U.S. Application Data

(60) Provisional application No. 62/401,687, filed on Sep. 29, 2016.

(51) Int. Cl.
*A61K 9/00* (2006.01)
*A61K 38/07* (2006.01)
(Continued)

(52) U.S. Cl.
CPC ............ *C07C 235/60* (2013.01); *A61K 38/07* (2013.01); *A61K 38/1709* (2013.01);
(Continued)

(58) Field of Classification Search
CPC .... A61K 38/00; A61K 38/07; A61K 38/1709; A61K 51/00; A61K 51/04;
(Continued)

(56) References Cited

U.S. PATENT DOCUMENTS 3,323,857 A  6/1967 Bauer
3,634,113 A  1/1972 Fhrenbacher
(Continued)

FOREIGN PATENT DOCUMENTS

CA  3022852 A1  11/2017
CA  3035966 A1   3/2018
(Continued)

OTHER PUBLICATIONS

Sturzbecher-Hoehne et al, Dalton Trans., vol. 40, pp. 8340-8346 (Year: 2011).*
(Continued)

*Primary Examiner* — Paul W Dickinson
(74) *Attorney, Agent, or Firm* — Knobbe, Martens, Olson & Bear, LLP

(57) ABSTRACT

Provided herein are a variety of metal chelators as well as methods of use thereof.

20 Claims, 50 Drawing Sheets

(51) Int. Cl.

| | | |
|---|---|---|
| *A61K 38/17* | (2006.01) | |
| *A61K 51/04* | (2006.01) | |
| *C07C 235/60* | (2006.01) | |
| *C07D 213/89* | (2006.01) | |
| *C07K 5/103* | (2006.01) | |

(52) U.S. Cl.
CPC ...... *A61K 51/0478* (2013.01); *A61K 51/0482* (2013.01); *C07D 213/89* (2013.01); *C07K 5/1008* (2013.01)

(58) Field of Classification Search
CPC ............ A61K 51/0478; A61K 51/0482; A61K 51/1093; C07C 235/60; C07D 213/89; C07K 5/1008; A61P 35/00
USPC ......... 424/1.11, 1.65, 9.1, 9.2; 534/7, 10–16
See application file for complete search history.

(56) References Cited

U.S. PATENT DOCUMENTS

| | | | |
|---|---|---|---|
| 4,025,602 A | 5/1977 | Campbell | |
| 4,278,559 A | 7/1981 | Levenson et al. | |
| 4,698,431 A | 10/1987 | Raymond et al. | |
| 4,891,075 A | 1/1990 | Dakubu | |
| 5,442,116 A | 8/1995 | Welch et al. | |
| 5,482,570 A | 1/1996 | Saurer et al. | |
| 5,510,091 A | 4/1996 | Rais | |
| 5,571,894 A | 11/1996 | Wels et al. | |
| 5,587,458 A | 12/1996 | King et al. | |
| 5,591,828 A | 1/1997 | Bosslet et al. | |
| 5,624,901 A * | 4/1997 | Raymond ............ | C07D 213/81 530/331 |
| 5,634,901 A | 6/1997 | Alba et al. | |
| 5,753,204 A | 5/1998 | Huston et al. | |
| 5,826,161 A | 10/1998 | Madic et al. | |
| 5,869,046 A | 2/1999 | Presta et al. | |
| 5,892,029 A | 4/1999 | Raymond et al. | |
| 6,221,476 B1 | 4/2001 | Bruening et al. | |
| 6,843,917 B1 | 1/2005 | Guy et al. | |
| 6,846,915 B2 | 1/2005 | Raymond et al. | |
| 8,361,794 B2 | 1/2013 | Jakobsen et al. | |
| 8,475,747 B1 | 7/2013 | Johnson et al. | |
| 8,557,601 B2 | 10/2013 | Raymond et al. | |
| 8,933,526 B2 | 1/2015 | Tsakalakos et al. | |
| 9,123,846 B2 | 9/2015 | Le Perchec et al. | |
| 9,472,694 B2 | 10/2016 | Dionne et al. | |
| 9,556,122 B2 | 1/2017 | Raymond et al. | |
| 10,982,136 B2 | 4/2021 | Agbo et al. | |
| 11,684,614 B2 | 6/2023 | Abergel et al. | |
| 12,002,595 B2 | 6/2024 | Abergel et al. | |
| 2002/0122752 A1 | 9/2002 | Fukasawa et al. | |
| 2005/0008570 A1 | 1/2005 | Raymond et al. | |
| 2009/0184051 A1 | 7/2009 | Heres et al. | |
| 2009/0320646 A1 | 12/2009 | Yaita et al. | |
| 2010/0015725 A1 | 1/2010 | Raymond et al. | |
| 2010/0261902 A1 | 10/2010 | Xu | |
| 2010/0317117 A1 | 12/2010 | Peterson | |
| 2011/0250138 A1 | 10/2011 | Fan et al. | |
| 2012/0132277 A1 | 5/2012 | Sulima et al. | |
| 2012/0214843 A1 | 8/2012 | Durbin-Harvey et al. | |
| 2014/0039169 A1 | 2/2014 | Raymond et al. | |
| 2014/0235680 A1 | 8/2014 | Bergeron et al. | |
| 2016/0289223 A1 | 10/2016 | Bergeron | |
| 2016/0362491 A1 | 12/2016 | Mudde et al. | |
| 2017/0298272 A1 | 10/2017 | Agbo et al. | |
| 2017/0360956 A1 | 12/2017 | Butlin et al. | |
| 2019/0183868 A1 | 6/2019 | Abergel et al. | |
| 2019/0287691 A1 | 9/2019 | Abergel et al. | |
| 2019/0382470 A1 | 12/2019 | Himmler et al. | |
| 2021/0283115 A1 | 9/2021 | Abergel et al. | |
| 2022/0152003 A1 | 5/2022 | Abergel et al. | |

FOREIGN PATENT DOCUMENTS

| | | |
|---|---|---|
| CA | 3038670 A1 | 4/2018 |
| CA | 3038723 A1 | 5/2018 |
| CN | 104825389 | 8/2015 |
| CN | 104998251 | 10/2015 |
| EP | 0404097 B1 | 6/1990 |
| EP | 1755586 A2 | 2/2007 |
| EP | 3452040 A1 | 3/2019 |
| EP | 3509595 A1 | 7/2019 |
| EP | 3519034 A1 | 8/2019 |
| EP | 3520117 A2 | 8/2019 |
| EP | 3520117 B1 | 11/2023 |
| JP | 2008-525812 | 7/2008 |
| JP | 2019-514944 A | 6/2019 |
| JP | 2019-532040 A | 11/2019 |
| JP | 2019-532182 A | 11/2019 |
| JP | 7018210 B2 | 2/2022 |
| WO | WO 1993/01161 A1 | 1/1993 |
| WO | WO 1993/16185 A2 | 8/1993 |
| WO | WO 2006/028523 | 3/2006 |
| WO | WO 2006/072620 A1 | 7/2006 |
| WO | WO 2007/098934 A1 | 9/2007 |
| WO | WO 2007/118904 | 10/2007 |
| WO | WO 2010/129962 | 11/2010 |
| WO | WO 2015/077655 A1 | 5/2015 |
| WO | WO 2017/105565 | 6/2017 |
| WO | WO 2017/192581 A1 | 11/2017 |
| WO | WO 2018/048812 A1 | 3/2018 |
| WO | WO 2018/063638 A1 | 4/2018 |
| WO | WO 2018/097871 A2 | 5/2018 |

OTHER PUBLICATIONS

Moore et al, Inorg. Chem., vol. 49, No. 21, pp. 9928-9939 (Year: 2010).*
Chatterjee et al (American Association of Pharmaceutical Scientists, Chapter 24, Excipients and Active Pharmaceutical Ingredients, pp. 347-361). (Year: 2014).*
Uhlir et al , J. Med. Chem., vol. 36, pp. 504-509 (Year: 1993).*
PubChem CID 31374—N,N-dimethyleacetamide (date unknown), 3 pages.*
Werner, 1,2-Hydroxypyridonate/Terephthalamide Complexes of Gadolinium(III): Synthesis, Stability, Relaxivity, and Water Exchange Properties, Inorganic Chemistry (2009), 48(1), 277-286) (Year: 2009).*
Office Action dated Jun. 10, 2021 in U.S. Appl. No. 16/365,132, dated Mar. 26, 2019.
Japanese Office Action dated Oct. 26, 2021 in JP 2019-516989.
Corrected Notice of Allowability dated Nov. 10, 2021 in U.S. Appl. No. 16/330,601.
Office Action dated May 14, 2021 in European Patent Application No. 17793154.0.
Extended European Search Report dated Jan. 19, 2021 in Application No. 17857076.8.
Office Action dated Oct. 26, 2021 in Japanese Application No. 2019-516989.
Durbin, P. et al., "Octadentate catecholamide ligands for Pu (IV) based on linear or preorganized molecular backbones", Human Toxicology, Macmillan Publishers, Basingstoke GB, vol. 15, No. 4, pp. 352-360, 1996.
Gans, et al., Glee, a new computer program for glass electrode calibration, Talanta, vol. 51, No. 1, pp. 33-37, 2000.
Sam II, AD et al. Safety of gadolinium contrast angiography in patients with chronic renal Insufficiency Journal of Vascular Surgery, vol. 38, pp. 313-318, (2003).
Uhlir, Linda et al., "Specific sequestering agents for the actinides. 21. Synthesis and initial biological testing of octadentate mixed catecholate-hydroxypyridinonate ligands", Journal of Medicinal Chemistry, vol. 36, No. 4, pp. 504-509, 1993.
Office Action Dated Jan. 2, 2020 in U.S. Appl. No. 15/442,441.
Office Action Dated Apr. 9, 2020 in U.S. Appl. No. 15/442,441.
Office Action Dated Mar. 10, 2020 in U.S. Appl. No. 16/097,782.
Office Action Dated Oct. 15, 2019 in U.S. Appl. No. 16/097,782.

(56) References Cited

OTHER PUBLICATIONS

Office Action Dated Jun. 25, 2019 in U.S. Appl. No. 16/097,782.
Supplementary Partial European Search Report, re Application No. 17873523.9, dated May 27, 2020.
Office Action Dated Jul. 22, 2020 in U.S. Appl. No. 16/097,782.
European Search Report, re Application No. 17873523.9, dated Aug. 27, 2020.
Supplementary Partial European Search Report, re Application No. 17857076.8, dated Oct. 7, 2020.
Naasani, Imad et al., Improving the Oral Bioavailability of Sulpiride by Sodium Oleate in Rabbits, J. Pharm., vol. 47, pp. 469-473, 1995.
Office Action Dated Jul. 13, 2021 in U.S. Appl. No. 16/330,601.
Office Action dated Jul. 28, 2021 in JP 2019-512761.
Notice of Reasons for Rejection dated Apr. 26, 2021 in Japanese Patent Application No. JP 2018-557384.
Abergel, et al. Biomimetic Actinide Chelators: An Update on the Preclinical Development of the Orally Active Hydroxypyridonate Decorporation Agents 3,4,3-L/(1,2-HOPO) and 5-LIO(Me-3,2-HOPO). Health Physics, vol. 99, No. 3, pp. 401-417, 2010.
Abergel, et al. Using the Antenna Effect as a Spectroscopic Tool; Photophysics and Solution Thermodynamics of the Model Luminescent Hydroxypyridonate Complex [EuIII(3,4,3-LI(1,2-HOPO))], Inorganic Chemistry, vol. 48, No. 23, pp. 10868-10870, 2009.
Abergei, et al., Multidentate Terephthalamidate and Hydroxypyridonate Ligands: Towards New Orally Active Chelators, Hemoglobin, vol. 35, No. 3, pp. 276-290, 2011.
Agbo et al., Enhanced ultraviolet photon capture in ligand-sensitized nanocrystals, ACS Photonics, vol. 3, pp. 547-552, 2016.
Agbo et al., Ligand-Sensitized Lanthanide Nanocrystals: Merging Solid-State Photophysics and Molecular Solution Chemistry, Inorganic Chemistry, vol. 55, No. 20, pp. 9973-9980, 2016.
Agency for Toxic Substances and Disease Registry (ATSDR), Toxicological profile for Plutonium. 2010, U.S. Department of Health and Human Services, Public Health Service: Atlanta, GA.
Alderighi, et al., Hyperquad Simulation and Speciation (HySS): A Utility Program for the Investigation of Equilibria Involving Soluble and Partially Soluble Species, Coordination Chemistry Reviews, vol. 184, pp. 311-318, 1999.
Allred, B. et al. Siderocalin-mediated recognition, sensitization, and cellular uptake of actinides. Proceedings of the National Academy of Sciences of the United States of America, vol. 112, pp. 10342, 2015.
An, et al., Elimination Profiles After Delayed Treatment With 3,4,3L/(1,2HOPO) in Female and Male Swiss-Webster Mice. International Journal of Radiation Biology, vol. 90, No. 11, pp. 1055-1061, 2014.
An, et al., From Early Prophylaxis to Delayed Treatment: Establishing the Plutonium Decorporation Activity Window of Hydroxypyridinonate Chelating Agents, Chemico-Biological Interactions, Elsevier Science Ireland, IR, vol. 267, pp. 80-88, 2016.
Ansari, et al., Extraction of actinides using N, N,N , N-Tetraoctyl Diglycolamide (TODGA): A Thermodynamic Study Radiochimica. Acta Journal, vol. 94, pp. 307-312, 2006.
Ansari, et al., N,N,N',N'-Tetraoctyl Diglycolamide (Todga): A Promising Extractant for Actinide-Partitioning from High-Level Waste (HLW), Solvent Extraction and Ion Exchange, pp. 463-479, 2006.
Antonio, M. et al., Berkelium redox speciation, Radiochim. Acta, vol. 90, pp. 851-856, (2006).
Argonne National Laboratory Division of Biological and Medical Research, Annual Report, Argonne National Laboratory. Division of Biological and Medical Research: Argonne, Illinois. 1979.
Baco, et al., Diphenyl-Benzo[1,3]dioxole-4-Carboxylic Acid Pentafluorophenyl Ester: A Convenient Catechol Precursor in the Synthesis of Siderophore Vectors Suitable for Antibiotic Trojan Horse Strategies, Organic and Biomolecular Chemistry, vol. 12, pp. 749, 2014.
Banker, et al., Pharmaceutics and Pharmacy Practice, pp. 238-250, 1982.
Banski, M. et al., NaYF4 nanocrystals with TOPO ligands: synthesis-dependent structural and luminescent properties, Physical Chemistry Chemical Physics, vol. 15, No. 47, pp. 19232-19241, 2013.
Baral, T. et al., Experimental Therapy of African Trypanosomiasis With a Nanobody-Conjugated Human Trypanolytic Factor, Nature Medicine, vol. 12, pp. 580-584, 2006.
Barthelemy, et al., Journal of Biological Chemistry, pp. 3283-3639, 2008.
Baybarz, et al. Absorption Spectra of Bk(III) and Bk(IV) in Several Media, Journal of Inorganic and Nuclear Chemistry, Vo. 34, pp. 739-746, 1972.
Bhattacharyya, M. et al., Action of DTPA on Hepatic Plutonium: III. Evidence for a Direct Chelation Mechanism for DTPA-Induced Excretion of Monomeric Plutonium into Rat Bile, Radiation Research, vol. 80, pp. 108-115, 1979.
Binz, et al., Engineering Novel Binding Proteins From Nonimmunoglobulin Domains, Nature Biotechnology, vol. 23, pp. 1257-1268, 2005.
Bird, et al., Single-chain antigen-binding proteins, Science, vol. 242, No. 4877, pp. 423-426, 1988.
Boersma, et al., DARPins and Other Repeat Protein Scaffolds: Advances in Engineering and Applications, Current Opinion in Biotechnology, vol. 22, No. 4, pp. 849-857, 2011.
Bunin, et al., Dose-Dependent Efficacy and Safety Toxicology of Hydroxypyridinonate Actinide Decorporation Agents in Rodents: Towards a Safe and Effective Human Dosing Regimenm Radiation Research, vol. 179, No. 2, pp. 171-182, 2013.
Bünzlil, et al., Lanthanide Luminescence for Biomedical Analyses and Imaging, Chemical Reviews, vol. 110, No. 5, pp. 2729-2755, 2010.
Bünzlil, et al. Taking Advantage of Luminescent Lanthanide Ions, Chemical Society Reviews, vol. 34, No. 12, pp. 1048-1077, 2005.
Carnall, et al., A Systematic Analysis of the Spectra the Trivalent Actinide Chlorides in D3h Site Symetry, Argonne National Laboratory, Argonne , Illinois, USA, 1989.
Carott, et al., Distribution of plutonium, americium and interfering fission products between nitric acid and a mixed organic phase of TODGA and DMDOHEMA in kerosene, and implications for the design of the "Euro-Ganex" process, Hydrometallurgy, vol. 152, pp. 139-148, 2015.
Carrot, et al. Neptunium Extraction and Stability in the Ganex Solvent: 0.2 M Todga/0.5 M Dmdohema/ Kerosene, Solvent Extraction and Ion Exchange, 2012.
Captain, et al., Engineered Recognition of Tetravalent Zirconium and Thorium by Chelator—Protein Systems: Toward Flexible Radiotherapy and Imaging Platforms, Inorganic Chemistry, vol. 55, pp. 11930-11936, 2016.
Cassatt, et al., Medical Countermeasures Against Nuclear Threats: Radionuclide Decorporation Agents., Radiation Research, vol. 170, No. 4, pp. 540-548, 2008.
Chang, et al., Analytical Methods for the Bioavailability Evaluation of Hydroxypyridinonate Actinide Decorporation Agents in Pre-Clinical Pharmacokinetic Studies, Journal Chromatography Separation Technique Journal, 2012.
Chen, et al. Core/Shell NaGdF4:Nd3+/NaGdF4 Nanocrystals with Efficient Near-Infrared to Near-Infrared Downconversion Photoluminescence for Bioimaging Applications, ACS Nano, vol. 6, No. 4, pp. 2969-2977, 2012.
Choi, et al., Biodistribution of the Multidentate Hydroxypyridinonate Ligand [(14) CJ-3,4,3-L/(1,2-HOPO), a Potent Actinide Decorporation Agent, Drug Development Research, vol. 76, No. 3, pp. 107-122, 2015.
Choi, et al., In vitro metabolism and stability of the actinide chelating agent 3,4,3-Lf {1,2-I-/OPO). Journal of pharmaceutical sciences, vol. 104, No. 5, pp. 1832-1838, 2015.
Choi, et al., Understanding the Health Impacts and Risks of Exposure to Radiation, in Reflections on the Fukushima Daiichi Nuclear Accident, Chemical Sciences Division, Lawrence Berkeley National Laboratory, pp. 259-281, 2015.
Chudinov, et al., The separation of berkelium (III) from cerium (III), Journal of Radioanalytical and Nuclear Chemistry, vol. 10, pp. 41-46, 1972.

(56) References Cited

OTHER PUBLICATIONS

Cortez-Retamozo, V. et al., Efficient Cancer Therapy with a Nanobody-Based Conjugate, Cancer Research, vol. 64, pp. 2853-2857, 2004.
Cotton, et al., Wiley, 2006. http://www.wiley.com/WileyCDA/WileyTitle/productCd-0470010053.html.
Daumann, et al. New Insights into Structure and Luminescence of Eu(III) and Sm(III) Complexes of the 3,4,3-Li(1,2-HOPO) Ligand, Journal of the American Chemical Society, vol. 137, pp. 2816-2819, 2015.
Deblonde, et al., A New Strategy for the Purification of Heavy Actinides and Medical Radioisotopes, Advanced Techniques in Actinide Spectroscopy, 2018.
Deblonde, et al., Chelation and stabilization of berkelium in oxidation state +IV, Nature Chemistry, vol. 9, pp. 843-849, 2017.
Deblonde, et al., Complexation, Characterization and Separation of the Lanthanides and Actinides: Shedding Light to Subtle Differences within the f-element Series, Actinides and Rare Earths Focus Topic, 2018.
Deblonde, et al., Solution Thermodynamic Stability of Complexes Formed with the Octadentate Hydroxypyridinonate Ligand 3,4,3-LI(1,2-HOPO): A Critical Feature for Efficient Chelation of Lanthanide(IV) and Actinide(IV) Ions, Inorganic Chemistry, vol. 52, pp. 8805-8811, 2013.
Deblonde, et al., 1387—Hydropyridinonate ligands: From iron(III) to berkelium(IV) chemistry, Abstract.
Deblonde, et al., Inducing Selectivity and Chirality in Group IV Metal Coordination With High-Denticity Hydroxypyridinonest, Dalton Transactions, No. 23, 2019.
Deblonde, et al., Solution Thermodynamics and Kinetics of Metal Complexation with a Hydroxypyridinone Chelator Designed for Thorium-227 Targeted Alpha Therapy, Inorganic Chemistry, vol. 57, pp. 14337-14346, 2018.
Deblonde, et al., Solution thermodynamics of hydropyridinonate 4f and 5f complexes, 28th Rare Earth Research Conference, 2017.
Deblonde, et al., Toxic heavy metal—Pb, Cd, Sn—complexation by the octadentate hydroxypyridinonate ligand archetype 3,4,3-LI(1,2-HOPO)†, New Journal of Chemistry, vol. 42, pp. 7649-7658, 2018.
Deblonde, et al., Ultra-selective Ligand-driven Separation of Strategic Actinides, Nature Communications, 2019.
Deblonde, et al., Inorganic chemistry, vol. 52, No. 15, pp. 8805-8811,2013.
Delmau, et al., Extraction of Trivalent Actinides and Lanthanides from Californium Campaign Rework Solution Using Todga-based Solvent Extraction System, Oak Ridge National Laboratory, 2017.
Deri, et al., Alternative Chelator for 89Zr Radiopharmaceuticals: Radiolabeling and Evaluation of 3,4,3-(LI-1,2-HOPO), Journal of Medicinal Chemistry, vol. 57, No. 11, pp. 4849-4860, 2014.
Deri, et al., Bioconjugate Chemistry, vol. 26, No. 12, pp. 2579-2591, 2015.
Deri, et al., A Superior Bifunctional Chelator for 89Zr ImmunoPET, Bioconjugate Chemistry, vol. 26, No. 12, pp. 2579-2591, 2015.
Designing a Process for Selecting a Site for a Deep-Mined, Geologic Repository for High Level Radioactive Waste and Spent Nuclear Fuel, United States Nuclear Waste Technical Review Board, pp. 1-228, 2015.
Durbin, et al. Actinides in Animals and Man, in the Chemistry of the Actinide and Transactinide Elements, L.R. Morss, N.M. Edelstein, and J. Fuger, Editors, pp. 3339-3340, 2006.
Durbin, et al., Gross Composition and Plasma and Extracellular Water Volumes of Tissues of a Reference Mouse, Health Physics, vol. 63, No. 4, pp. 427-442, 1992.
Durbin, et al., Lecture: The Quest for Therapeutic Actinide Chelators, Health Physics, vol. 95, No. 5, pp. 465-492, 2008.
Dutta, et al., Studies on separation of 90Y and 90Sr separation from hydrochloric acid solutions using Todga as the extractant by SLM method, Procedia Chemistry, vol. 7, pp. 191-194, 2012.
Fritsch, et al., Simplified Structure of a New Model to Describe Urinary Excretion of Plutonium After Systemic, Liver or Pulmonary Contamination of Rats Associated With Ca-DTPA Treatments, Radiation Research, vol. 171, No. 6, pp. 674-686, 2009.
Fritsch, et al., Structure of a Single Model to Describe Plutonium and Americium Decorporation by DTPA treatments, Health Physics, vol. 99, No. 4, pp. 553-559, 2010.
Gans, et al., Investigation of Equilibria in Solution. Determination of Equilibrium Constants with the Hyperquad Suite of Programs, Talanta, vol. 43, pp. 1739-1753, 1996.
Gennaro, et al., Remington: The Science and Practice of Pharmacy, 20th ed, 2003.
Goetz, et al., The Neutrophil Lipocalin NGAL Is a Bacteriostatic Agent That Interferes With Siderophore-Mediated Iron Acquisition, Molecular Cell, vol. 10, pp. 1033-1043, 2002.
Gorden, et al., Rational Design of Sequestering Agents for Plutonium and Other Actinides, Chemical Reviews, vol. 103, pp. 4207-4282, 2003.
Grappin, et al., Treatment of actinide exposures: A review oJCa-DTPA injections inside CEA-COGEMA plants, Radiation Protection Dosimetry, vol. 127, pp. 435-439, 2007.
Gregoric, et al., Characterization and Leaching of Neodymium Magnet Waste and Solvent Extraction of the Rare-Earth Elements Using Todga, Journal of Sustain. Metall, vol. 3, pp. 638-645, 2017.
Grimes, et al., Trivalent Lanthanide/Actinide Separation Using Aqueous-Modified Talspeak Chemistry, Solvent Extraction and Ion Exchange, vol. 32, No. 4, pp. 378-390, 2014.
Gutmacher, et al., The absorption spectra of Bk3+ and Bk4+ in solution, Journal of Inorganic and Nuclear Chemistry, vol. 29, pp. 2341-2345, 1967.
Gutmacher, et al., Stability of Tetravalent Berkelium in Acid Solution and the Absorption Spectra of Bk(IV) and Bk(III), Journal of Inorganic and Nuclear Chemistry, pp. 979-994, 1973.
Harvey, Production of Actinium-225 via High Energy Proton Induced Spallation of Thorium-232. Final Technical Report DE-SC0003602, NorthStar Medical Radioisotopes, LLC, https://world wide web .osti.gov/scitech/servlets/purl/1032445/).
Hobart, et al., The Chemistry of the Actinide and Transactinide Elements—Chapter X—Berkelium, Springer, 2006.
Hoet, et al., Generation of High-Affinity Human Antibodies by Combining Donor-Derived and Synthetic Complementarity-Determining-Region Diversity, Nature Biotechnology, vol. 23, pp. 344-348, 2005.
Holliger, et al., Diabodies: small bivalent and bispecific antibody fragments, Proceedings of the National Academy of Sciences of the USA, vol. 90, pp. 6444-6448, 1993.
Hudson, et al., Engineered antibodies, Nature Medicine, vol. 9, pp. 129-134, 2003.
Husain, et al., Extraction chromatography of lanthanides using N,N,N',N'-tetraoctyl diglycolamide (Todga) as the stationary phase, Desalination, vol. 229, pp. 294-301, 2008.
Huston, et al., Protein Engineering of Antibody Binding Sites: Recovery of Specific Activity in an Anti-Digoxin Single-Chain Fv Analogue Produced in *Escherichia coli*, Proceedings of the National Academy of Sciences of the USA, vol. 85, pp. 5879-5883, 1988.
Iqbal, et al., Synthesis and Am/Eu extraction of novel Todga derivatives, Supramolecualr Chemistry, vol. 22, pp. 827-837, 2010.
Jang, et al. Bright dual-mode green emission from selective set of dopant ions in β-Na(Y,Gd)F4:Yb,Er/β-NaGdF4:Ce, Tb core/shell nanocrystals, Optics Express, vol. 20, No. 15, pp. 17107-17118, (2012).
Jarvis, et al., Significance of Single Variables in Defining Adequate Animal Models to Assess the Efficacy of New Radionuclide Decorporation Agents: Using the Contamination Dose as an Example. Drug Development Research, vol. 73, No. 5, pp. 281-299, 2012.
Burgaada, et al., Journal of Labelled Compounds and Radiopharmaceuticals, vol. 44, pp. 13-19, 2001.
Jursich, et al., Laser induced fluorescence of 249 Bk 4+ in CeF 4, Inorganica Chim. Acta. vol. 139, pp. 273-274. 1987.
Konzen, et al., Development of the Plutonium-DTPA Biokinetic Model. Health Physics, vol. 108, No. 6, pp. 565-573, 2015.
Kurkoti, et al., Gadolinium and nephrogenic systemic fibrosis: Association or causation. 1-10 Nephrology, vol. 13, pp. 235-241, 2008.
Kullgren, et al., Actinide Chelation: Biodistribution and In Vivo Complex Stability of the Targeted Metal Ions, Toxicology Mechanisms and Methods, vol. 23, No. 1, pp. 18-26, 2013.

(56) References Cited

OTHER PUBLICATIONS

Lakowicz, et al., Energy Transfer, Principles of Fluorescence Spectroscopy, pp. 367-394, 2006.

Lake, et al., Construction and Binding Analysis of Recombinant Single-Chain TCR Derived From Tumor-Infiltrating Lymphocytes and a Cytotoxic T Lymphocyte Clone Directed Against MAGE-1, International Immunology, Vo. 11, pp. 745-751, 1999.

Lakshminarayana, et al., Cooperative downconversion luminescence in Pr3+/Yb3+:SiO2—Al2O3—BaF2—GdF3 glasses, Journal of Materials Research, vol. 23, Issue 11, pp. 3090-3095, 2008.

Li, et al., Engineering Homogeneous Doping in Single Nanoparticle to Enhance Upconversion Efficiency, Nano Lett., vol. 14, No. 6, pp. 3634-3639, 2014.

Li, et al., Enhanced NIR downconversion luminescence by precipitating nano Ca5(PO4)3F crystals in Eu2+—Yb3+ co-doped glass, Spectrochimica Acta Part A: Molecular and Biomolecular Spectroscopy, vol. 114, pp. 575-578, 2013.

Li, et al. Nd3+ Sensitized Up/Down Converting Dual-Mode Nanomaterials for Efficient In-vitro and In-vivo Bioimaging Excited at 800 nm, Scientific Reports, vol. 3, pp. 3536, 2013.

Liu, et al. A Stratgey to Achieve Efficent Dual-Mode Luminscence of EU3+ in Lanthanides Doped Multifunctional NAGdF4 Nanocrystals, Adv Matter, vol. 22, pp. 3266-3271, 2010.

Liu, et al. Morphology and Phase-Controlled Synthesis of Monodisperse Lanthanide-Doped NaGdF4 Nanocrystals with Multicolor Photo Luminsence, Journal of Materials Chemistry, vol. 19, pp. 489-496, 2009.

Liu et al., Procedures for a fast separation of berkelium from complex mixtures of reaction products, J. Radioanal. Nucl. Chem. 76, pp. 119-124, 1983.

Lohithakshan, et al., Solvent extraction studies of plutonium(IV) and americium(III) in room temperature ionic liquid (RTIL) by di-2-ethyl hexyl phosphoric acid (HDEHP) as Extractant, Journal of Radioanalytical and Nuclear Chemistry, vol. 301, pp. 153-157, 2014.

Loomis, et al., Inorganic Chemistry, vol. 30, No. 5, pp. 906-911, 1991.

Lumetta, et al., An Advanced Talspeak Concept Using 2-Ethylhexylphosphonic Acid Mono-2-Ethylhexyl Ester as the Extractant, Solvent Extraction and Ion Exchange, vol. 33, No. 3, pp. 211-223, 2015.

Lundberg, et al., Structural Study of the N,N'-Dimethylpropyleneurea Solvated Lanthanoid(III) Ions in Solution and Solid State with an Analysis of the Ionic Radii of Lanthanoid(III) Ions, Inorganic Chemistry, vol. 49, pp. 4420-4432, 2010.

Lundberg, et al., The size of actinoid(III) ions—structural analysis vs. common misinterpretations, Coordination Chemistry Reviews, vol. 318, pp. 131-134, 2016.

Martell, et al., NIST Standard Reference Database; National Institute of Standards and Technology: Gaithersburg, MD.

Maynard, et al., High-Level Bacterial Secretion of Single-Chain Aβ T-Cell Receptors, Journal of Immunological Methods, vol. 306, pp. 51-67, 2005.

Mimum, et al., Bimodal imaging using neodymium doped gadolinium fluoride nanocrystals with near-infrared to near-infrared downconversion luminescence and magnetic resonance properties, Journals of Materials Chemistry B, vol. 1, pp. 5702-5710, 2013.

Milyukova, et al. Extraction of Bk(IV) with POM—Milyukova, 1986.pdf, J. Radioanal. Nucl. Chem. 104 pp. 81-90, (1986).

Modolo, et al., Recovery of Actinides and Lanthanides From High-Level Liquid Waste by Extraction Chromatography Using TODGA+TBP Impregnated Resins, Radiochimica Acta, vol. 95, pp. 391-397, 2007.

Modolo, et al., Development of a Todga based Process for Partitioning of Actinides from a Purex Raffinate Part I: Batch Extraction Optimization Studies and Stability Tests, Solvent Extraction and Ion Exchange, 2007.

Moore, et al. An octadentate luminescent Eu(III) 1,2-HOPO chelate with potent aqueous stability, Inorganic Chemistry, vol. 46, No. 14, pp. 5468-5470, 2007.

Moore, et al., Application of dual affinity retargeting molecules to achieve optimal redirected T-cell killing of B-cell lymphoma, Blood, Vo. 117, pp. 4542-4551, 2011.

Moore, et al. Liquid-liquid Extraction Method for the Separation of Cerium (IV) From Berkelium (IV) and Other Elements, Analytical Chemistry, vol. 41, pp. 1658-1661, 1969.

Moore, et al., New Method for Rapid Separation of Berkelium (IV) From Cerium (IV) by Anion Exchange, Analytical Chemistry, vol. 39, pp. 1874-1876, 1967.

Moos, et al., Radiation Drugs—A Hot Topic. Drug Development Research, vol. 73, No. 5, pp. 229-231, 2012.

Morita, et al. Development of Todga Extraction Process for High-Level Liquid Waste—Preliminary Evaluation of Actinide Separation by Calculation, 2000.

Morris, et al., Voltammetric Investigation of the Berkelium(IV/III) Couple in Concentrated Aqueous Carbonate Solutions, Radiochimica Acta, pp. 125-134, 1990.

Morss et al., The Chemistry of the Actinide and Transactinide Elements, 4th ed, Springer,(2010).

Nash, et al., The Chemistry of Talspeak: A Review of the Science, Solvent Extraction. Ion Exchange Journal, vol. 33, No. 1, pp. 1-55, 2015.

NCRP, Management of Persons Contaminated with Radionuclides: Handbook, in NCRP Publication. 2008: Bethesda.

Nord, et al., A combinatorial library of an α-helical bacterial receptor domain, Protein Engineering, Design and Selection, vol. 8, No. 6, pp. 601, 1995.

Nord, et al., Binding proteins selected from combinatorial libraries of an α-helical bacterial receptor domain, Nature Biotechnology, vol. 15, pp. 772-777, 1997.

Nord, et al., Recombinant human factor VIII-specific affinity ligands selected from phage-displayed combinatorial libraries of protein A, European Journal of Biochemistry, vol. 268, pp. 4269-4277, 2001.

Nugent, et al., Electron-transfer and fd Absorption Bands of Some Lanthanide and Actinide Complexes and the Standard (II-III) Oxidation Potential for Each Member of the Lanthanide and Actinide Series, The Journal of Physical Chemistry A, vol. 77, pp. 1528-1539, 1973.

Nugent, et al., Intramolecular Energy Transfer and Sensitized Luminescence in Actinide (III). Beta.-Diketone Chelates, The Journal of Physical Chemistry A, vol. 73, pp. 1540-1549, 1969.

Ostapenko, et al., Extraction Chromatographic Behavior of Actinium and REE on DGA, Ln and TRU Resins in Nitric Acid Solutions, Journal of Radioanalytical and Nuclear Chemistry, vol. 306, pp. 707-711, 2015.

Oxford Dictionary of Biochemistry and Molecular Biology Ed. Anthony Smith, Oxford University Press, Oxford, 2004.

Parker, S et al., The McGraw-Hill Dictionary of chemical Terms, 1985.

Payne, et al. Possible Stabilization of the Tetravalent Oxidation State of Berkelium and Californium in Acetonitrile With Triphenylarsine Oxide, Inorganica Chimica Acta, vol. 139 , pp. 111-112, 1987.

Peppard, et al. Isolation of Berkelium by Solvent Extraction of the Tetravalent Species, Journal of Inorganic and Nuclear Chemistry, vol. 4, pp. 344-348, 1957.

Pham, et al., A Macrocyclic Chelator with Unprecedented Th4+ Affinity, Journal of the American Chemical Society, vol. 136, No. 25, pp. 9106-9115, 2014.

Plueckthon the Pharmacology of Monoclonal Antibodies, vol. 113, Rosenburg and Moore, 269-315, 1994.

Pokhrel, et al. Stokes emission inGdF3:Nd3+ nanoparticles for bioimaging probe, Nanoscale, vol. 6, No. 3, pp. 1667-1674, 2014.

Pourmand, et al., Distribution coefficients of 60 elements on Todga resin: Application to Ca, Lu, Hf, U and Th isotope geochemistry, Talanta, vol. 81, pp. 741-753, 2010.

Radchenko et al., Application of Ion Exchange and Extraction Chromatography to the Separation of Actinium From Proton-Irradiated Thorium Metal for Analytical Purposes, Journal of Chromatography, pp. 55-63, 2015.

Remington's Pharmaceutical Sciences, 18th Ed. Mack Printing Company, 1990.

Ricano, et al. Combinatorial Design of Multimeric Chelating Peptoids for Selective Metal Coordination, Chemical Science, 2019.

(56) References Cited

OTHER PUBLICATIONS

Shannon, et al., Revised Effective Ionic Radii and Systematic Studies of Interatomic Distances in Halides and Chalcogenides, Acta Crystallographica A32, pp. 751-757, 1976.
Shockley, et al. Detailed Balance Limit of Efficiency of p—n Junction Solar Cells, Journal of Applied Physics, vol. 32, No. 3, pp. 510-519, 1961.
Smith, et al., NIST Critically selected stability constants of metal complexes database, NIST standard reference database, 2004.
Stather, et al., Use of DTPAfor increasing the rate of elimination ofplutonium-238 and americium-241from rodents after their inhalation as the nitrates, Human & Experimental Toxicology, vol. 4, No. 6, pp. 573-582, 1985.
Stockley, et al., Absorption Spectra of the Bk(IV)-Bk(III) in several media, Journal of Inorganic and Nuclear Chemistry, vol. 34, pp. 739-746, 1972.
Sturzbecher-Hoehne, et al., Highly Luminescent and Stable Hydroxypyridinonate Complexes: A Step Towards New Curium Decontamination Strategies, Chemistry—A European Journal, vol. 20, No. 32, pp. 9962-9968, 2014.
Sturzbecher-Hoehne, et al., Hydroxypyridinonate Complex Stability of Group (IV) Metals and Tetravalent f-Block Elements: The Key to the Next Generation of Chelating Agents for Radiopharmaceuticals, Inorganic chemistry, vol. 54, No. 7, pp. 3462-3468, 2015.
Sturzbecher-Hoehne, et al. 3,4,3-LI(1,2-HOPO): In vitroformation of highly stable lanthanide complexes translates into efficacious in vivo europium decorporation, Dalton Trans., vol. 40, No. 33, pp. 8340-8346, 2011.
Sturzbecher-Hoehne, et al Intramolecular Sensitization of Americium Luminescence in Solution: Shining Light on Short-Lived Forbidden 5f Transitions, Dalton Transactions, vol. 45, pp. 9912-9919, 2016.
Sturzbecher-Hoehne, et al., Solution Thermodynamic Evaluation of Hydroxypyridinonate Chelators 3,4,3-LI(1,2-HOPO) and 5-LIO(Me-3,2-HOPO) for UO2(VI) and Th(IV) Decorporation, Radiochimica Acta, vol. 101, No. 6, pp. 359-366, 2013.
Suzuki, et al., Extraction and separation of Am(III) and Sr(II) by N,N,N ,N-tetraoctyl-3-oxapentanediamide (Todga), Radiochimica Acta vol. 92, pp. 463-466, 2004.
Tachimori, et al. Modification of Todga-N-Dodecane Solvent With a Monoamide for High Loading of Lanthanides(III) and Actinides(III), Solvent Extraction and Ion Exchange, 2007.
Taylor, et al., Treatment of Human Contamination With Plutonium and Americium: Would Orally Administered Ca- or Zn-DTPA be effective? Radiation Protection Dosimetry, vol. 127, pp. 469-471, 2007.
Thompson, et al, Element 97, Physics Review, vol. 77, pp. 838, 1950.
Thompson, et al, Chemical properties of Berkelium, Journal of the American Chemical Society, vol. 72, pp. 2798-2801, 1950.
Trissel, L. et al., ASHP Handbook on Injectable Drugs 4th ed, pp. 622-630, 1986.
Turanov, et al., Synergistic Extraction of U(VI), Th(IV), and Lanthanides(III) from Nitric Acid Solutions Using Mixtures of Todga and Dinonylnaphthalene Sulfonic Acid, Solvent Extraction and Ion Exchange, 2018.
Umeda, et al., Separation of Americium from Plutonium-Solvent Extraction Raffinate by Extraction Chromatography using Todga Absorbent, Atlantate, 2004.
U.S. Food and Drug Administration, Guidance for Industry Calcium DTPA and Zinc DTPA Drug Products—Submitting a New Drug Application. 2004.
US. Food and Drug Administration, Guidance for Industry Internal Radioactive Contamination—Development of Decorporation Agents. 2006.
U.S. Food and Drug Administration, Guidance for Industry Product Development Under the Animal Rule 2015.
U.S. Food and Drug Administration, Approval of New Drugs When Human Efficacy Studies Are Not Ethical or Feasible. 2015, U.S. FDA: Washington, DC.
Van Der Ende, et al., Lanthanide ions as spectral converters for solar cells, Physical Chemistry Chemical Physics, vol. 11, pp. 11081-11095, 2009.
Van Wijngaarden, et al. Energy Transfer Mechanism for Downconversion in the (Pr3+, Yb3+) couple, Physics Review, vol. 81, Issue 15, pp. 155112, 2010.
Wadsworth, et al., Present Status of Cerium (IV)-Cerium (III) Potentials, Analytical Chemistry, vol. 29, pp. 1824-1825, 1957.
Wai, et al., Carboxylate-Derived Calixarenes With High Selectivity for Actinium-225, Chemical Communications pp. 377-378, 1998.
Wang, et al. Down- and Up-Conversion Photoluminescence, Cathodoluminescence and Paramagnetic Properties of NaGdF4 : Yb3+,Er3+ Submicron Disks Assembled From Primary nanocrystals, Journal of Materials Chemistry, Issue 16, pp. 3178-3185, 2010.
Wang, et al. Extraction of Trivalent Americium and Europium With Todga Homologs From HNO3 Solution, Journal of Radioanalytical and Nuclear Chemistry, vol. 313, pp. 309-318, 2017.
Wang, et al. Preparation of Core-Shell NaGdF4 Nanoparticles Doped with Luminescent Lanthanide Ions to be Used as Upconversion-Based Probes, Nature Protocols, vol. 9, No. 7, pp. 1634-1644, 2014.
Wawrzynczyk, et al. Ligand-dependent luminescence of ultra-small Eu3+-doped NaYF4 nanoparticles, Journal of Nanoparticle Research, vol. 15, pp. 1707, 2013.
Weidle et al., The Emerging Role of New Protein Scaffold-based Agents for Treatment of Cancer, Cancer Genomics and Proteomics. vol. 10, pp. 155, 2013.
Weitl, et al., Specific sequestering agents for the actinides. 3. Polycatecholate ligands derived from 2,3-dihydroxy-5-sulfobenzoyl conjugates of diaza- and tetraazaalkanes, Journal of the American Chemical Society, vol. 102. No. 7, pp. 2289-2293, 1980.
Welcher, F. J. The analytical uses of ethylenediamine tetraacetic acid; 1958.
Wermuth, C. et al., Designing Prodrugs and Bioprecursors, pp. 561-586, 2003.
Whitaker, et al., Applications of Diglycolamide Based Solvent Extraction Processes in Spent Nuclear Fuel Reprocessing, Part 1: Todga, Solvent Extraction and Ion Exchange, 2018.
Whitcomb, et al., A Public Health Perspective on the U.S. Response to the Fukushima radiological emergency. Health Phys, vol. 108, No. 3, pp. 357-363, 2015.
White, et al., Specific Sequestering Agents for the Actinides. 16. Synthesis and Initial Biological Testing of Polydentate Oxohydroxypyridinecarboxylate Ligands, Journal of Medicinal Chemistry, vol. 31, No. 1, pp. 11-18, 1988.
Wilden, A. et al. Unprecedented Inversion of Selectivity and Extraordinary Difference in the Complexation of Trivalent f-Elements by Diastereomers of a Methylated Diglycolamide, Chemistry a European Journal, 2019.
Xu, et al., Specific Sequestering Agents for the Actinides. 28. Synthesis and Initial Evaluation of Multidentate 4-Carbamoyl-3-hydroxy-1-methyl-2(1H)-pyridinone Ligands for in Vivo Plutonium (IV) Chelation, Journal of Medicinal Chemistry, vol. 38, No. 14, pp. 2606-2614, 1988.
Yantasee, et al., Novel Sorbents for Removal of Gadolinium-Based Contrast Agents in Sorbent Dialysis and Hemoperfusion: Preventive Approaches to Nephrogenic Systemic Fibrosis (NSF), Nanomedicine, vol. 6, No. 1, pp. 1-8, 2010.
Ye, et al. Down conversion luminescence of Tb3+—Yb3+ codoped SrF2 precipitated glass ceramics, Journal of Non-Crystalline Solids, vol. 357, Issues 11-13, pp. 2268-2271, 2011.
Ye, et al. Enhanced cooperative quantum cutting in Tm3+—Yb3+ codoped glass ceramics containing LaF3nanocrystals, Optics Express, vol. 16, No. 12, pp. 8989-8994, 2008.
Zou, et al. Broadband Dye-Sensitized Upconversion of Near-Infrared Light, Nature Photonics, vol. 6, pp. 560-564, 2012.
Zhang et al, Novel enterobactin analogues as potential therapeutic chelating agents: Synthesis, thermodynamic and antioxidant studies Scientific Reports, vol. 6, pp. 1-12, 2016.

(56) References Cited

OTHER PUBLICATIONS

Zhu, et al. An active-core/active-shell structure with enhanced quantum-cutting luminescence in Pr—Yb co-doped monodisperse nanoparticles, Nanoscale, vol. 6, pp. 10500-10504, 2014.
Zhu, X et al. Cumulative study on solvent extraction of elements by N,N,N ,N-tetraoctyl-3-oxapentanediamide (Todga) from nitric acid into n-dodecane, Analytica Chimica Acta 527, pp. 163-168, 2004.
International Preliminary Report on Patentability dated Nov. 6, 2018 in International Patent Application No. PCT/US2017/030628.
International Preliminary Report on Patentability dated Mar. 12, 2019 in International Patent Application No. PCT/US2017/050121.
International Preliminary Report on Patentability dated Apr. 11, 2019 in International Patent Application No. PCT/US2017/048910.
International Preliminary Report on Patentability dated Apr. 11, 2019 in International Patent Application No. PCT/US2017/048934.
International Search Report and Written Opinion dated Jul. 27, 2017 in International Patent Application No. PCT/US2017/030628.
International Search Report and Written Opinion Dated Nov. 13, 2017 in International patent application PCT/US2017/050121.
International Search Report Dated Dec. 21, 2017 in International Patent Application No. PCT/US2017/048910.
International Search Report Dated May 11, 2018 in International Patent Application No. PCT/US2017/048934.
Office Action Dated Nov. 21, 2018 in U.S. Appl. No. 15/442,441.
Office Action Dated May 6, 2019 in U.S. Appl. No. 15/442,441.
Office Action Dated Aug. 23, 2019 in U.S. Appl. No. 15/442,441.
Supplementary European Search Report, Dated Nov. 15, 2019, in European Application No. EP 17793154.
Extended European Search Report Dated Mar. 24, 2020 in European App. No. 17849400.1.
Pharmaceutics, 1997, vol. 57 No. Suppl, pp. 62-63.
Decision to Grant in European Application No. 17849400.1, dated Oct. 7, 2022, in 2 pages.
Decision on Petition in U.S. Appl. No. 16/330,601, dated Jun. 23, 2022.
Office Action issued in European Application No. 17793154.0, dated Sep. 20, 2022, in 4 pages.
Decision of Refusal in Japanese Application No. 2018-557384, dated Sep. 29, 2022, with English translation, in 5 pages.
Corrected Notice of Allowability dated Nov. 28, 2022, in U.S. Appl. No. 16/330,601.
Notice of Allowance dated Nov. 7, 2022, in U.S. Appl. No. 16/330,601.
Carter et al., Developing scandium and yttrium coordination chemistry to advance theranostic radiopharmaceuticals, Communications Therapy, https://doi.org/10.1038/s42004-020-0307-0, pp. 1-7 (2020).
Notice of Allowance dated Jan. 30, 2023, in U.S. Appl. No. 16/365,132.
Office Action dated Jan. 31, 2023, in Japanese Application No. 2022-008581.
Corrected Notice of Allowability dated May 19, 2023, in U.S. Appl. No. 16/330,601.
Notice of Allowance dated May 24, 2023, in U.S. Appl. No. 16/365,132.
Office Action in Japanese Application No. 2022-008581, dated Jun. 27, 2023, in 5 pages.
Corrected Notice of Allowability in U.S. Appl. No. 16/365,132, dated Mar. 21, 2023.
Notice of Allowance in Japanese Application No. 2019-516989, dated Mar. 29, 2023.
Non-Final Office Action dated Mar. 30, 2023, in U.S. Appl. No. 16/097,782.
Corrected Notice of Allowability dated Apr. 12, 2023, in U.S. Appl. No. 16/330,601.
Notice of Allowance dated Jun. 28, 2023, in U.S. Appl. No. 16/365,132.
Office Action in Canadian Application No. 3,022,852, dated Jun. 22, 2023, in 6 pages.
Notice of Allowance dated Jan. 8, 2024 in U.S. Appl. No. 16/365,132, in 12 pages.
Final Office Action dated Aug. 1, 2023, in U.S. Appl. No. 16/097,782.
Intention to Grant dated May 30, 2023, in European application No. 17873523.9.
Notice of Allowance in Japanese Application No. 2022-8581, dated Oct. 16, 2023.
Office Action in Canadian Application No. 3,035,966, dated Oct. 23, 2023.
Office Action in Canadian Application No. 3,038,723, dated Oct. 27, 2023.
Decision to Grant in European Application No. 17793154.0, dated Nov. 2, 2023.
Office Action in Canadian Application No. 3,038,670, dated Nov. 1, 2023.
(Office Action: Final Rejection) in U.S. Appl. No. 16/097,782, dated Jan. 12, 2024, in 11 pages.
Office Action in Canadian application No. 3,022,852, dated Jan. 16, 2024, in 6 pages.
Rees et al., "Evaluating the potential of chelation therapy to prevent and treat gadolinium deposition from MRI contrast agents", Scientific Reports, published online Mar. 13, 2018, www.nature.com/scientificreports, in 9 pages.
Office Action Dated Jan. 19, 2022 in U.S. Appl. No. 16/097,782.
Notice of Allowance dated Nov. 26, 2021 in Japanese Patent Application No. 2019-512761.
Notice of Allowance dated Oct. 29, 2021 in U.S. Appl. No. 16/330,601.
Supplemental Notice of Allowability dated Dec. 14, 2021 in U.S. Appl. No. 16/330,601.
Notice of Allowance dated Mar. 16, 2022 in U.S. Appl. No. 16/330,601.
Notice of Allowance dated Jul. 27, 2022 in U.S. Appl. No. 16/330,601.
Notice of Reason for Rejection dated Mar. 10, 2022 in Japanese Patent Application No. 2018-557384.
Intention to Grant dated May 18, 2022, in European Application No. 17849400.1.
Non-Final Office Action dated Feb. 25, 2022, in U.S. Appl. No. 16/365,132.
Office Action with English translation in Japanese Application No. 2019-516989, dated Aug. 5, 2022.
Corrected Notice of Allowability in U.S. Appl. No. 16/365,132, dated Mar. 26, 2024, in 3 pages.
Advisory Action in U.S. Appl. No. 16/097,782, dated Apr. 19, 2024, in 3 pages.
Corrected Notice of Allowability in U.S. Appl. No. 16/365,132, dated May 2, 2024, in 4 pages.
Interview Summary in U.S. Appl. No. 16/097,782, dated Apr. 15, 2024, in 3 pages.
Corrected Notice of Allowability in U.S. Appl. No. 17/665,135, dated Jun. 28, 2024, in 3 pages.
Notice of Allowance in U.S. Appl. No. 16/365,132, dated Mar. 1, 2024, in 3 pages.
Office Action in Japanese application No. 2023-16016, dated Mar. 5, 2024, in 3 pages.
Extended European Search report in European Application No. 23204493.3, dated Feb. 16, 2024, in 10 pages.
Notice of Allowance in U.S. Appl. No. 17/665,135, dated Jun. 20, 2024, in 47 pages.

\* cited by examiner

FIG. 9

| species | mlh | log β$_{mlh}$ | pK$_a$ |
|---|---|---|---|
| 3,4,3-LI(CAM) | | | |
| LH$^{7-}$ | 011 | 12.50 ± 0.30 | 12.50 ± 0.30 |
| LH$_2^{6-}$ | 012 | 24.50 ± 0.35 | 12.00 ± 0.30 |
| LH$_3^{5-}$ | 013 | 35.81 ± 0.55 | 11.31 ± 0.55 |
| LH$_4^{4-}$ | 014 | 45.41 ± 0.47 | 9.60 ± 0.12 |
| LH$_5^{3-}$ | 015 | 54.11 ± 0.23 | 8.70 ± 0.27 |
| LH$_6^{2-}$ | 016 | 61.93 ± 0.56 | 7.82 ± 0.57 |
| LH$_7$ | 017 | 68.67 ± 1.45 | 6.73 ± 0.61 |
| LH$_8$ | 018 | 73.24 ± 1.38 | 4.57 ± 0.29 |
| [EuL]$^{5-}$ | 110 | 29.65 ± 0.65 | - |
| [EuLH]$^{4-}$ | 111 | 41.75 ± 0.06 | - |
| [EuLH$_2$]$^{3-}$ | 112 | 46.79 ± 0.14 | - |
| [ZrL]$^{4-}$ | 110 | 57.26 ± 0.20 | - |
| [ZrLH]$^{3-}$ | 111 | 64.25 ± 0.32 | - |
| [ThL]$^{4-}$ | 110 | 47.71 ± 0.08 | - |
| [ThLH]$^{3-}$ | 111 | 55.36 ± 0.09 | - |
| 3,4,3-LI(1,2-HOPO) | | | |
| LH$^{3-}$ | 011 | 6.64 | 6.64 |
| LH$_2^{2-}$ | 012 | 12.32 | 5.68 |
| LH$_3$ | 013 | 17.33 | 5.01 |
| LH$_4$ | 014 | 21.20 | 3.87 |
| [EuL]$^-$ | 110 | 20.2 | - |
| [EuLH] | 111 | 24.8 | - |
| [ZrL] | 110 | 43.1 | - |
| [ThL] | 110 | 40.1 | - |

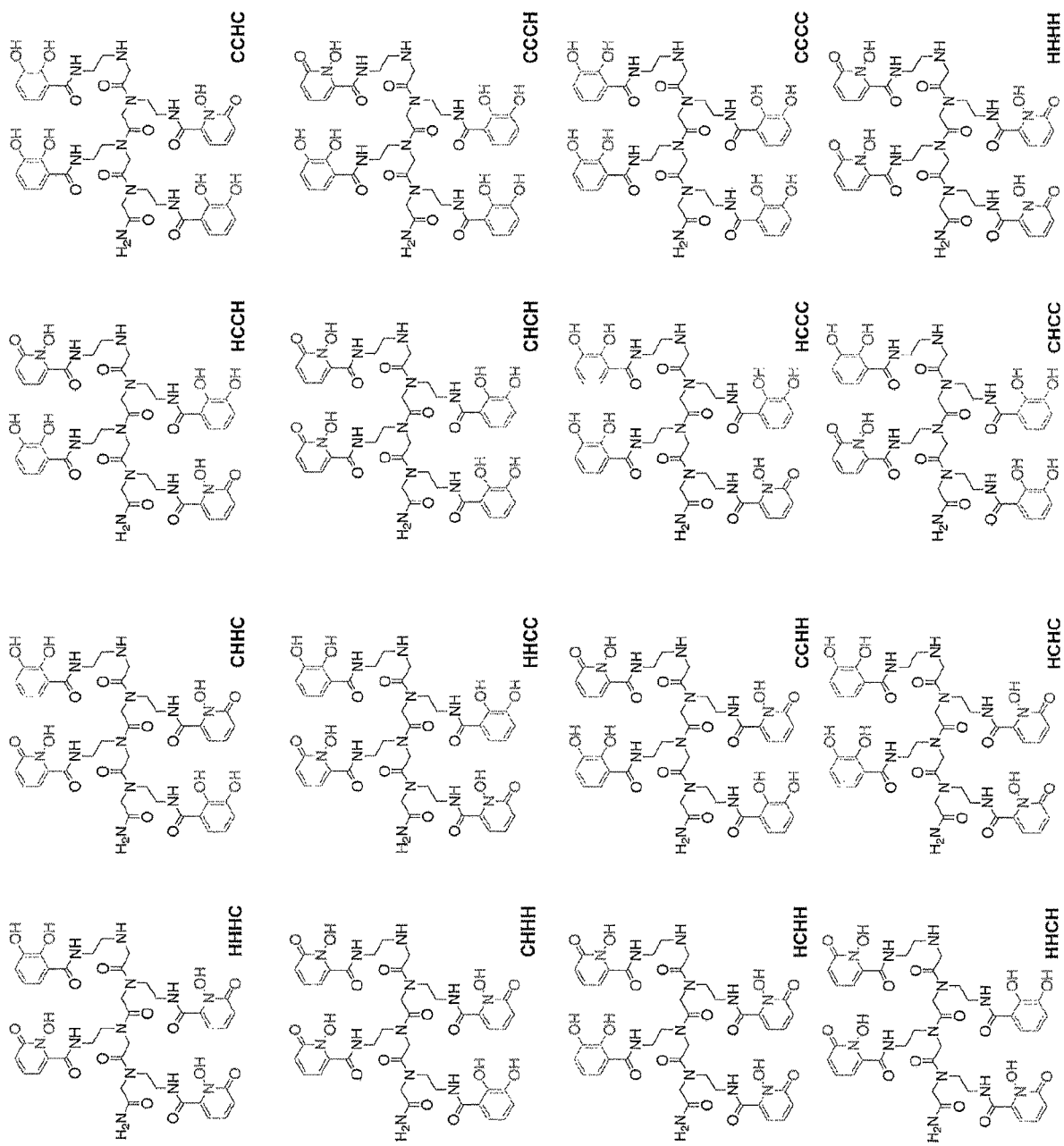
FIG. 10.E

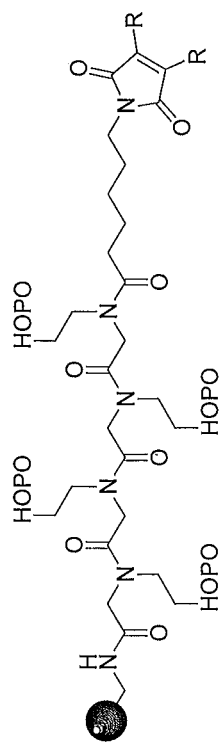
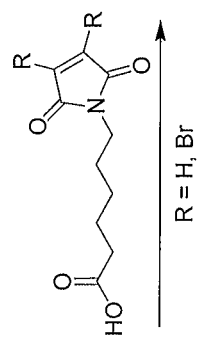
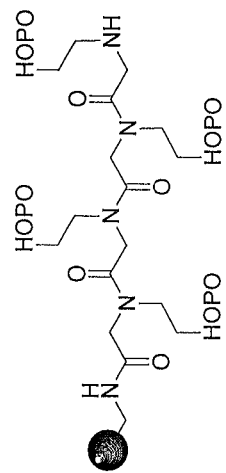
FIG. 11A

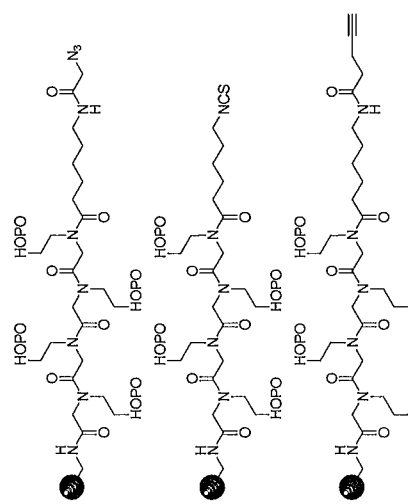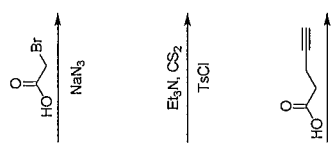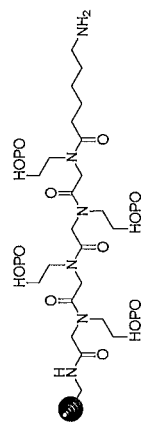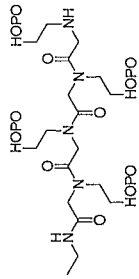
FIG 11B

Disulfide / Thiol Conjugation

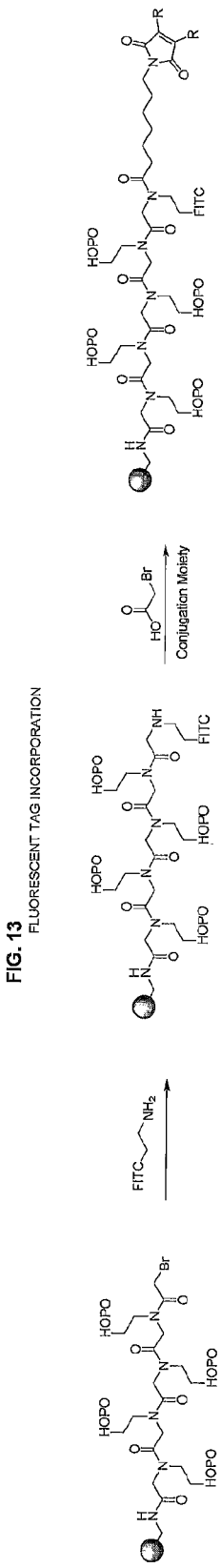
FIG. 13 FLUORESCENT TAG INCORPORATION

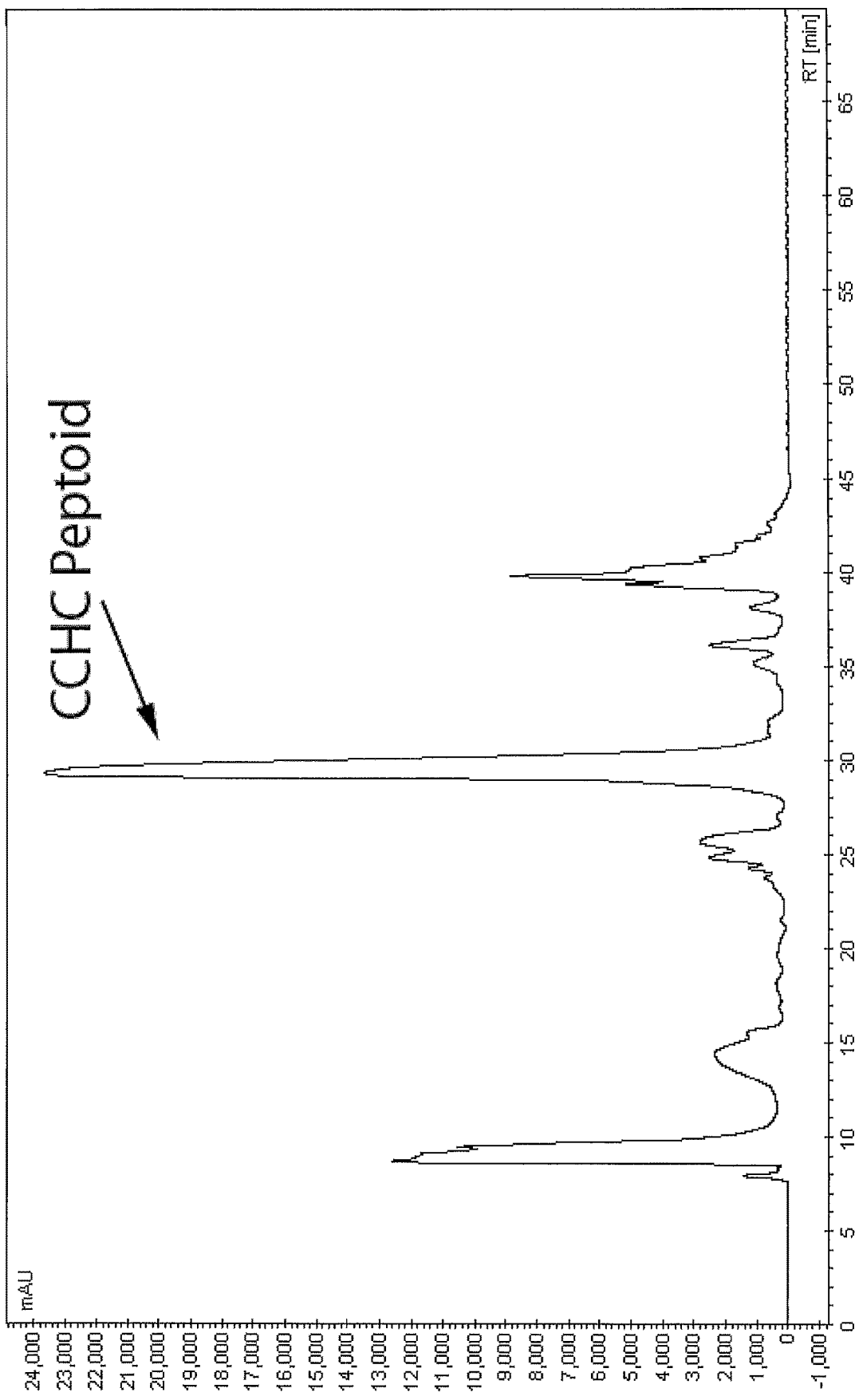
FIG. 14— A representative reversed-phase preparative HPLC trace

Left to right and top to bottom: HHHC, CHHH, HCHH, HHCH, CHHC, HHCC

Left to right and top to bottom: CCHH, HCHC, HCCH, CHCH, HCCC, CHCC

Left to right and top to bottom: CCHC, CCCH, CCCC (uncomplexed), HHHH:Zr:Na

FIG. 17
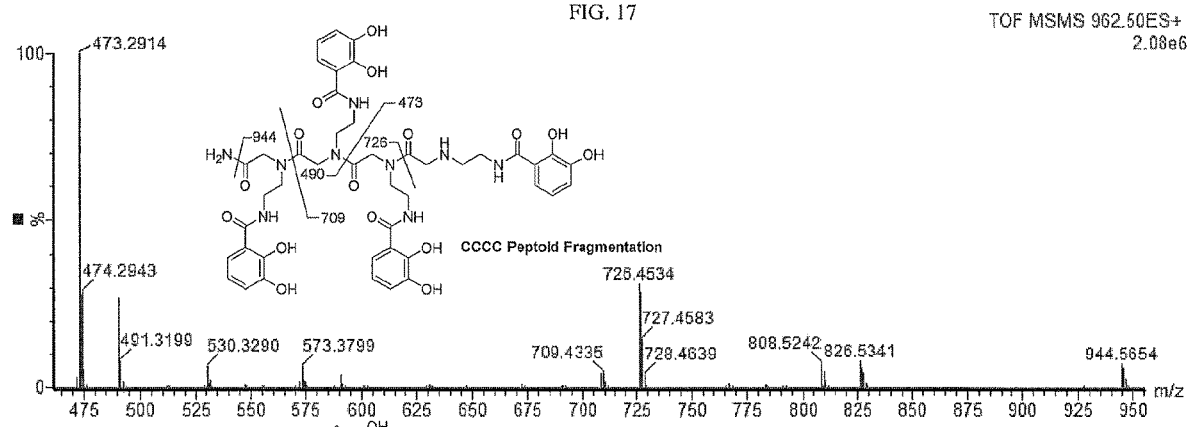
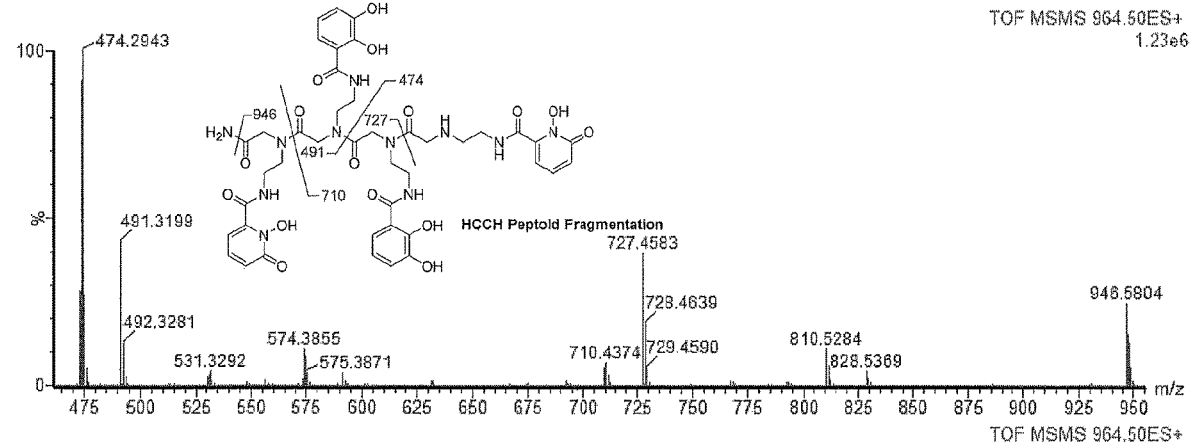
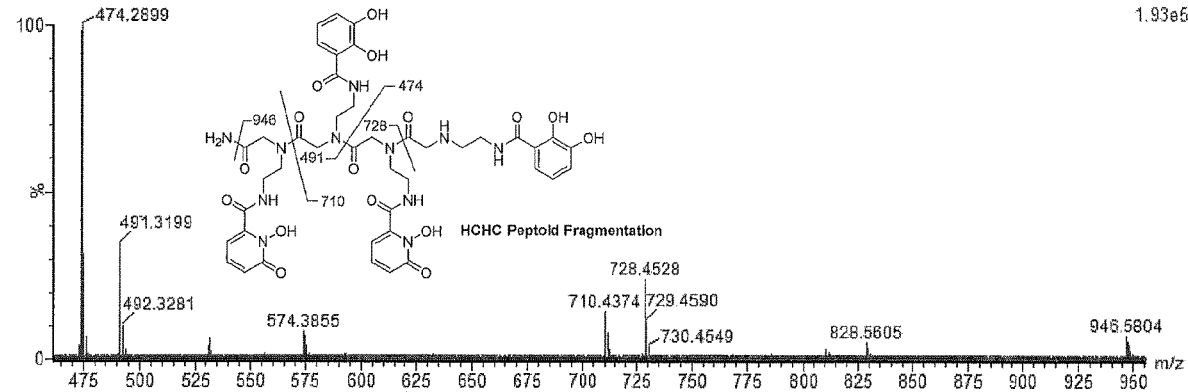

COMPOSITIONS OF CHELATING MOLECULES

CROSS REFERENCE TO RELATED APPLICATIONS

This application is the U.S. National Phase Application under 35 U.S.C. § 371 of International Application No. PCT/US2017/048910, filed Aug. 28, 2017, designating the U.S. and published as WO 2018/063638 A1 on Apr. 5, 2018, which claims the benefit of U.S. Provisional Application No. 62/401,687, filed on Sep. 29, 2016, which is hereby incorporated by reference in its entirety. Any and all applications for which a foreign or a domestic priority is claimed is/are identified in the Application Data Sheet filed herewith and is/are hereby incorporated by reference in their entireties under 37 C.F.R. § 1.57.

STATEMENT OF GOVERNMENT SUPPORT

This invention was made with government support under DE-AC02-05CH11231 awarded by the Department of Energy. The government has certain rights in the invention.

FIELD OF THE DISCLOSURE

The present disclosure provides various metal chelators.

BACKGROUND OF THE DISCLOSURE

Metal-binding ligands have a variety of uses, from medical to environmental and numerous other applications.

SUMMARY OF THE DISCLOSURE

In some embodiments, a composition having a structure is provided that comprises:

wherein:
(i) A1, A2, A3, and A4, individually, comprise a CAM group, a 1,2-HOPO group, or a HA group; (ii) B1, B2, B3, and B4, individually, comprise an amide group or an amine group; (iii) at least one of C1, C2, C3, C4, C5, or C6, individually, comprise $NH_2$, $C(=O)OH$, maleimide, dibromo-maleimide, isothiocyanate, alkyne, or azide;
(iv) at least another one of C1, C2, C3, C4, C5, or C6 is optional; (v) at least one of L1, L2, L3, L4, L5, L6, L7, L8, L9, L10, L11, L12, or L13, individually, comprise H, an alkyl group having no greater than 10 carbon atoms, an alkylamino group having no greater than 10 carbon atoms and no greater than 2 nitrogen atoms; an alkylamido group having no greater than 10 carbon atoms and no greater than 2 nitrogen atoms; an alkyl ether group having no greater than 10 carbon atoms, a hydroxy ester group, or an alkyl ester group having no greater than 10 carbon atoms; and (vi) at least one of L1, L5, L6, L7, L8, L9, L10, L11, L12, or L13 is optional.

In some embodiments a composition is provided that comprises a structure:

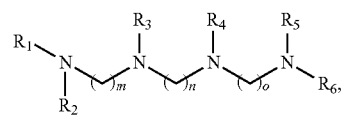

wherein: at least one of $R_1$, $R_2$, $R_3$, $R_4$, and $R_5$, individually, comprise a CAM group, a HA group, or a 1,2-HOPO group; at least another one of $R_1$, $R_2$, $R_3$, $R_4$, and $R_5$, individually, comprise H or an alkyl group having from 1 to 10 carbon atoms; $R_6$ comprises (i) H, (ii) an alkyl group having from 1 to 10 carbon atoms, or (iii) an alkyl group having from 1 to 10 carbon atoms and substituted by at least one of NH$_2$, C(=O)OH, maleimide, dibromo-maleimide, isothiocyanate, alkyne, or azide; m can be from 1 to 6; n can be from 1 to 6; o can be from 1 to 6.

In some embodiments, a composition is provided that comprises a structure:

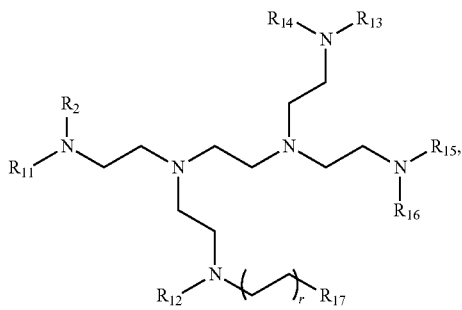

wherein: at least one of R$_{11}$, R$_{12}$, R$_{13}$, or R$_{15}$, individually, comprise a CAM group, a HA group, or a 1,2-HOPO group; optionally, at least another one of R$_{11}$, R$_{12}$, R$_{13}$, or R$_{15}$, individually, comprise H, OH, or an alkyl group having from 1 to 10 carbon atoms; R$_{17}$ comprises NH$_2$, C(=O)OH, maleimide, dibromo-maleimide, isothiocyanate, alkyne, or azide; R$_2$, R$_{14}$, and R$_{16}$, individually, comprise H, OH, or an alkyl group having from 1 to 10 carbon atoms; and r can be from 0 to 6.

In some embodiments, a composition is provided comprising a structure:

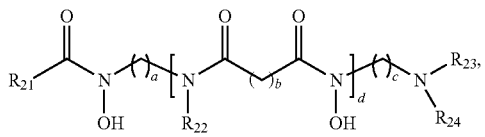

wherein: R$_{21}$ and R$_{22}$, individually, comprise H, OH, or an alkyl group having from 1 to 10 carbon atoms; R$_{23}$ comprises H, OH, an alkyl group having from 1 to 10 carbon atoms, or (CH$_2$)$_e$R$_a$, where R$_a$ is NH$_2$, C(=O)OH, maleimide, dibromo-maleimide, isothiocyanate, alkyne, or azide; R$_{24}$ comprises a substituent having a CAM group, a 1,2-HOPO group, or a HA group; a, b, and c, individually, are from 1 to 10; d is from 1 to 4; and e is from 1 to 10.

In some embodiments, a composition is provided that comprises a structure:

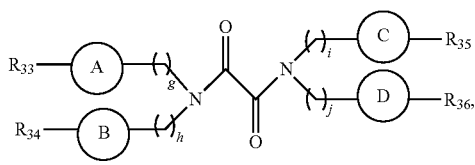

wherein: A, B, C, and D, individually, comprise one or more amide groups, one or more amine groups, or an alkyl group having from 1 to 10 carbon atoms; R$_{33}$, R$_{34}$, R$_{35}$, and R$_{36}$, individually, comprise a CAM group, a 1,2-HOPO group, or a HA group; and g, h, i and j, individually, are from 1 to 10.

In some embodiments, a composition is provided that comprises a structure:

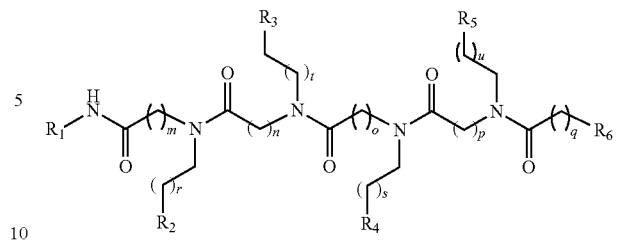

wherein: at least one of R$_1$, R$_2$, R$_3$, R$_4$, R$_5$, individually, comprise a CAM group, a HA group, or a 1,2-HOPO group; at least another one of R$_1$, R$_2$, R$_3$, R$_4$, and R$_5$, individually, comprise H or an alkyl group having from 1 to 10 carbon atoms; R$_6$ comprises (i) H, (ii) an alkyl group having from 1 to 10 carbon atoms, or (iii) an alkyl group having from 1 to 10 carbon atoms and substituted by at least one of NH$_2$, C(=O)OH, maleimide, dibromo-maleimide, isothiocyanate, alkyne, or azide; m can be from 1 to 6; n can be from 1 to 6; o can be from 1 to 6; p can be from 1 to 6; q can be from 1 to 6; r can be from 1 to 6; s can be from 1 to 6; and t can be from 1 to 6.

Inset: Change in absorbance 360 nm (squares), 340 nm (crosses) and 265 nm (diamonds) as a function of pH. (7B) Speciation diagram of the 3,4,3-LI(CAM) ligand in the presence of Eu(III). [Eu]=[CAM]=10 μM. T=25° C., I=0.1 M. Species: $CAMH_8$, $CAMH_7^-$, $CAMH_6^{2-}$, $[CAMH_2Eu]^{3-}$, $[CAMHEu]^{4-}$ and $[CAMEu]^{5-}$. Calculations performed with Hyss software.

Figure 8:
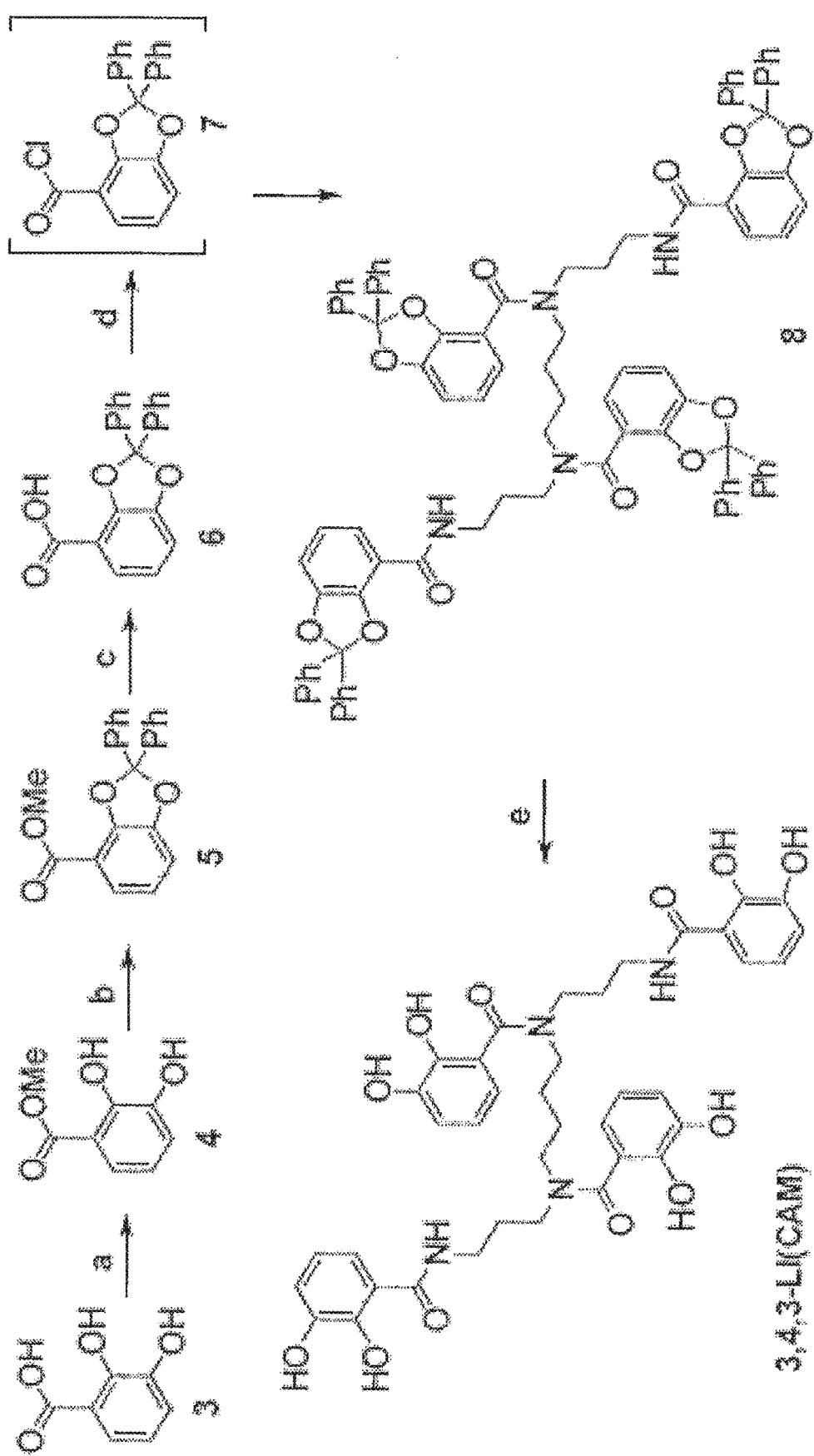

FIG. 8. Synthesis of 3,4,3-LI(CAM). (A) $H_2SO_4$, MeOH, 65° C., 16 h (88%). (B) dichlorodiphenylmethane, 160° C., 1 h. (C) 50/50 THF/$H_2O$, reflux 5 h (81% over 2 steps). (D) $(COCl)_2$, toluene, cat. DMF; then spermine, $Et_3N$, THF, 50° C., O/N (78%). (E) AcOH/$H_2O$+conc. HCl, 16 h (90%).

FIG. 9. Protonation and Eu(III), Zr(IV), and Th(IV) Complex Formation Constants for 3,4,3-LI(CAM)[a] [a]I=0.1 M (KCl), T=25° C. Errors correspond to standard deviations from at least three independent titrations. Protonation and Eu(III), Zr(IV), and Th(IV) complex formation constants previously reported for 3,4,3-LI(1,2-HOPO) are also given for comparison.

Figure 10A:
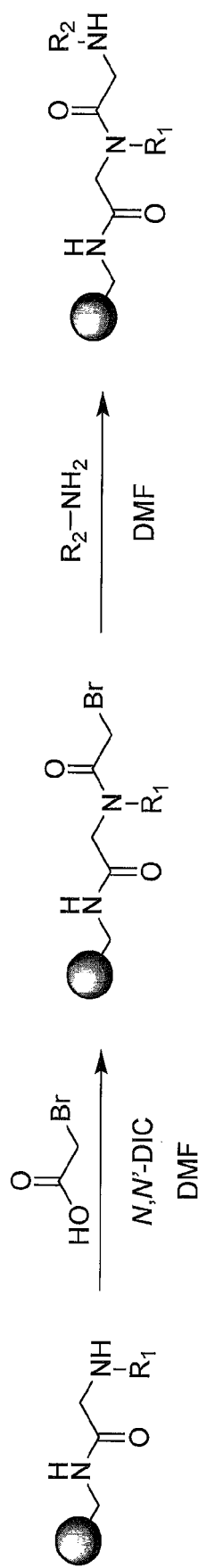

FIG. 10A depicts an embodiment of a general peptoid synthesis.

Figure 10B:
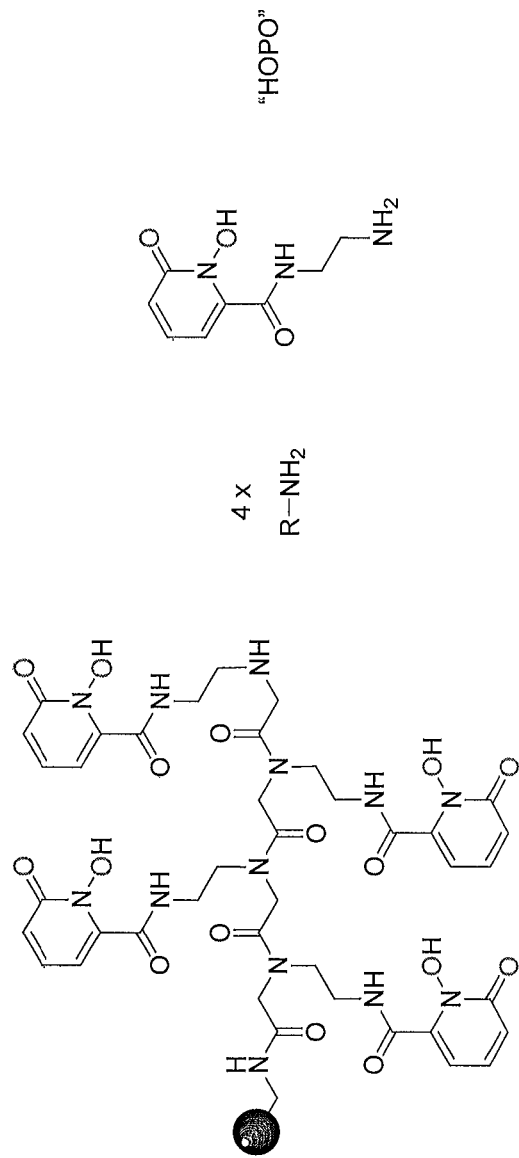

FIG. 10B depicts an embodiment of a general peptoid synthesis.

Figure 10C:
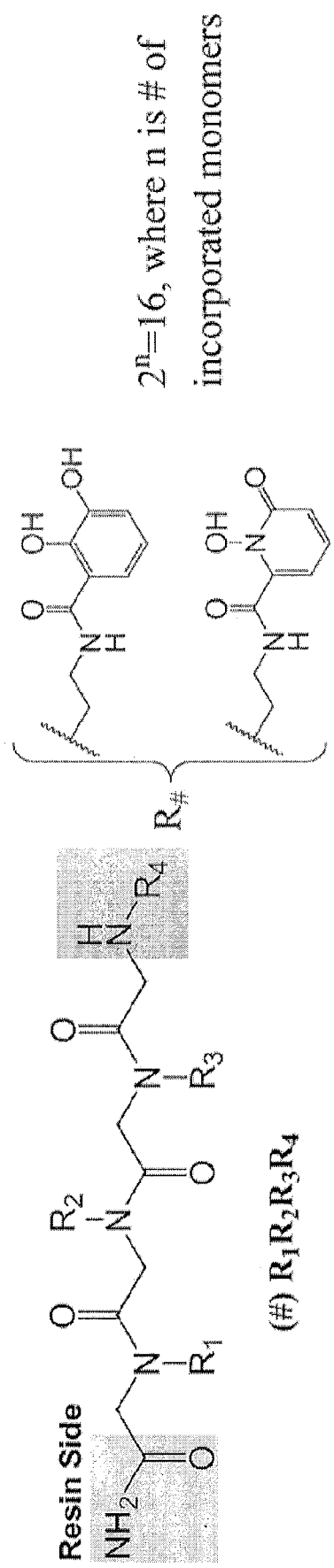

FIG. 10C depicts some embodiments of a general peptoid synthesis.

Figure 10D:
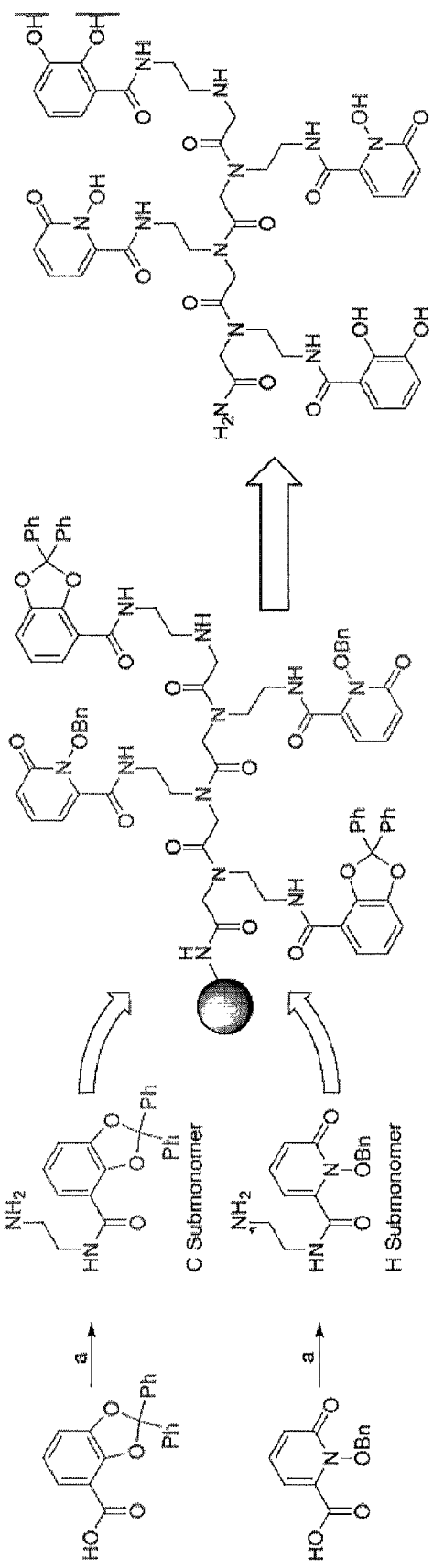

FIG. 10D depicts some embodiment of a general peptoid synthesis.

FIG. 10E depicts some embodiments of a combination of products obtained from a general peptoid synthesis scheme.

Figure 10F:
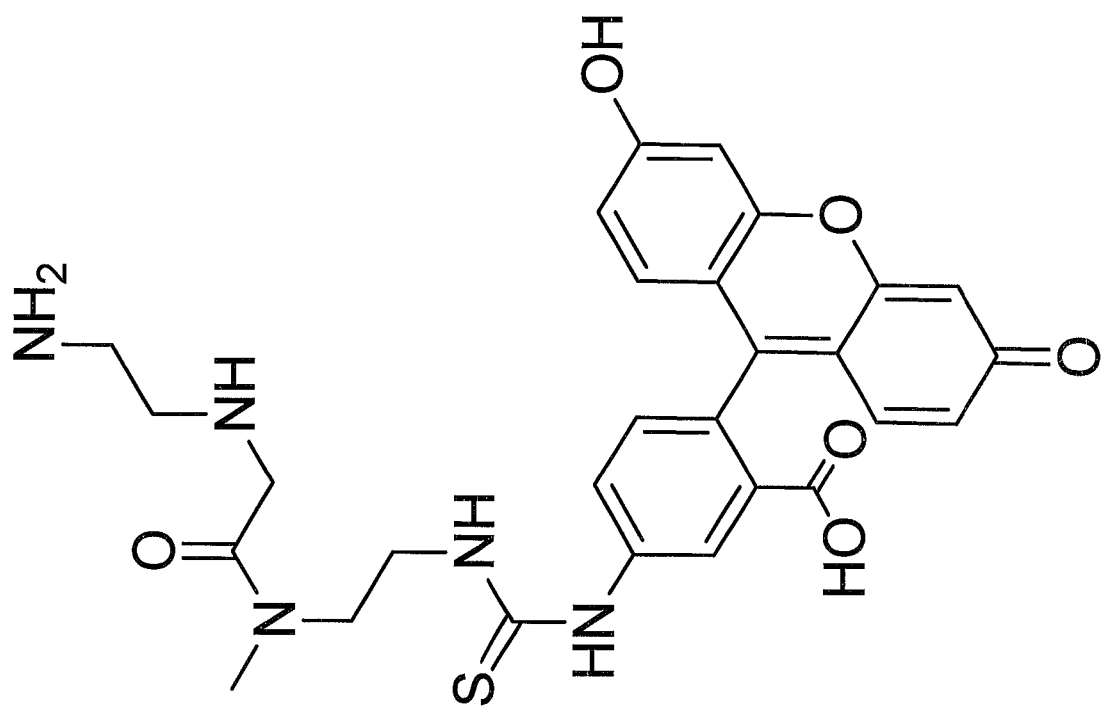

FIG. 10F depicts some embodiments of a fluorescent tag.

FIG. 11A depicts some embodiments of a conjugation pathway.

FIG. 11B depicts some embodiments of a conjugation pathway.

Figure 12A:
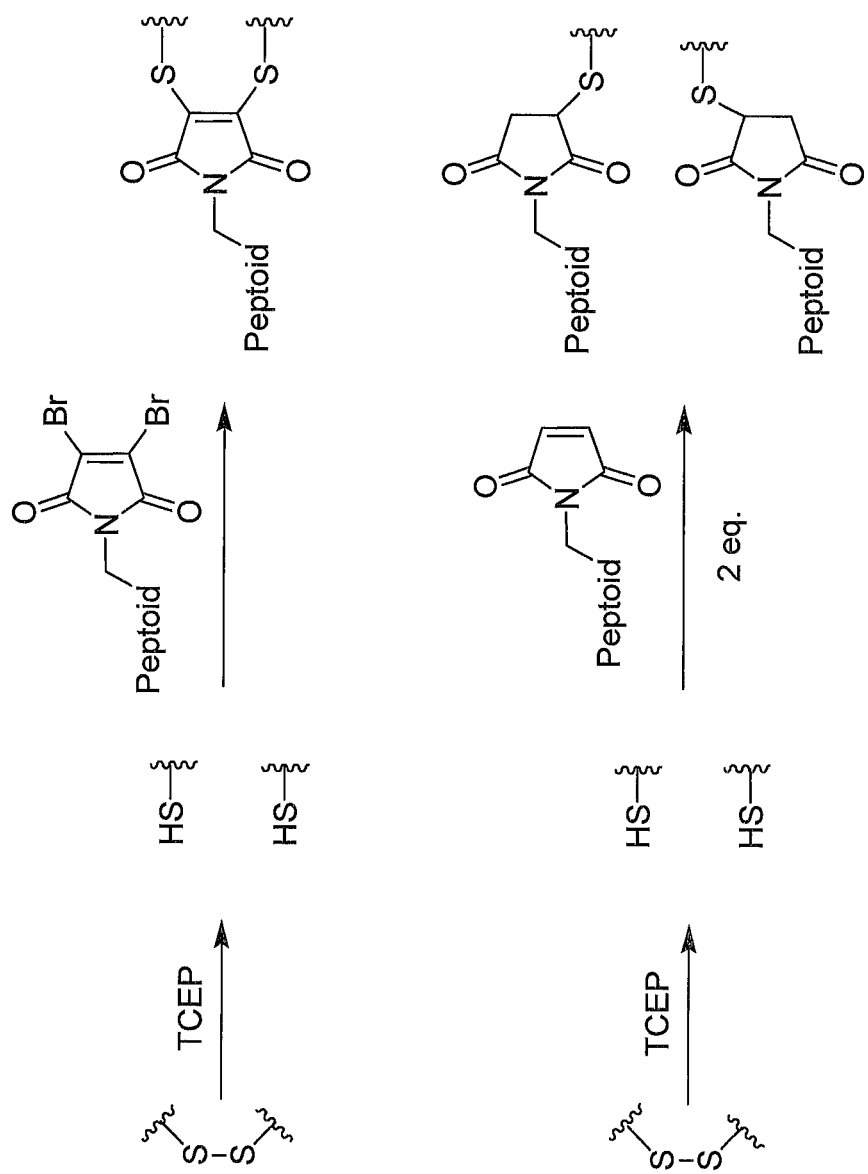

FIG. 12A depicts reaction schemes for conjugation.

Figure 12B:
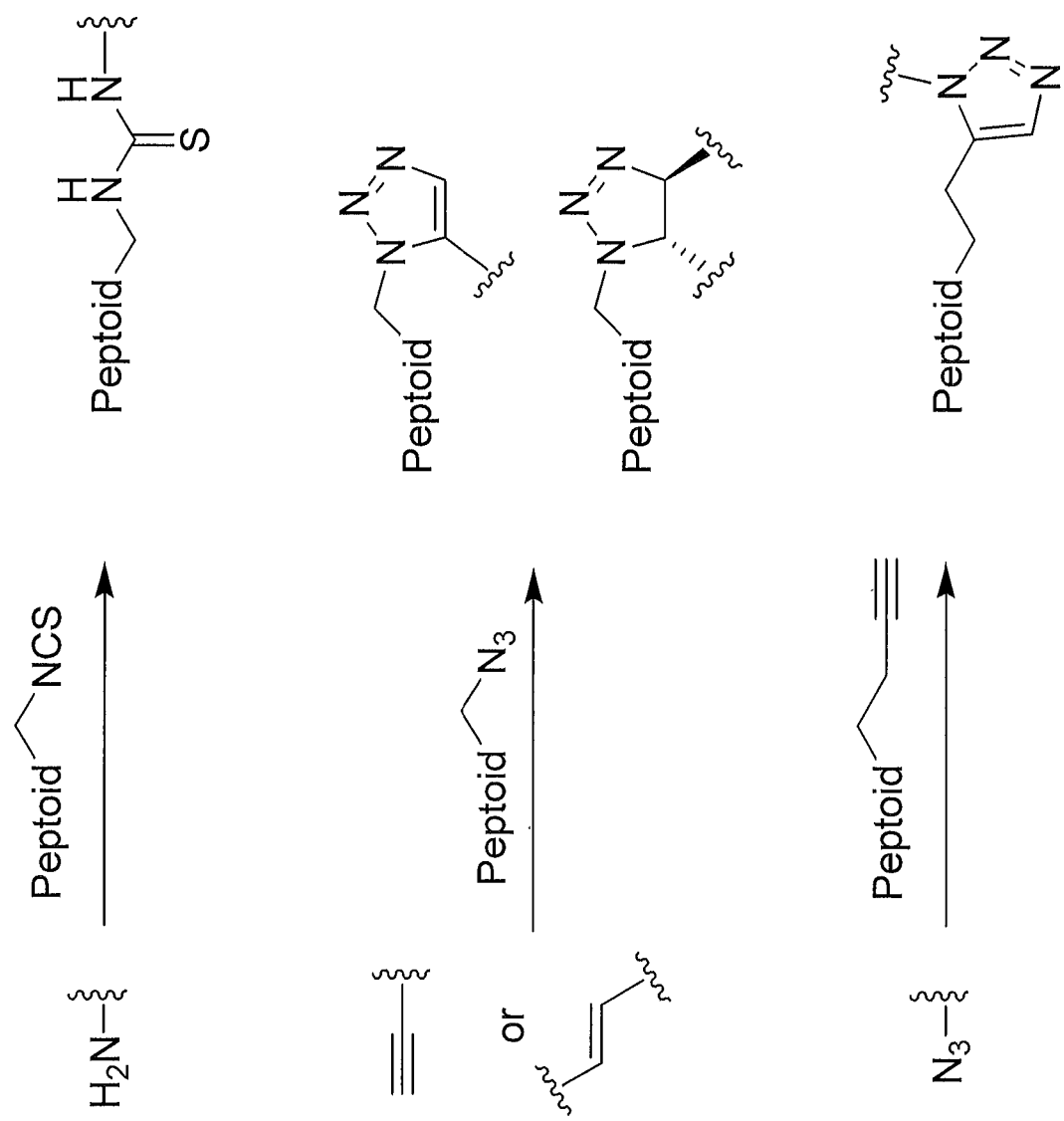

FIG. 12B depicts reaction schemes for conjugation.

FIG. 13 depicts some embodiments of a fluorescent tag incorporation.

FIG. 14 depicts a representative reversed-phase HPLC trace

Figure 15A:
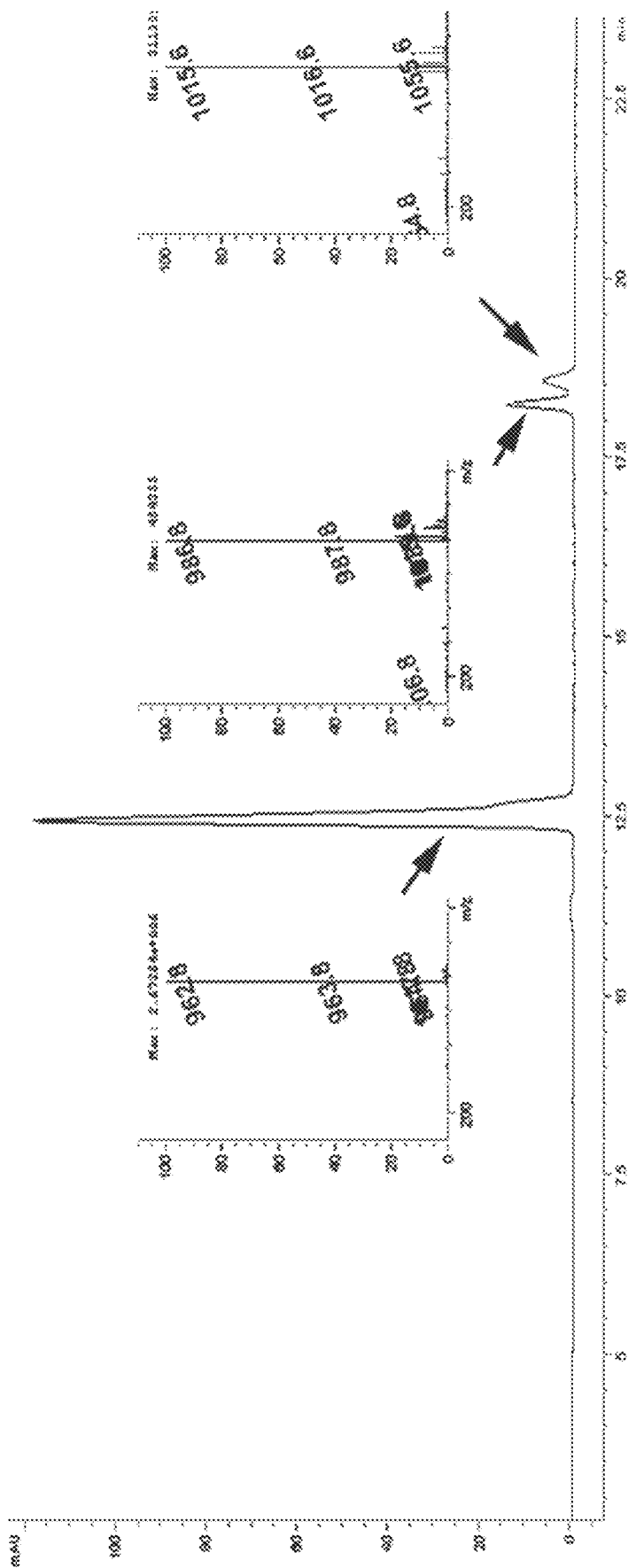

FIG. 15A depicts the mass spectra (HHHC Peptoid. MS1: free peptoid, MS2: peptoid-Na, MS3: peptoid-Fe and peptoid-Fe—K.

Figure 15B:
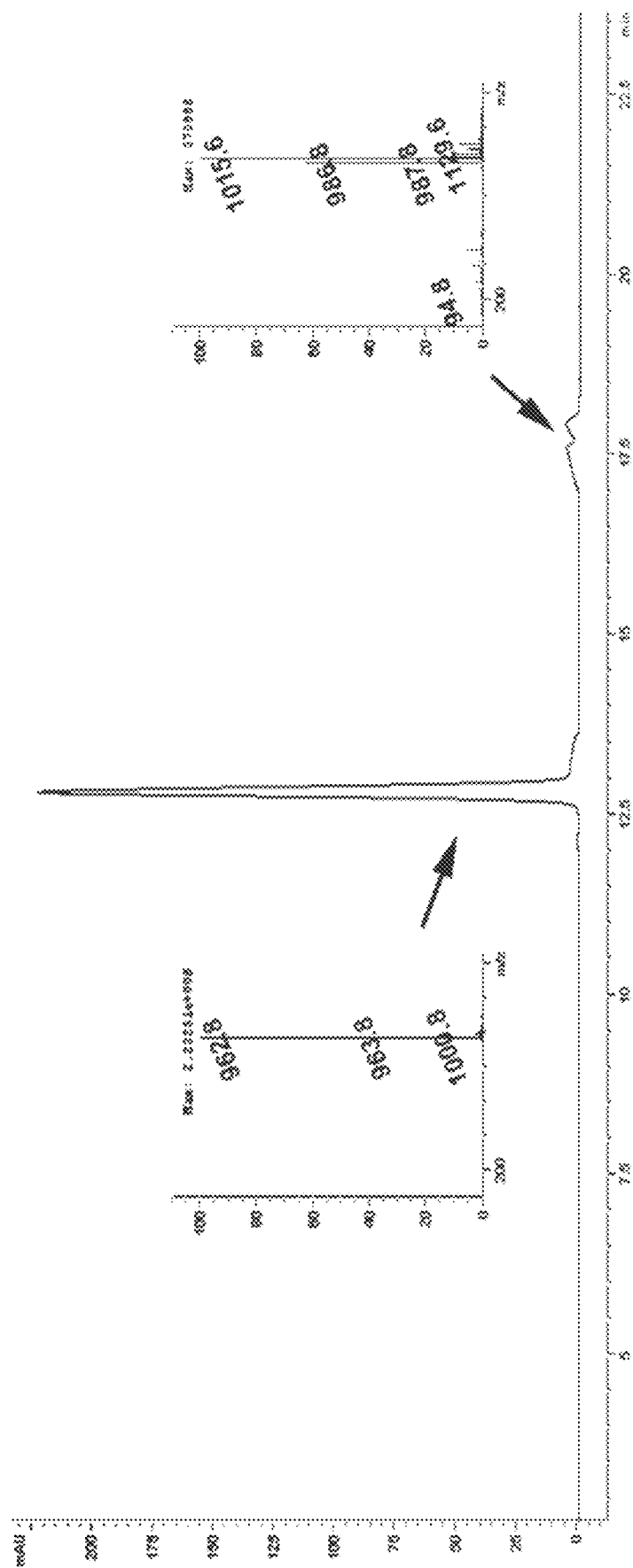

FIG. 15B depicts the mass spectra for CHHH Peptoid. MS1: free peptoid and peptoid-K, MS2: peptoid-Na, peptoid-Fe, and possible impurity.

Figure 15C:
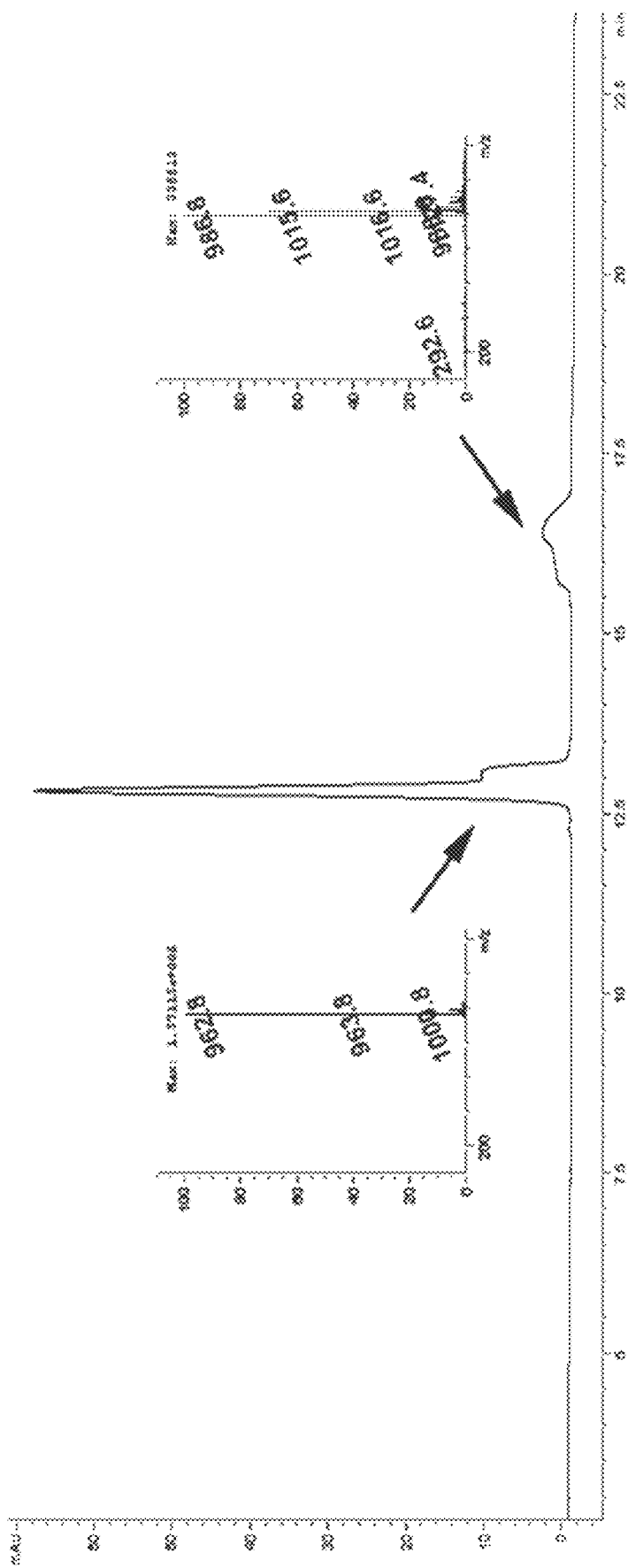

FIG. 15C depicts the mass spectra for HCHH Peptoid. MS1: free peptoid and peptoid-K, MS2: peptoid-Na, peptoid-Fe.

Figure 15D:
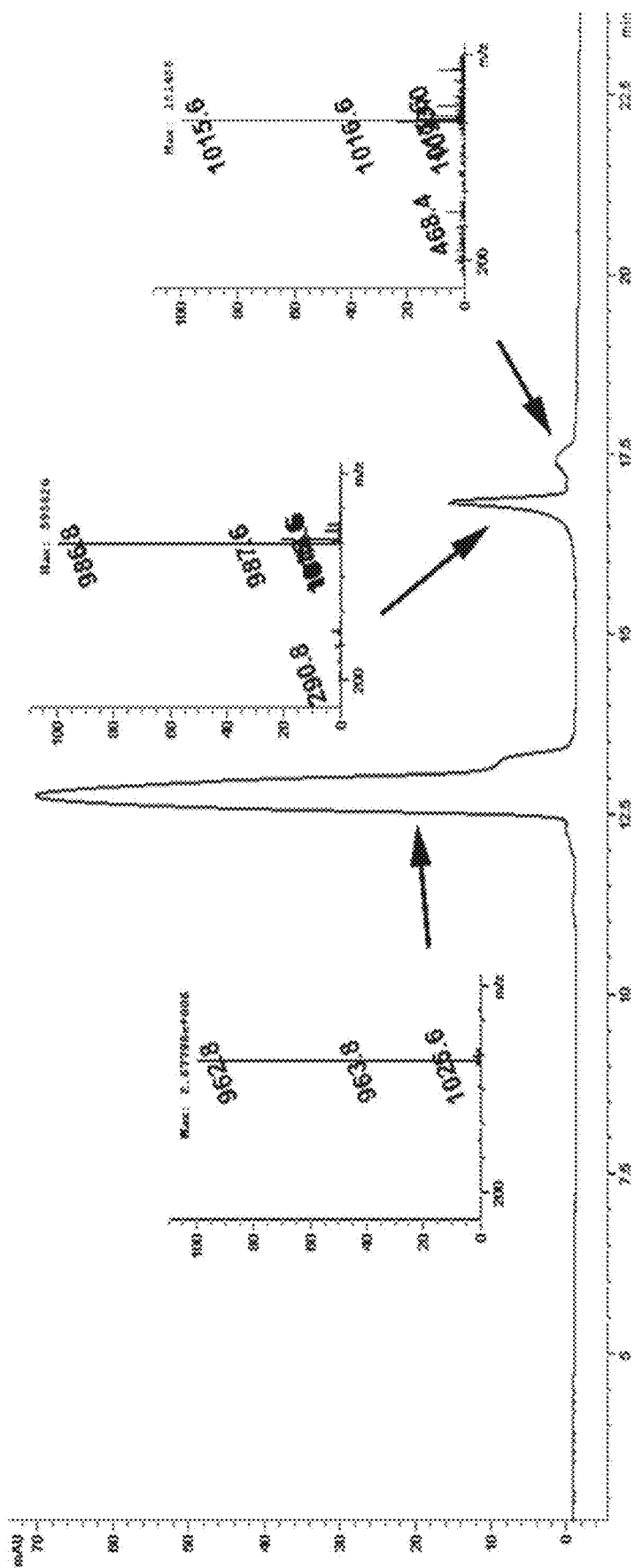

FIG. 15D depicts the mass spectra for HHCH Peptoid. MS1: free peptoid and possible impurity, MS2: peptoid-Na, MS3: Peptoid-Fe.

Figure 15E:
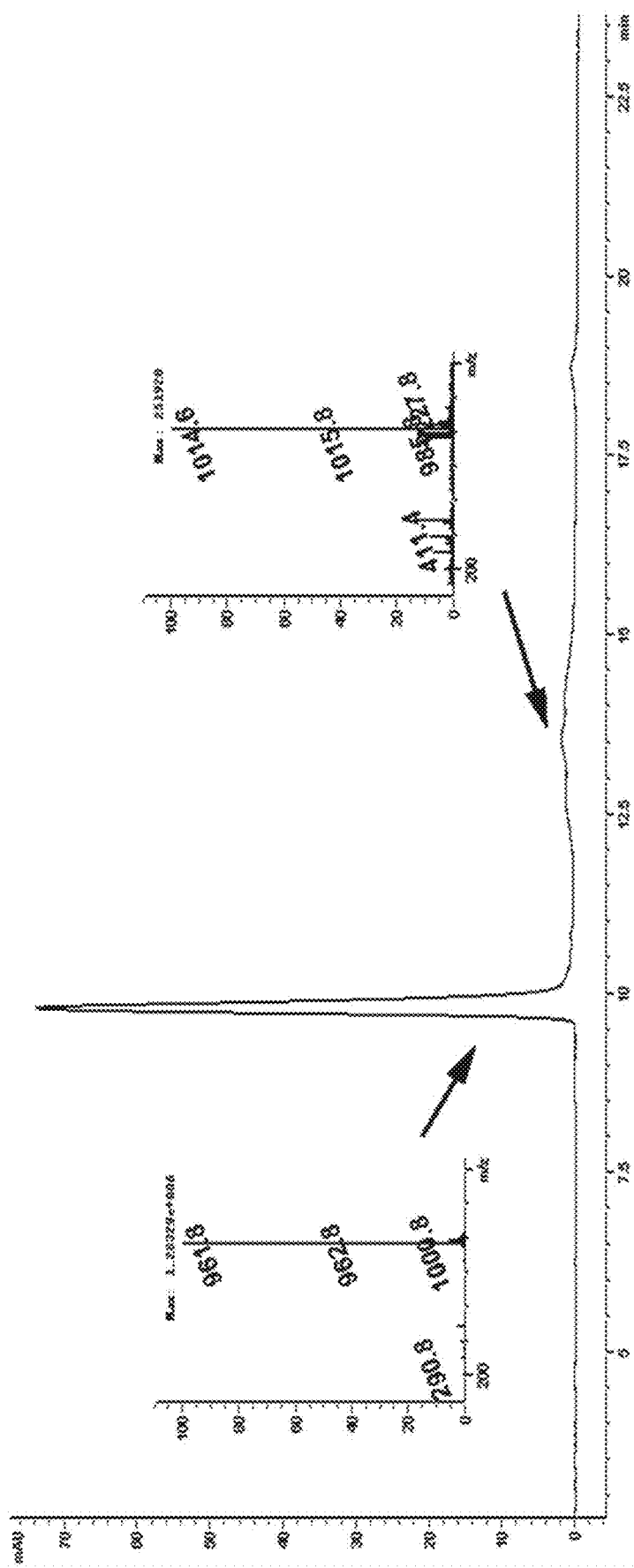

FIG. 15E depicts the mass spectra for CHHC Peptoid. MS1: free peptoid only and peptoid-K, MS2: peptoid-Na and peptoid-Fe.

Figure 15F:
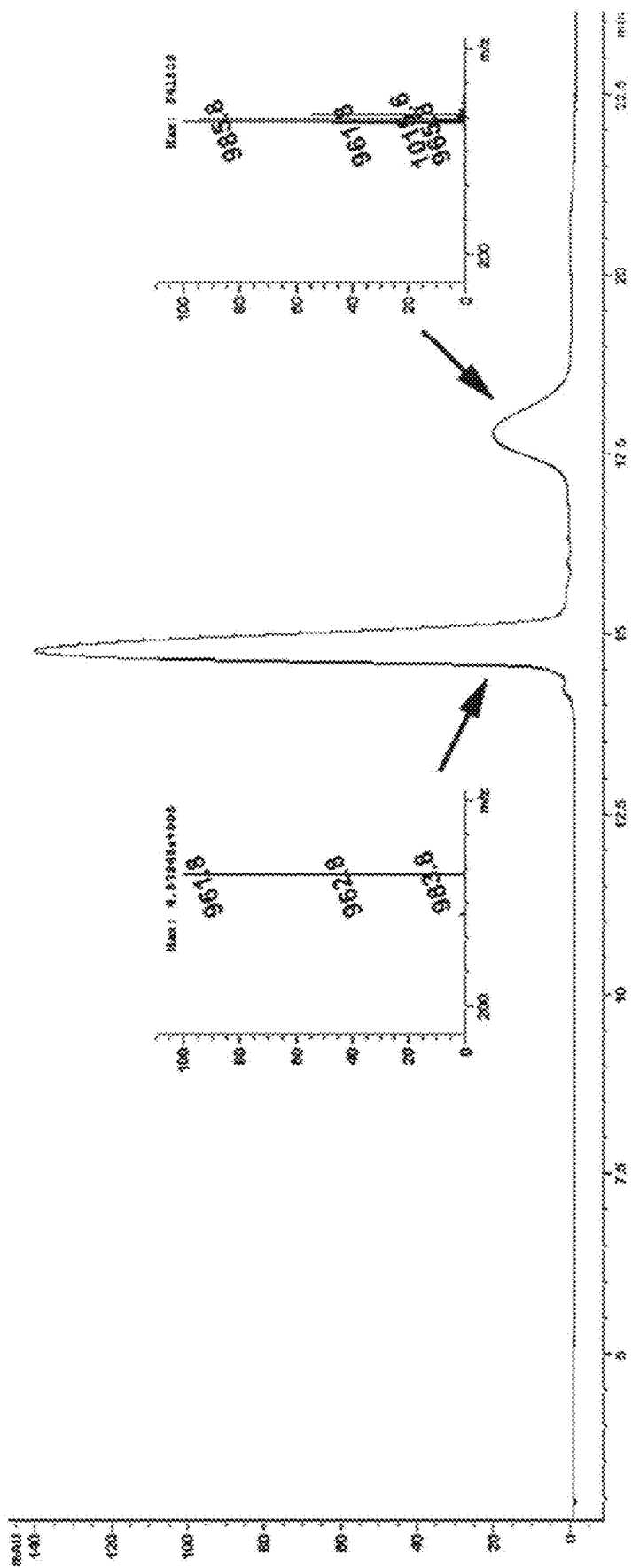

FIG. 15F depicts the mass spectra for HHCC Peptoid. MS1: free peptoid and peptoid-Na, MS2: peptoid-Na, free peptoid, and peptoid-Fe.

Figure 15G:
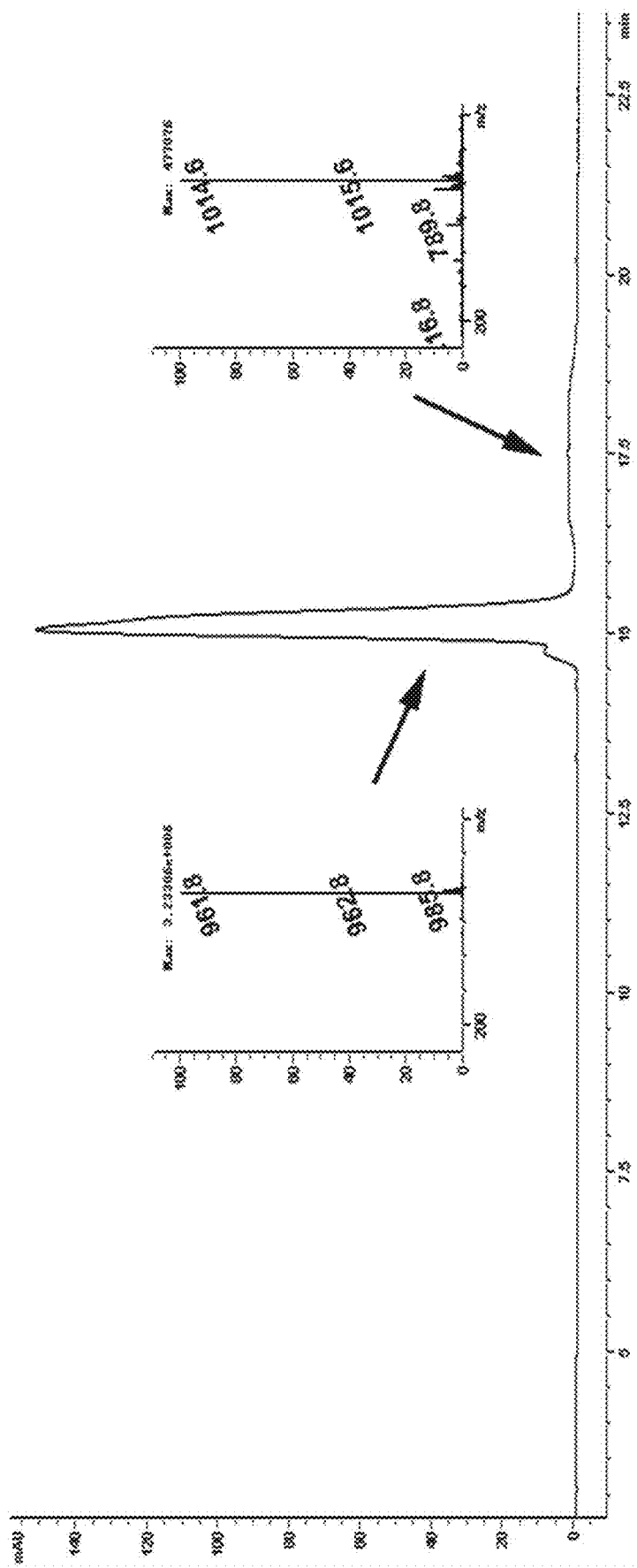

FIG. 15G depicts the mass spectra for CCHH Peptoid. MS1: free peptoid and peptoid-Na, MS2: Peptoid-Fe and possible trimer.

Figure 15H:
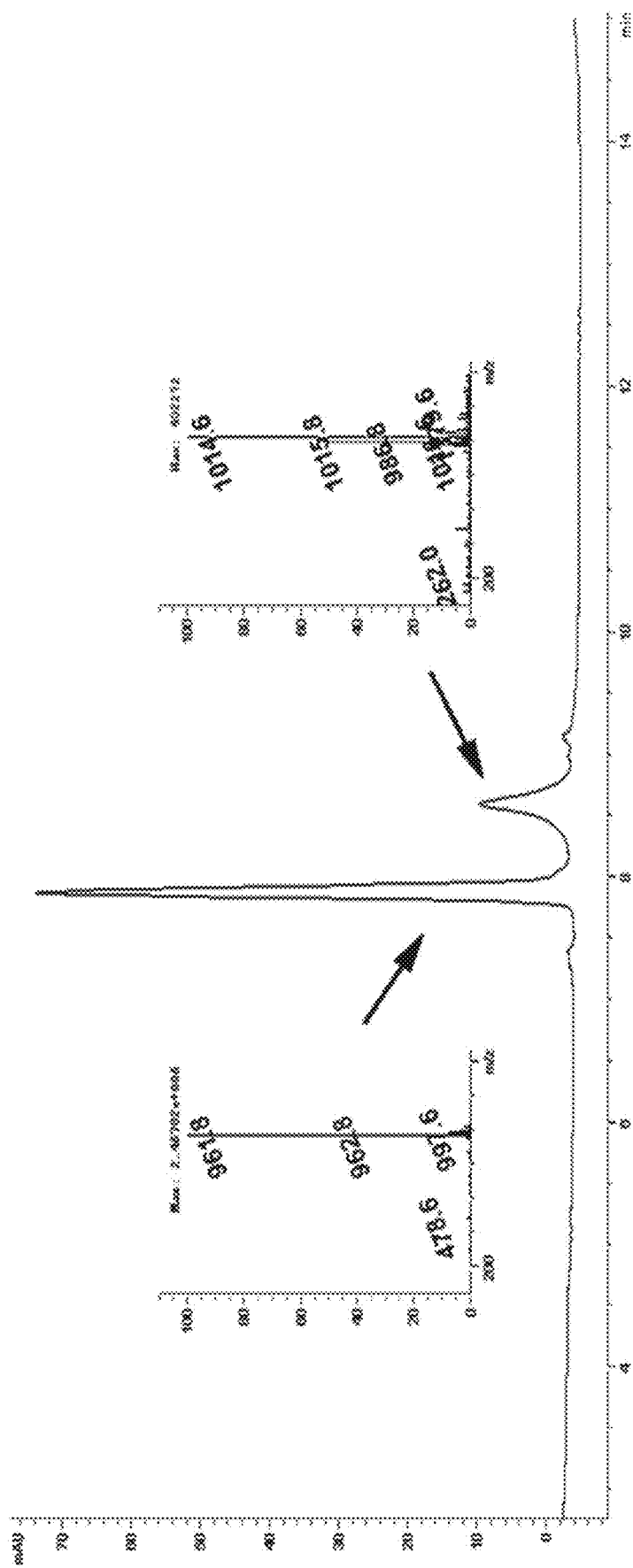

FIG. 15H depicts the mass spectra for HCHC Peptoid. MS1: free peptoid, MS2: peptoid-Fe and peptoid-Na.

Figure 15I:
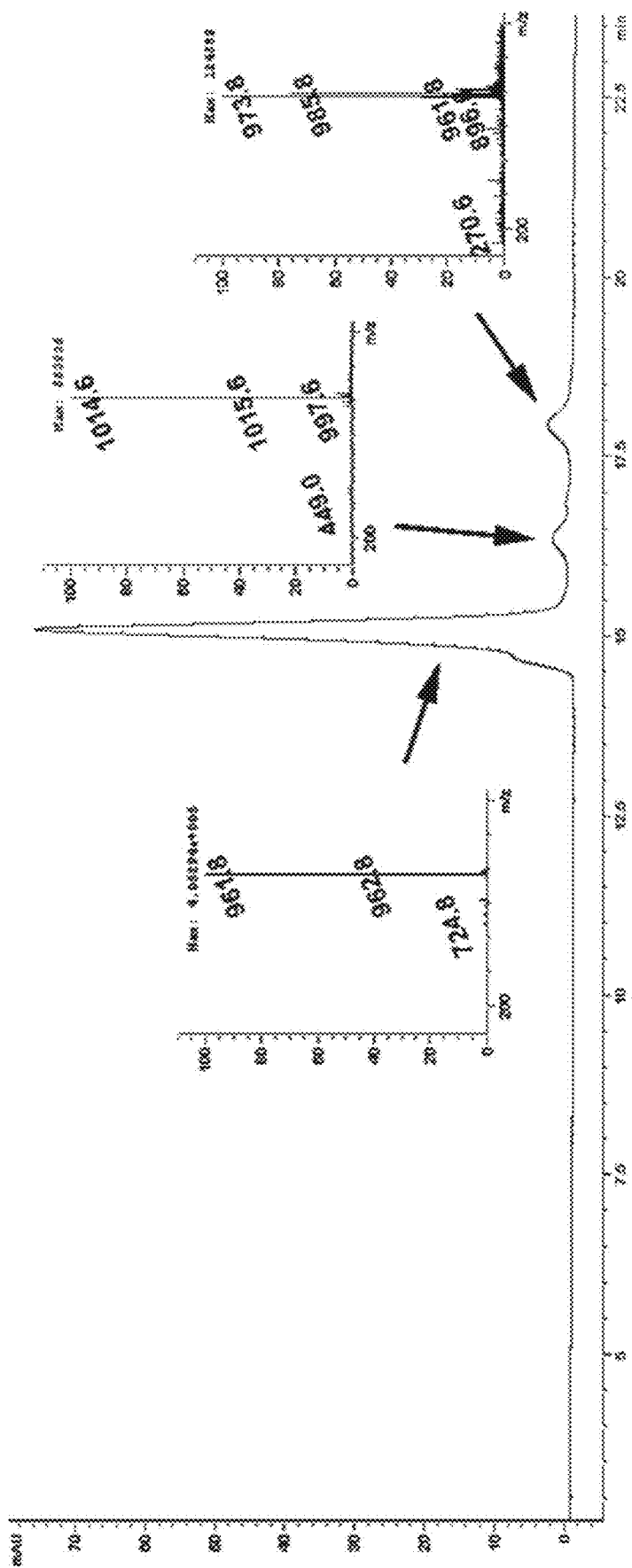

FIG. 15I depicts the mass spectra for HCCH Peptoid. MS1: free peptoid and small amount trimer, MS2: peptoid-Fe, MS3: peptoid-Na and possible fragments.

Figure 15J:
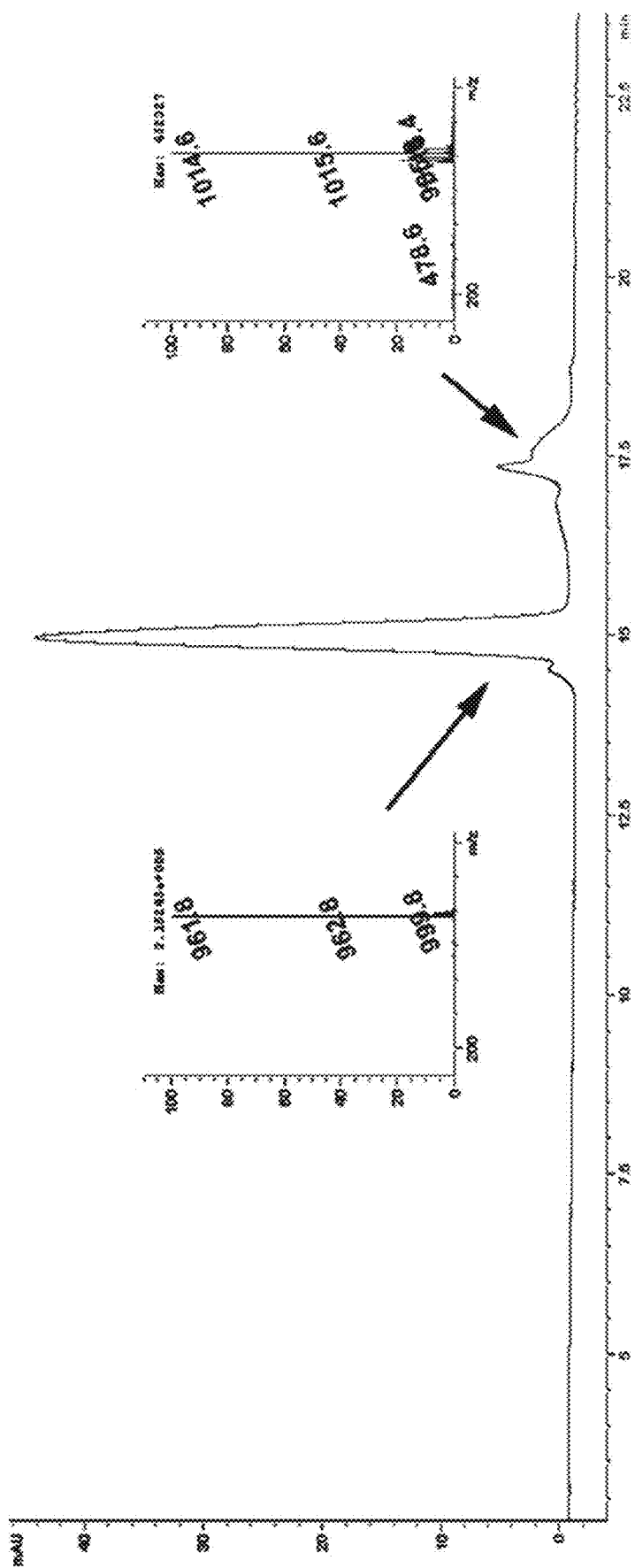

FIG. 15J depicts the mass spectra for CHCH Peptoid. MS1: free peptoid and peptoid-K, MS2: peptoid-Fe.

Figure 15K:
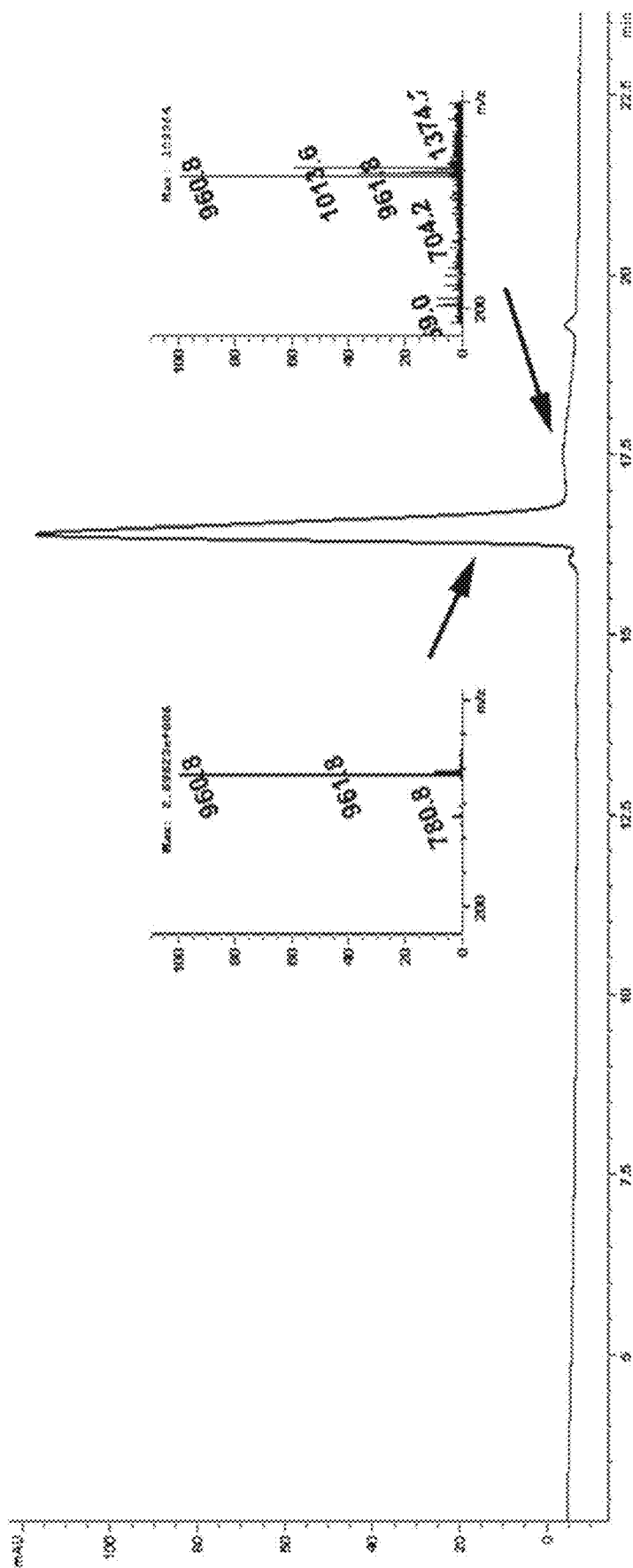

FIG. 15K depicts the mass spectra for HCCC Peptoid. MS1: free peptoid and trimer-Fe trace, MS2: free peptoid and peptoid-Fe.

Figure 15L:
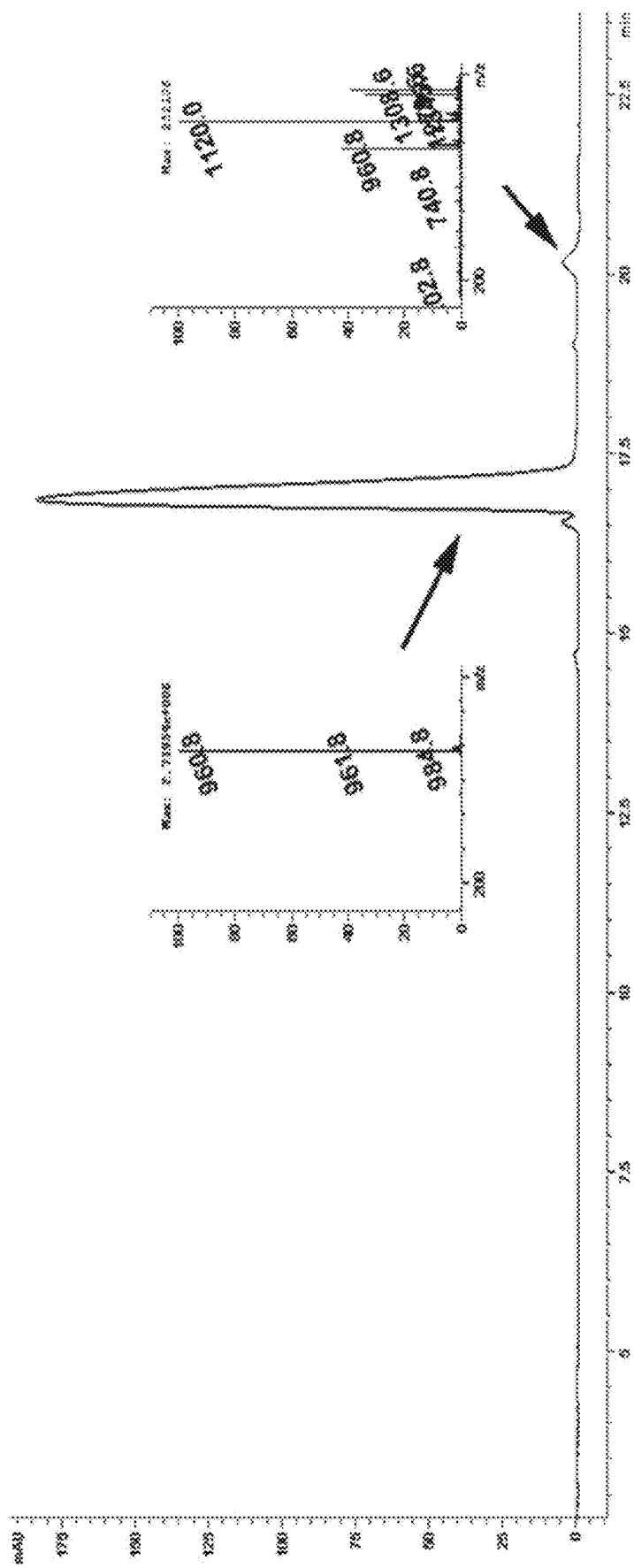

FIG. 15L depicts the mass spectra for CHCC Peptoid. MS1: free peptoid and peptoid-Na, MS2: free peptoid and unidentified masses.

Figure 15M:
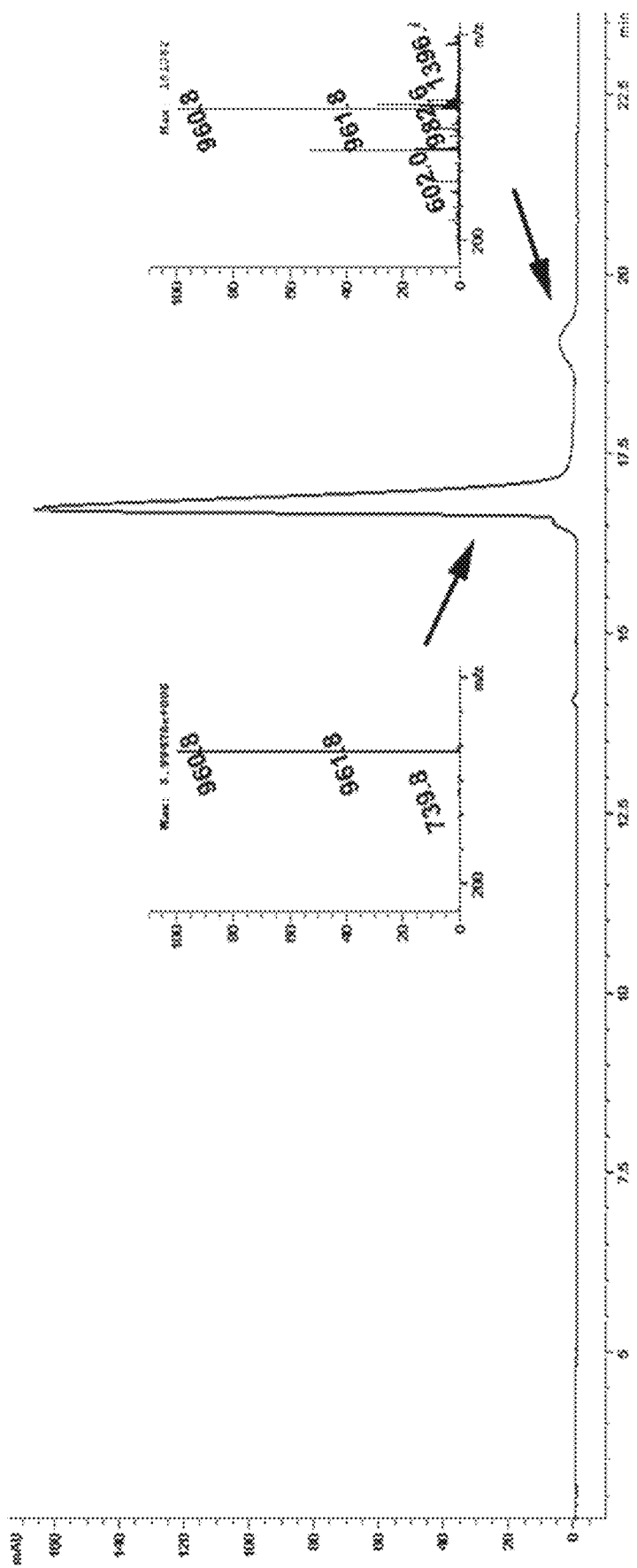

FIG. 15M depicts the mass spectra for CCHC Peptoid. MS1: free peptoid, MS2: free peptoid and peptoid-Na.

Figure 15N:
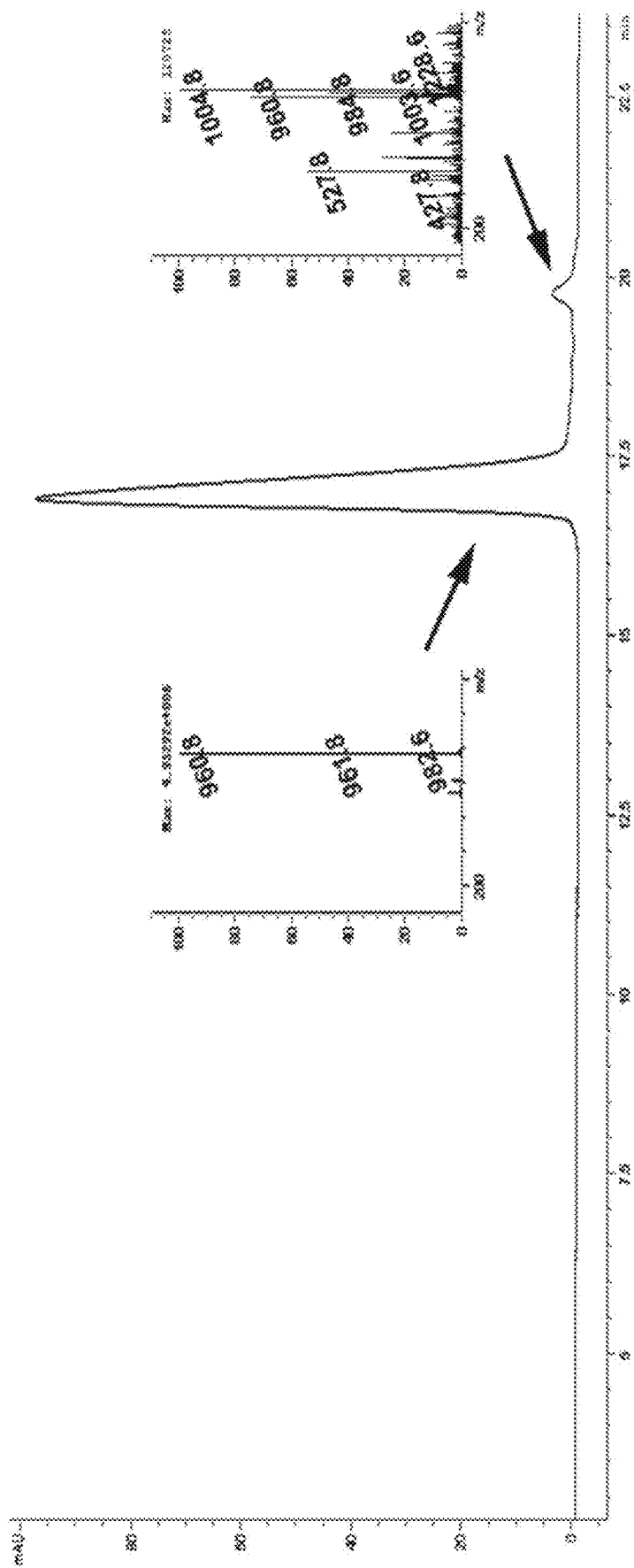

FIG. 15N depicts the mass spectra for CCCH Peptoid. MS1: free peptoid and peptoid-Na, MS2: free peptoid and peptoid-K/Na.

Figure 15O:
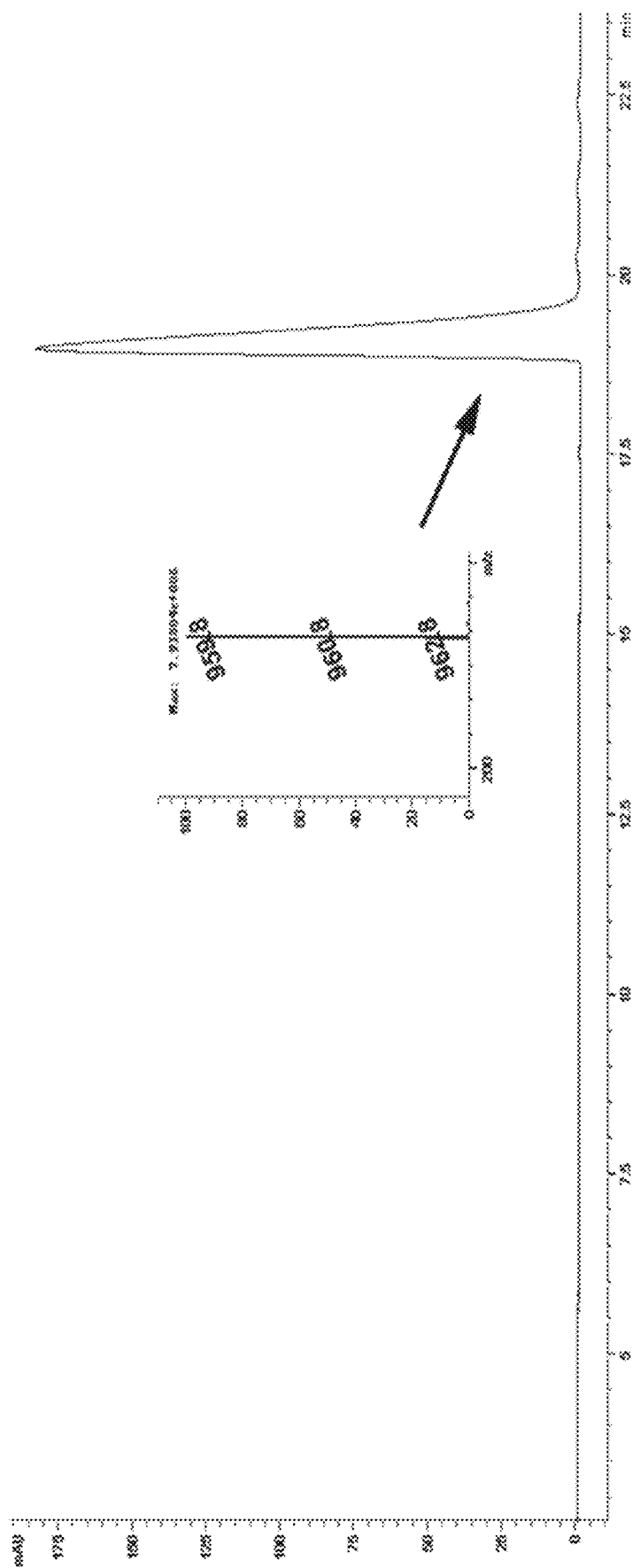

FIG. 15O depicts the mass spectra for CCCH Peptoid. MS1: free peptoid and peptoid-Na, MS2: free peptoid and peptoid-K/Na.

Figure 15P:
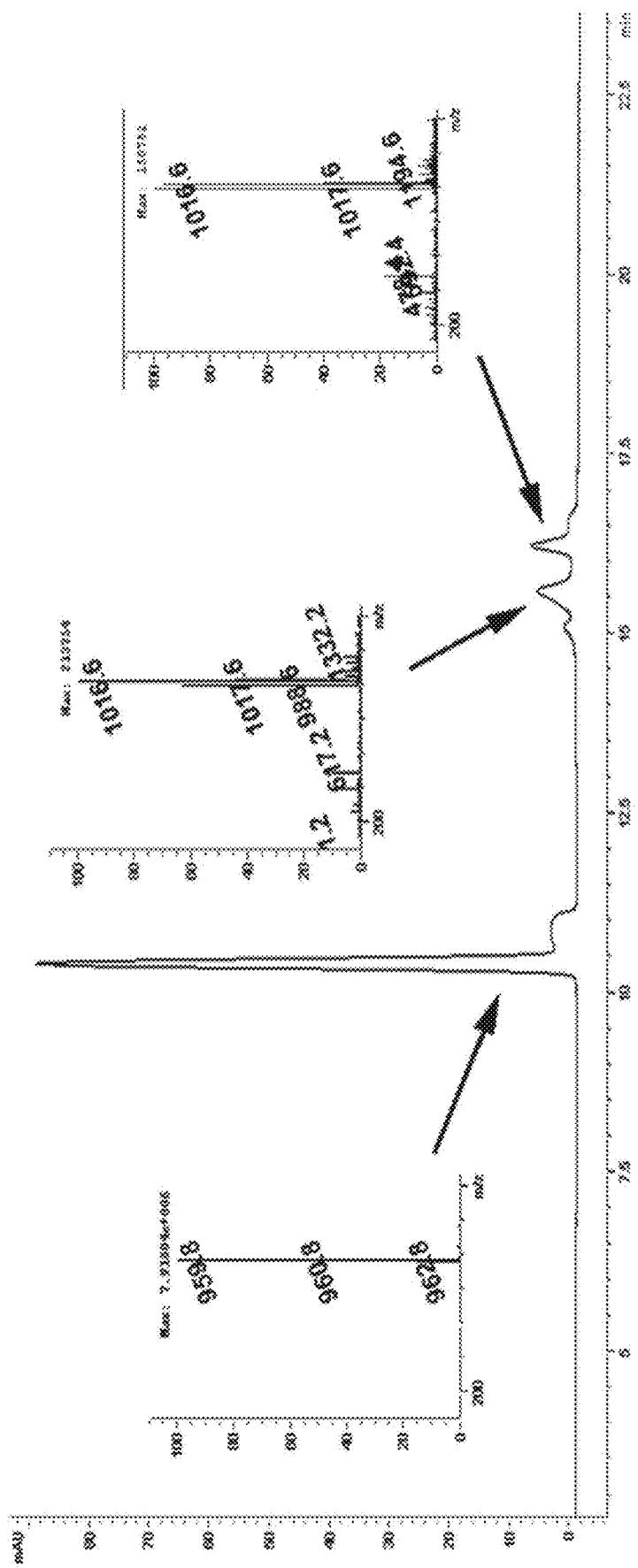

FIG. 15P is the mass spectra for HHHH Peptoid. MS1: free peptoid, MS2: peptoid-Fe/Na, MS3: Peptoid-Fe—Na.

Figure 16A:
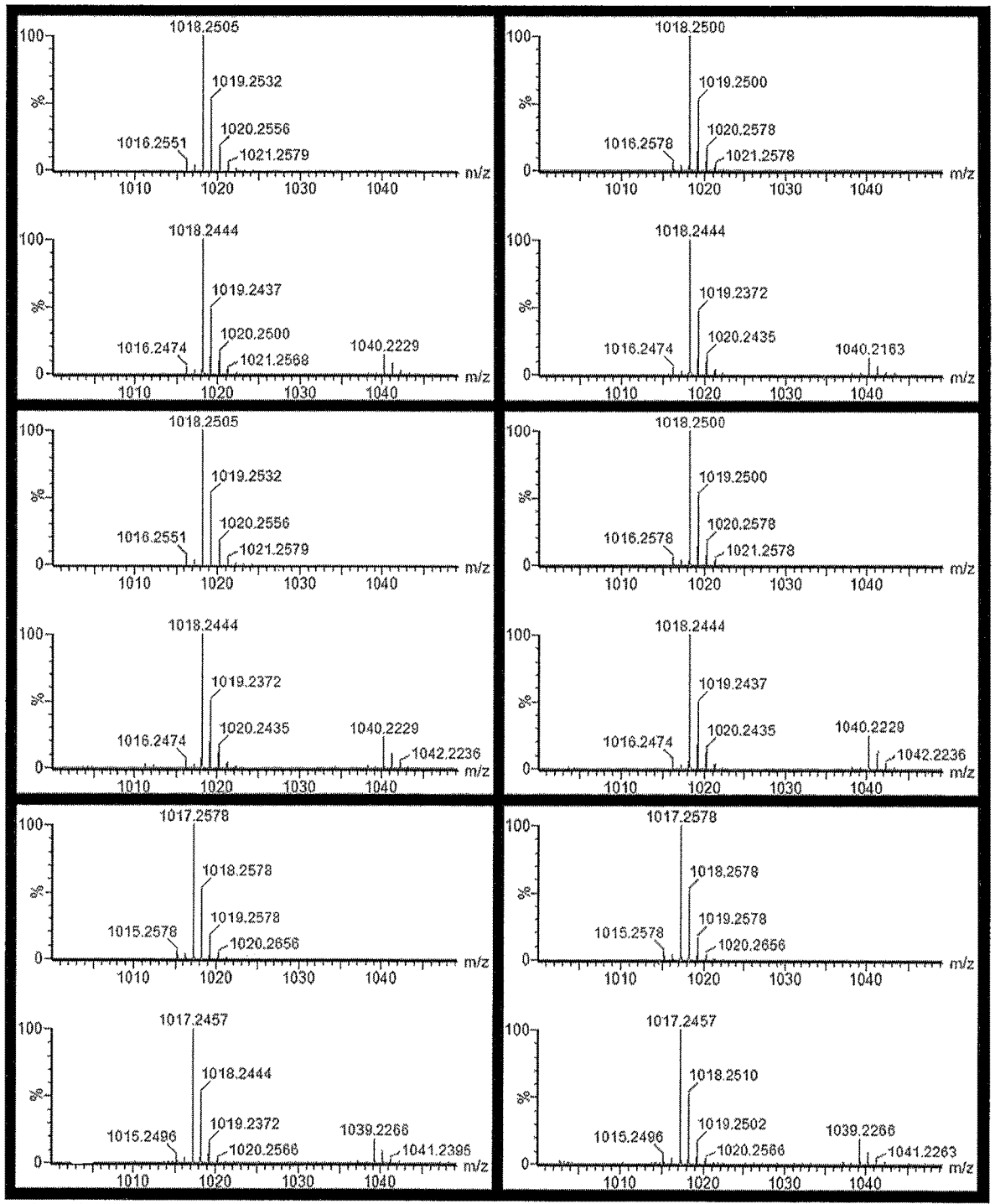
Figure 16B:
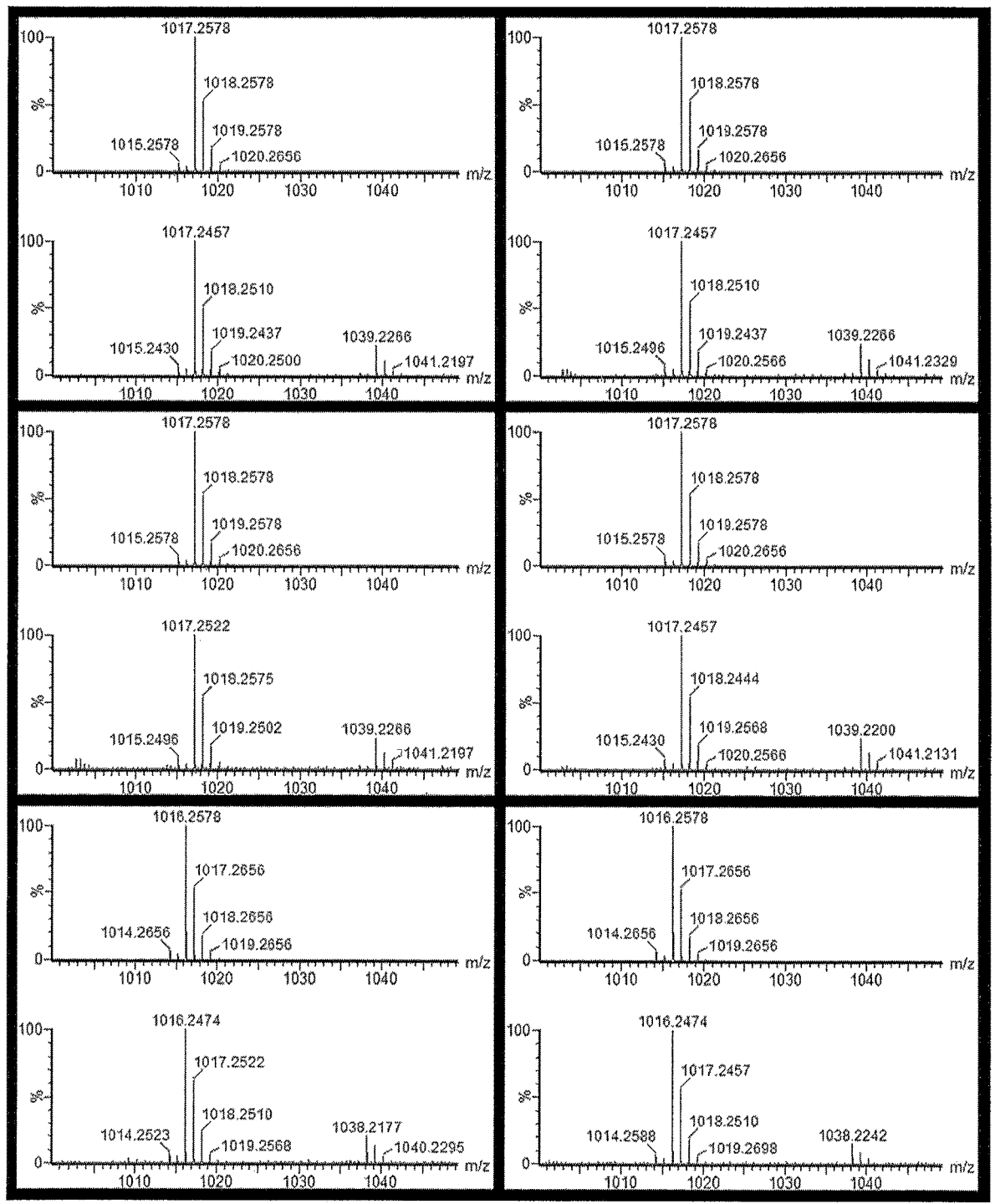
Figure 16C:
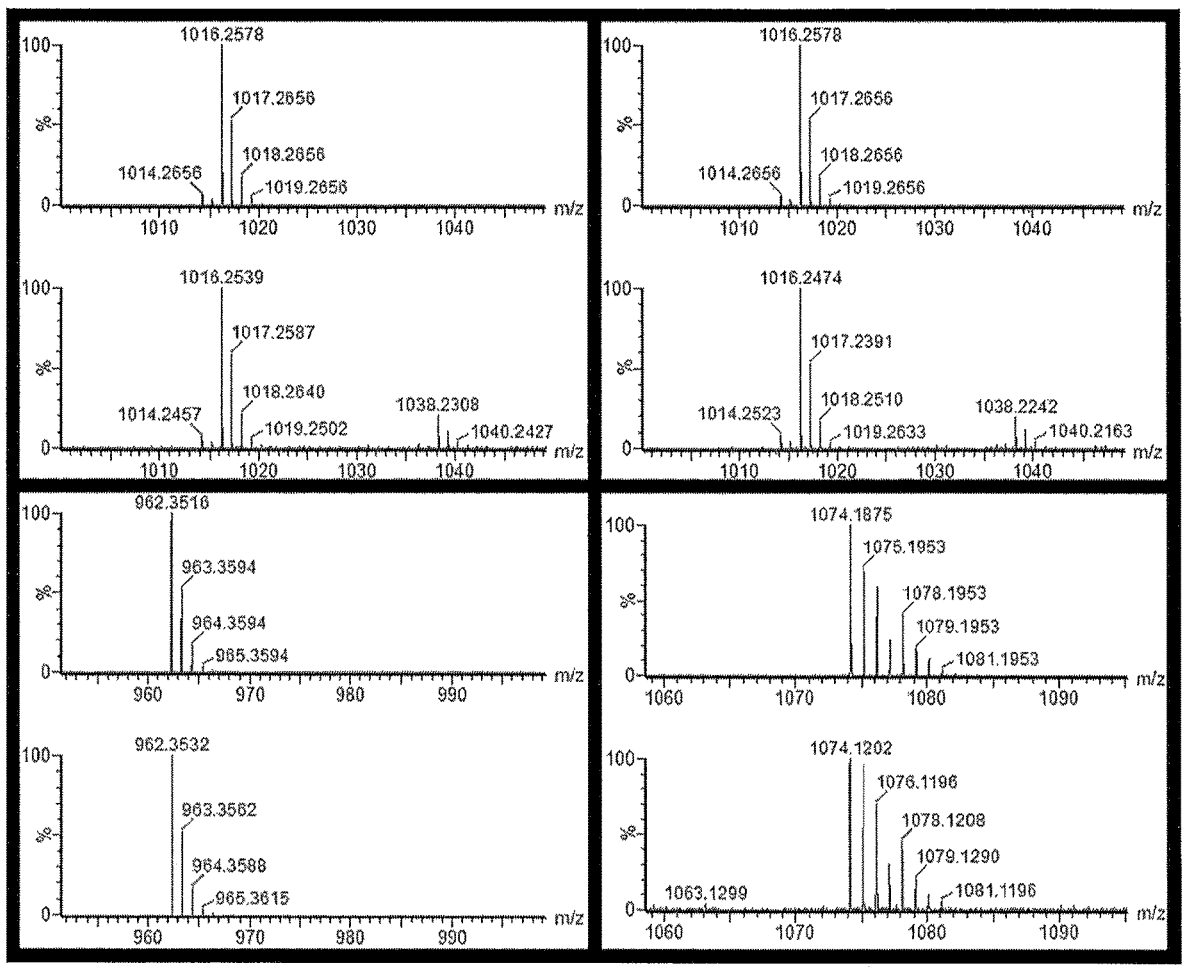
Figure 18A:
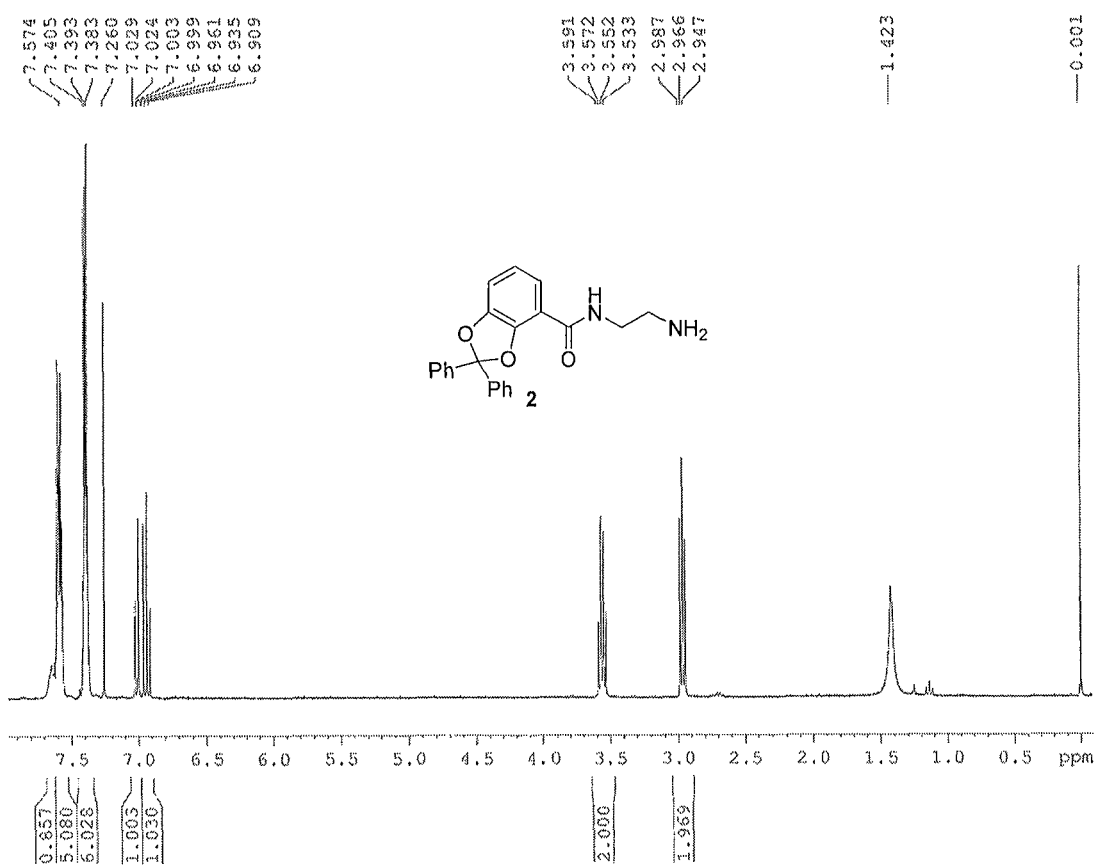
Figure 18B:
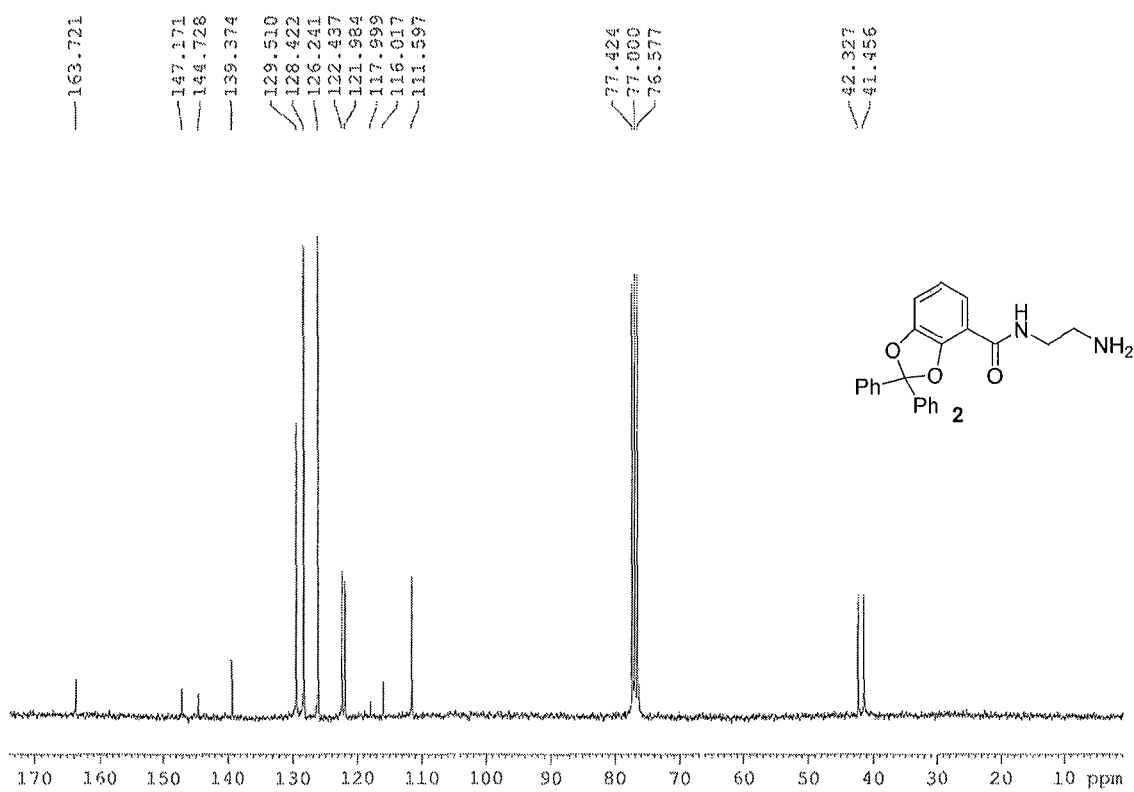
Figure 18C:
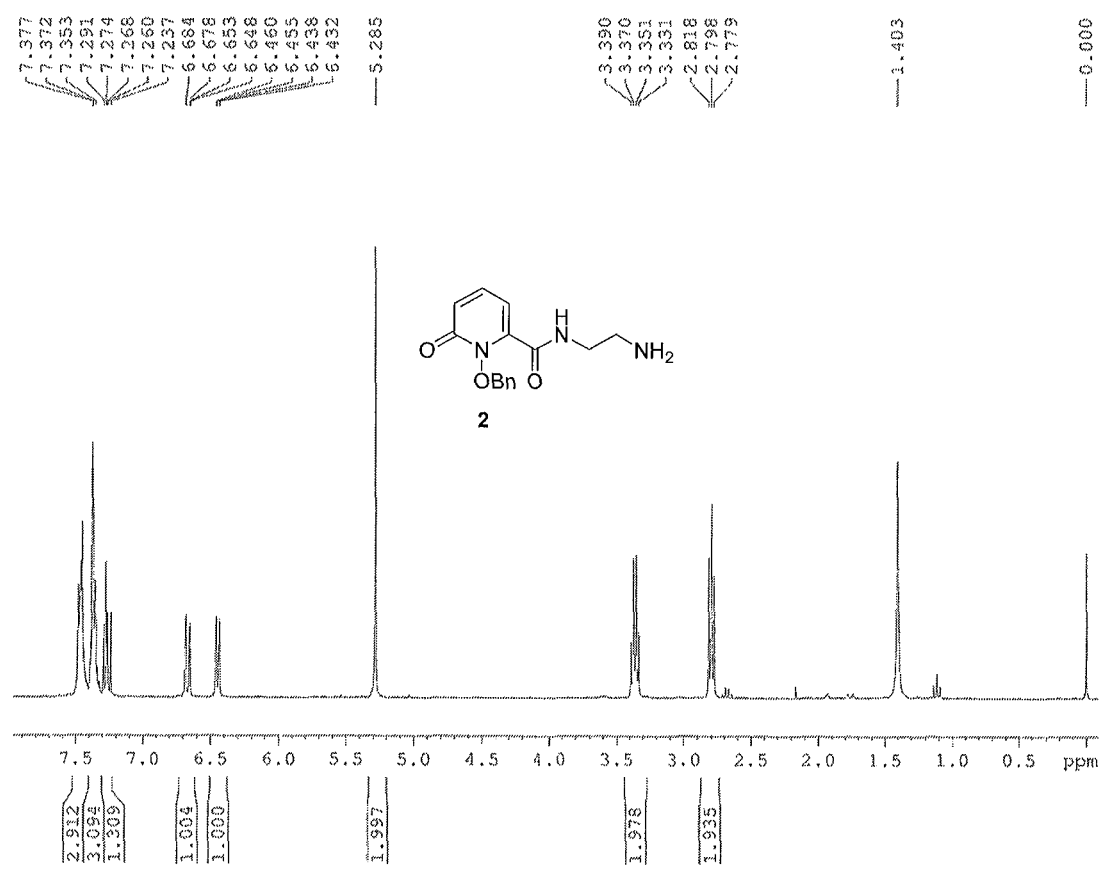
Figure 18D:
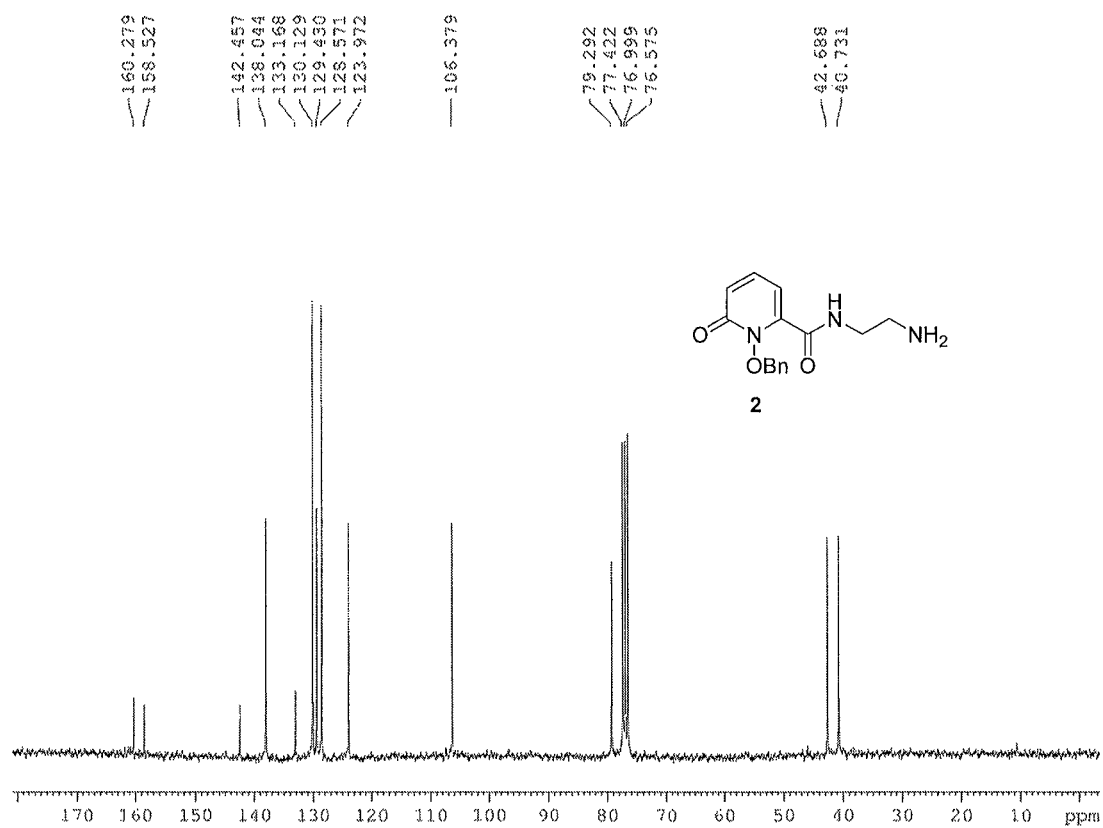

FIGS. 16A-16C depict the spectra that were obtained in negative mode. All peptoids are 1:1 $Fe^{3+}$ complexes except for CCCC and HHHH. Top spectrum is calculated and bottom is obtained.

FIG. 17 depicts the TOF MSMS of select peptoids.

FIGS. 18A-18D depict NMR results of select peptoids.

DETAILED DESCRIPTION

Chelators. Chelators are molecules that can bind metals. Chelators can include organic molecules that covalently bond with a metal. As used herein, a covalent bond describes the sharing of one or more pairs of electrons between atoms. In some instances, chelators are agents that bind to metal.

In particular embodiments, chelators can include a number of metal-coordinating atoms that bond with a metal. The metal-coordinating atoms can bond with metals having cations with a +1 charge. The metal-coordinating atoms can also bond with metals having cations with a +2 charge. Additionally, the metal-coordinating atoms can bond with metals having cations with a +3 charge. Further, the metal-coordinating atoms can bond with metals having cations with a +4 charge. The chelators described herein can, in some cases, include siderophores.

In particular embodiments, the metal-coordinating atoms of the chelators described herein can be included in one or more functional groups of the chelators. In some examples, the metal-coordinating atoms of the chelators can be included in one or more catecholate (CAM) groups. A CAM group can include at least a phenyl ring substituted by hydroxyl groups on adjacent carbon atoms. According to some illustrative embodiments, a CAM group can include:

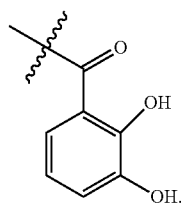 [SMILES: *C(=O)c1cccc(O)c1O]

In some embodiments, the metal-coordinating atoms of the chelators can be included in one or more hydroxamate (HA) groups. According to some embodiments, a HA group can include:

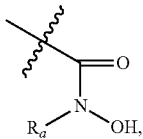

where $R_a$ can include H or an alkyl group including no greater than 5 carbon atoms. For example, $R_a$ can include a methyl group, an ethyl group, a propyl group, an isopropyl group, a butyl group, a sec-butyl group, an iso-butyl group, a tert-butyl group, a pentyl group, a tert-pentyl group, a neopentyl group, or an iso-pentyl group.

In some embodiments, the metal-coordinating atoms of the chelators can be included in one or more hydroxypyridinone (HOPO) groups. A HOPO group can include a pyridinone ring substituted by a hydroxyl group on the N atom. In some cases, a HOPO group can include a 1,2-HOPO group. According to some illustrative embodiments, a 1,2-HOPO group can include:

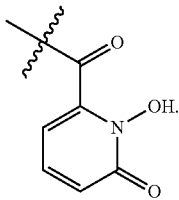 [SMILES: *C(=O)c1cccc(=O)n1O]

The metal-coordinating atoms of the chelators can be included in combinations of two or more of one or more CAM groups, one or more HA groups, or one or more HOPO groups. In illustrative examples, the metal-coordinating atoms of the chelators can be included in one or more CAM groups and one or more HA groups. In other illustrative examples, the metal-coordinating atoms of the chelators can be included in one or more CAM groups and one or more HOPO groups. In additional illustrative examples, the metal-coordinating atoms of the chelators can be included in one or more HA groups and one or more HOPO groups. In further illustrative examples, the metal-coordinating atoms of the chelators can be included in one or more HA groups, one or more CAM groups, and one or more HOPO groups.

The chelators can include a number of functional groups having metal-coordinating atoms with the functional groups being bonded to a linear scaffold or a branched scaffold. The functional groups and/or substituents described herein may be substituted or unsubstituted. Substituted functional groups and/or substituents can be substituted by one or more hydroxyl groups, one or more alkyl groups having no greater than 10 carbon atoms, one or more amine groups, one or more thiol groups, one or more ester groups, or combinations thereof.

The scaffold can include one or more amine groups. An amine group can include a nitrogen atom bonded to three substituents. In particular embodiments, an amine group can include a nitrogen atom bonded at least one carbon atom of substituent. In various embodiments, an amine group can include a nitrogen atom bonded to at least a first carbon atom of a first substituent and a second carbon atom of a second substituent. In further embodiments, an amine group can include a nitrogen atom bonded to a first carbon atom of a first substituent, a second carbon atom of a second substituent and a third carbon atom of a third substituent. In certain embodiments, an amine group can include a nitrogen atom bonded to one or more hydrogen atoms.

In some embodiments, the scaffold can include one or more amide groups. An amide group can include a nitrogen atom bonded to a carbonyl group and two additional substituents. In various examples, an amide group can include a nitrogen atom bonded to a carbonyl group and a carbon atom of a first additional substituent. In other examples, an amide group can include a nitrogen atom bonded to a carbonyl group and a first carbon atom of a first additional substituent and a second carbon atom of a second additional substituent. In certain embodiments, an amine group can include a nitrogen atom bonded to one or more hydrogen atoms.

In particular embodiments, the scaffold can include one or more amine groups and one or more amide groups. The scaffold can include one or more carbon-based chains bonded between amine groups, a carbon-based chain bonded between amide groups, or one or more carbon-based chains bonded between a combination of one or more amine groups and one or more amide groups. The carbon-based chains can include at least one carbon atom, at least 2 carbon atoms, at least 3 carbon atoms, at least 4 carbon atoms, or at least 5 carbon atoms. In addition, the carbon-based chains can include no greater than 10 carbon atoms, no greater than 9 carbon atoms, no greater than 8 carbon atoms, no greater than 7 carbon atoms, or no greater than 6 carbon atoms. In various embodiments, the carbon-based chains can include from 1 carbon atom to 10 carbon atoms, from 2 carbon atoms to 7 carbon atoms, or from 3 carbon atoms to 6 carbon atoms. In illustrative embodiments, the carbon-based chains can include alkane chains having carbon-carbon single bonds. In some cases, the carbon-based chains can include alkene chains having at least one carbon-carbon double bond. The carbon-based chains can be substituted or unsubstituted.

In particular embodiments, compositions that function as chelators for radionuclides can have the following structure, referred to herein as Structure I:

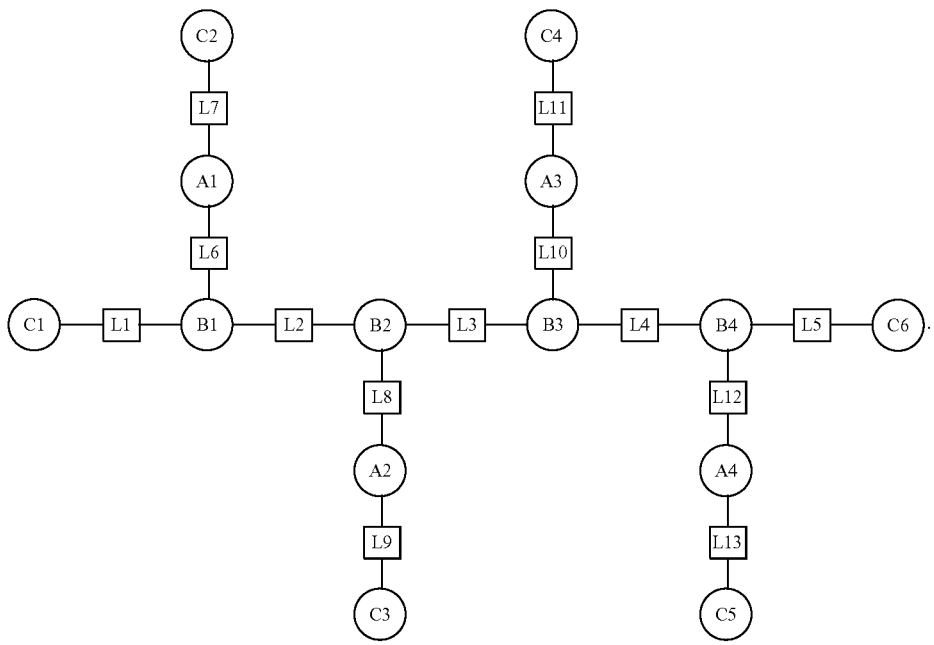

In some examples, A1, A2, A3, and A4 can, individually, include a CAM group, a HOPO group, or a HA group. Additionally, B1, B2, B3, and B4 can, individually, include an amide group or an amine group. Further, at least one of C1, C2, C3, C4, C5, or C6 can, individually, include $NH_2$, $C(=O)OH$, maleimide, dibromo-maleimide, isothiocyanate, alkyne, or azide. Also, in various examples, at least another one of C1, C2, C3, C4, C5, or C6 can be optional. In particular examples, at least one of L1, L2, L3, L4, L5, L6, L7, L8, L9, L10, L11, L12, or L13 can, individually, include H, an alkyl group having no greater than 10 carbon atoms, an alkylamino group having no greater than 10 carbon atoms and no greater than 2 nitrogen atoms; an alkylamido group having no greater than 10 carbon atoms and no greater than 2 nitrogen atoms; an alkyl ether group having no greater than 10 carbon atoms, a hydroxy ester group, or an alkyl ester group having no greater than 10 carbon atoms. In certain examples, at least one of L1, L5, L6, L7, L8, L9, L10, L11, L12, or L13 can be optional.

In illustrative examples, at least another one of L2, L3, or L4, can, individually, include an amine group or an amide group. In additional illustrative examples, L1, C1, L7, C2, L9, C3, L11, C4, and L13, C5 can be absent, L5 can include an alkyl group having no greater than 5 carbon atoms, and C6 can include $NH_2$, $C(=O)OH$, maleimide, dibromo-maleimide, isothiocyanate, alkyne, or azide. In further illustrative examples, L2, L3, L4, L6, L8, L10, and L12 can, individually, include an alkyl group having no greater than 5 carbon atoms. Also, A1 can include a CAM group or a 1,2-HOPO group; A2 can include a HA group, A3 can include a HA group, and A4 can include a CAM group, a 1,2-HOPO group, or a HA group. In other illustrative examples, at least one of L2, L3, or L4 includes an alkylamino or alkylamido group.

In various illustrative examples, B1, B2, and B3 can, individually, include an amide group and B4 can include an amino group, L2 and L3 can include an amino group, and L4 can include an alky group having no greater than 5 carbon atoms. Additionally, C1, C2, C3, C4, C5, L1, A1, A2, A3, L1, L6, L7, L8, L9, L10, L11, L12, and L13 can be absent; A4 can include a CAM group, a 1,2-HOPO group, or a HA group; and L5 can include an alkyl group having no greater than 5 carbon atoms.

In certain illustrative examples, B1, B2, and B3 can include an amide group and B4 can include an amide group; L2 and L3 can, individually, include an amino group; and L4 includes an alky group having no greater than 5 carbon atoms. Further, C1, C2, C3, C4, C5, A1, A2, A3, L1, L6, L7, L8, L9, L10, L11, and L13 can be absent, L12 can include an amino group, L5 can include an ether group having no greater than 10 carbon atoms, and A4 can include a CAM group, a 1,2-HOPO group, or a HA group.

In particular illustrative examples, C1, C2, C5, C6, L1, L2, L3, L4, L5, L7, L13, B2, and B4 can be absent; B1 and B3 can, individually, include an amide group; L6, L8, L10, and L12 can, individually, include an amino group, A1, A2, A3, and A4 can, individually, include a CAM group, a 1,2-HOPO group, or a HA group; and L9 and L11 can, individually, include an alkyl group having no greater than 5 carbon atoms.

In particular embodiments, compositions that function as chelators for radionuclides can have the following structure, referred to herein as Structure II:

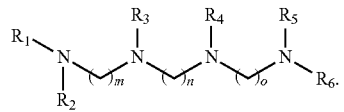

$R_1$, $R_2$, $R_3$, $R_4$, and $R_5$ can, individually, include H, an alkyl group having from 1 to 10 carbon atoms, a CAM group, a HA group, or a 1,2-HOPO group. $R_6$ can include H, an alkyl group having from 1 to 10 carbon atoms, or an alkyl group having from 1 to 10 carbon atoms and substituted by at least one of $NH_2$, C(=O)OH, maleimide, dibromo-maleimide, isothiocyanate, alkyne, or azide. m can be from 1 to 6; n can be from 1 to 6; and o can be from 1 to 6. In particular embodiments, at least one of $R_1$, $R_2$, $R_3$, $R_4$, or $R_5$ can, individually, include a CAM group, a HA group, or a 1,2-HOPO group. In various embodiments, Structure II can include a linear, spermine-based backbone.

In particular embodiments, compositions that function as chelators for radionuclides can have the following structure, referred to herein as Structure III:

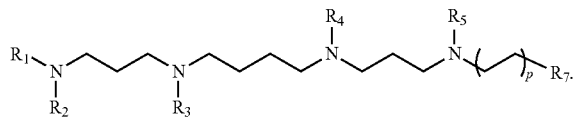

At least one of $R_1$, $R_3$, $R_4$, or $R_5$ can, individually, include a CAM group, a HA group, or a 1,2-HOPO group. Optionally, another one of $R_1$, $R_3$, $R_4$, or $R_5$ can, individually, include H, OH, or an alkyl group having from 1 to 10 carbon atoms. $R_2$ can include H, OH, or an alkyl group including from 1 to 5 carbon atoms. p can be from 0 to 4. $R_7$ can include $NH_2$, C(=O)OH, maleimide, dibromo-maleimide, isothiocyanate, alkyne, or azide. In illustrative embodiments, $R_1$ can include a CAM group or a 1,2-HOPO group, $R_3$ and $R_4$ can, individually, include a HA group, and $R_5$ can include a CAM group, a 1,2-HOPO group, or a HA group.

In particular embodiments, compositions that function as chelators for radionuclides can have the following structure, referred to herein as Structure IV:

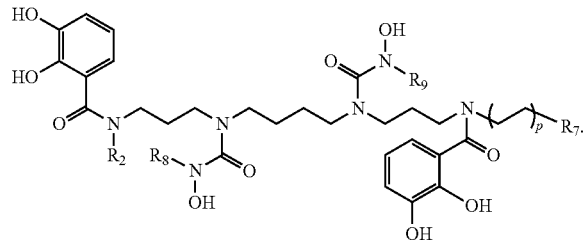

$R_7$ can include $NH_2$, C(=O)OH, maleimide, dibromo-maleimide, isothiocyanate, alkyne, or azide. $R_2$, $R_8$, and $R_9$ can, individually, include H, OH, or an alkyl group including from 1 to 5 carbon atoms. p can be from 0 to 4.

In particular embodiments, compositions that function as chelators for radionuclides can have the following structure, referred to herein as Structure V:

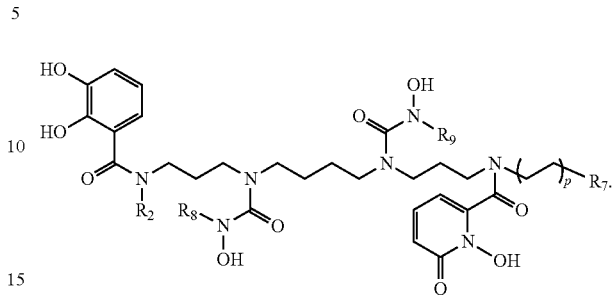

$R_7$ can include $NH_2$, C(=O)OH, maleimide, dibromo-maleimide, isothiocyanate, alkyne, or azide. $R_2$, $R_8$, and $R_9$ can, individually, include H, OH, or an alkyl group including from 1 to 5 carbon atoms. p can be from 0 to 4.

In particular embodiments, compositions that function as chelators for radionuclides can have the following structure, referred to herein as Structure VI:

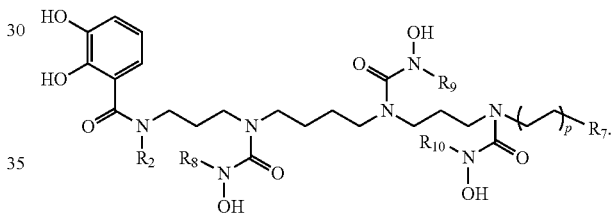

$R_7$ can include $NH_2$, C(=O)OH, maleimide, dibromo-maleimide, isothiocyanate, alkyne, or azide. $R_2$, $R_8$, $R_9$, and $R_{10}$ can, individually, include H, OH, or an alkyl group including from 1 to 5 carbon atoms. p can be from 0 to 4.

In particular embodiments, compositions that function as chelators for radionuclides can have the following structure, referred to herein as Structure VII:

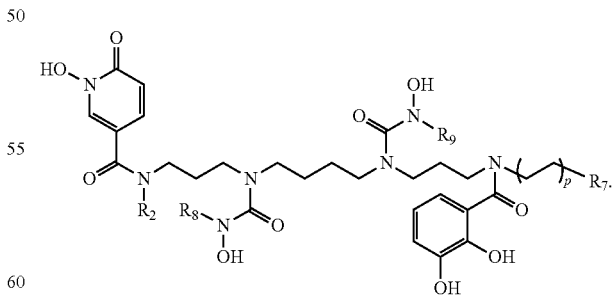

$R_7$ can include $NH_2$, C(=O)OH, maleimide, dibromo-maleimide, isothiocyanate, alkyne, or azide. $R_2$, $R_8$, and $R_9$ can, individually, include H, OH, or an alkyl group including from 1 to 5 carbon atoms. p can be from 0 to 4.

In particular embodiments, compositions that function as chelators for radionuclides can have the following structure, referred to herein as Structure VIII:

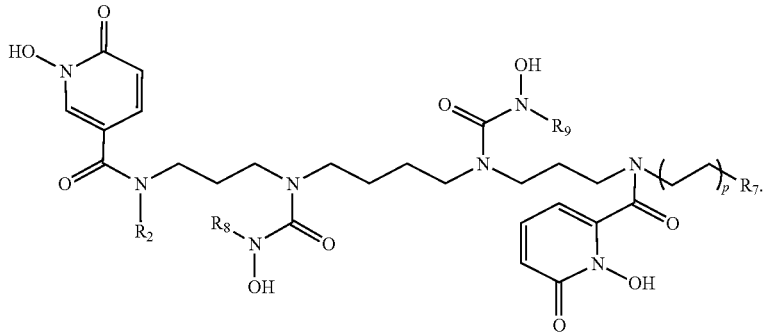

$R_7$ can include $NH_2$, $C(=O)OH$, maleimide, dibromo-maleimide, isothiocyanate, alkyne, or azide. $R_2$, $R_8$, and $R_9$ can, individually, include H, OH, or an alkyl group including from 1 to 5 carbon atoms. p can be from 0 to 4.

In particular embodiments, compositions that function as chelators for radionuclides can have the following structure, referred to herein as Structure IX:

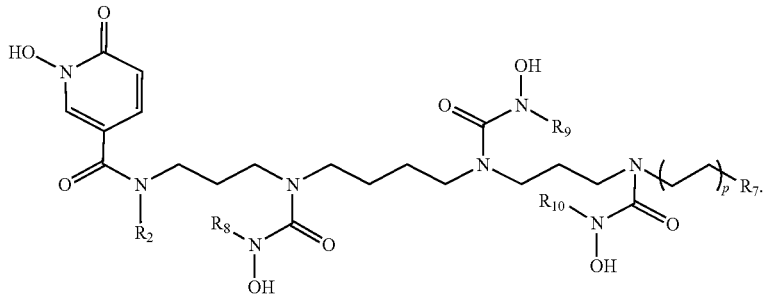

$R_7$ can include $NH_2$, $C(=O)OH$, maleimide, dibromo-maleimide, isothiocyanate, alkyne, or azide. $R_2$, $R_8$, $R_9$, and $R_{10}$ can, individually, include H, OH, or an alkyl group including from 1 to 5 carbon atoms. p can be from 0 to 4.

In particular embodiments, compositions that function as chelators for radionuclides can have the following structure, referred to herein as Structure X:

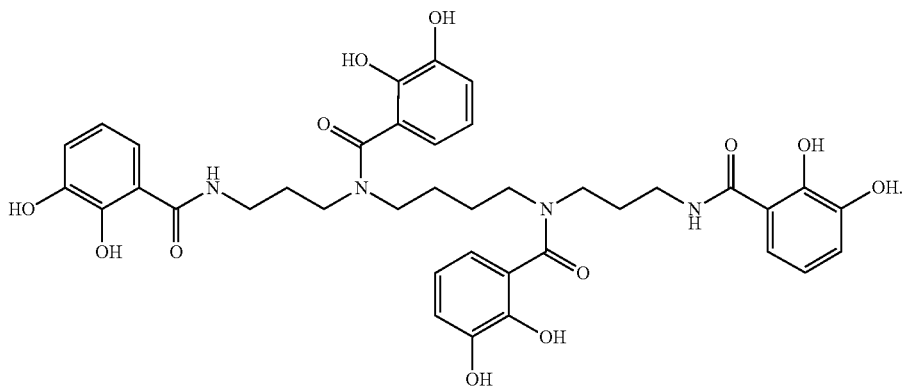 [SMILES: O=C(NCCCN(CCCCN(CCCNC(=O)c1cccc(O)c1O)C(=O)c1cccc(O)c1O)C(=O)c1cccc(O)c1O)c1cccc(O)c1O]

In particular embodiments, compositions that function as chelators for radionuclides can have the following structure, referred to herein as Structure XI:

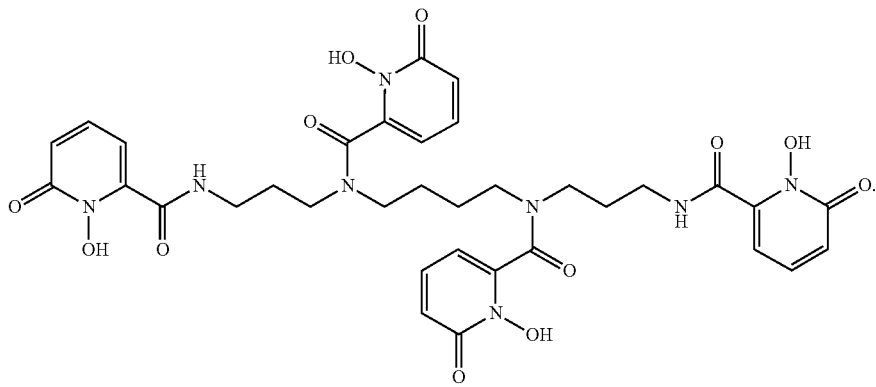 [SMILES: O=C(NCCCN(CCCCN(CCCNC(=O)c1cccc(=O)n1O)C(=O)c1cccc(=O)n1O)C(=O)c1cccc(=O)n1O)c1cccc(=O)n1O]

In particular embodiments, compositions can have a branched backbone rather than the linear, spermine-based backbone of Structures III-XI. In particular embodiments, compositions that function as chelators for radionuclides can have the following structure, referred to herein as Structure XII:

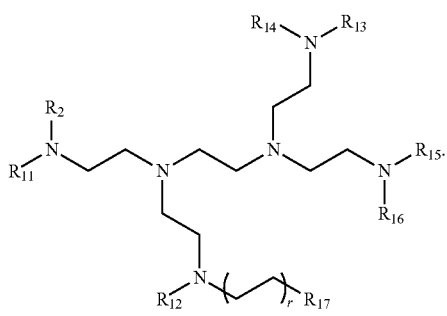

At least one of $R_{11}$, $R_{12}$, $R_{13}$, or $R_{15}$, can, individually, include a CAM group, a HA group, or a 1,2-HOPO group. Optionally, at least another one of $R_{11}$, $R_{12}$, $R_{13}$, or $R_{15}$ can, individually, include H, OH, or an alkyl group having from 1 to 10 carbon atoms. $R_{17}$ can include $NH_2$, C(=O)OH, maleimide, dibromo-maleimide, isothiocyanate, alkyne, or azide. r can be from 0 to 6. $R_2$, $R_{14}$, and $R_{16}$ can, individually, include H, OH, or an alkyl group having from 1 to 10 carbon atoms. In illustrative embodiments, $R_{11}$ can include a CAM group or a 1,2-HOPO group, $R_{12}$ and $R_{15}$ can, individually, include a HA group, and $R_{13}$ can include a CAM group, a 1,2-HOPO group, or a HA group.

In particular embodiments, compositions that function as chelators for radionuclides can have the following structure, referred to herein as Structure XIII:

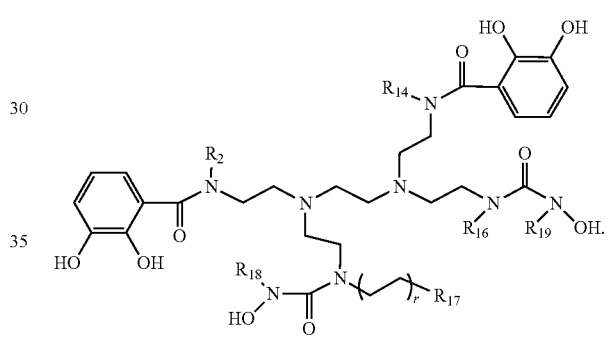

$R_2$, $R_{14}$, $R_{16}$, $R_{18}$, and $R_{19}$ can, individually, include H, OH, or an alkyl group having from 1 to 10 carbon atoms. $R_{17}$ can include $NH_2$, C(=O)OH, maleimide, dibromo-maleimide, isothiocyanate, alkyne, or azide. r can be from 0 to 4.

In particular embodiments, compositions that function as chelators for radionuclides can have the following structure, referred to herein as Structure XIV:

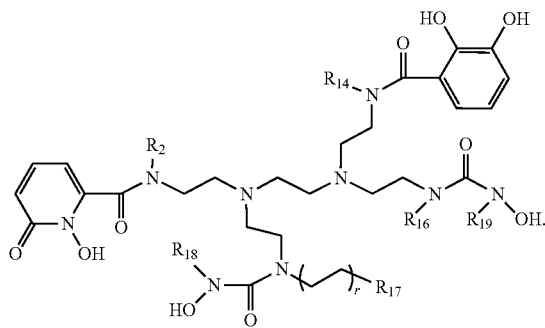

$R_2$, $R_{14}$, $R_{16}$, $R_{18}$, and $R_{19}$ can, individually, include H, OH, or an alkyl group having from 1 to 10 carbon atoms. $R_{17}$ can include $NH_2$, C(=O)OH, maleimide, dibromo-maleimide, isothiocyanate, alkyne, or azide. r can be from 0 to 4.

In particular embodiments, compositions that function as chelators for radionuclides can have the following structure, referred to herein as Structure XV:

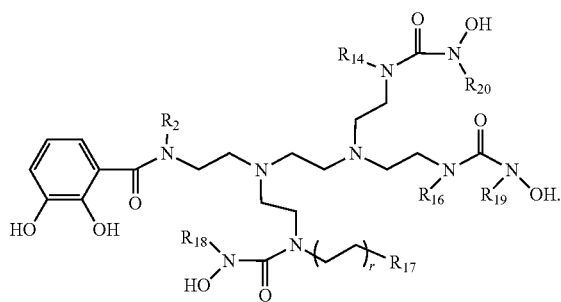

$R_2$, $R_{14}$, $R_{16}$, $R_{18}$, $R_{19}$, and $R_{20}$ can, individually, include H, OH, or an alkyl group having from 1 to 10 carbon atoms. $R_{17}$ can include $NH_2$, C(=O)OH, maleimide, dibromo-maleimide, isothiocyanate, alkyne, or azide. r can be from 0 to 4.

In particular embodiments, compositions that function as chelators for radionuclides can have the following structure, referred to herein as Structure XVI:

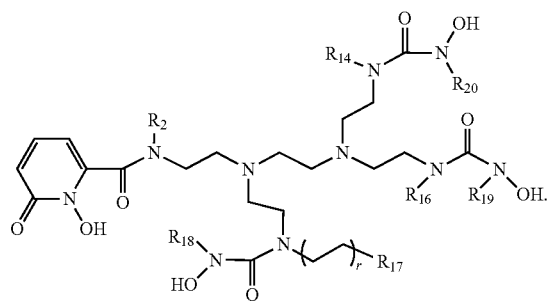

$R_2$, $R_{14}$, $R_{16}$, $R_{18}$, $R_{19}$, and $R_{20}$ can, individually, include H, OH, or an alkyl group having from 1 to 10 carbon atoms. $R_{17}$ can include $NH_2$, C(=O)OH, maleimide, dibromo-maleimide, isothiocyanate, alkyne, or azide. r can be from 0 to 4.

In particular embodiments, compositions that function as chelators for radionuclides can have the following structure, referred to herein as Structure XVII:

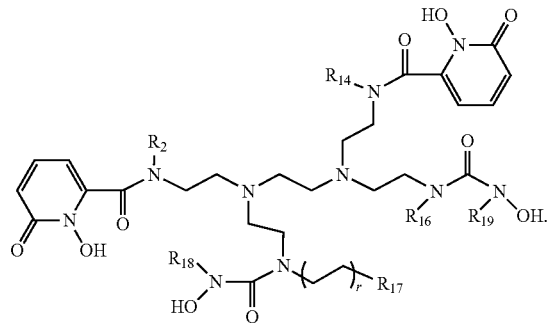

$R_2$, $R_{14}$, $R_{16}$, $R_{18}$, and $R_{19}$ can, individually, include H, OH, or an alkyl group having from 1 to 10 carbon atoms. $R_{17}$ can include $NH_2$, C(=O)OH, maleimide, dibromo-maleimide, isothiocyanate, alkyne, or azide. r can be from 0 to 4.

In particular embodiments, compositions that function as chelators for radionuclides can have the following structure, referred to herein as Structure XVIII:

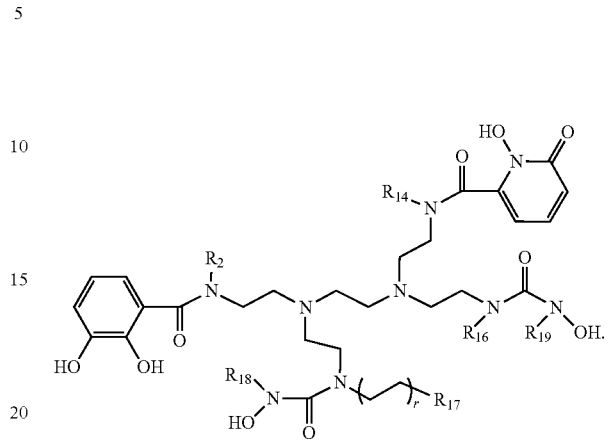

$R_2$, $R_{14}$, $R_{16}$, $R_{18}$, and $R_{19}$ can include H, OH, or an alkyl group having from 1 to 10 carbon atoms. $R_{17}$ can, individually, include $NH_2$, C(=O)OH, maleimide, dibromo-maleimide, isothiocyanate, alkyne, or azide. r can be from 0 to 4.

In particular embodiments, compositions can have a backbone that includes a number of amide groups and a number of amine groups. In some embodiments, the backbone of compositions that function as chelators for radionuclides can be based on Desferrioxamine B. In particular embodiments, compositions that function as chelators can have the following structure, referred to herein as Structure XIX:

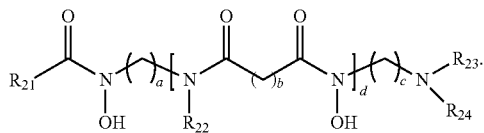

$R_{21}$ and $R_{22}$ can include H, OH, or an alkyl group having from 1 to 10 carbon atoms. $R_{23}$ can include H, OH, an alkyl group having from 1 to 10 carbon atoms, or $(CH_2)_e R_a$, where $R_a$ is $NH_2$, C(=O)OH, maleimide, dibromo-maleimide, isothiocyanate, alkyne, or azide and e is from 1 to 10. $R_{24}$ can include a substituent that includes a CAM group, a 1,2-HOPO group, or a HA group. Optionally, $R_{24}$ can include $NH_2$, C(=O)OH, maleimide, dibromo-maleimide, isothiocyanate, alkyne, or azide. a, b, and c can include from 1 to 10 and d can include from 1 to 4.

In particular embodiments, compositions that function as chelators for radionuclides can have the following structure, referred to herein as Structure XX:

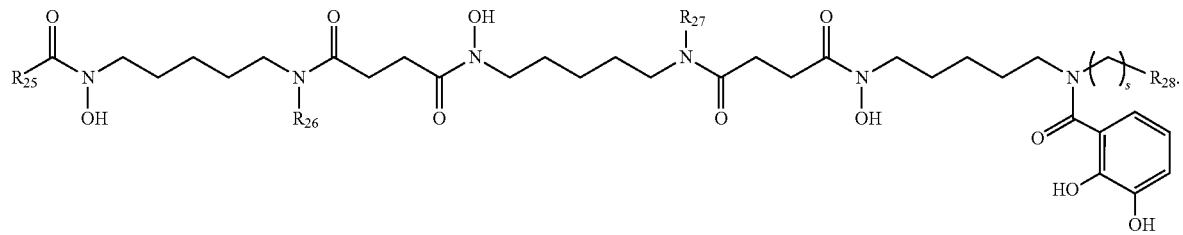

$R_{25}$, $R_{26}$, and $R_{27}$ can, individually, include H, OH, or an alkyl group having from 1 to 10 carbon atoms. $R_{28}$ can include H, an alkyl group having from 1 to 5 carbon atoms, $NH_2$, $C(=O)OH$, maleimide, dibromo-maleimide, isothiocyanate, alkyne, or azide. s can be from 0 to 4.

In particular embodiments, compositions that function as chelators for radionuclides can have the following structure, referred to herein as Structure XXI:

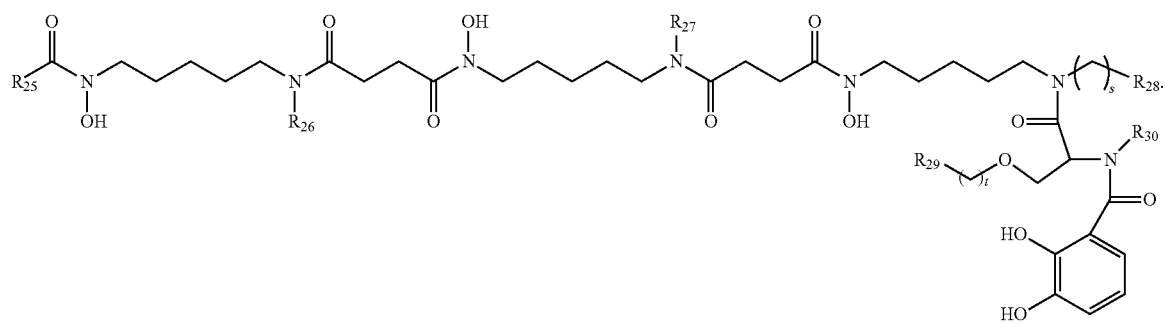

$R_{25}$, $R_{26}$, $R_{27}$, and $R_{30}$ can, individually, include H, OH, or an alkyl group having from 1 to 10 carbon atoms. $R_{28}$ and $R_{29}$ can, individually, include H, an alkyl group having from 1 to 5 carbon atoms, $NH_2$, $C(=O)OH$, maleimide, dibromo-maleimide, isothiocyanate, alkyne, or azide. s can be from 0 to 4. t can be from 0 to 4.

In particular embodiments, compositions that function as chelators for radionuclides can have the following structure, referred to herein as Structure XXII:

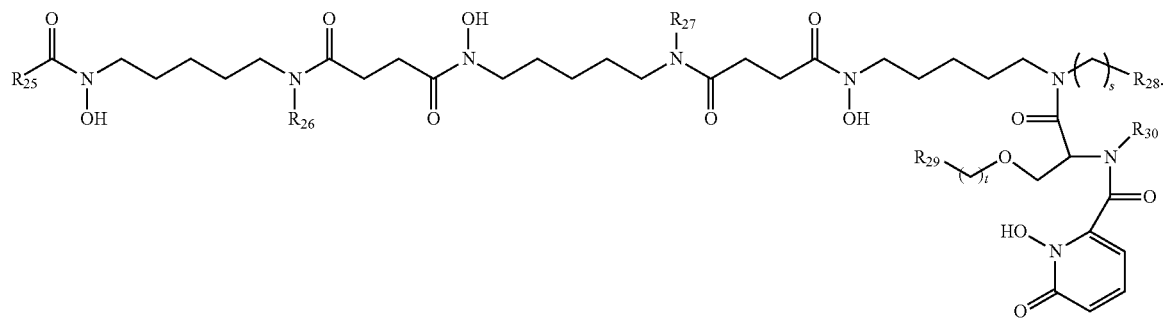

$R_{25}$, $R_{26}$, $R_{27}$, and $R_{30}$ can, individually, include H, OH, or an alkyl group having from 1 to 10 carbon atoms. $R_{28}$ and $R_{29}$ can, individually, include H, an alkyl group having from 1 to 5 carbon atoms, $NH_2$, $C(=O)OH$, maleimide, dibromo-maleimide, isothiocyanate, alkyne, or azide. s can be from 0 to 4. t can be from 0 to 4.

In particular embodiments, compositions that function as chelators for radionuclides can have the following structure, referred to herein as Structure XXIII:

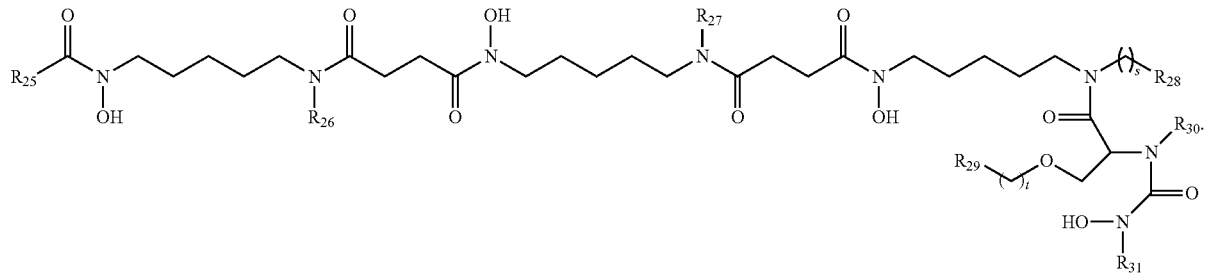

$R_{25}$, $R_{26}$, $R_{27}$, $R_{30}$, and $R_{31}$ can, individually, include H, OH, or an alkyl group having from 1 to 10 carbon atoms. $R_{28}$ and $R_{29}$ can, individually, include H, an alkyl group having from 1 to 5 carbon atoms, $NH_2$, C(=O)OH, maleimide, dibromo-maleimide, isothiocyanate, alkyne, or azide. s can be from 0 to 4. t can be from 0 to 4.

In particular embodiments, compositions that function as chelators for radionuclides can have the following structure, referred to herein as Structure XXIV:

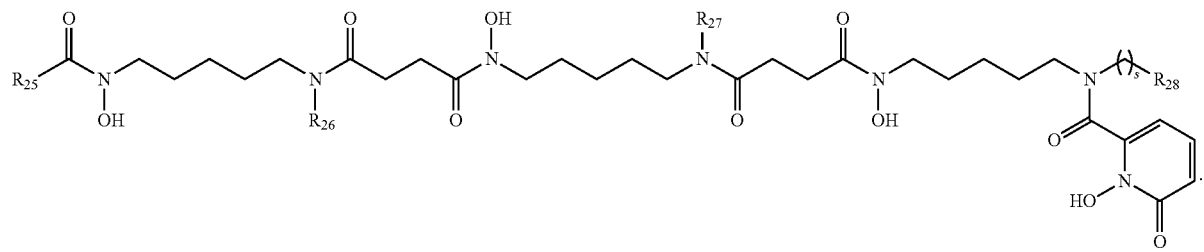

$R_{25}$, $R_{26}$, and $R_{27}$ can, individually, include H, OH, or an alkyl group having from 1 to 10 carbon atoms. $R_{28}$ can include H, an alkyl group having from 1 to 5 carbon atoms, $NH_2$, C(=O)OH, maleimide, dibromo-maleimide, isothiocyanate, alkyne, or azide. s can be from 0 to 4.

In particular embodiments, compositions that function as chelators for radionuclides can have the following structure, referred to herein as Structure XXV:

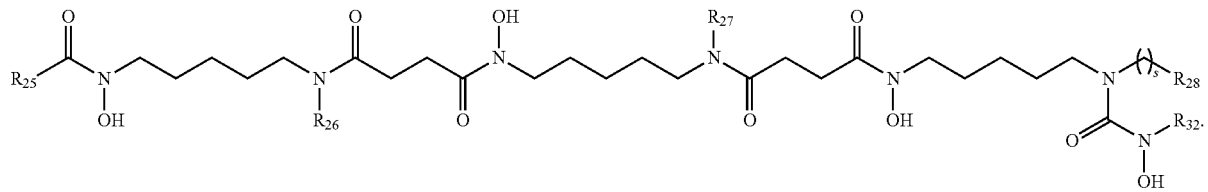

$R_{25}$, $R_{26}$, $R_{27}$, and $R_{32}$ can, individually, include H, OH, or an alkyl group having from 1 to 10 carbon atoms. $R_{28}$ can include H, an alkyl group having from 1 to 5 carbon atoms, $NH_2$, C(=O)OH, maleimide, dibromo-maleimide, isothiocyanate, alkyne, or azide. s can be from 0 to 4.

In particular embodiments, compositions can have an amide-based backbone. In particular embodiments, compositions that function as chelators can have the following structure, referred to herein as Structure XXVI:

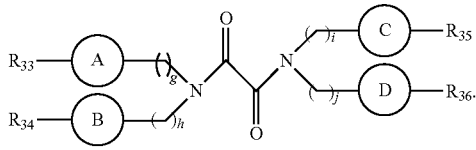

A, B, C, and D can, individually, include one or more amide groups, one or more amine groups, or an alkyl group having from 1 to 10 carbon atoms. $R_{33}$, $R_{34}$, $R_{35}$, and $R_{36}$ can, individually, include a CAM group, a 1,2-HOPO group, or a HA group. g, h, i, and j can, individually, be from 1 to 10.

In particular embodiments, compositions that function as chelators for radionuclides can have the following structure, referred to herein as Structure XXVII:

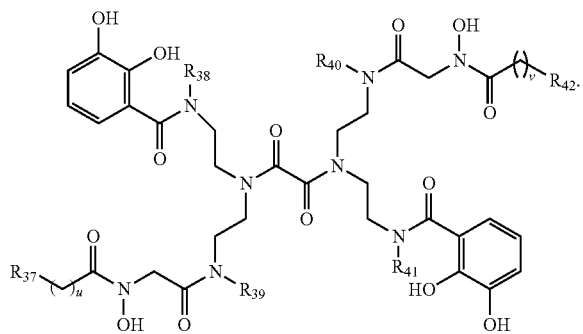

$R_{37}$ and $R_{42}$ can, individually, include H, an alkyl group having from 1 to 5 carbon atoms, $NH_2$, $C(=O)OH$, maleimide, dibromo-maleimide, isothiocyanate, alkyne, or azide. $R_{38}$, $R_{39}$, $R_{40}$, and $R_{41}$ can, individually, include H, OH, or an alkyl group having from 1 to 5 carbon atoms. u and v can, individually, be from 0 to 5.

In particular embodiments, compositions that function as chelators for radionuclides can have the following structure, referred to herein as Structure XXVIII:

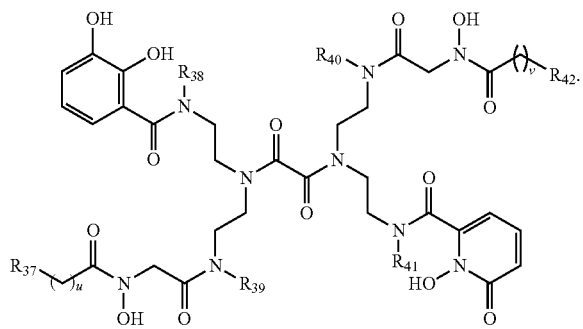

$R_{37}$ and $R_{42}$ can, individually, include H, an alkyl group having from 1 to 5 carbon atoms, $NH_2$, $C(=O)OH$, maleimide, dibromo-maleimide, isothiocyanate, alkyne, or azide. $R_{38}$, $R_{39}$, $R_{40}$, and $R_{41}$ can, individually, include H, OH, or an alkyl group having from 1 to 5 carbon atoms. u and v can, individually, be from 0 to 5.

In particular embodiments, compositions that function as chelators for radionuclides can have the following structure, referred to herein as Structure XXIX:

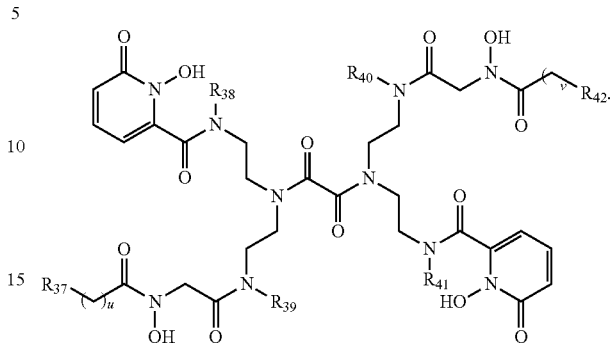

$R_{37}$ and $R_{42}$ can, individually, include H, an alkyl group having from 1 to 5 carbon atoms, $NH_2$, $C(=O)OH$, maleimide, dibromo-maleimide, isothiocyanate, alkyne, or azide. $R_{38}$, $R_{39}$, $R_{40}$, and $R_{41}$ can, individually, include H, OH, or an alkyl group having from 1 to 5 carbon atoms. u and v can, individually, be from 0 to 5.

In particular embodiments, compositions that function as chelators for radionuclides can have the following structure, referred to herein as Structure L:

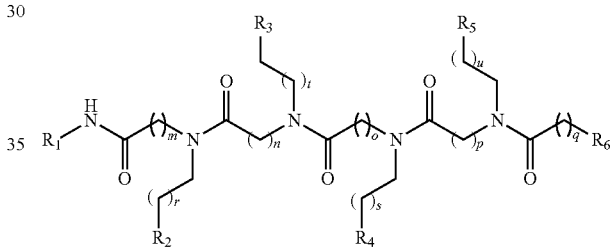

wherein: at least one of $R_1$, $R_2$, $R_3$, $R_4$, $R_5$, individually, comprise a CAM group, a HA group, or a 1,2-HOPO group; at least another one of $R_1$, $R_2$, $R_3$, $R_4$, and $R_5$, individually, comprise H or an alkyl group having from 1 to 10 carbon atoms; $R_6$ comprises (i) H, (ii) an alkyl group having from 1 to 10 carbon atoms, or (iii) an alkyl group having from 1 to 100 carbon atoms and no greater than 2 nitrogen atoms, and substituted by at least one of $NH_2$, $C(=O)OH$, maleimide, dibromo-maleimide, isothiocyanate, alkyne, amide, fluorescent moiety, or azide; m can be from 1 to 6; n can be from 1 to 6; o can be from 1 to 6; p can be from 1 to 6; q can be from 0 to 6; r can be from 1 to 6; s can be from 1 to 6; t can be from 1 to 6.

In some embodiments, the chelator is any one or more of the chelators in any of the figures. In some embodiments, the chelator has a structure as depicted in FIG. 10E. In some embodiments, the chelator is made by any one or more of the flow charts provided in the present figures. In some embodiments, the chelator is a peptoid chelator.

Examples of radioisotopes useful include [225]Ac, [226]Ac, [228]Ac, [105]Ag, [106]mAg, [110]mAg, [111]Ag, [112]Ag, [113]Ag, [239]Am, [240]Am, [242]Am, [244]Am, [37]Ar, [71]As, [72]As, [73]As, [74]As, [76]As, [77]As, [209]At, [210]At, [191]Au, [192]Au, [193]Au, [194]Au, [195]Au, [196]Au, [196]m2Au, [198]Au, [198]mAu, [199]Au, [200]mAu, [128]Ba, [131]Ba, [133]mBa, [135]mBa, [140]Ba, [7]Be, [203]Bi, [204]Bi, [205]Bi, [206]Bi, [210]Bi, [212]Bi, [243]Bk, [244]Bk, [245]Bk, [246]Bk, [248]mBk, [250]Bk, [76]Br, [77]Br, [80]mBr, [82]Br, $^{11}$C, $^{14}$C, [45]Ca, [47]Ca, [167]Cd, $^{115}$Cd, $^{115m}$Cd, $^{117m}$Cd, $^{132}$Ce, $^{133m}$Ce, $^{134}$Ce, $^{135}$Ce, $^{137}$Ce, $^{137m}$Ce, $^{139}$Ce, $^{141}$Ce, $^{143}$Ce, $^{144}$Ce, $^{246}$Cf, $^{247}$Cf, $^{253}$Cf, $^{254}$Cf, $^{240}$Cm, $^{241}$Cm, $^{242}$Cm, $^{252}$Cm, $^{55}$Co, $^{56}$Co, $^{57}$Co, $^{58}$Co, $^{58m}$Co, $^{60}$Co, $^{48}$Cr, $^{51}$Cr, $^{127}$Cs, $^{129}$Cs, $^{131}$Cs, $^{132}$Cs, $^{136}$Cs, $^{137}$Cs, $^{61}$Cu, $^{62}$Cu, $^{64}$Cu, $^{67}$Cu, $^{153}$Dy, $^{155}$Dy, $^{157}$Dy, $^{159}$Dy, $^{165}$Dy, $^{166}$Dy, $^{160}$Er, $^{161}$Er, $^{165}$Er, $^{169}$Er, $^{171}$Er, $^{172}$Er, $^{250}$Es, $^{251}$Es, $^{253}$Es, $^{254}$Es, $^{254m}$Es, $^{255}$Es, $^{256m}$Es, $^{145}$Eu, $^{146}$Eu, $^{147}$Eu, $^{148}$Eu, $^{149}$Eu, $^{150m}$Eu, $^{152m}$Eu, $^{156}$Eu, $^{157}$Eu, $^{52}$Fe, $^{59}$Fe, $^{251}$Fm, $^{252}$Fm, $^{253}$Fm, $^{254}$Fm, $^{255}$Fm, $^{257}$Fm, $^{66}$Ga, $^{67}$Ga, $^{68}$Ga, $^{72}$Ga, $^{73}$Ga, $^{146}$Gd, $^{147}$Gd, $^{149}$Gd, $^{151}$Gd, $^{153}$Gd, $^{159}$Gd, $^{68}$Ge, $^{69}$Ge, $^{71}$Ge, $^{77}$Ge, $^{170}$Hf, $^{171}$Hf, $^{173}$Hf, $^{175}$Hf, $^{179m2}$Hf, $^{180m}$Hf, $^{181}$Hf, $^{184}$Hf, $^{192}$Hg, $^{193}$Hg, $^{193m}$Hg, $^{195}$Hg, $^{195m}$Hg, $^{197}$Hg, $^{197m}$Hg, $^{203}$Hg, $^{160m}$Ho, $^{166}$Ho, $^{167}$Ho, $^{123}$I, $^{124}$I, $^{126}$I, $^{130}$I, $^{132}$I, $^{133}$I, $^{135}$I, $^{109}$In, $^{110}$In, $^{111}$In, $^{114m}$In, $^{115m}$In, $^{184}$Ir, $^{185}$Ir, $^{186}$Ir, $^{187}$Ir, $^{188}$Ir, $^{189}$Ir, $^{190}$Ir, $^{190m2}$Ir, $^{192}$Ir, $^{193m}$Ir, $^{194}$Ir, $^{194m2}$Ir, $^{195m}$Ir, $^{42}$K, $^{43}$K, $^{76}$Kr, $^{79}$Kr, $^{81m}$Kr, $^{85m}$Kr, $^{132}$La, $^{133}$La, $^{135}$La, $^{140}$La, $^{141}$La, $^{262}$Lr, $^{169}$Lu, $^{170}$Lu, $^{171}$Lu, $^{172}$Lu, $^{174m}$Lu, $^{176m}$Lu, $^{177}$Lu, $^{177m}$Lu, $^{179}$Lu, $^{257}$Md, $^{258}$Md, $^{260}$Md, $^{28}$Mg, $^{52}$Mn, $^{90}$Mo, $^{93m}$Mo, $^{99}$Mo, $^{13}$N, $^{24}$Na, $^{90}$Nb, $^{91m}$Nb, $^{92m}$Nb, $^{95}$Nb, $^{95m}$Nb, $^{96}$Nb, $^{138}$Nd, $^{139m}$Nd, $^{140}$Nd, $^{147}$Nd, $^{56}$Ni, $^{57}$Ni, $^{66}$Ni, $^{234}$Np, $^{236m}$Np, $^{238}$Np, $^{239}$Np, $^{15}$O, $^{182}$Os, $^{183}$Os, $^{183m}$Os, $^{185}$Os, $^{189m}$Os, $^{191}$Os, $^{191m}$Os, $^{193}$Os, $^{32}$P, $^{33}$P, $^{228}$Pa, $^{229}$Pa, $^{230}$Pa, $^{232}$Pa, $^{233}$Pa, $^{234}$Pa, $^{200}$Pb, $^{201}$Pb, $^{202m}$Pb, $^{203}$Pb, $^{209}$Pb, $^{212}$Pb, $^{100}$Pd, $^{101}$Pd, $^{103}$Pd, $^{109}$Pd, $^{111m}$Pd, $^{112}$Pd, $^{143}$Pm, $^{148}$Pm, $^{148m}$Pm, $^{149}$Pm, $^{151}$Pm, $^{204}$Po, $^{206}$Po, $^{207}$Po, $^{210}$Po, $^{139}$Pr, $^{142}$Pr, $^{143}$Pr, $^{145}$Pr, $^{188}$Pt, $^{189}$Pt, $^{191}$Pt, $^{193m}$Pt, $^{195m}$Pt, $^{197}$Pt, $^{200}$Pt, $^{202}$Pt, $^{234}$Pu, $^{237}$Pu, $^{243}$Pu, $^{245}$Pu, $^{246}$Pu, $^{247}$Pu, $^{223}$Ra, $^{224}$Ra, $^{225}$Ra, $^{81}$Rb, $^{82}$Rb, $^{82m}$Rb, $^{83}$Rb, $^{84}$Rb, $^{86}$Rb, $^{181}$Re, $^{182}$Re, $^{182m}$Re, $^{183}$Re, $^{184}$Re, $^{184m}$Re, $^{186}$Re, $^{188}$Re, $^{189}$Re, $^{190m}$Re, $^{99}$Rh, $^{99m}$Rh, $^{100}$Rh, $^{101m}$Rh, $^{102}$Rh, $^{103m}$Rh, $^{105}$Rh, $^{211}$Rn, $^{222}$Rn, $^{97}$Ru, $^{103}$Ru, $^{105}$Ru, $^{35}$S, $^{118m}$Sb, $^{119}$Sb, $^{120}$Sb, $^{120m}$Sb, $^{122}$Sb, $^{124}$Sb, $^{126}$Sb, $^{127}$Sb, $^{128}$Sb, $^{129}$Sb, $^{43}$Sc, $^{44}$Sc, $^{44m}$Sc, $^{46}$Sc, $^{47}$Sc, $^{48}$Sc, $^{72}$Se, $^{73}$Se, $^{75}$Se, $^{153}$Sm, $^{156}$Sm, $^{110}$Sn, $^{113}$Sn, $^{117m}$Sn, $^{119m}$Sn, $^{121}$Sn, $^{123}$Sn, $^{125}$Sn, $^{82}$Sr, $^{83}$Sr, $^{85}$Sr, $^{89}$Sr, $^{91}$Sr, $^{173}$Ta, $^{175}$Ta, $^{176}$Ta, $^{177}$Ta, $^{180}$Ta, $^{182}$Ta, $^{183}$Ta, $^{184}$Ta, $^{149}$Tb, $^{150}$Tb, $^{151}$Tb, $^{152}$Tb, $^{153}$Tb, $^{154}$Tb, $^{154m}$Tb, $^{154m2}$Tb, $^{155}$Tb, $^{156}$Tb, $^{156m}$Tb, $^{156m2}$Tb, $^{160}$Tb, $^{161}$Tb, $^{94}$Tc, $^{95}$Tc, $^{95m}$Tc, $^{96}$Tc, $^{97m}$Tc, $^{99m}$Tc, $^{118}$Te, $^{119}$Te, $^{119m}$Te, $^{121}$Te, $^{121m}$Te, $^{123m}$Te, $^{125m}$Te, $^{127}$Te, $^{127m}$Te, $^{129m}$Te, $^{131m}$Te, $^{132}$Te, $^{227}$Th, $^{231}$Th, $^{234}$Th, $^{45}$Ti, $^{198}$Tl, $^{199}$Tl, $^{200}$Tl, $^{201}$Tl, $^{202}$Tl, $^{204}$Tl, $^{165}$Tm, $^{166}$Tm, $^{167}$Tm, $^{168}$Tm, $^{170}$Tm, $^{172}$Tm, $^{173}$Tm, $^{230}$U, $^{231}$U, $^{237}$U, $^{240}$U, $^{48}$V, $^{178}$W, $^{181}$W, $^{185}$W, $^{187}$W, $^{188}$W, $^{122}$Xe, $^{125}$Xe, $^{127}$Xe, $^{129m}$Xe, $^{131m}$Xe, $^{133}$Xe, $^{133m}$Xe, $^{135}$Xe, $^{85m}$Y, $^{86}$Y, $^{87}$Y, $^{87m}$Y, $^{88}$Y, $^{90}$Y, $^{90m}$Y, $^{91}$Y, $^{92}$Y, $^{93}$Y, $^{166}$Yb, $^{169}$Yb, $^{175}$Yb, $^{62}$Zn, $^{65}$Zn, $^{69m}$Zn, $^{71m}$Zn, $^{72}$Zn, $^{86}$Zr, $^{88}$Zr, $^{89}$Zr, $^{95}$Zr, and $^{97}$Zr.

It can be helpful to classify cytotoxic radionuclides into groups, for example, metals (e.g., $^{90}$Y, $^{67}$Cu, $^{213}$Bi, $^{212}$Bi), and transitional elements (e.g., $^{186}$Re). Further, examples of pure β-emitters include $^{67}$Cu and $^{90}$Y; and examples of α-emitters include $^{213}$Bi. β-emitters that emit γ-radiation include $^{177}$Lu and $^{186}$Re, while Auger emitters and radionuclides that decay by internal conversion include $^{67}$Ga.

As will be appreciated by one of ordinary skill in the art, more than one radioisotope may be chosen and used, for example, in particular nuclear medicine indications. Thus, embodiments can include a single species of radioisotope, two species of radioisotopes, or a population of a plurality of species of radioisotopes combined in various proportions. In this manner the useful properties of different radioisotopes can be combined. For example, a single radioisotope decays at a defined exponential rate. By combining radioisotopes of different half-lives, it is possible to create a new decay rate.

In particular embodiments, targeting domains can be derived from whole proteins or protein fragments with an affinity for particular tissues and/or cell types of interest. In particular embodiments, targeting domains can be derived from whole antibodies or binding fragments of an antibody, e.g., Fv, Fab, Fab', F(ab')$_2$, Fc, and single chain Fv fragments (scFvs) or any biologically-effective fragments of an immunoglobulin that bind specifically to, for example, a cancer antigen epitope. Antibodies or antigen binding fragments include all or a portion of polyclonal antibodies, monoclonal antibodies, human antibodies, humanized antibodies, synthetic antibodies, chimeric antibodies, bispecific antibodies, mini bodies, and linear antibodies.

Targeting domains from human origin or humanized antibodies have lowered or no immunogenicity in humans and have a lower number of non-immunogenic epitopes compared to non-human antibodies. Antibodies and their fragments will generally be selected to have a reduced level or no antigenicity in human subjects. Targeting domains can particularly include any peptide that specifically binds a selected unwanted cell epitope. Sources of targeting domains include antibody variable regions from various species (which can be in the form of antibodies, sFvs, scFvs, Fabs, scFv-based grababody, or soluble VH domain or domain antibodies). These antibodies can form antigen-binding regions using only a heavy chain variable region, i.e., these functional antibodies are homodimers of heavy chains only (referred to as "heavy chain antibodies") (Jespers et al., *Nat. Biotechnol.* 22:1161, 2004; Cortez-Retamozo et al., *Cancer Res.* 64:2853, 2004; Baral et al., *Nature Med.* 12:580, 2006; and Barthelemy et al., *J. Biol. Chem.* 283:3639, 2008).

Phage display libraries of partially or fully synthetic antibodies are available and can be screened for an antibody or fragment thereof that can bind a selected epitope. For example, targeting domains may be identified by screening a Fab phage library for Fab fragments that specifically bind to a target of interest (see Hoet et al., *Nat. Biotechnol.* 23:344, 2005). Phage display libraries of human antibodies are also available. Additionally, traditional strategies for hybridoma development using a target of interest as an immunogen in convenient systems (e.g., mice, HuMAb mouse®, TC mouse™, KM-mouse®, llamas, chicken, rats, hamsters, rabbits, etc.) can be used to develop targeting domains. In particular embodiments, antibodies specifically bind to selected epitopes expressed by targeted cells and do not cross react with nonspecific components or unrelated targets. Once identified, the amino acid sequence or polynucleotide sequence coding for the antibody can be isolated and/or determined.

An alternative source of targeting domains includes sequences that encode random peptide libraries or sequences that encode an engineered diversity of amino acids in loop regions of alternative non-antibody scaffolds, such as scTCR (see, e.g., Lake et al., *Int. Immunol.* 11:745, 1999; Maynard et al., *J. Immunol. Methods* 306:51, 2005; U.S. Pat. No. 8,361,794), mAb$^2$ or Fcab™ (see, e.g., PCT Patent Application Publication Nos. WO 2007/098934; WO 2006/072620), affibody, avimers, fynomers, cytotoxic T-lymphocyte associated protein-4 (Weidle et al., *Cancer Gen. Proteo.* 10:155, 2013), or the like (Nord et al., *Protein Eng.* 8:601, 1995; Nord et al., *Nat. Biotechnol.* 15:772, 1997; Nord et al., *Euro. J. Biochem.* 268:4269, 2001; Binz et al., *Nat. Biotechnol.* 23:1257, 2005; Boersma and Plückthun, *Curr. Opin. Biotechnol.* 22:849, 2011).

An "antibody fragment" denotes a portion of a complete or full length antibody that retains the ability to bind to an epitope. Examples of antibody fragments include Fv, scFv, Fab, Fab', Fab'-SH, F(ab')$_2$; diabodies; and linear antibodies.

A single chain variable fragment (scFv) is a fusion protein of the variable regions of the heavy and light chains of immunoglobulins connected with a short linker peptide. Fv fragments include the VL and VH domains of a single arm of an antibody. Although the two domains of the Fv fragment, VL and VH, are coded by separate genes, they can be joined, using, for example, recombinant methods, by a synthetic linker that enables them to be made as a single protein chain in which the VL and VH regions pair to form monovalent molecules (single chain Fv (scFv)). For additional information regarding Fv and scFv, see e.g., Bird, et al., Science 242 (1988) 423-426; Huston, et al., Proc. Natl. Acad. Sci. USA 85 (1988) 5879-5883; Plueckthun, in The Pharmacology of Monoclonal Antibodies, vol. 113, Rosenburg and Moore (eds.), Springer-Verlag, New York), (1994) 269-315; WO1993/16185; U.S. Pat. Nos. 5,571,894; and 5,587,458.

A Fab fragment is a monovalent antibody fragment including VL, VH, CL and CH1 domains. A F(ab')$_2$ fragment is a bivalent fragment including two Fab fragments linked by a disulfide bridge at the hinge region. For discussion of Fab and F(ab')$_2$ fragments having increased in vivo half-life, see U.S. Pat. No. 5,869,046. Diabodies include two epitope-binding sites that may be bivalent. See, for example, EP 0404097; WO1993/01161; and Holliger, et al., Proc. Natl. Acad. Sci. USA 90 (1993) 6444-6448. Dual affinity retargeting antibodies (DART™; based on the diabody format but featuring a C-terminal disulfide bridge for additional stabilization (Moore et al., Blood 117, 4542-51 (2011))) can also be used. Antibody fragments can also include isolated CDRs. For a review of antibody fragments, see Hudson, et al., Nat. Med. 9 (2003) 129-134.

Antibody fragments can be made by various techniques, including proteolytic digestion of an intact antibody as well as production by recombinant host-cells (e.g. *E. coli* or phage), as described herein. Antibody fragments can be screened for their binding properties in the same manner as intact antibodies.

In particular embodiments, targeting domains can also include a natural receptor or ligand for an epitope. For example, if a target for binding includes PD-L1, the binding domain can include PD-1 (including, e.g., a PD-1/antiCD3 fusion). One example of a receptor fusion for binding is Enbrel® (Immunex). Natural receptors or ligands can also be modified to enhance binding. For example, betalacept is a modified version of abatacept.

Binding can also be enhanced through increasing avidity. Any screening method known in the art can be used to identify increased avidity to an antigen epitope.

As used herein, an epitope denotes the binding site on a protein target bound by a corresponding targeting domain. The targeting domain either binds to a linear epitope, (e.g., an epitope including a stretch of 5 to 12 consecutive amino acids), or the targeting domains binds to a three-dimensional structure formed by the spatial arrangement of several short stretches of the protein target. Three-dimensional epitopes recognized by a targeting domain, e.g. by the epitope recognition site or paratope of an antibody or antibody fragment, can be thought of as three-dimensional surface features of an epitope molecule. These features fit precisely (in)to the corresponding binding site of the targeting domains and thereby binding between the targeting domains and its target protein is facilitated.

"Bind" means that the targeting domain associates with its target epitope with a dissociation constant (1(D) of $10^{-8}$ M or less, in one embodiment of from $10^{-5}$ M to $10^{-13}$ M, in one embodiment of from $10^{-5}$ M to $10^{-10}$ M, in one embodiment of from $10^{-5}$ M to $10^{-7}$ M, in one embodiment of from $10^{-8}$ M to $10^{-13}$ M, or in one embodiment of from $10^{-9}$ M to $10^{-13}$ M. The term can be further used to indicate that the targeting domains does not bind to other biomolecules present, (e.g., it binds to other biomolecules with a dissociation constant (KD) of $10^{-4}$ M or more, in one embodiment of from $10^{-4}$ M to 1 M.

Methods of Synthesizing Chelators. In some embodiments, compositions of chelators described herein can be synthesized using techniques that are simpler and less harsh than conventional techniques. In particular, the use of dichlorophenylmethane improves the synthesis of natural siderophores and analogs, such as 3,4,3-LI(CAM), by minimizing the use of harsh, toxic substances in the synthesis of siderophores and siderophore-like ligands. Additionally, the reaction conditions are improved when dichlorophenylmethane is used in the synthesis of siderophores and siderophore-like ligands.

Methods of Making Radionuclides. Radioisotopes can be obtained in solution in water or other polar fluid in elemental form (i.e., uncharged) or ionic form. As appreciated by the skilled artisan, when in ionic form, radioisotopes may occur in various different valence states, as anions, or as cations, depending upon the particular radioisotope being considered.

Methods of Charging Chelators with Radionuclides. In particular embodiments, chelators can be charged with radionuclides by contacting the chelators with metallic radioisotopes and allowing complexes between the two molecules to form.

A prodrug includes an active ingredient which is converted into a therapeutically active or more therapeutically active compound after administration, such as by cleavage of a protein.

A pharmaceutically acceptable salt includes any salt that retains the activity of the active ingredient and is acceptable for pharmaceutical use. A pharmaceutically acceptable salt also refers to any salt which may form in vivo as a result of administration of an acid, another salt, or a prodrug which is converted into an acid or salt. Suitable pharmaceutically acceptable acid addition salts can be prepared from an inorganic acid or an organic acid. Examples of inorganic acids include hydrochloric, hydrobromic, hydroiodic, nitric, carbonic, sulfuric and phosphoric acid. Appropriate organic acids can be selected from aliphatic, cycloaliphatic, aromatic, arylaliphatic, heterocyclic, carboxylic and sulfonic classes of organic acids. Suitable pharmaceutically acceptable base addition salts include metallic salts made from aluminum, calcium, lithium, magnesium, potassium, sodium and zinc or organic salts made from N,N'-dibenzylethylenediamine, chloroprocaine, choline, diethanolamine, ethylenediamine, N-methylglucamine, lysine, arginine and procaine.

The term analog (also structural analog or chemical analog) is used to refer to a compound that is structurally similar to another compound but differs with respect to a certain component, such as an atom, a functional group, or a substructure. The term derivative refers to a compound that is obtained from a similar compound or a precursor compound by a chemical reaction. As used herein, analogs and derivatives retain the therapeutic effectiveness of the parent compound (i.e., there is no statistically significant difference in therapeutic activity according to an imaging assay or assessment of clinical improvement) or have improved therapeutic effectiveness as defined elsewhere herein.

Active ingredients are formulated into compositions for administration to subjects. Compositions include at least one active ingredient and at least one pharmaceutically acceptable carrier. In particular embodiments, compositions include active ingredients of at least 0.1% w/v or w/w of the composition; at least 1% w/v or w/w of composition; at least 10% w/v or w/w of composition; at least 20% w/v or w/w of composition; at least 30% w/v or w/w of composition; at least 40% w/v or w/w of composition; at least 50% w/v or w/w of composition; at least 60% w/v or w/w of composition; at least 70% w/v or w/w of composition; at least 80% w/v or w/w of composition; at least 90% w/v or w/w of composition; at least 95% w/v or w/w of composition; or at least 99% w/v or w/w of composition.

Exemplary generally used pharmaceutically acceptable carriers include any and all absorption delaying agents, antioxidants, binders, buffering agents, bulking agents or fillers, chelating agents, coatings, disintegration agents, dispersion media, gels, isotonic agents, lubricants, preservatives, salts, solvents or co-solvents, stabilizers, surfactants, and/or delivery vehicles.

Exemplary antioxidants include ascorbic acid, methionine, and vitamin E.

Exemplary buffering agents include citrate buffers, succinate buffers, tartrate buffers, fumarate buffers, gluconate buffers, oxalate buffers, lactate buffers, acetate buffers, phosphate buffers, histidine buffers, and/or trimethylamine salts.

An exemplary chelating agent for use as a pharmaceutically acceptable carrier is EDTA. Other chelating agents disclosed herein may also be used.

Exemplary isotonic agents include polyhydric sugar alcohols including trihydric or higher sugar alcohols, such as glycerin, erythritol, arabitol, xylitol, sorbitol, or mannitol.

Exemplary preservatives include phenol, benzyl alcohol, meta-cresol, methyl paraben, propyl paraben, octadecyldimethylbenzyl ammonium chloride, benzalkonium halides, hexamethonium chloride, alkyl parabens such as methyl or propyl paraben, catechol, resorcinol, cyclohexanol, and 3-pentanol.

Stabilizers refer to a broad category of excipients which can range in function from a bulking agent to an additive which solubilizes the active ingredient or helps to prevent denaturation or adherence to the container wall. Typical stabilizers can include polyhydric sugar alcohols; amino acids, such as R, K, G, Q, N, H, A, ornithine, L-leucine, 2-F, E, and T; organic sugars or sugar alcohols, such as lactose, trehalose, stachyose, mannitol, sorbitol, xylitol, ribitol, myoinisitol, galactitol, glycerol, and cyclitols, such as inositol; PEG; amino acid polymers; sulfur-containing reducing agents, such as urea, glutathione, thioctic acid, sodium thioglycolate, thioglycerol, alpha-monothioglycerol, and sodium thiosulfate; low molecular weight polypeptides (i.e., <10 residues); proteins such as human serum albumin, bovine serum albumin, gelatin or immunoglobulins; hydrophilic polymers such as polyvinylpyrrolidone; monosaccharides such as xylose, mannose, fructose and glucose; disaccharides such as lactose, maltose and sucrose; trisaccharides such as raffinose, and polysaccharides such as dextran. Stabilizers are typically present in the range of from 0.1 to 10,000 parts by weight based on active ingredient weight.

In particular embodiments, the compositions disclosed herein can be formulated for administration by injection (e.g., intravenous injection). Compositions can also be formulated for administration by, for example, inhalation, infusion, perfusion, lavage, or ingestion. The compositions disclosed herein can further be formulated for intradermal, intraarterial, intranodal, intralymphatic, intraperitoneal, intralesional, intraprostatic, intravaginal, intrarectal, topical, intrathecal, intravesicular, oral and/or subcutaneous administration and more particularly by intravenous, intradermal, intraarterial, intranodal, intralymphatic, intraperitoneal, intralesional, intraprostatic, intravaginal, intrarectal, intrathecal, intramuscular, intravesicular, and/or subcutaneous injection.

For injection, compositions can be formulated as aqueous solutions, such as in buffers including Hanks' solution, Ringer's solution, or physiological saline. The aqueous solutions can contain formulatory agents such as suspending, stabilizing, and/or dispersing agents. Alternatively, the formulation can be in lyophilized and/or powder form for constitution with a suitable vehicle, e.g., sterile pyrogen-free water, before use. Particular embodiments are formulated for intravenous or intramuscular administration.

For oral administration, the compositions can be formulated as tablets, pills, dragees, capsules, liquids, gels, syrups, slurries, suspensions and the like. Compositions can be formulated as an aerosol for inhalation. In one embodiment, the aerosol is provided as part of an anhydrous, liquid or dry powder inhaler. Compositions can also be formulated as depot preparations. Depot preparations can be formulated with suitable polymeric or hydrophobic materials (for example as an emulsion in an acceptable oil) or ion exchange resins, or as sparingly soluble derivatives, for example, as a sparingly soluble salts. Additionally, compositions can be formulated as sustained-release systems utilizing semipermeable matrices of solid polymers containing at least one active ingredient.

Any composition disclosed herein can advantageously include any other pharmaceutically acceptable carriers which include those that do not produce significantly adverse, allergic, or other untoward reactions that outweigh the benefit of administration. Exemplary pharmaceutically acceptable carriers and formulations are disclosed in Remington's Pharmaceutical Sciences, 18th Ed. Mack Printing Company, 1990. Moreover, formulations can be prepared to meet sterility, pyrogenicity, general safety, and purity standards as required by U.S. FDA Office of Biological Standards and/or other relevant foreign regulatory agencies.

Kits. Also disclosed herein are kits including one or more containers including one or more of the active ingredients, compositions, chelators, and/or radionuclides described herein. In various embodiments, the kits may include one or more containers containing one or more portions of active ingredients and/or compositions to be used in combination with other portions of the active ingredients and/or compositions described herein. Associated with such container(s) can be a notice in the form prescribed by a governmental agency regulating the manufacture, use, or sale of pharmaceuticals or biological products, which notice reflects approval by the agency of manufacture, use, or sale for human administration.

Optionally, the kits described herein further include instructions for using the kit in the methods disclosed herein. In various embodiments, the kit may include instructions regarding preparation of the active ingredients and/or compositions for administration; administration of the active ingredients and/or compositions; appropriate reference levels to interpret results associated with using the kit; proper disposal of the related waste; and the like. The instructions can be in the form of printed instructions provided within the kit or the instructions can be printed on a portion of the kit itself. Instructions may be in the form of a sheet, pamphlet, brochure, CD-Rom, or computer-readable device, or can provide directions to instructions at a remote location, such as a website. The instructions may be in English and/or in any national or regional language. In various embodiments, possible side effects and contraindications to further use of components of the kit based on a subject's symptoms can be included.

In various embodiments, the kits described herein include some or all of the necessary medical supplies needed to use the kit effectively, thereby eliminating the need to locate and gather such medical supplies. Such medical supplies can include syringes, ampules, tubing, facemasks, protective clothing, a needleless fluid transfer device, an injection cap, sponges, sterile adhesive strips, Chloraprep, gloves, and the like. Variations in contents of any of the kits described herein can be made. Particular kits provide materials to administer compositions through intravenous administration.

Methods of Use. Methods disclosed herein include treating subjects (humans, veterinary animals (dogs, cats, reptiles, birds, etc.) livestock (horses, cattle, goats, pigs, chickens, etc.) and research animals (monkeys, rats, mice, fish, etc.) with therapeutic compositions disclosed herein. Treating subjects includes delivering therapeutically effective amounts. Therapeutically effective amounts include those that provide effective amounts and therapeutic treatments.

An "effective amount" is the amount of a composition necessary to result in a desired physiological change in the subject. Effective amounts are often administered for research purposes. Effective amounts disclosed herein can cause a statistically-significant effect in an animal model assessing a use of nuclear medicine.

A "therapeutic treatment" can include a treatment administered to a subject in need of imaging. The subject can be in need of imaging to aid in diagnosis; to locate a position for a therapeutic intervention; to assess the functioning of a body part; and/or to assess the presence or absence of a condition. The effectiveness of a therapeutic imaging treatment can be confirmed based on the capture of an image sufficient for its intended purpose.

Exemplary types of imaging that utilize nuclear medicine include: positron emission tomography (PET), single photon emission computed tomography, radioisotope renography, and scintigraphy.

A "therapeutic treatment" can also include a treatment administered to a subject with a condition. The therapeutic treatment reduces, controls, or eliminates the condition or a symptom associated with the condition. Conditions treated with nuclear medicine include those associated with the proliferation of unwanted cells.

In particular embodiments, therapeutic treatments reduce cellular proliferation. Cellular proliferation refers to the process of cellular division, either through mitosis or meiosis, whereby increased cell numbers result. In particular embodiments, therapeutic treatments reduce cellular growth. Cellular growth refers both to an increase in cell mass or size, as well as cellular physiological processes necessary to support a cell's life.

Particular conditions that can be treated include various cancers, thyroid diseases (e.g., hyperthyroidism or thyrotoxicosis), blood disorders (e.g., Polycythemia vera, an excess of red blood cells produced in the bone marrow), and cellular proliferation in blood vessels following balloon angioplasty and/or stent placement (known as restenosis).

The effectiveness of a therapeutic treatment can be confirmed based on a beneficial change related to the condition following the treatment.

In the context of cancers, therapeutic treatments can decrease the number of cancer cells, decrease the number of metastases, decrease tumor volume, increase life expectancy, induce chemo- or radiosensitivity in cancer cells, inhibit angiogenesis near cancer cells, inhibit cancer cell proliferation, inhibit tumor growth, prevent or reduce metastases, prolong a subject's life, reduce cancer-associated pain, and/or reduce relapse or re-occurrence of cancer following treatment. In particular embodiments, therapeutic treatments reduce, delay, or prevent further metastasis from occurring.

For hyperthyroidism or thyrotoxicosis, therapeutic treatments can aid in the return of thyroid secreted hormones, such as T3 and T4, to more normal levels. These hormones can be measured from patient blood samples. In particular embodiments, a therapeutic treatment returns serum levels of T3 and/or T4 to within a normal range (80-180 ng/dl and 4.6-12 µg/dl, respectively).

For Polycythemia vera, therapeutic treatments can aid in the return of red blood cell counts to more normal levels. In particular embodiments, a therapeutic treatment returns the red blood cell count to within a normal range (4.7 to 6.1 million Cells/µl).

For restenosis, therapeutic treatments can include the placement of radionuclides in the region of a vessel where a stent was placed or balloon angioplasty was performed, in order to inhibit the narrowing of the vessel due to proliferation of blood vessel cells. Treatment for restenosis can be deemed effective if normal blood flow through the affected blood vessel is restored. One test that can be used to diagnose improper blood flow is a stress test, which involves physical exercise while blood pressure and heart rate are measured. A normal stress test result means that the patient was able to exercise for a normal length of time and at a normal intensity level for their age and gender. Another test that can be performed to diagnose improper blood flow is a CT or MRI angiogram, which involves placement of a dye into the bloodstream and imaging of blood vessels. If restenosis treatment is effective, the CT or MRI angiogram will reveal normal blood flow through the affected vessel.

As indicated previously, particular uses of the chelating platforms disclosed herein include in imaging and treatment in the same subject.

The actual dose amount administered to a particular subject can be determined by a physician, veterinarian, or researcher taking into account parameters such as physical and physiological factors including body weight; severity of condition; previous or concurrent therapeutic interventions; idiopathy of the subject; and route of administration.

In particular embodiments, the total dose of absorbed radiation may include 10-3 grays (Gy), 10-2 Gy, 10-1 Gy, 1 Gy, 5 Gy, 10 Gy, 25 Gy, 50 Gy, 75 Gy, 100 Gy, 200 Gy, 300 Gy, 400 Gy, 500 Gy, 600 Gy, 700 Gy, 800 Gy, 900 Gy, or 1000 Gy.

Doses of absorbed radiation can be achieved by delivering an appropriate amount of a composition. Exemplary amounts of compositions can include 0.05 mg/kg to 5.0 mg/kg administered to a subject per day in one or more doses. For certain indications, the total daily dose can be 0.05 mg/kg to 3.0 mg/kg administered intravenously to a subject one to three times a day, including administration of total daily doses of 0.05-3.0, 0.1-3.0, 0.5-3.0, 1.0-3.0, 1.5-3.0, 2.0-3.0, 2.5-3.0, and 0.5-3.0 mg/kg/day of composition using 60-minute QD, BID, or TID intravenous infusion dosing. Additional useful doses can often range from 0.1 to 5 µg/kg or from 0.5 to 1 µg/kg. In other examples, a dose can include 1 µg/kg, 20 µg/kg, 40 µg/kg, 60 µg/kg, 80 µg/kg, 100 µg/kg, 200 µg/kg, 350 µg/kg, 500 µg/kg, 700 µg/kg, 0.1 to 5 mg/kg, or from 0.5 to 1 mg/kg. In other examples, a dose can include 1 mg/kg, 10 mg/kg, 20 mg/kg, 40 mg/kg, 60 mg/kg, 80 mg/kg, 100 mg/kg, 200 mg/kg, 400 mg/kg, 500 mg/kg, 700 mg/kg, 750 mg/kg, 1000 mg/kg, or more.

Therapeutically effective amounts can be achieved by administering single or multiple doses during the course of an imaging or treatment regimen (e.g., daily, every other day, every 3 days, every 4 days, every 5 days, every 6 days, weekly, every 2 weeks, every 3 weeks, monthly, every 2 months, every 3 months, every 4 months, every 5 months, every 6 months, every 7 months, every 8 months, every 9 months, every 10 months, every 11 months, or yearly).

In some embodiments, the 1,2-HOPO chelating agent include, but are not limited to, molecules incorporating a plurality of HOPO-type structures, including:

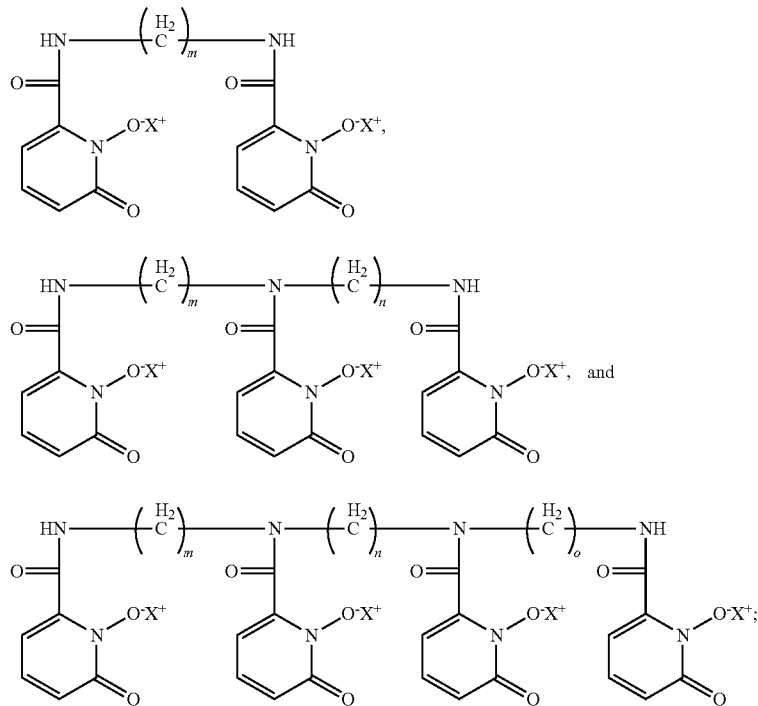

wherein l, m and n are integers between one and twenty. In some embodiments, there can be 5 HOPO groups instead of 4 (shown above).

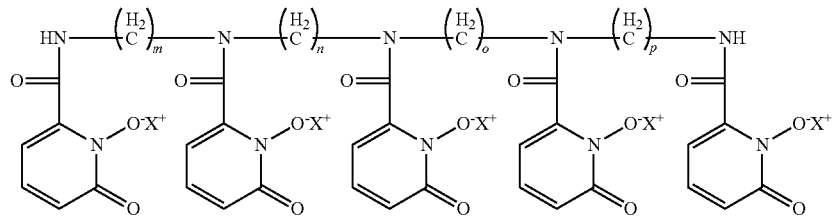

In some embodiments, the —(CH2)m- chains can contain ether bonds —(CH2-O—CH2)- or ramifications. —(CH2-CHR'—CH2)-, or hydroxyl groups —(CH2-CH(OH)'—CH2)- etc. In some embodiments, one can substitute one or both of the oxygens on the HOPO ring (shown in any of the embodiments herein) with a sulfur.

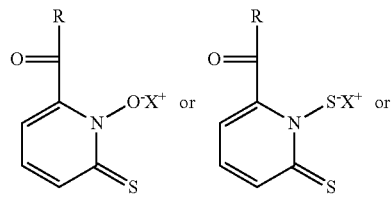

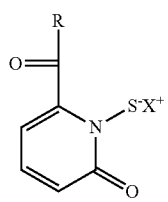

In a particular embodiment of the invention, m is three. In a particular embodiment of the invention, m is three and n is four. In a particular embodiment of the invention, l and n are three, and m is four. Various 1,2-HOPO and 3,2-HOPO chelating agents suitable for various uses, as well as methods of making them, are also taught in U.S. Pat. No. 4,698,431 ("Hydroxypyridonate Chelating Agents"), U.S. Pat. No. 5,634,901 ("3-Hydroxy-2(1H)-pyridonate Chelating Agents"), and U.S. Pat. No. 5,892,029 ("3-Hydroxy-2(1H)-pyridonate Chelating Agents"), all of which are hereby incorporated by reference. The compositions provided herein can find use where other HOPO ligands or chelators would be useful. These compositions can be useful in or attached to other polymeric compositions and structures for varieties of uses or applications involving a moiety to chelate, deliver, capture, bind or otherwise have affinity for heavy metals and their ions.

EXEMPLARY EMBODIMENTS

1. A composition having a structure including:

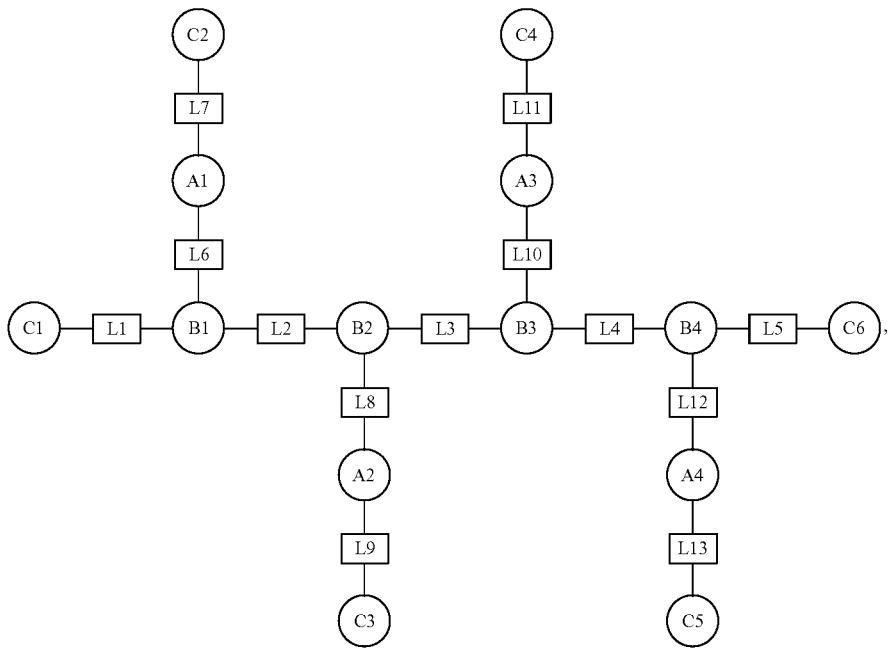

wherein:
(i) A1, A2, A3, and A4, individually, include a CAM group, a 1,2-HOPO group, or a HA group;
(ii) B1, B2, B3, and B4, individually, include an amide group or an amine group;
(iii) at least one of C1, C2, C3, C4, C5, or C6, individually, include $NH_2$, $C(=O)OH$, maleimide, dibromo-maleimide, isothiocyanate, alkyne, or azide;
(iv) at least another one of C1, C2, C3, C4, C5, or C6 is optional;
(v) at least one of L1, L2, L3, L4, L5, L6, L7, L8, L9, L10, L11, L12, or L13, individually, include H, an alkyl group having no greater than 10 carbon atoms, an alkylamino group having no greater than 10 carbon atoms and no greater than 2 nitrogen atoms; an alkylamido group having no greater than 10 carbon atoms and no greater than 2 nitrogen atoms; an alkyl ether group having no greater than 10 carbon atoms, a hydroxy ester group, or an alkyl ester group having no greater than 10 carbon atoms; and
(vi) at least one of L1, L5, L6, L7, L8, L9, L10, L11, L12, or L13 is optional.

2. A composition of embodiment 1, wherein at least another one of L2, L3, or L4, individually, include an amine group or an amide group.

3. A composition of embodiment 1 or embodiment 2, wherein L1, C1, L7, C2, L9, C3, L11, C4, and L13, C5 are absent, L5 includes an unsubstituted alkyl group having no greater than 5 carbon atoms, and C6 includes $NH_2$, $C(=O)OH$, maleimide, dibromo-maleimide, isothiocyanate, alkyne, or azide.

4. A composition of embodiment 3, wherein L2, L3, L4, L6, L8, L10, and L12, individually, include an unsubstituted alkyl group having no greater than 5 carbon atoms.

5. A composition of embodiment 4, wherein A1 includes a CAM group or a HOPO group; A2 includes a HA group, A3 includes a HA group, and A4 includes a CAM group, a HOPO group, or a HA group.

6. A composition of any one of embodiments 1-5, wherein at least one of L2, L3, or L4, individually, include an alkylamino or alkylamido group.

7. A composition of embodiment 1, wherein B1, B2, and B3, individually, include an amide group and B4 includes an amino group, L2 and L3 include an amino group, and L4 includes an alky group having no greater than 5 carbon atoms 8. A composition of embodiment 7, wherein:
C1, C2, C3, C4, C5, L1, A1, A2, A3, L1, L6, L7, L8, L9, L10, L11, L12, and L13 are absent,
A4 includes a CAM group, a HOPO group, or a HA group; and
L5 includes an alkyl group having no greater than 5 carbon atoms.

9. A composition of embodiment 1, wherein B1, B2, and B3, individually, include an amide group and B4 includes an amide group, L2 and L3, individually, include an amino group, and L4 includes an alky group having no greater than 5 carbon atoms.

10. A composition of embodiment 9, wherein C1, C2, C3, C4, C5, A1, A2, A3, L1, L6, L7, L8, L9, L10, L11, and L13 are absent, L12 includes an amino group, L5 includes an ether group having no greater than 10 carbon atoms, and A4 includes a CAM group, a HOPO group, or a HA group.

11. A composition of embodiment 1, wherein C1, C2, C5, C6, L1, L2, L3, L4, L5, L7, L13, B2, and B4 are absent, B1 and B3, individually, include an amide group, L6, L8, L10, and L12, individually, include an amino group, A1, A2, A3, and A4, individually, include a CAM group, a HOPO group, or a HA group, L9 and L11, individually, include an alkyl group having no greater than 5 carbon atoms.

12. A composition, including a structure:

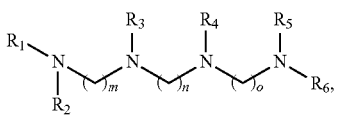

wherein:

at least one of $R_1$, $R_2$, $R_3$, $R_4$, and $R_5$, individually, include a CAM group, a HA group, or a 1,2-HOPO group;

at least another one of $R_1$, $R_2$, $R_3$, $R_4$, and $R_5$, individually, include H or an alkyl group having from 1 to 10 carbon atoms;

$R_6$ includes (i) H, (ii) an alkyl group having from 1 to 10 carbon atoms, or (iii) an alkyl group having from 1 to 10 carbon atoms and substituted by at least one of $NH_2$, $C(=O)OH$, maleimide, dibromo-maleimide, isothiocyanate, alkyne, or azide;

m can be from 1 to 6;

n can be from 1 to 6;

can be from 1 to 6.

13. A composition of embodiment 12, including a structure:

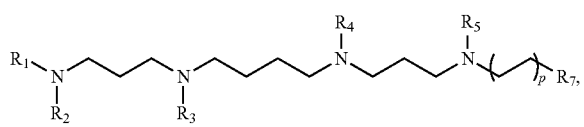

wherein:

at least one of $R_1$, $R_3$, $R_4$, or $R_5$ $R_1$, $R_2$, $R_3$, $R_4$, and $R_5$, individually, include a CAM group, a HA group, or a 1,2-HOPO group;

optionally, another one of $R_1$, $R_3$, $R_4$, or $R_5$ $R_1$, $R_2$, $R_3$, $R_4$, and $R_5$, individually, include H or an alkyl group having from 1 to 10 carbon atoms;

$R_2$ includes H or an alkyl group including from 1 to 5 carbon atoms;

$R_7$ includes $NH_2$, $C(=O)OH$, maleimide, dibromo-maleimide, isothiocyanate, alkyne, or azide; and p is from 0 to 4.

14. A composition of embodiment 13, wherein:

$R_1$ includes a CAM group or a 1,2-HOPO group;

$R_3$ and $R_4$, individually, include a HA group; and $R_5$ includes a CAM group, a 1,2-HOPO group, or a HA group.

15. A composition of embodiment 12, including a structure:

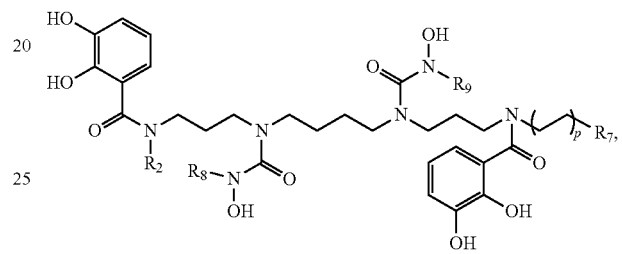

wherein:

$R_7$ includes $NH_2$, $C(=O)OH$, maleimide, dibromo-maleimide, isothiocyanate, alkyne, or azide;

$R_2$, $R_8$, and $R_9$, individually, include H, OH, or an alkyl group including from 1 to 5 carbon atoms; and p is from 0 to 4.

16. A composition of embodiment 12, including a structure:

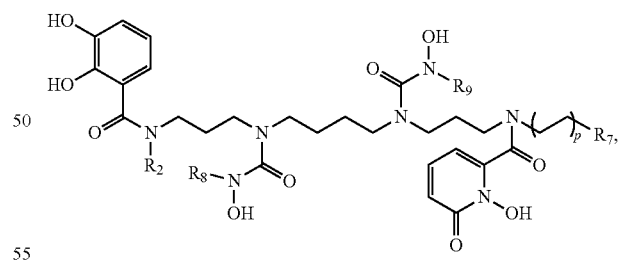

wherein:

$R_7$ includes $NH_2$, $C(=O)OH$, maleimide, dibromo-maleimide, isothiocyanate, alkyne, or azide;

$R_2$, $R_8$, and $R_9$, individually, include H, OH, or an alkyl group including from 1 to 5 carbon atoms; and p is from 0 to 4.

17. A composition of embodiment 12, including a structure:

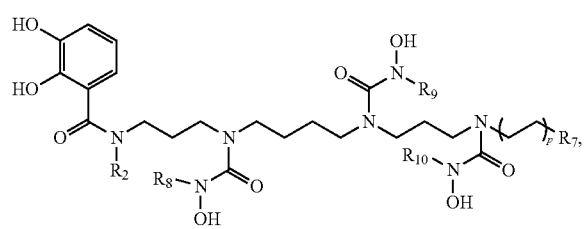

wherein:

$R_7$ includes $NH_2$, $C(=O)OH$, maleimide, dibromo-maleimide, isothiocyanate, alkyne, or azide;

$R_2$, $R_8$, $R_9$, and $R_{10}$, individually, include H, OH, or an alkyl group including from 1 to 5 carbon atoms; and p is from 0 to 4.

18. A composition of embodiment 12, including a structure:

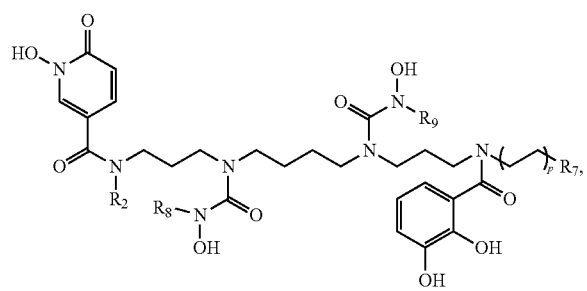

wherein:

$R_7$ includes $NH_2$, $C(=O)OH$, maleimide, dibromo-maleimide, isothiocyanate, alkyne, or azide;

$R_2$, $R_8$, and $R_9$, individually, include H, OH, or an alkyl group including from 1 to 5 carbon atoms; and p is from 0 to 4.

19. A composition of embodiment 12, including a structure:

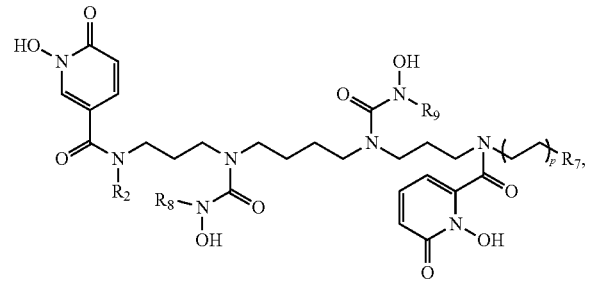

wherein:

$R_7$ includes $NH_2$, $C(=O)OH$, maleimide, dibromo-maleimide, isothiocyanate, alkyne, or azide;

$R_2$, $R_8$, and $R_9$, individually, include H, OH, or an alkyl group including from 1 to 5 carbon atoms; and p is from 0 to 4.

20. A composition of embodiment 12, including a structure:

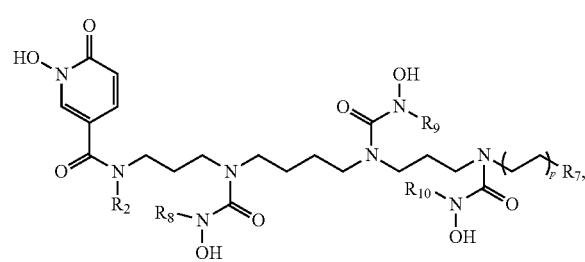

wherein:

$R_7$ includes $NH_2$, $C(=O)OH$, maleimide, dibromo-maleimide, isothiocyanate, alkyne, or azide;

$R_2$, $R_8$, $R_9$, and $R_{10}$, individually, include H, OH, or an alkyl group including from 1 to 5 carbon atoms; and p is from 0 to 4.

21. A composition of embodiment 12, including a structure:

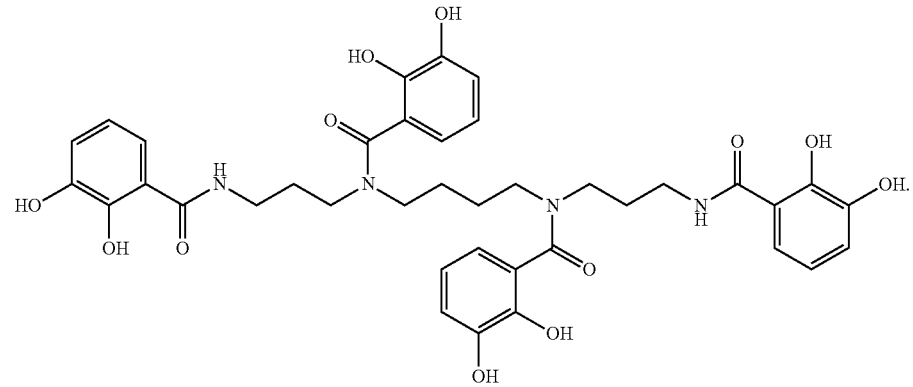 [SMILES: O=C(NCCCN(CCCCN(CCCNC(=O)c1cccc(O)c1O)C(=O)c1cccc(O)c1O)C(=O)c1cccc(O)c1O)c1cccc(O)c1O]

22. A composition of embodiment 12, including a structure:

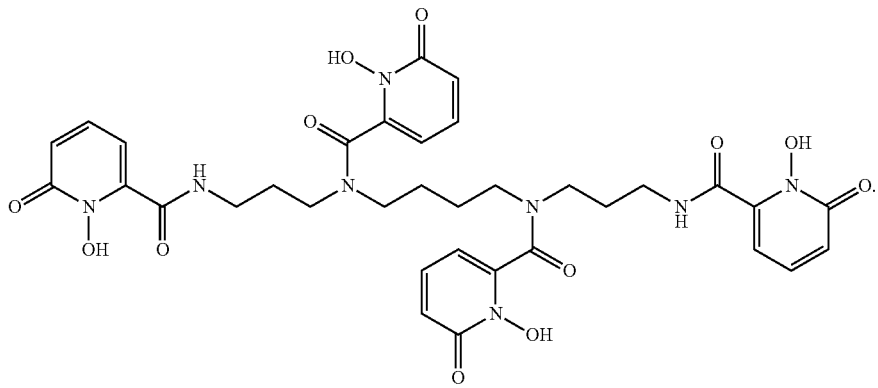 [SMILES: O=C(NCCCN(CCCCN(CCCNC(=O)c1cccc(=O)n1O)C(=O)c1cccc(=O)n1O)C(=O)c1cccc(=O)n1O)c1cccc(=O)n1O]

23. A composition, including a structure:

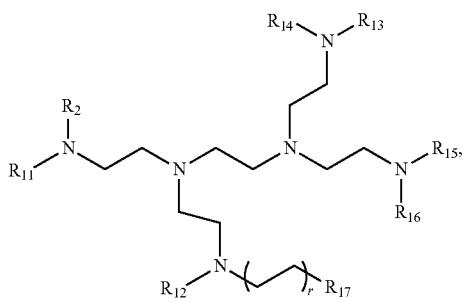

wherein:
at least one of $R_{11}$, $R_{12}$, $R_{13}$, or $R_{15}$, individually, include a CAM group, a HA group, or a 1,2-HOPO group;
optionally, at least another one of $R_{11}$, $R_{12}$, $R_{13}$, or $R_{15}$, individually, include H, OH, or an alkyl group having from 1 to 10 carbon atoms;
$R_{17}$ includes $NH_2$, C(=O)OH, maleimide, dibromo-maleimide, isothiocyanate, alkyne, or azide;
$R_2$, $R_{14}$, and $R_{16}$, individually, include H, OH, or an alkyl group having from 1 to 10 carbon atoms; and
r can be from 0 to 6.

24. A composition of embodiment 23, wherein:
$R^{11}$ includes a CAM group or a 1,2-HOPO group;
$R_{12}$ and $R_{15}$, individually, include a HA group; and
$R_{13}$ includes a CAM group, a 1,2-HOPO group, or a HA group.

25. A composition of embodiment 23, including a structure:

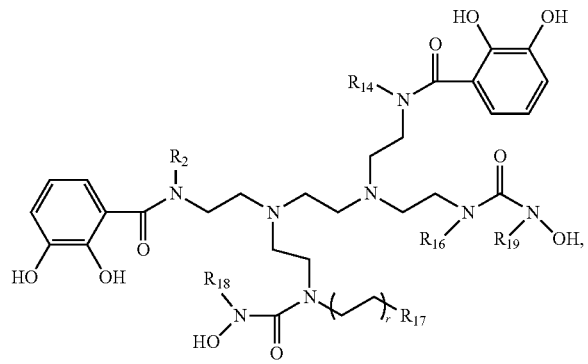

wherein:
$R_2$, $R_{14}$, $R_{16}$, $R_{18}$, and $R_{19}$, individually, include H, OH, or an alkyl group having from 1 to 10 carbon atoms;
$R_{17}$ includes $NH_2$, C(=O)OH, maleimide, dibromo-maleimide, isothiocyanate, alkyne, or azide; and
r can be from 0 to 4.

26. A composition of embodiment 23, including a structure:

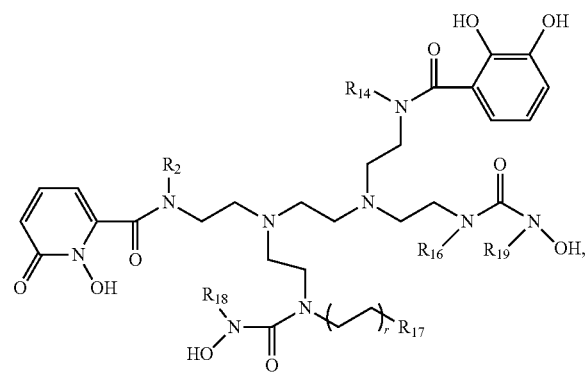

wherein
$R_2$, $R_{14}$, $R_{16}$, $R_{18}$, and $R_{19}$, individually, include H, OH, or an alkyl group having from 1 to 10 carbon atoms;
$R_{17}$ includes $NH_2$, C(=O)OH, maleimide, dibromo-maleimide, isothiocyanate, alkyne, or azide; and
r is from 0 to 4.

27. A composition of embodiment 23, including a structure:

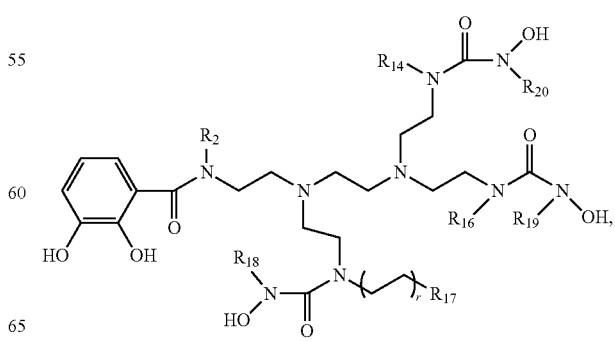

wherein:

$R_2$, $R_{14}$, $R_{16}$, $R_{18}$, $R_{19}$, and $R_{20}$, individually, include H, OH, or an alkyl group having from 1 to 10 carbon atoms;

$R_{17}$ includes $NH_2$, C(=O)OH, maleimide, dibromo-maleimide, isothiocyanate, alkyne, or azide; and r can be from 0 to 4.

28. A composition of embodiment 23, including a structure:

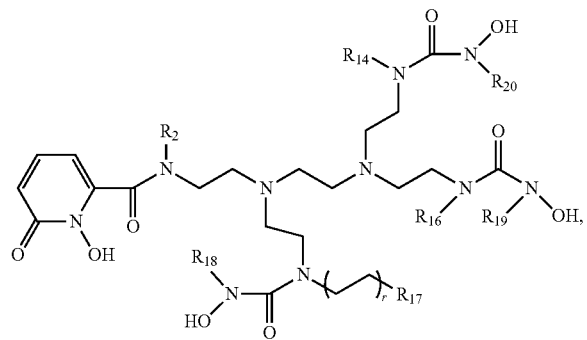

wherein:

$R_2$, $R_{14}$, $R_{16}$, $R_{18}$, $R_{19}$, and $R_{20}$, individually, include H, OH, or an alkyl group having from 1 to 10 carbon atoms;

$R_{17}$ includes $NH_2$, C(=O)OH, maleimide, dibromo-maleimide, isothiocyanate, alkyne, or azide; and r can be from 0 to 4.

29. A composition of embodiment 23, including a structure:

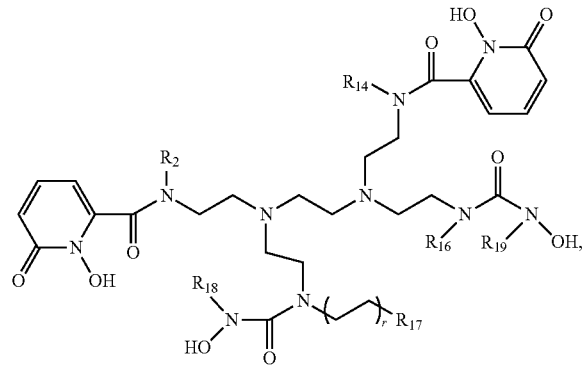

wherein:

$R_2$, $R_{14}$, $R_{16}$, $R_{18}$, and $R_{19}$, individually, include H, OH, or an alkyl group having from 1 to 10 carbon atoms;

$R_{17}$ includes $NH_2$, C(=O)OH, maleimide, dibromo-maleimide, isothiocyanate, alkyne, or azide; and r is from 0 to 4.

30. A composition of embodiment 23, including a structure:

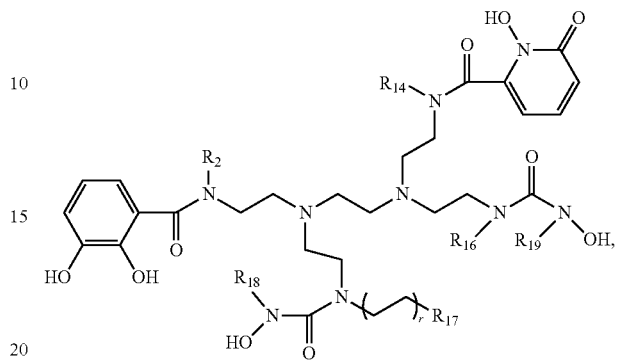

wherein:

$R_2$, $R_{14}$, $R_{16}$, $R_{18}$, and $R_{19}$, individually, include H, OH, or an alkyl group having from 1 to 10 carbon atoms;

$R_{17}$ includes $NH_2$, C(=O)OH, maleimide, dibromo-maleimide, isothiocyanate, alkyne, or azide;

r is from 0 to 4.

31. A composition, including a structure:

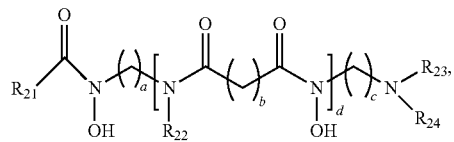

wherein:

$R_{21}$ and $R_{22}$, individually, include H, OH, or an alkyl group having from 1 to 10 carbon atoms;

$R_{23}$ includes H, OH, an alkyl group having from 1 to 10 carbon atoms, or $(CH_2)_e R_a$, where $R_a$ is $NH_2$, C(=O)OH, maleimide, dibromo-maleimide, isothiocyanate, alkyne, or azide;

$R_{24}$ includes a substituent having a CAM group, a 1,2-HOPO group, or a HA group;

a, b, and c, individually, are from 1 to 10;

d is from 1 to 4; and e is from 1 to 10.

32. A composition of embodiment 31, wherein $R_{24}$ includes a substituent having $NH_2$, C(=O)OH, maleimide, dibromo-maleimide, isothiocyanate, alkyne, or azide.

33. A composition of embodiment 31, including a structure:

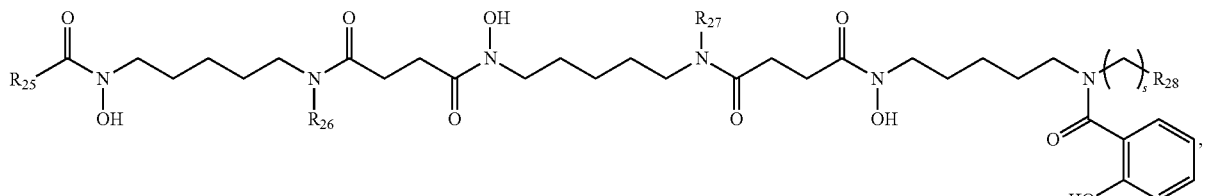

wherein:

$R_{25}$, $R_{26}$, and $R_{27}$, individually, include H, OH, or an alkyl group having from 1 to 10 carbon atoms;

$R_{28}$ includes H, an alkyl group having from 1 to 5 carbon atoms, $NH_2$, C(=O)OH, maleimide, dibromo-maleimide, isothiocyanate, alkyne, or azide; and s is from 0 to 4.

34. A composition of embodiment 31, including a structure:

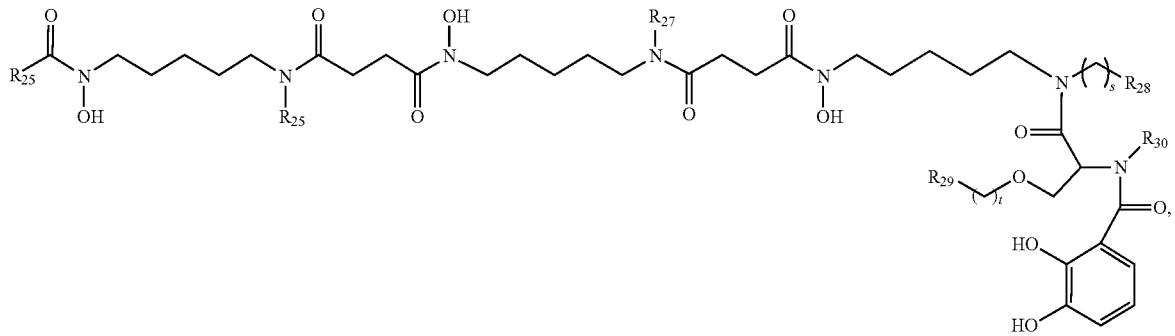

wherein:

$R_{25}$, $R_{26}$, $R_{27}$, and $R_{30}$, individually, include H, OH, or an alkyl group having from 1 to 10 carbon atoms;

$R_{28}$ and $R_{29}$, individually, include H, an alkyl group having from 1 to 5 carbon atoms, $NH_2$, C(=O)OH, maleimide, dibromo-maleimide, isothiocyanate, alkyne, or azide;

s is from 0 to 4; and t is from 0 to 4.

35. A composition of embodiment 31, including a structure:

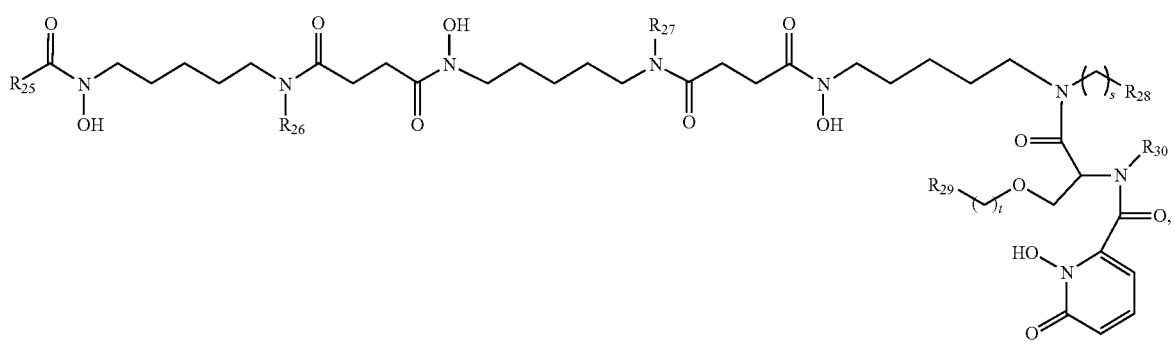

wherein:

$R_{25}$, $R_{26}$, $R_{27}$, and $R_{30}$, individually, include H, OH, or an alkyl group having from 1 to 10 carbon atoms;

$R_{28}$ and $R_{29}$, individually, include H, an alkyl group having from 1 to 5 carbon atoms, $NH_2$, C(=O)OH, maleimide, dibromo-maleimide, isothiocyanate, or azide;

s is from 0 to 4; and t is from 0 to 4.

36. A composition of embodiment 31, including a structure:

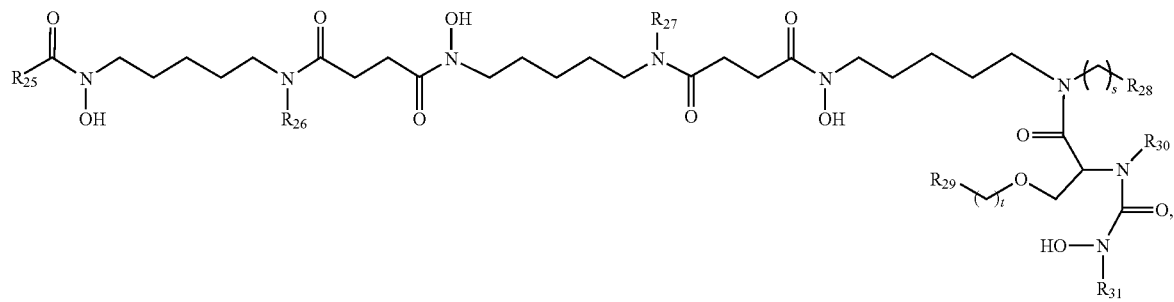

wherein:
$R_{25}$, $R_{26}$, $R_{27}$, $R_{30}$, and $R_{31}$, individually, include H, OH, or an alkyl group having from 1 to 10 carbon atoms;
$R_{28}$ and $R_{29}$, individually, include H, an alkyl group having from 1 to 5 carbon atoms, $NH_2$, $C(=O)OH$, maleimide, dibromo-maleimide, isothiocyanate, or azide;
s is from 0 to 4; and
t is from 0 to 4.

37. A composition of embodiment 31, including a structure:

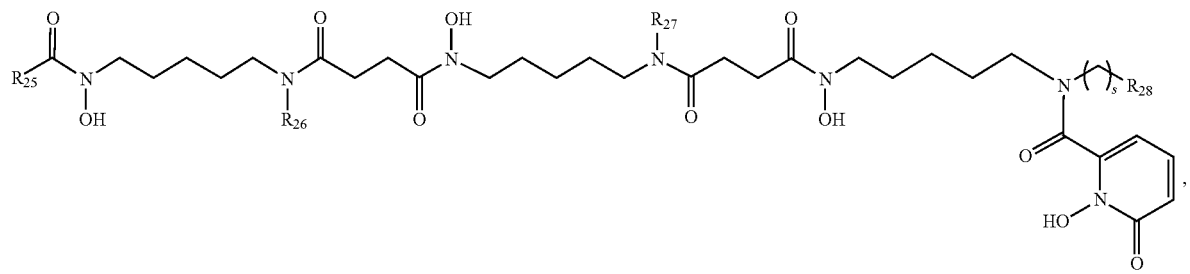

wherein
$R_{25}$, $R_{26}$, and $R_{27}$, individually, include H, OH, or an alkyl group having from 1 to 10 carbon atoms;
$R_{28}$ includes H, an alkyl group having from 1 to 5 carbon atoms, $NH_2$, $C(=O)OH$, maleimide, dibromo-maleimide, isothiocyanate, alkyne, or azide; and
s is from 0 to 4.

38. A composition of embodiment 31, including a structure:

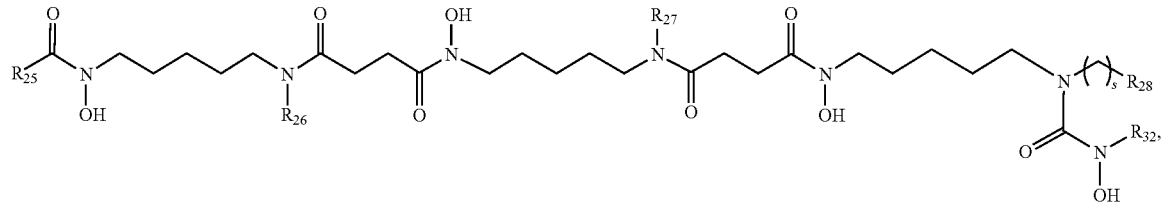

wherein:
$R_{25}$, $R_{26}$, $R_{27}$, and $R_{32}$, individually, include H, OH, or an alkyl group having from 1 to 10 carbon atoms;
$R_{28}$ includes H, an alkyl group having from 1 to 5 carbon atoms, $NH_2$, $C(=O)OH$, maleimide, dibromo-maleimide, isothiocyanate, alkyne, or azide; and
s is from 0 to 4.

39. A composition, including a structure:

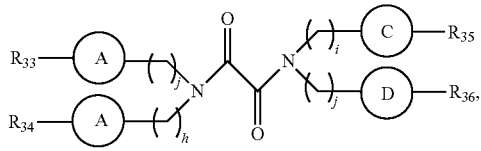

wherein:

A, B, C, and D, individually, include one or more amide groups, one or more amine groups, or an alkyl group having from 1 to 10 carbon atoms;

$R_{33}$, $R_{34}$, $R_{35}$, and $R_{36}$, individually, include a CAM group, a 1,2-HOPO group, or a HA group; and g, h, i, and j, individually, are from 1 to 10.

40. A composition of embodiment 39, including a structure:

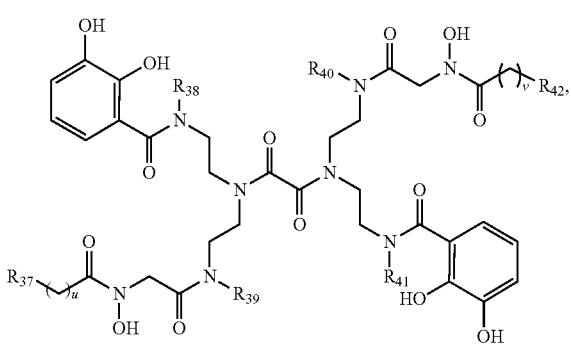

wherein:

$R_{37}$ and $R_{42}$, individually, include H, an alkyl group having from 1 to 5 carbon atoms, $NH_2$, $C(=O)OH$, maleimide, dibromo-maleimide, isothiocyanate, alkyne, or azide;

$R_{38}$, $R_{39}$, $R_{40}$, and $R_{41}$, individually, include H, OH, or an alkyl group having from 1 to 5 carbon atoms; and u and v, individually, are from 0 to 5.

41. A composition of embodiment 39, including a structure:

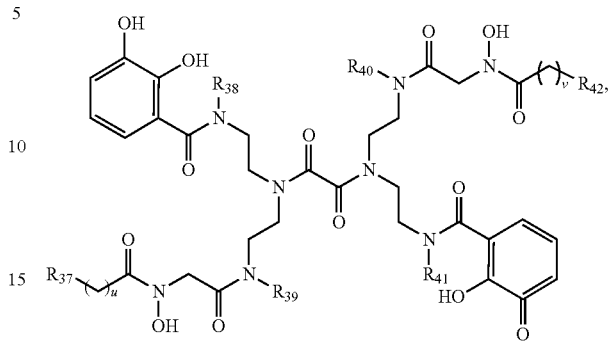

wherein:

$R_{37}$ and $R_{42}$, individually, include H, an alkyl group having from 1 to 5 carbon atoms, $NH_2$, $C(=O)OH$, maleimide, dibromo-maleimide, isothiocyanate, alkyne, or azide;

$R_{38}$, $R_{39}$, $R_{40}$, and $R_{41}$, individually, include H, OH, or an alkyl group having from 1 to 5 carbon atoms; and u and v, individually, are from 0 to 5.

42. A composition of embodiment 39, including a structure:

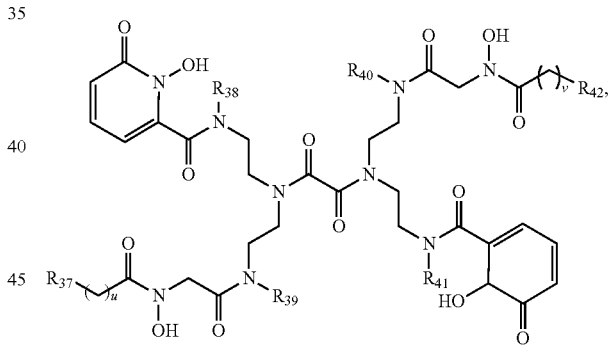

wherein:

$R_{37}$ and $R_{42}$, individually, include H, an alkyl group having from 1 to 5 carbon atoms, $NH_2$, $C(=O)OH$, maleimide, dibromo-maleimide, isothiocyanate, alkyne, or azide;

$R_{38}$, $R_{39}$, $R_{40}$, and $R_{41}$, individually, include H, OH, or an alkyl group having from 1 to 5 carbon atoms; and u and v, individually, are from 0 to 5.

43. A method of synthesizing a siderophore using dichlorodiphenylmethane.

44. A method of embodiment 43, wherein a siderophore or siderophore-like ligand is synthesized according to the following pathway:

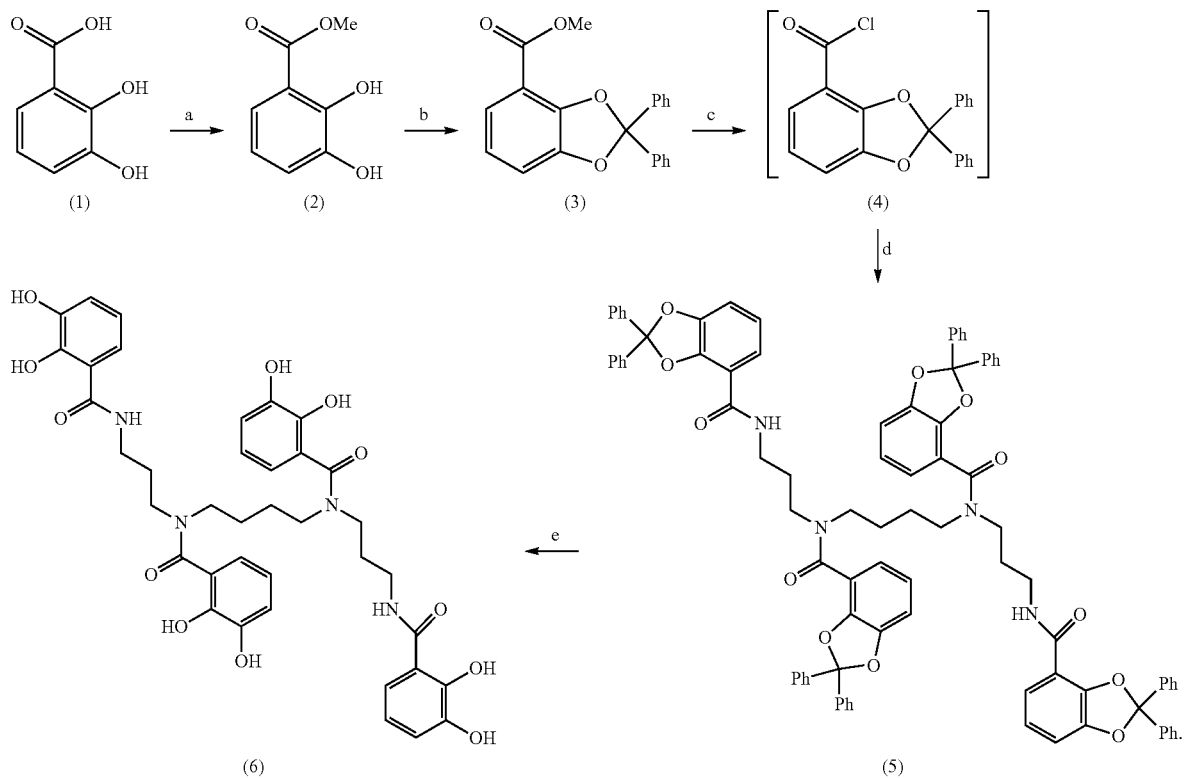

45. A composition of any one of embodiments 1-42, wherein the metal is a radionuclide.
46. A composition of embodiment 53, wherein the radionuclide includes $^{225}$Ac, $^{226}$Ac, $^{228}$Ac, $^{105}$Ag, $^{106}$mAg, $^{110}$mAg, $^{111}$Ag, $^{112}$Ag, $^{113}$Ag, $^{239}$Am, $^{240}$Am, $^{242}$Am, $^{244}$Am, $^{37}$Ar, $^{71}$As, $^{72}$As, $^{73}$As, $^{74}$As, $^{76}$As, $^{77}$As, $^{209}$At, $^{210}$At, $^{191}$Au, $^{192}$Au, $^{193}$Au, $^{194}$Au, $^{195}$Au, $^{196}$Au, $^{196}$m$^2$Au, $^{198}$Au, $^{198}$mAu, $^{199}$Au, $^{200}$mAu, $^{128}$Ba, $^{131}$Ba, $^{133}$mBa, $^{135}$mBa, $^{140}$Ba, $^{7}$Be, $^{203}$Bi, $^{204}$Bi, $^{205}$Bi, $^{206}$Bi, $^{210}$Bi, $^{212}$Bi, $^{243}$Bk, $^{244}$Bk, $^{245}$Bk, $^{246}$Bk, $^{248}$mBk, $^{250}$Bk, $^{76}$Br, $^{77}$Br, $^{80}$mBr, $^{82}$Br, $^{11}$C, $^{14}$C, $^{45}$Ca, $^{47}$Ca, $^{107}$Cd, $^{115}$Cd, $^{115}$mCd, $^{117}$mCd, $^{132}$Ce, $^{133}$mCe, $^{134}$Ce, $^{135}$Ce, $^{137}$Ce, $^{137}$mCe, $^{139}$Ce, $^{141}$Ce, $^{143}$Ce, $^{144}$Ce, $^{246}$Cf, $^{247}$Cf, $^{253}$Cf, $^{254}$Cf, $^{240}$Cm, $^{241}$Cm, $^{242}$Cm, $^{252}$Cm, $^{55}$Co, $^{56}$Co, $^{57}$Co, $^{58}$Co, $^{58}$mCo, $^{60}$Co, $^{48}$Cr, $^{51}$Cr, $^{127}$Cs, $^{129}$Cs, $^{131}$Cs, $^{132}$Cs, $^{136}$Cs, $^{137}$Cs, $^{61}$Cu, $^{62}$Cu, $^{64}$Cu, $^{67}$Cu, $^{153}$Dy, $^{155}$Dy, $^{157}$Dy, $^{159}$Dy, $^{165}$Dy, $^{166}$Dy, $^{160}$Er, $^{161}$Er, $^{165}$Er, $^{169}$Er, $^{171}$Er, $^{172}$Er, $^{250}$Es, $^{251}$Es, $^{253}$Es, $^{254}$Es, $^{254}$mEs, $^{255}$Es, $^{256}$mEs, $^{145}$Eu, $^{146}$Eu, $^{147}$Eu, $^{148}$Eu, $^{149}$Eu, $^{150}$mEu, $^{152}$mEu, $^{156}$Eu, $^{157}$Eu, $^{52}$Fe, $^{59}$Fe, $^{251}$Fm, $^{252}$Fm, $^{253}$Fm, $^{254}$Fm, $^{255}$Fm, $^{257}$Fm, $^{66}$Ga, $^{67}$Ga, $^{68}$Ga, $^{72}$Ga, $^{73}$Ga, $^{146}$Gd, $^{147}$Gd, $^{149}$Gd, $^{151}$Gd, $^{153}$Gd, $^{159}$Gd, $^{68}$Ge, $^{69}$Ge, $^{71}$Ge, $^{77}$Ge, $^{170}$Hf, $^{171}$Hf, $^{173}$Hf, $^{175}$Hf, $^{179}$m$^2$Hf, $^{180}$mHf, $^{181}$Hf, $^{184}$Hf, $^{192}$Hg, $^{193}$Hg, $^{193}$mHg, $^{195}$Hg, $^{195}$mHg, $^{197}$Hg, $^{197}$mHg, $^{203}$Hg, $^{160}$mHo, $^{166}$Ho, $^{167}$Ho, $^{123}$I, $^{124}$I, $^{126}$I, $^{130}$I, $^{132}$I, $^{133}$I, $^{135}$I, $^{109}$In, $^{110}$In, $^{111}$In, $^{114}$mIn, $^{115}$mIn, $^{184}$Ir, $^{185}$Ir, $^{186}$Ir, $^{187}$Ir, $^{188}$Ir, $^{189}$Ir, $^{190}$Ir, $^{190}$m$^2$Ir, $^{192}$Ir, $^{193}$mIr, $^{194}$Ir, $^{194}$m$^2$Ir, $^{195}$mIr, $^{42}$K, $^{43}$K, $^{76}$Kr, $^{79}$Kr, $^{81}$mKr, $^{85}$mKr, $^{132}$La, $^{133}$La, $^{135}$La, $^{140}$La, $^{141}$La, $^{262}$Lr, $^{169}$Lu, $^{170}$Lu, $^{171}$Lu, $^{172}$Lu, $^{174}$Lu, $^{176}$mLu, $^{177}$Lu, $^{177}$mLu, $^{179}$Lu, $^{257}$Md, $^{258}$Md, $^{260}$Md, $_{28}$Mg, $^{52}$Mn, $^{90}$Mo, $_{93}$mMo, $^{99}$Mo, $^{13}$N, $^{24}$Na, $^{90}$Nb, $^{91}$mNb, $^{92}$mNb, $^{95}$Nb, $^{95}$mNb, $^{96}$Nb, $^{138}$Nd, $^{139}$mNd, $^{140}$Nd, $^{147}$Nd, $^{56}$Ni, $^{57}$Ni, $^{66}$Ni, $^{234}$Np, $^{236}$mNp, $^{238}$Np, $^{239}$Np, $^{15}$O, $^{182}$Os, $^{183}$Os, $^{183}$mOs, $^{185}$Os, $^{189}$mOs, $^{191}$Os, $^{191}$mOs, $^{193}$Os, $^{32}$P, $^{33}$P, $^{228}$Pa, $^{229}$Pa, $^{230}$Pa, $^{232}$Pa, $^{233}$Pa, $^{234}$Pa, $^{200}$Pb, $^{201}$Pb, $^{202}$mPb, $^{203}$Pb, $^{209}$Pb, $^{212}$Pb, $^{100}$Pd, $^{101}$Pd, $^{103}$Pd, $^{109}$Pd, $^{111}$mPd, $^{112}$Pd, $^{143}$Pm, $^{146}$Pm, $^{148}$mPm, $^{149}$Pm, $^{151}$Pm, $^{204}$Po, $^{206}$Po, $^{207}$Po, $^{210}$Po, $^{139}$Pr, $^{142}$Pr, $^{143}$Pr, $^{145}$Pr, $^{188}$Pt, $^{189}$Pt, $^{191}$Pt, $^{193}$mPt, $^{195}$mPt, $^{197}$Pt, $^{200}$Pt, $^{202}$Pt, $^{234}$Pu, $^{237}$Pu, $^{243}$Pu, $^{245}$Pu, $^{246}$Pu, $^{247}$Pu, $^{223}$Ra, $^{224}$Ra, $^{225}$Ra, $^{81}$Rb, $^{82}$Rb, $^{82}$mRb, $^{83}$Rb, $^{84}$Rb, $^{86}$Rb, $^{181}$Re, $^{182}$Re, $^{182}$mRe, $^{183}$Re, $^{184}$Re, $^{184}$mRe, $^{186}$Re, $^{188}$Re, $^{189}$Re, $^{190}$mRe, $^{99}$Rh, $^{99}$mRh, $^{100}$Rh, $^{101}$mRh, $^{102}$Rh, $^{103}$mRh, $^{105}$Rh, $^{211}$Rn, $^{222}$Rn, $^{97}$Ru, $^{103}$Ru, $^{105}$Ru, $^{35}$S, $^{118}$mSb, $^{119}$Sb, $^{120}$Sb, $^{120}$mSb, $^{122}$Sb, $^{124}$Sb, $^{126}$Sb, $^{127}$Sb, $^{128}$Sb, $^{129}$Sb, $^{43}$Sc, $^{44}$Sc, $^{44}$mSc, $^{46}$Sc, $^{47}$Sc, $^{48}$Sc, $^{72}$Se, $^{73}$Se, $^{75}$Se, $^{153}$Sm, $^{156}$Sm, $^{110}$Sn, $^{113}$Sn, $^{117}$mSn, $^{119}$mSn, $^{121}$Sn, $^{123}$Sn, $^{125}$Sn, $^{82}$Sr, $^{83}$Sr, $^{85}$Sr, $^{89}$Sr, $^{91}$Sr, $^{173}$Ta, $^{175}$Ta, $^{176}$Ta, $^{177}$Ta, $^{180}$Ta, $^{182}$Ta, $^{183}$Ta, $^{184}$Ta, $^{149}$Tb, $^{150}$Tb, $^{151}$Tb, $^{152}$Tb, $^{153}$Tb, $^{154}$Tb, $^{154}$mTb, $^{154}$m$^2$Tb, $^{155}$Tb, $^{156}$Tb, $^{156}$mTb, $^{156}$m$^2$Tb, $^{160}$Tb, $^{161}$Tb, $^{94}$Tc, $^{95}$Tc, $^{95}$mTc, $^{96}$Tc, $^{97}$mTc, $^{99}$mTc, $^{118}$Te, $^{119}$Te, $^{119}$mTe, $^{121}$Te, $^{121}$mTe, $^{123}$mTe, $^{125}$mTe, $^{127}$Te, $^{127}$mTe, $^{129}$mTe, $^{131}$mTe, $^{132}$Te, $^{227}$Th, $^{231}$Th, $^{234}$Th, $^{45}$Ti, $^{198}$Tl, $^{199}$Tl, $^{200}$Tl, $^{201}$Tl, $^{202}$Tl, $^{204}$Tl, $^{165}$Tm, $^{166}$Tm, $^{167}$Tm, $^{168}$Tm, $^{170}$Tm, $^{172}$Tm, $^{173}$Tm, $^{230}$U, $^{231}$U, $^{237}$U, $^{240}$U, $^{48}$V, $^{178}$W, $^{181}$W, $^{185}$W, $^{187}$W, $^{188}$W, $^{122}$Xe, $^{125}$Xe, $^{127}$Xe, $^{129}$mXe, $^{131}$mXe, $^{133}$Xe, $^{133}$mXe, $^{135}$Xe, $^{85}$mY, $^{86}$Y, $^{87}$Y, $^{87}$mY, $^{88}$Y, $^{90}$Y, $^{90}$mY, $^{91}$Y, $^{92}$Y, $^{93}$Y, $^{166}$Yb, $^{169}$Yb, $^{175}$Yb, $^{62}$Zn, $^{65}$Zn, $^{69}$mZn, $^{71}$mZn, $^{72}$Zn, $^{86}$Zr, $^{88}$Zr, $^{89}$Zr, $^{95}$Zr, and/or $^{97}$Zr.

47. A composition of embodiment 46, wherein the radionuclide includes $^{90}$Y, $^{67}$Cu, $^{213}$Bi, $^{212}$Bi, $^{186}$Re, $^{67}$Cu, $^{90}$Y, $^{213}$Bi, $^{177}$Lu, $^{186}$Re, and/or $^{67}$Ga.

48. A composition of embodiment 46, wherein the radionuclide includes $^{89}$Zr, $^{225}$Ac, and/or $^{227}$Th.

49. A composition of any one of embodiments 1-42, wherein the metal includes a daughter isotope of a radionuclide.

50. A composition of embodiment 49, wherein the daughter isotope of the radionuclide includes $^{89}$Y, $^{18}$O, $^{221}$Fr, $^{213}$Bi, and/or $^{209}$Pb.

51. A method of treating a subject in need thereof comprising administering a therapeutically effective amount of a composition of any of embodiments 1-42 to the subject thereby treating the subject.

52. A method of embodiment 51 wherein the treating provides imaging to aid in diagnosis; to locate a position for a therapeutic intervention; to assess the functioning of a body part; and/or to assess the presence or absence of a condition.

53. A method of embodiment 64 wherein the imaging is through positron emission tomography (PET), single photon emission computed tomography, radioisotope renography, or scintigraphy.

54. A method of any of embodiments 63-65 wherein the treating reduces cellular proliferation.

55. A method of embodiment 66 wherein the cellular proliferation is due to cancer, a thyroid disease, a blood disorder, and/or restenosis.

56. A method of embodiment 67 wherein the cancer is adrenal cancer, bladder cancer, blood cancer, bone cancer, brain cancer, breast cancer, carcinoma, cervical cancer, colon cancer, colorectal cancer, corpus uterine cancer, ear, nose and throat (ENT) cancer, endometrial cancer, esophageal cancer, gastrointestinal cancer, head and neck cancer, Hodgkin's disease cancer, intestinal cancer, kidney cancer, larynx cancer, leukemia, liver cancer, lymph node cancer, lymphoma, lung cancer, melanoma, mesothelioma, myeloma, nasopharynx cancer, neuroblastoma, non-Hodgkin's lymphoma, oral cancer, ovarian cancer, pancreatic cancer, penile cancer, pharynx cancer, prostate cancer, rectal cancer, sarcomcancer, seminomcancer, skin cancer, stomach cancer, teratomcancer, testicular cancer, thyroid cancer, uterine cancer, vaginal cancer, vascular tumor cancer, and/or cancer from metastases thereof.

57. A method of embodiment 67 wherein the thyroid disease is hyperthyroidism or thyrotoxicosis.

58. A method of embodiment 67 wherein the blood disorder is Polycythemia vera.

59. A method of embodiment 67 wherein the restenosis follows balloon angioplasty and/or stent placement.

60. A method of any of embodiments 72-76 wherein the metal is a radionuclide.

61. A method of any of embodiments 72-76 wherein the metal is a radionuclide of embodiment 55.

62. A method of any of embodiments 72-76 wherein the metal is a radionuclide selected from $^{90}$Y, $^{67}$Cu, $^{213}$Bi, $^{212}$Bi, $^{186}$Re, $^{67}$Cu $^{90}$Y, $^{213}$Bi, $^{177}$Lu, $^{186}$Re, and $^{67}$Ga.

63. A method of any of embodiments 72-76 wherein the metal is a radionuclide selected from $^{89}$Zr, $^{225}$Ac, and $^{227}$Th.

Figure 1:
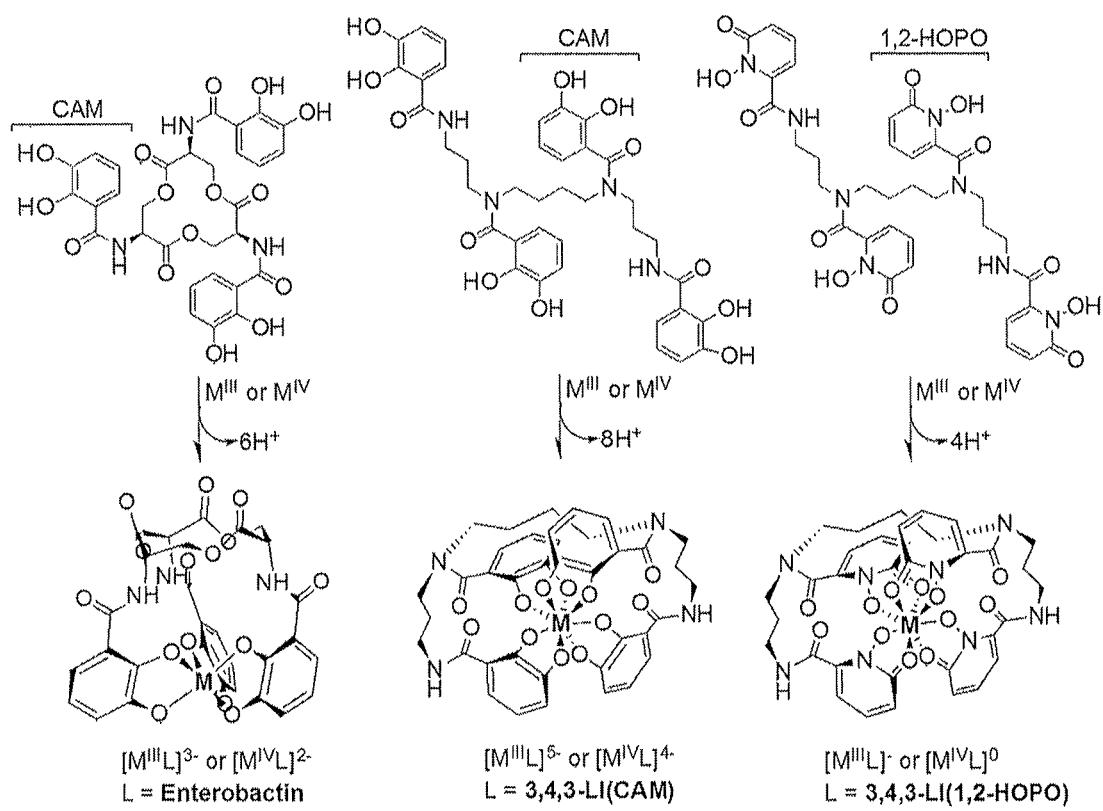
FIG. 1. Complexation of M(III) and M(IV) by the hexadentate siderophore enterobactin or the octadentate synthetic analogs 3,4,3-LI(CAM) or 3,4,3-LI(1,2-HOPO), when deprotonated.

The chelator 3,4,3-LI(1,2-HOPO) is an octadentate, tetraprotic compound including 4 bidentate 1,2-HOPO metal binding units attached onto a spermine ("3,4,3-LI") scaffold (FIG. 1), which was recently modified to enable monoclonal antibody attachment and form a bioconjugate chelator that displayed great properties for positron emission tomography (PET) when bound to $^{89}$Zr (Deri, et al., *Bioconjugate Chemistry*, 2015, 26 (12): 2579-2591; Deri, et al., *J. Med. Chem.*, 2014, 57 (11): 4849-4860). Methyl 2,3-dihydroxybenzoate (2). A stirred suspension of 1 (8.06 g, 52.3 mmol) in 100 mL of MeOH was treated with 2.00 mL of concentrated sulfuric acid. The suspension warmed and clarified 2 minutes after the addition. The reaction was equipped with a reflux condenser and was heated to 65° C. overnight. The next morning the conversion was verified by LC-MS and the volatiles were removed under reduced pressure. The crude was partitioned between H$_2$O (100 mL) and ethyl acetate (100 mL) and the aqueous layer was extracted with ethyl acetate (3×50 mL). The organic extracts were combined, dried over MgSO$_4$, and concentrated under reduced pressure. The crude was passed through a plug of silica using 10% ethyl acetate in hexanes as eluent. The eluent was concentrated under reduced pressure and dried under high vacuum for 2 hours to yield 2 (7.66 g, 45.6 mmol, 88%) as a white solid, the spectral properties of which matched previous reports (Weitl, et al., *J. Am. Chem. Soc.*, 1980, 102 (7): 2289-2293).

Methyl 2,2-diphenylbenzo[d][1,3]dioxole-4-carboxylate (3). Precursor 2 (5.00 g, 29.7 mmol) was mixed with dichlorodiphenylmethane (8.56 mL, 44.6 mmol) under an argon atmosphere; the resulting suspension was stirred and heated to 160° C. for 1 hour. The mixture was allowed to cool to room temperature and was diluted with 100 mL of ethyl acetate. The solution was washed with sat. NaHCO$_3$ (30 mL), brine (30 mL), dried over MgSO$_4$, and then concentrated under reduced pressure. The ensuing greyish oil was dissolved in 30 mL of hot MeOH (65° C.) and was slowly cooled to 5° C., which resulted in the formation of white crystals. The crystals were a mixture of 3 and benzophenone that could not be easily separated; the crude product was used as is for the subsequent step.

2,2-diphenylbenzo[d][1,3]dioxole-4-carboxylic acid (4). The mixture from the previous step was dissolved in 100 mL of THF and was treated with 100 mL of 0.9 M LiOH. The emulsion was rapidly stirred and heated to reflux for 5 hours. Conversion was verified by LC-MS and the reaction was cooled to room temperature. The solution was neutralized with 10% v/v aqueous acetic acid and was extracted with ethyl acetate (3×50 mL). The organic extracts were combined, dried over MgSO$_4$, and concentrated under reduced pressure. The crude was chromatographed using 25% ethyl acetate in hexanes as eluent. Volatiles were then removed under reduced pressure followed by high vacuum to yield 4 (7.6 g, 24 mmol, 81% over 2 steps) as a white solid, the spectral properties of which matched previous reports (Weitl, et al., *J. Am. Chem. Soc.*, 1980, 102 (7): 2289-2293).

Figure 2A:
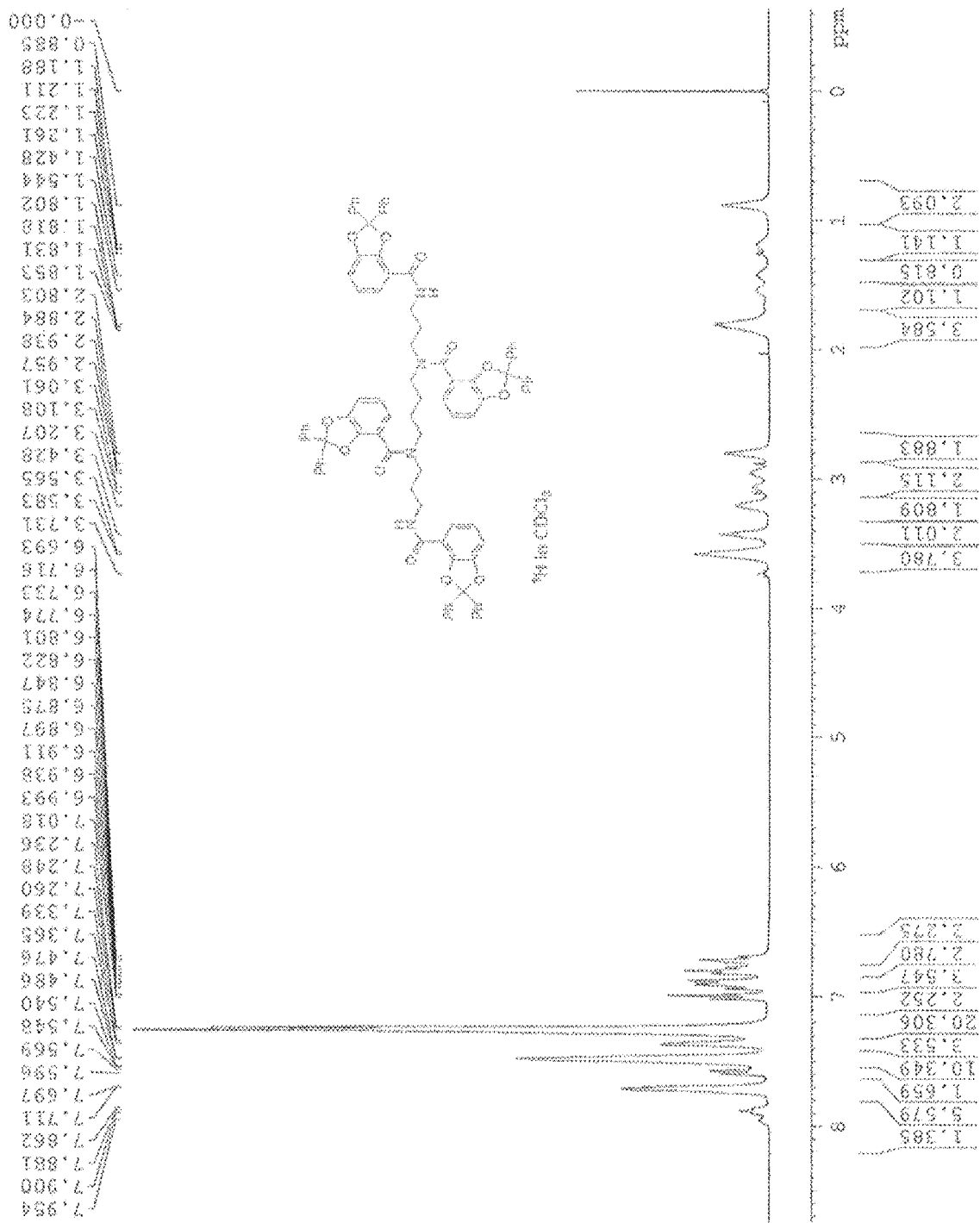
FIGS. 2A and 2B. 3,4,3-LI(2,2-diphenylbenzo[d][1,3]-2,3-catecholamide) (5)-NMR Spectra.
Figure 2B:
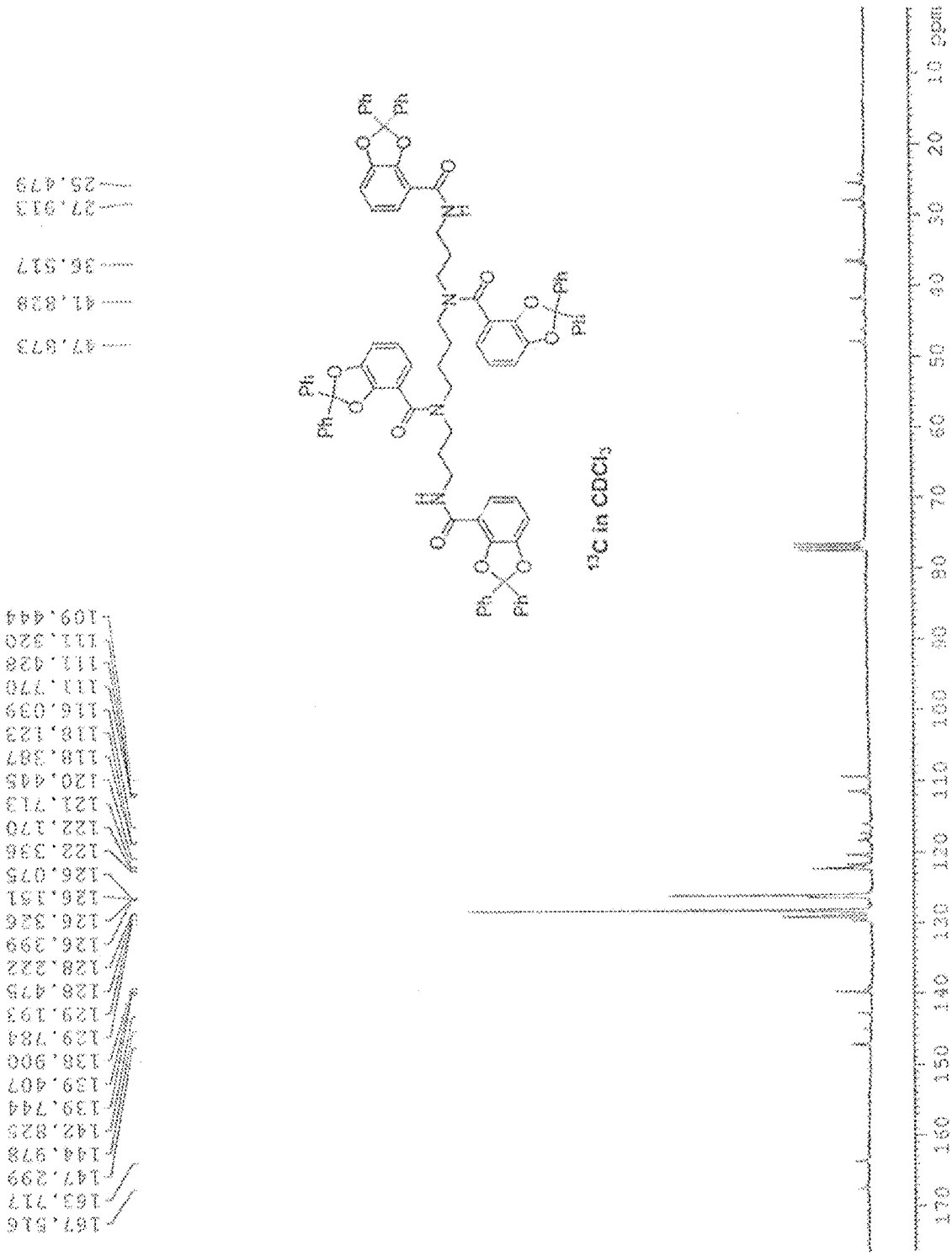
Figure 3A:
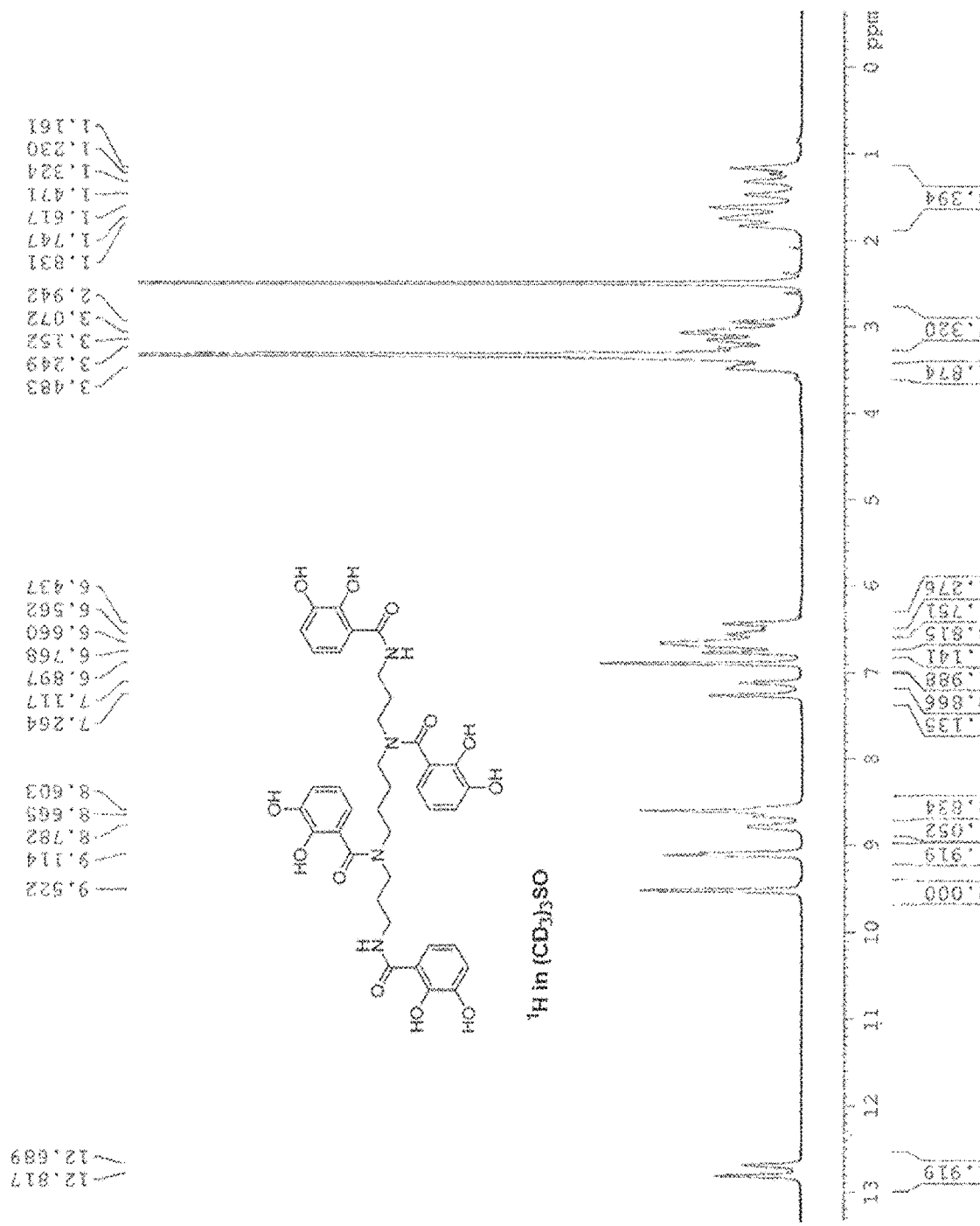
FIGS. 3A and 3B. 3,4,3-LI(CAM) (6)-NMR Spectra.
Figure 3B:
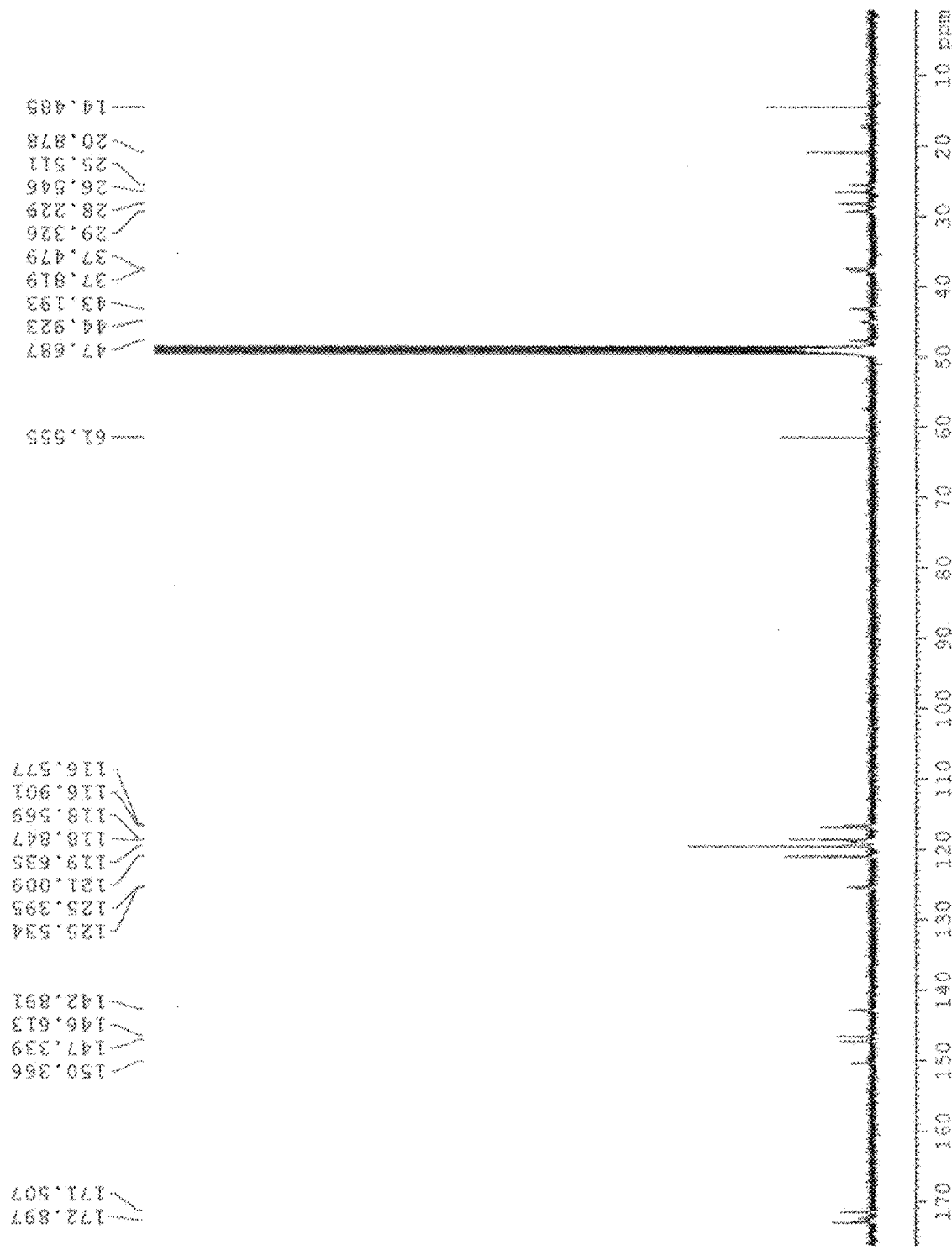
Figure 4:
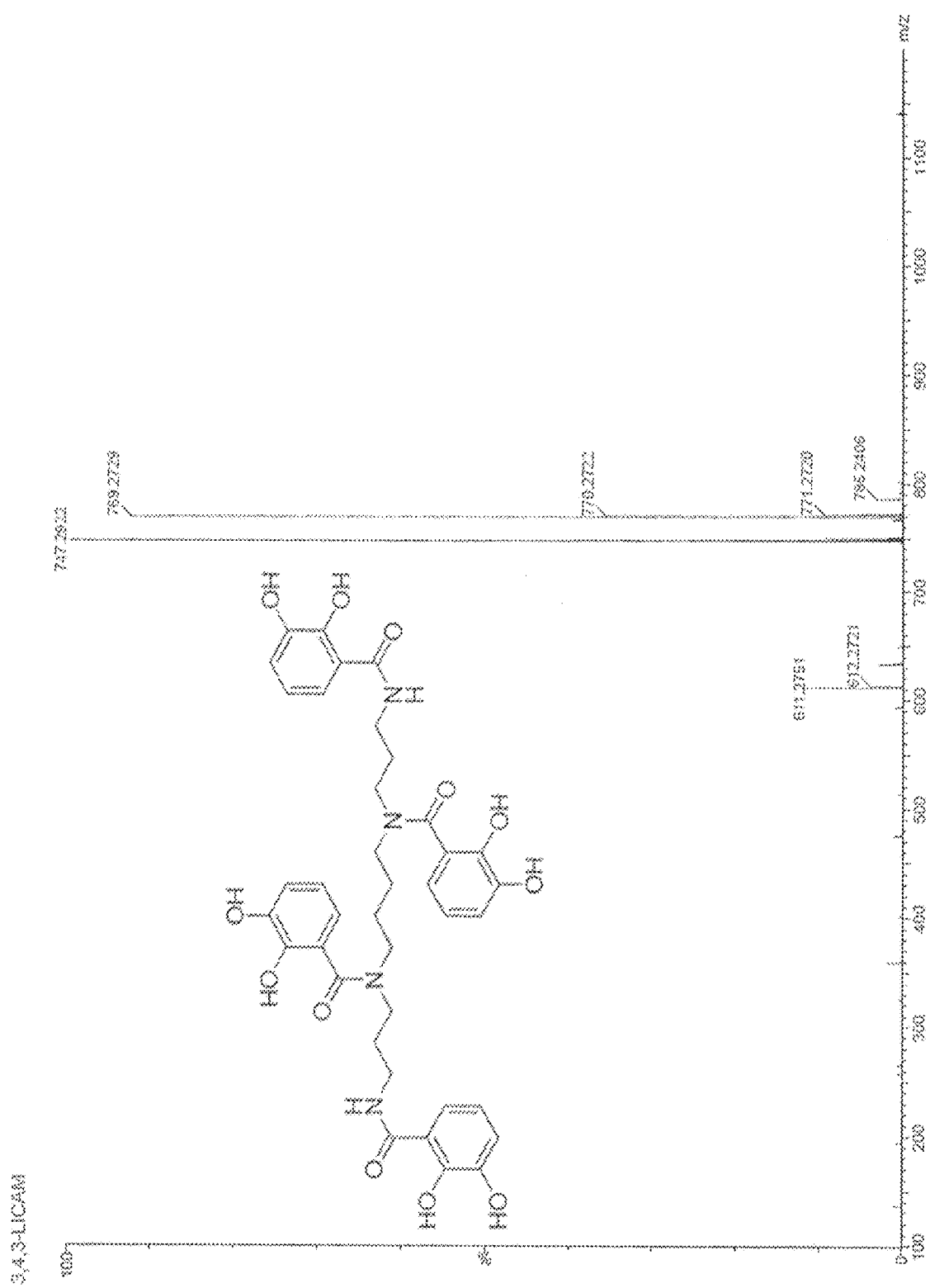
FIG. 4. 3,4,3-LI(CAM) (6)-Mass Spectrum, Positive Mode.

3,4,3-LI(2,2-diphenylbenzo[d][1,3]-2,3-catecholamide) (5). Precursor 4 (746 mg, 2.33 mmol) was suspended in 10 mL of dry toluene under an argon atmosphere and was treated with oxalyl chloride (220 µL, 2.55 mmol). Catalytic N,N-dimethylformamide was added and the suspension was heated to 40° C. The solution was stirred until the evolution of gas ceased and was concentrated on the manifold vacuum at the same temperature. The resulting brown oil was dissolved in 10 mL of dry THF. In a separate container a solution of spermine (118 mg, 0.583 mmol), triethylamine (356 µL, 2.56 mmol), and THF (5 mL) was prepared. The solutions were combined and heated to 50° C. overnight in a sealed flask. The following day the reaction was filtered and concentrated under reduced pressure. The resulting crude oil was chromatographed using 3% MeOH in CH$_2$Cl$_2$ as eluent. The volatiles were then removed under reduced pressure and dried under vacuum, yielding 5 as a white foam (641 mg, 0.457 mmol, 78% yield). $^1$H NMR (300 MHz, CDCl$_3$) δ 7.88 (1H, t, J=5.7 Hz), 7.66-7.76 (6H, br t), 7.60 (1H, br s), 7.57 (1H, br s), 7.43-7.53 (10H, br s), 7.33-7.40 (4H, br s), 7.19-7.31 (20H, br s), 7.01 (2H, d, J=7.6 Hz), 6.91 (4H, dd, J=12.1 Hz, 8.0 Hz), 6.80 (2H, br s), 6.72 (2H, br s), 3.85 (4H, br s), 3.43 (2H br s), 3.21 (2H, br s), 3.06 (1H, br s), 2.96 (1H, br s), 2.80 (2H, br s), 1.81 (4H, br s), 1.54 (1H, br s), 1.43 (1H, br s), 1.19 (1H, br s), 0.89 (2H, br s). $^{13}$C NMR (75 MHz, CDCl$_3$) δ 167.5, 163.7, 147.3, 147.1, 145.0, 142.8, 139.7, 139.4, 138.9, 129.7, 129.2, 128.4, 128.3, 126.4, 126.3, 126.1, 126.0, 122.3, 122.2, 121.7, 120.4, 118.4, 118.1, 116.0, 111.8, 111.4, 111.3, 109.4, 47.9, 41.8, 36.5, 27.9, 25.5 (FIGS. 2A and 2B).

br s), 6.66 (4H, br s), 6.56 (2H, br s), 6.44 (1H, br s), 2.88-3.52 (12H, overlapping aliphatic signals), 1.16-1.83 (8H, overlapping aliphatic signals); $^{13}$C NMR (125 MHz, MeOD-d$_4$) δ 172.9, 171.5, 150.4, 147.3, 146.6, 125.6, 125.4, 121.0, 119.6, 119.1, 118.8, 118.6, 116.9, 116.6, 47.7, 44.9, 43.2, 37.8, 37.5, 29.3, 28.2, 26.5, 25.5 (FIGS. 3A and 3B). MS-ESI (m/z) [M+H] Calcd for C$_{38}$H$_{43}$N$_4$O$_{12}$, 747.2878; found 747.2922 and [M−H] Calcd. for C$_{38}$H$_{41}$N$_4$O$_{12}$, 745.2721; found 745.2774 (FIG. 4).

Another pathway for synthesizing a chelator that includes a carboxyl group for binding with another compound, such as a protein or a dye, can include:

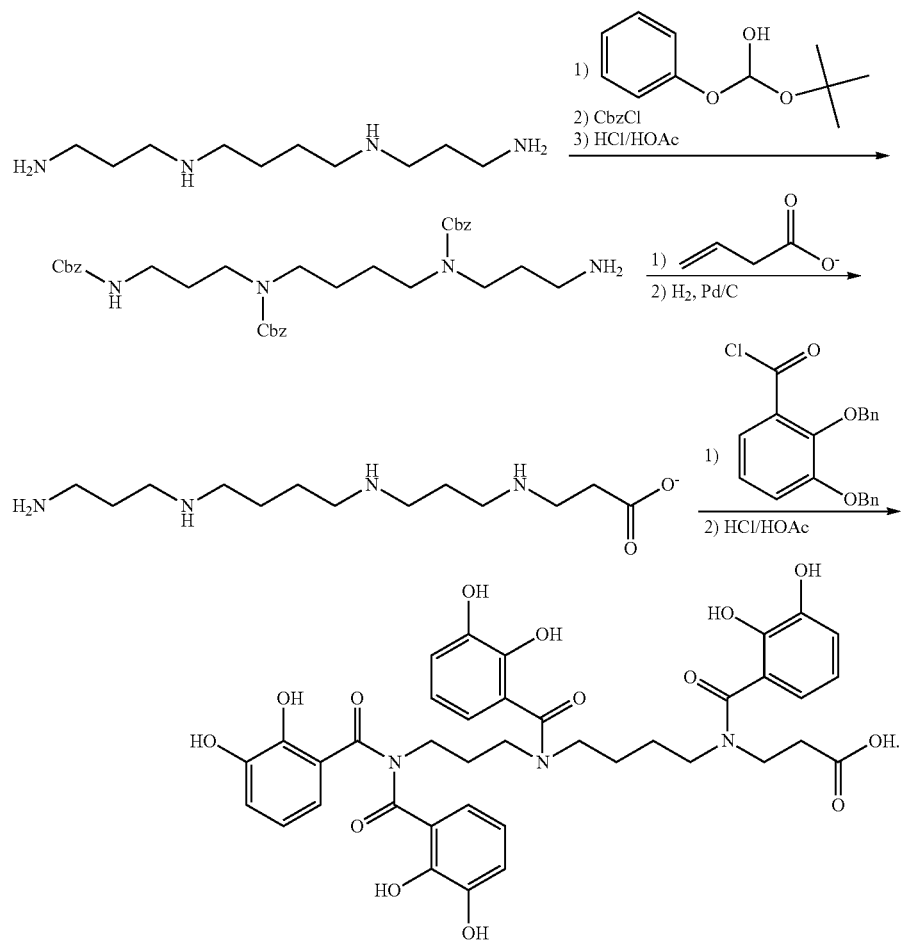

3,4,3-LI(CAM) (6). The protected chelator 5 (411 mg, 0.293 mmol) was dissolved in a mixture of 5 mL acetic acid, 0.5 mL H$_2$O, and 0.1 mL concentrated HCl. The solution was stirred in a sealed container at 60° C. overnight. The next day the conversion was confirmed by LC-MS and the volatiles were removed under vacuum. A portion of the crude was purified using reverse-phase prep-HPLC using at 10→50% MeOH in H$_2$O+0.1% trifluoroacetic acid as eluent. The solvent was removed on a Genevac centrifugal evaporator followed by lyophilization of residual H$_2$O. 6 was obtained as a pure white powder (90% yield). $^1$H NMR (600 MHz, DMSO-d$_6$) δ 12.82 (1H, br s), 12.69 (1H, br s), 9.52 (2H, br s), 9.11 (2H, br s), 8.78 (1H, br s), 8.60 (3H, br s), 7.26 (1H, br s), 7.12 (1H, br s), 6.90 (2H, br s), 6.77 (1H, Metal, Chelator Solutions. The trivalent lanthanide Ln(III) working stock solutions were prepared in standardized 0.1 M HCl. A Zr(IV) stock solution was prepared by dissolving ZrCl$_4$ in 3.0 M H$_2$SO$_4$, to prevent hydrolysis. The metal salt ZrCl$_4$ was handled and stored in a glovebox kept under inert atmosphere. The Zr(IV) stock solution was standardized against EDTA, with xylene orange as the indicator (Welcher, F. J. *The analytical uses of ethylenediamine tetraacetic acid;* 1958). A Th(IV) stock solution was prepared in 0.1 M H$_2$SO$_4$. Stock solutions (4 mM) of Ent, and 3,4,3-LI(CAM) were prepared by direct dissolution of a weighed portion of chelator in DMSO and aliquots were removed prior to each set of experiments.

Solution Thermodynamics. All titrant solutions were degassed by boiling for 1 h while being purged under Ar.

Carbonate-free 0.1 M KOH was prepared from concentrate (J.T Baker Dilut-It) and was standardized by titrating against 0.1 M potassium hydrogen phthalate (99.95%, Sigma Aldrich). Solutions of 0.1 M HCl were similarly prepared and were standardized by titrating against TRIS (99.9%, J.T. Baker). The glass electrode (Metrohm-Micro Combi-response to [H+]) used for the pH measurements was calibrated at 25.0° C. and at an ionic strength of 0.1 M (KCl) before each potentiometric or spectrophotometric titration. The calibration data were analyzed using the program GLEE (Gans & O'Sullivan, *Talanta*, 2000, 51 (1): 33-37) to refine for the E° and slope. All thermodynamic measurements were conducted at 25.0° C., in 0.1 M KCl supporting electrolyte under positive Ar gas pressure. The automated titration system was controlled by an 867 pH Module (Metrohm). Two-milliliter Dosino 800 burets (Metrohm) dosed the titrant (0.1 M KOH or 0.1 M HCl) into the thermostated titration vessel (5-90 mL). UV-visible spectra were acquired with an Ocean Optics USB4000-UV-vis spectrometer equipped with a TP-300 dip probe (Ocean Optics; path length of 10 mm), fiber optics and a DH-2000 light source (deuterium and halogen lamps). The fully automated titration system and the UV-vis spectrophotometer were coordinated by LBNL titration system, a computer program developed in house.

Figure 5A:
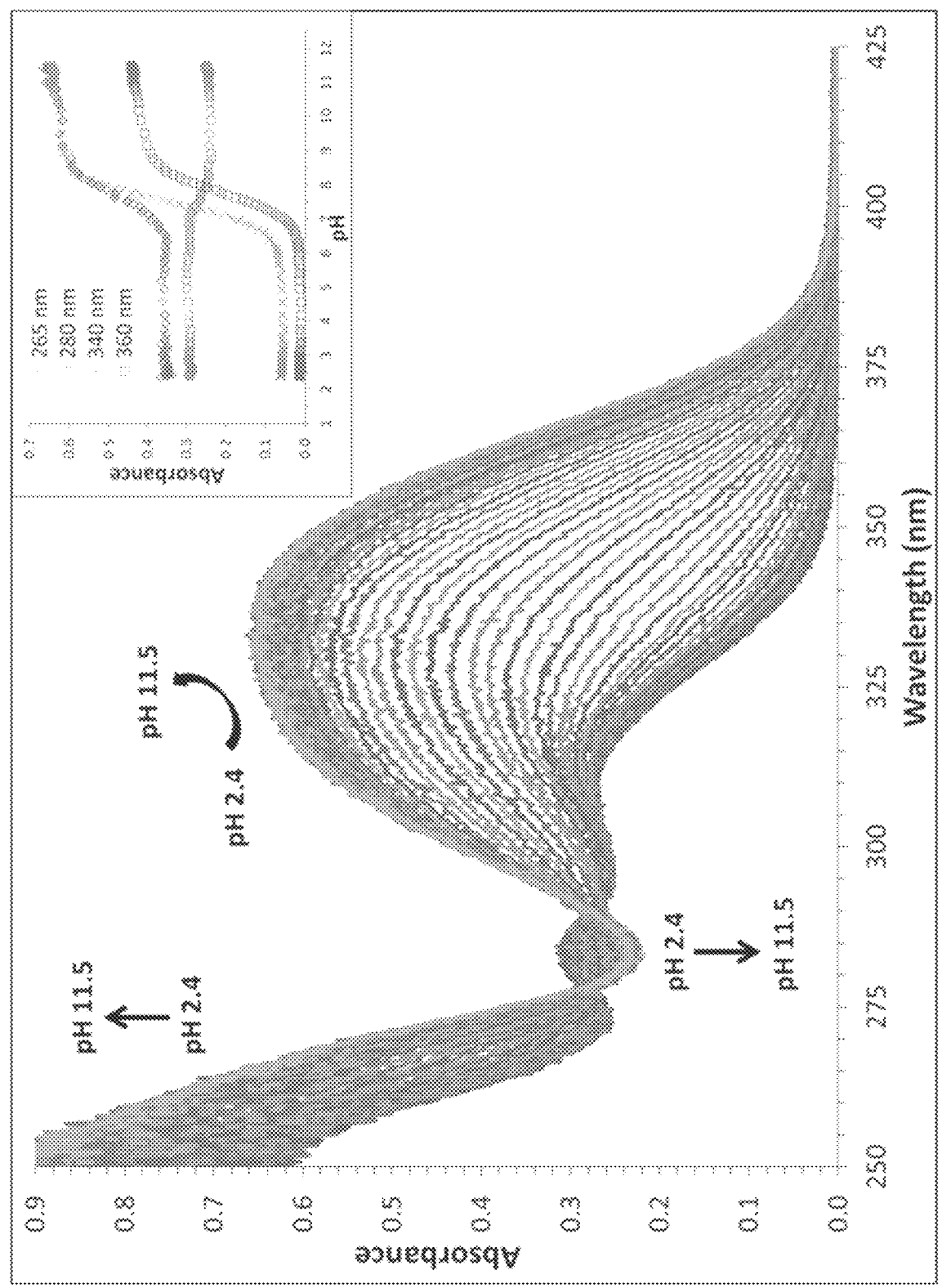
FIGS. 5A and 5B. (5A) Example of spectrophotometric competition titration of Th(IV)-CAM complexes. Starting conditions: 50 µM 3,4,3-LI(CAM), 50 µM Th(IV), 112 µM DTPA, 3 mM CHES, 3 mM TRIS, 3 mM MES, 10 mM HCl. I=0.1 M (KCl). T=25° C. 130 spectra measured between pH 2.4 and 11.5. Path length=10 mm. Spectra corrected for dilution. Inset: Change in absorbance 360 nm (squares), 340 nm (crosses), 280 nm (circles) and 265 nm (diamonds) as a function of pH. (5B) Speciation diagram of the 3,4,3-LI(CAM) ligand in the presence of Th(IV). [Th]=[CAM]=10 µM. T=25° C., I=0.1 M. Species: CAMH$_8$, CAMH$_7^-$, [CAMHTh]$^{3-}$ and [CAMTh]$^{4-}$. Calculations performed with Hyss software.
Figure 5B:
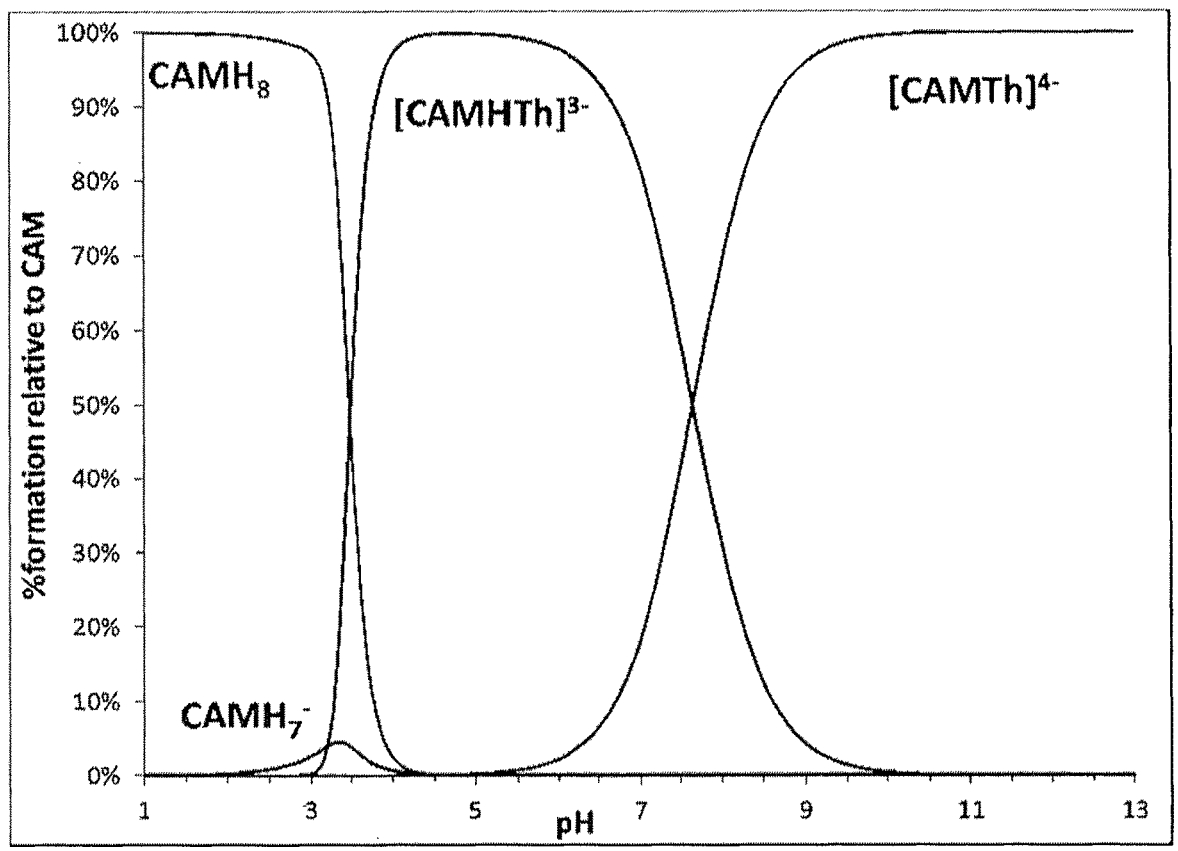
Figure 6A:
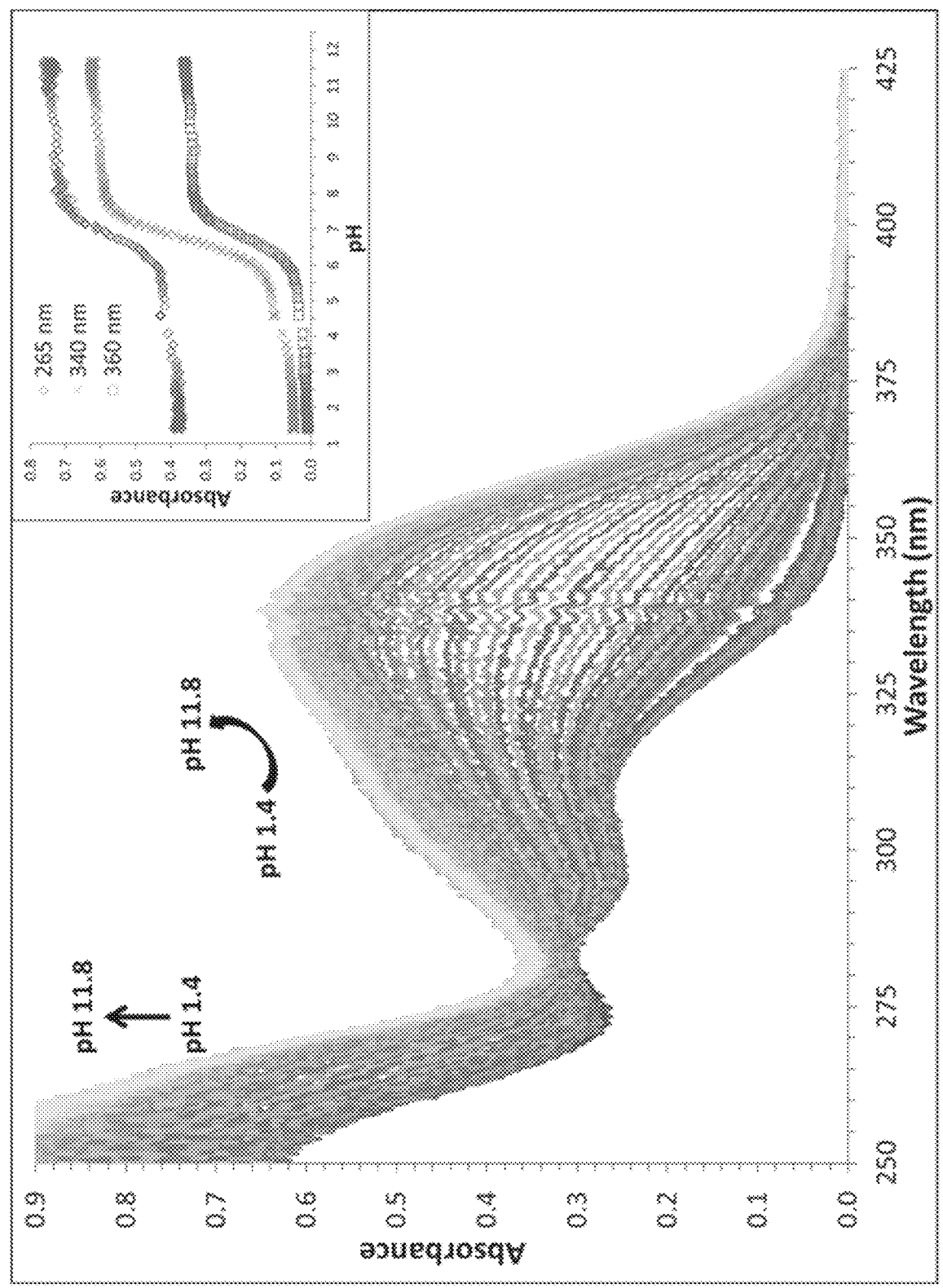
FIGS. 6A and 6B. (6A) Example of spectrophotometric competition titration of Zr(IV)-CAM complexes. Starting conditions: 50 µM 3,4,3-LI(CAM), 50 µM Zr(IV), 56 µM DTPA, 5 mM CHES, 5 mM TRIS, 5 mM MES, 45 mM HCl. I=0.1 M (KCl). T=25° C. 230 spectra measured between pH 1.4 and 11.8. Path length=10 mm. Spectra corrected for dilution. Inset: Change in absorbance 360 nm (squares), 340 nm (crosses) and 265 nm (diamonds) as a function of pH. (6B) Speciation diagram of the 3,4,3-LI(CAM) ligand in the presence of Zr(IV). [Zr]=[CAM]=10 µM. T=25° C., I=0.1 M. Species: CAMH$_8$, CAMH$_7^-$, [CAMHZr]$^{3-}$ and [CAMZr]$^{4-}$. Calculations performed with Hyss software.
Figure 6B:
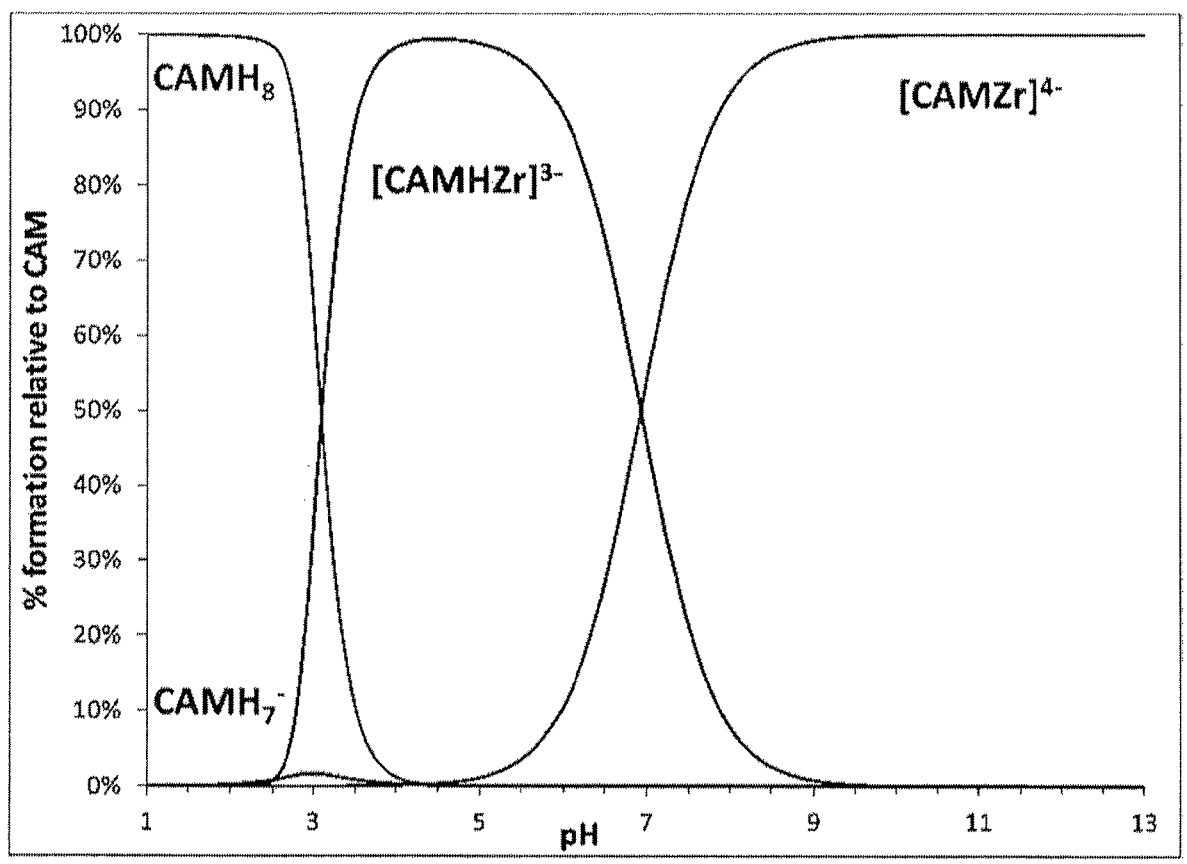
Figure 7A:
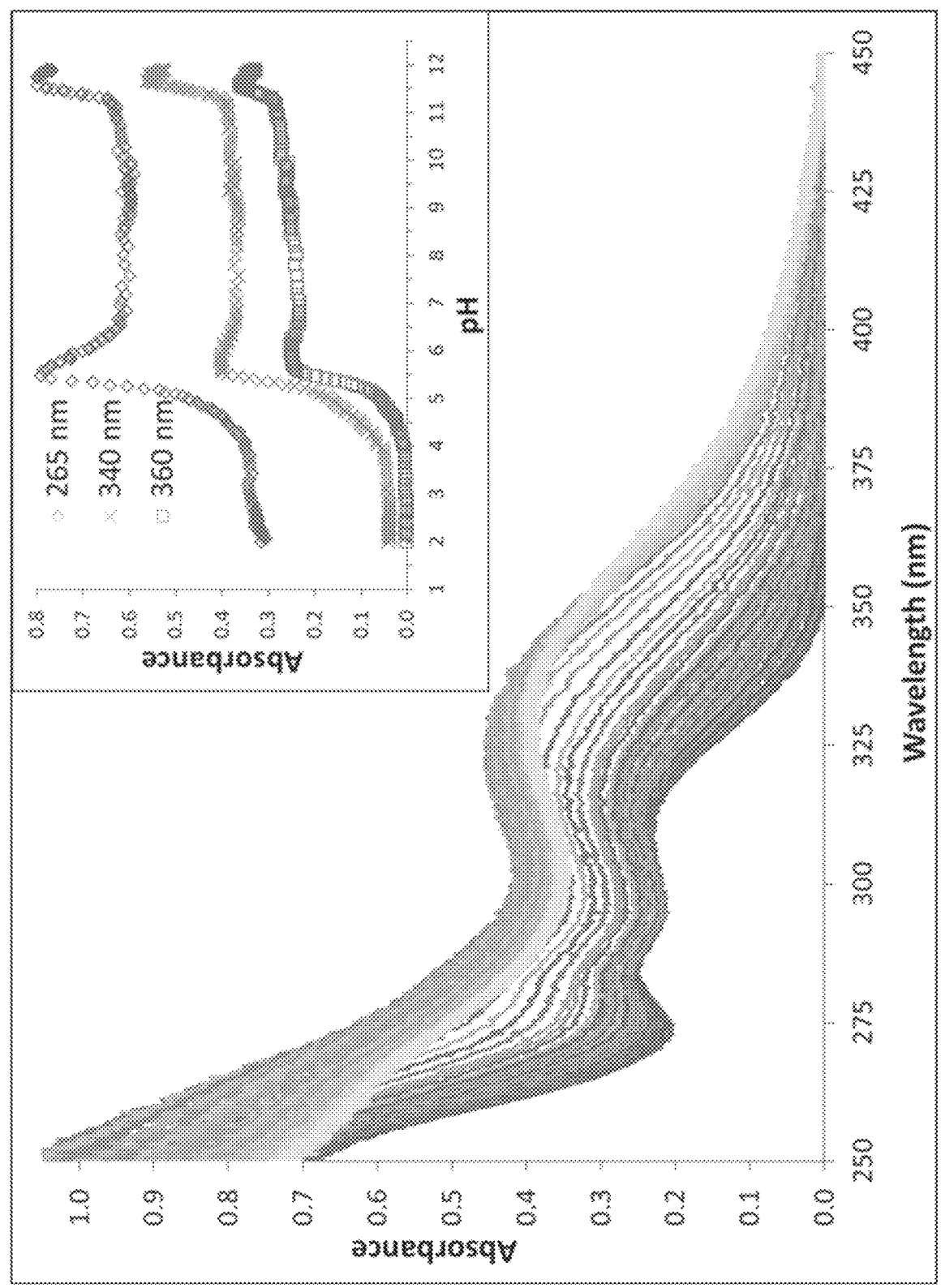
FIGS. 7A and 7B. (7A) Example of spectrophotometric competition titration of Eu(III)-CAM complexes. Starting conditions: 50 µM 3,4,3-LI(CAM), 50 µM Eu(IV), 10 mM CHES, 10 mM MES, 10 mM acetic acid, 10 mM HCl. I=0.1 M (KCl). T=25° C. 215 spectra measured between pH 2.0 and 11.9. Path length=10 mm. Spectra corrected for dilution.
Figure 7B:
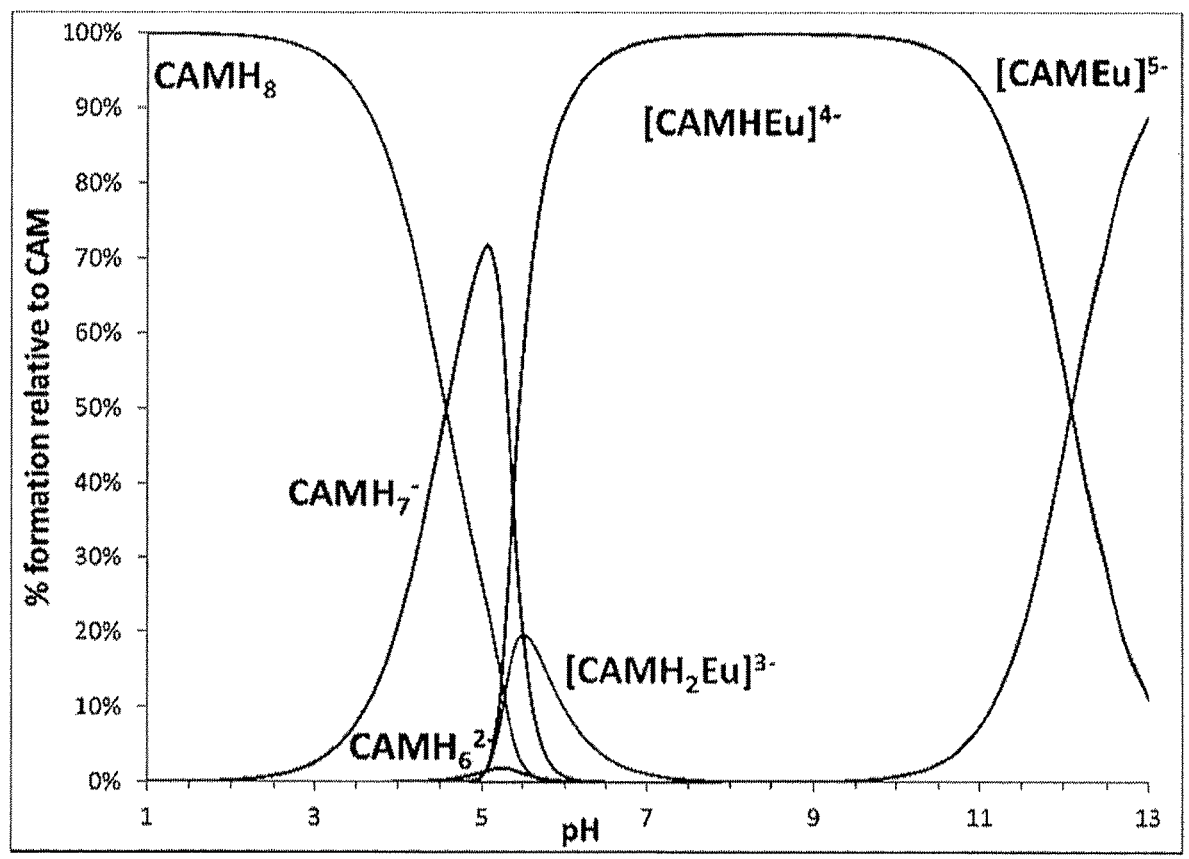

Incremental Spectrophotometric Titrations. This method was used to determine the protonation constants of 3,4,3-LI(CAM) as well as the stability constants of its complexes formed with Eu(III), Zr(IV) and $^{232}$Th(IV). The experimental titration setup is similar to previously described systems (Sturzbecher-Hoehne, et al., *Radiochimica Acta.*, 2013, 101 (6): 359-366). For the 3,4,3-LI(CAM) protonation (and Eu(III)-3,4,3-LI(CAM) complexes), titrations were performed with an initial concentration of 50 µM of 3,4,3-LI (CAM) (and 50 µM of Eu(III)) resulting in absorbance values included between 0 and 1.0 throughout the titration. Typically, 9 mL of a sample containing 3,4,3-LI(CAM) (and Eu(III)) and the supporting electrolyte (KCl/HCl) were incrementally perturbed by addition of 0.025 mL of carbonate-free 0.1 M KOH followed by a time delay of 80 s. Buffering of the solution was ensured by the addition of 10 mM of HEPES, 10 mM of CHES and 10 mM of MES. Between 130 and 250 data points were collected per titration, each data point including a pH measurement and a UV-Vis spectrum (250-450 nm) over the pH range 1.5 to 12.0. All spectra were corrected for dilution before data fitting. The entire procedure (electrode calibrate, titration and data treatment) was performed independently five times for the protonation constants and four times for the Eu(III)-3,4,3-LI(CAM) complexes. For the Zr(IV) and Th(IV) complexes, titrations were performed similarly but in the presence of DTPA to avoid the formation of metal hydroxides at low pH, before the uptake by 3,4,3-LI(CAM). For each metal, three titrations were performed independently in the presence of 1.1 to 40 equivalents of DTPA. Examples of titrations are displayed in the Supporting Information (FIGS. 5-7).

Data Treatment. Thermodynamic constants and spectral deconvolution were refined using the nonlinear least-squares fitting program HypSpec (Gans, et al., *Talanta*, 1996, 43 (10): 1739-1753). All equilibrium constants were defined as cumulative formation constants, $\beta_{mlh}$ according to Equation (1), where the metal and chelator are designated as M and L, respectively. All metal and chelator concentrations were held at estimated values determined from the volume of standardized stock solutions. All species formed with 3,4,3-LI(CAM) were considered to have significant absorbance to be observed in the UV-vis spectra and were therefore included in the refinement process. The refinements of the overall formation constants β included in each case with previously determined chelator protonation constants and the metal hydrolysis products, whose equilibrium constants were fixed to the literature values (Smith, et al., NIST standard reference database 46. NIST Critically selected stability constants of metal complexes database ver 2004, 2) The speciation diagrams were calculated using the modeling program Hyss (Alderighi, et al., *Coordination Chemistry Reviews*, 1999, 184 (1): 311-318). Errors on log $\beta_{mlh}$ and pK$_a$ values presented in this Example correspond to the standard deviation observed over the n replicates (n=3 to 5) of the entire procedure (electrode calibrate, titration and data treatment).

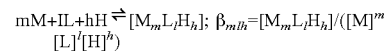

$$mM+lL+hH \rightleftharpoons [M_mL_lH_h]; \beta_{mlh}=[M_mL_lH_h]/([M]^m[L]^l[H]^h)$$

3,4,3-LI(CAM) was synthesized from readily available building blocks using a process shown in FIG. 8. The new preparation moves away from using harsh reaction conditions by using the protected diphenylmethylene acetal derivative (5), which greatly simplifies purification of the final product.

Affinity of 3,4,3-LI(CAM) Toward 3+ and 4+ Metals. A comprehensive solution thermodynamic analysis was performed to characterize the affinity of 3,4,3-LI(CAM) for trivalent and tetravalent metals and the effect of substituting 1,2-HOPO for CAM binding units on the octadentate spermine scaffold. The protonation constants of 3,4,3-LI(CAM) were determined by spectrophotometric titrations, and eight protonation equilibria were assigned to sequential removal of two protons from each of the four CAM units (FIG. 9). Previous studies of Ent and other CAM-containing synthetic analogs established that the protonation constants (pK$_{a1}$-pK$_{a4}$) of the meta-hydroxyl oxygen atoms are well separated from the ortho-hydroxyl oxygen atoms (pK$_{a5}$-pK$_{a8}$) (Loomis & Raymond, *Inorganic Chemistry*, 1991, 30 (5): 906-911). The last four pK$_a$ values are most relevant to metal binding as moieties corresponding to these values have to be deprotonated at physiological pH in order to bind the metal ions. The overall acidity of 3,4,3-LI(CAM) can be defined as ΣpK$_{a5-8}$=45.4 versus 3,4,3-LI(1,2-HOPO)'s 21.2 (Abergel, et al., *Inorganic chemistry* 2009, 48 (23): 10868-10870) with lower values representing higher acidity. 3,4,3-LI(CAM) is therefore less prone to bind hard Lewis acids at low pH than its 1,2-HOPO analog, due to competition between metal uptake and protonation of the CAM moieties.

Incremental spectrophotometric titrations were then carried out to determine the formation of Eu$^{III}$, Zr$^{IV}$ or Th$^{IV}$ complexes with 3,4,3-LI(CAM). Because of the very short half-life of $^{225}$Ac and the scarce availability of the longer-lived $^{227}$Ac, Eu$^{III}$ was used here as a non-radioactive Ln surrogate for Ac$^{III}$. Based on previous solution thermodynamic studies of Ln$^{III}$ complexes of 3,4,3-LI(1,2-HOPO) and other common polyaminocarboxylate chelators, 15 it is reasonable to expect similar stability constants for Eu$^{III}$ and Ac$^{III}$ complexes of 3,4,3-LI(CAM). The CAM octadentate chelator showed a very high affinity for both 3+ and 4+ ions (FIG. 9). The stability constants of [Eu-3,4,3-LI(CAM)]$^{5-}$, [Th-3,4,3-LI(CAM)]$^{4-}$ and [Zr-3,4,3-LI(CAM)]$^{4-}$ are several orders of magnitude higher than those of their 1,2-HOPO counterparts, with log β110 values of 29.7, 47.7 and 57.3, respectively. Consequently, 3,4,3-LI(CAM) is one of the strongest chelators ever reported for the chelation of both trivalent and tetravalent f-elements. For comparison, a cyclic octadentate terephthalamide derivative was recently designed to bind Th4+ in vivo and showed an unprecedented affinity for Th4+ with a log β110 (ThL4−) value of 53.7 (Pham, et al., *J. Am. Chem. Soc.*, 2014, 136 (25): 9106-9115). To inspect the pH dependency of metal complex formation, speciation diagrams were calculated for 3,4,3-LI (CAM) in the presence of 1 equivalent of Eu(III), Zr(IV) or Th(IV) (FIGS. 5-7). Both Zr(IV) and Th(IV) complexes start forming at around pH 3, with the mono and fully deprotonated species, $[MIVLH]^{3-}$ and $[MIVL]^{4-}$, being predominant at physiological pH (7.4). This behavior departs from that of 3,4,3-LI(1,2-HOPO), with which 4+ metal complexes are formed even under very acidic conditions (pH<0) (Deblonde, et al., *Inorganic chemistry*, 2013, 52 (15); 8805-8811; Sturzbecher-Hoehne, et al., *Inorganic chemistry*, 2015, 54 (7): 3462-3468). For Eu(III), complexation by 3,4,3-LI(CAM) starts at pH 5 and the mono-protonated complex, $[Eu^{III}LH]^{4-}$, is the only species present at pH 7.4. Similar to what is observed with 4+ metals, the pH at which Eu(III)-3,4,3-LI(CAM) complexes start forming is higher than in the case of Eu(III)-3,4,3-LI(1,2-HOPO) species that already appear at pH 1 under those same conditions (Abergel, et al., *Inorganic chemistry*, 2009, 48 (23): 10868-10870). Additional embodiments of various chelators are shown in FIG. 10A, which depicts an embodiment of a general peptoid synthesis. Submonomer units are generally depicted as "R" group, and can be metal chelating units substituted with an available primary amine. These submonomer units can be used to prepare the peptoids on Rink Amide resin employing standard coupling chemistry. An unlimited number of submonomer units can be added, with each submonomer unit providing 1, 2, 3, or more metal chelating atoms such as oxygen, nitrogen, or sulfur donors. Peptoid structures formed with one, two, three, four, or five submonomer CAM- or HOPO-based units will result in bidentate, tetradentate, hexadentate, Octadentate, or pentadentate ligands. Unless noted otherwise, all synthetic aspects may be carried out in fritted polypropylene syringes, which allowed for recovery of submonomer for re-use. Synthesis can include: 1. Adding 100-150 mg of Rink amide resin to a fritted syringe. Swelling the resin by adding 2 mL of DMF and rock for 30 minutes. Ejecting the solution to isolate the swelled resin. 2.

Adding 1 mL of 20% 4-methylpiperidine in DMF (v/v) to deprotect the Fmoc group. Agitating for 2 minutes, draining, and repeating for 12 minutes. 3. Rinsing the resin with DMF (2 mL, 5 times for 1 minute). 4. Bromoacetylation. Premixing 0.8 M bromoacetic acid in DMF with 0.8 M N,N-diisopropylcarbodiimide (DIC), 2 mL total solution with 0.4 M of each reagent. Drawing the solution into the syringe, agitating for 5 minutes, and rinsing (2 mL DMF 5×1 minute). 5. Displacement. Drawing in 1.5 mL of submonomer solution (0.2 M in DMF), agitating for 1 hour at 45° C., then rinsing (DMF 5×1 minute). 6. Repeating bromoacetylation and displacement until synthesis is finished. Washing with DCM (2 mL 3×1 minute) after last DMF wash and drying resin by pulling the plunger out and applying a gentle vacuum onto the syringe needle.

FIG. 10B depicts an embodiment of a general peptoid synthesis, where only one same submonomer unit is used throughout four coupling steps. The submonomer unit comprises a 1,2-HOPO chelating functionality linked to a primary amine through an ethylene bridge to allow for coupling to the peptoid scaffold. The resulting peptoid ligand is octadentate, with four HOPO chelating units available for metal binding. In some embodiments, different units can be added for different functionality, such as to allow cross-linking or other functions.

FIG. 10C depicts an embodiment of a general peptoid synthesis where two different submonomer units are used throughout four coupling steps. The submonomer units comprise either a 1,2-HOPO or CAM chelating functionality linked to a primary amine through an ethylene bridge to allow for coupling to the peptoid scaffold. The combinatorial nature of peptoid synthesis provides a unique opportunity to control binding moiety sequence. The modularity of the scaffold allows for the preparation of up to 16 possible tetrapeptoid, octadentate ligands, with zero, one, two, three, or four HOPO or CAM chelating units available for metal binding. "H" and "C" are defined in FIG. 10D. The option of this approach allows for the generation of a wide variety of resulting chelators.

FIG. 10D depicts an embodiment of a general peptoid synthesis, where two different submonomer units are each used throughout two coupling steps. The submonomer units can comprise a 1,2-HOPO or CAM chelating functionality linked to a primary amine through an ethylene bridge to allow for coupling to the peptoid scaffold. The particular embodiment depicts the "CHHC" peptoid ligand, which incorporates directionally from the rink amide resin a CAM, two HOPO, and a CAM chelating units available for metal binding.

FIG. 10E depicts an embodiment of the 16 products obtained from a general peptoid synthesis, where two different submonomer units are used throughout four coupling steps. The submonomer units comprise a 1,2-HOPO or CAM chelating functionality linked to a primary amine through an ethylene bridge to allow for coupling to the peptoid scaffold. The modularity of the scaffold allows for the preparation of up to 16 possible tetrapeptoid, octadentate ligands, with zero, one, two, three, or four HOPO or CAM chelating units available for metal binding.

FIG. 10F depicts an embodiment of an organic fluorophore, FITC, that can be used as a fluorescent tag. The tag, similarly to the majority of well-characterized commercially-available fluorophores, can be incorporated onto the peptoid structures through standard amine coupling conditions, using its available primary-amine-reactive isothiocyanate functionality.

FIG. 11A depicts an embodiment of a conjugation pathway for attachment to biologically-relevant targeting molecules, solid resins, or nanoparticles, that contain thiol reactive sites (such as those in cysteine residues). A maleimide or dibromo-maleimide functionality can be attached to the peptoid ligands through standard amide coupling conditions as a subsequent step following the addition of the last chelating submonomer. This embodiment specifically depicts the functionalization of the available peptoid secondary amine by a carboxylic group linked to maleimide or dibromomaleimide groups through an alkyl chain. In this case, the alkyl chain comprises 5 carbons, but its length can vary from 2 to 10 carbon atoms.

FIG. 11B depicts an embodiment of conjugation pathways that use click chemistry methods for attachment to biologically-relevant targeting molecules, solid resins, or nanoparticles. A functionality comprising of isothiocyanate, azide, or alkyne, can be attached to the peptoid ligands through standard amide coupling conditions as a subsequent step following the addition of the last chelating submonomer. This embodiment specifically depicts the addition of an available peptoid primary amine linked to the scaffold through an alkyl chain and its subsequent reaction to form the isothiocyanate, azide, or alkyne moiety. In this case, the alkyl chain comprises 5 carbons, but its length can vary from 2 to 10 carbon atoms.

FIG. 12A depicts reaction schemes for the conjugation of maleimide- or dibromomaleimide-substituted peptoids to the disulfide bridges available on antibodies. Reduction of the disulfide bridges results in the formation of thiol functionalities on the targeting antibodies, which then readily react with the substituted peptoid.

FIG. 12B depicts the reaction schemes for the conjugation of isothiocyanate- or azide-substituted peptoids to antibody substitutions sites through standard click chemistry methods.

FIG. 13 depicts some embodiments of a fluorescent tag incorporation. A fluorophore can be attached to the peptoid ligands through standard amide coupling conditions as a subsequent step following the addition of the last chelating submonomer. This embodiment specifically depicts the functionalization of the peptoid through additional bromoacetylation and displacement steps with the FITC fluorophore that is substituted with a primary amine through an alkyl chain. In this case, the alkyl chain comprises 2 carbons, but its length can vary from 2 to 10 carbon atoms. Any fluorophore can be used in some embodiments.

EXAMPLES

Example 1

Experimental Procedures

General Considerations. Chemicals were obtained from commercial suppliers and were used as received unless stated otherwise. $^1$H NMR spectra were recorded on Bruker instruments; $^{13}$C NMR spectra were recorded on Bruker instruments with tetramethylsilane as an internal reference. SilicaFlash G60 (particle size 60-200 μm) was used for flash column chromatography. LC-MS was performed on an Agilent LC/MS system consisting of an Agilent 1200 binary LC pump, a temperature-controlled autosampler, a PDA UV detector, and a 6530 Accurate Mass Q-TOF mass spectrometer (Wilmington, DE, USA). The mass spectrometer was equipped with a JetStream® ESI probe operating at atmospheric pressure. The ESI source parameter settings were: mass range m/z 100-1200, gas temperature 350° C., gas flow 10 L/min, nebulizer 50 psi, sheath gas temperature 400° C., sheath gas flow 12 L/min, capillary voltage (Vcap) 3500 V, nozzle voltage 500 V, fragmentor 200 V, skimmer 65 V, octopole RF (OCT 1 RF Vpp) 750 V. Reverse phase preparatory HPLC was performed on a Varian ProStar system with a Vydac C18 column. HRMS and MS-MS were obtained on a Waters Xevo G2 Qtof mass spectrometer, leucine encephalin lockspray with mass correction was used for HRMS.

Example 2—Synthetic Procedures—Submonomer

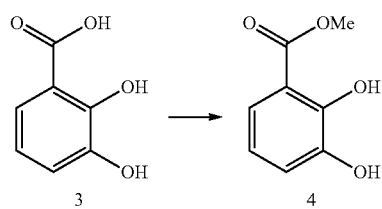 [SMILES: O=C(O)c1cccc(O)c1O ; COC(=O)c1cccc(O)c1O]

Methyl 2,3-dihydroxybenzoate, 4. A stirred suspension of 3 (8.06 g, 52.3 mmol) in 100 mL of methanol was treated with 2.00 mL of concentrated sulfuric acid. The suspension warmed and clarified 2 minutes after the addition. The reaction was equipped with a reflux condenser and was heated to 65° C. overnight. The next morning the conversion was verified by LC-MS and the volatiles were removed under reduced pressure. The crude was partitioned between water (100 mL) and ethyl acetate (100 mL) and the aqueous layer was extracted with ethyl acetate (3×50 mL). The organic extracts were combined, dried over MgSO$_4$, and concentrated under reduced pressure. The crude was passed through a plug of silica using 10% ethyl acetate in hexanes as eluent. The eluent was concentrated under reduced pressure and dried under high vacuum for 2 hours to yield 4 (7.66 g, 45.6 mmol, 88%) as a white solid, the spectral properties of which matched previous reports.[1]

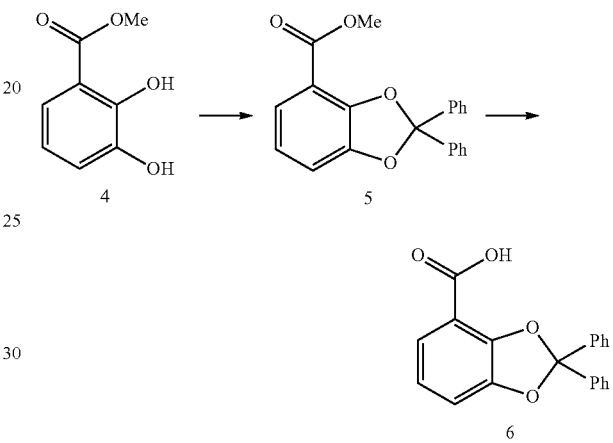

Methyl 2,2-diphenylbenzo[d][1,3]dioxole-4-carboxylate, 5. 4 (5.00 g, 29.7 mmol) was mixed with dichlorodiphenylmethane (8.56 ml, 44.6 mmol) under an argon atmosphere, the resulting suspension was stirred and heated to 160° C. for 1 hour. The mixture was allowed to cool to room temperature and was diluted with 100 ml of ethyl acetate. The solution was washed with sat. NaHCO$_3$ (30 mL) then brine (30 mL), dried over MgSO$_4$, then concentrated under reduced pressure. The ensuing greyish oil was dissolved in 30 mL of hot methanol (65° C.) and was slowly cooled to 5° C., which resulted in the formation of white crystals. The crystals were a mixture of 5 and benzophenone dimethyl acetal that could not be easily separated; product was used as is for the subsequent step.

2,2-diphenylbenzo[d][1,3]dioxole-4-carboxylic acid, 6. The mixture from the previous step was dissolved in 100 mL of THF and was treated with 100 mL of 0.9 M LiOH. The emulsion was rapidly stirred and heated to reflux for 5 hours. Conversion was verified by LC-MS and the reaction was cooled to room temperature. The solution was neutralized with 10% v/v aqueous acetic acid and was extracted with ethyl acetate (3×50 mL). The organic extracts were combined, dried over MgSO$_4$, and concentrated under reduced pressure. The crude was chromatographed using 25% ethyl acetate in hexanes as eluent. Volatiles were then removed under reduced pressure followed by high vacuum to yield 6 (7.6 g, 24 mmol, 81% over 2 steps) as a white solid, the spectral properties of which matched previous reports.[1]

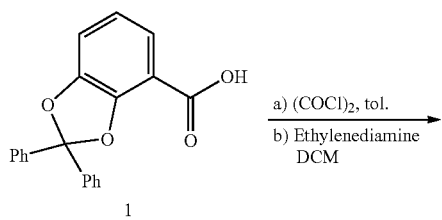

1

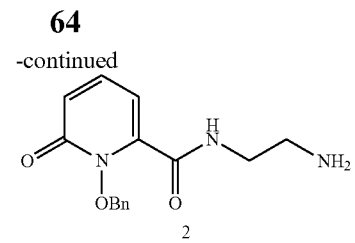

2

"CAM Submonomer, 2." 1 (3.84 g, 12.1 mmol) was suspended in 30 mL of toluene under an argon atmosphere. Oxalyl chloride (1.14 mL, 13.3 mmol) was then added followed by a catalytic amount of N,N-dimethylformamide. The suspension was heated to 40° C. and was stirred until it became clear and the evolution of gas has ceased (~1 hour). The volatiles were then removed under reduced pressure and the resulting white solid was dissolved in dry dichloromethane. A separate 1 L roundbottom flask outfitted with an addition funnel was charged with ethylenediamine (8 mL, 120 mmol) and 50 mL dry dichloromethane; the resulting solution was cooled to 0° C. using an ice bath. The aforementioned solution of acyl chloride was transferred into the addition funnel and was diluted with dichloromethane to a total volume of 700 mL. The acyl chloride solution was then added into the vigorously stirred ethylenediamine over 1.5 hours at 0° C. Following the addition, the reaction solution was transferred into a separatory funnel and was washed with 0.5 M NaOH in 50% saturated aq. NaCl (50 mL×2). The organic phase was dried over MgSO$_4$ and was concentrated on a rotary evaporator yielding the crude. The crude was purified using silica column chromatography (5→10% MeOH in DCM with 1% Et$_3$N, R$_f$=0.35 in 10% MeOH in DCM). The desired fractions were combined, concentrated under reduced pressure, and dried under vacuum yielding the CAM submonomer as a sticky yellow oil (3.49 g, 9.68 mmol, 80% yield). $^1$H NMR (300 MHz, CDCl$_3$) δ 7.64 (1H, br s, NH), 7.56-7.61 (5H, m, ArH), 7.37-7.42 (6H, m, ArH), 7.01 (1H, dd, J=7.7, 1.4 Hz, ArH), 6.94 (1H, t, J=7.9 Hz, ArH), 3.56 (2H, q, J=6.0 Hz, NHC$\underline{H}_2$), 2.97 (2H, t, J=6.0 Hz, NH$_2$C$\underline{H}_2$), 2.75 (2H, s, NH$_2$). $^{13}$C NMR (75 MHz, CDCl$_3$) δ 163.7, 147.2, 144.7, 139.4, 129.5, 128.4, 126.2, 122.4, 122.0, 118.0, 116.0, 111.6, 42.3, 41.5. HRMS-ESI (m/z) [M+H] Calcd. For C$_{22}$H$_{20}$N$_2$O$_3$+H, 361.1563; found, 361.1581.

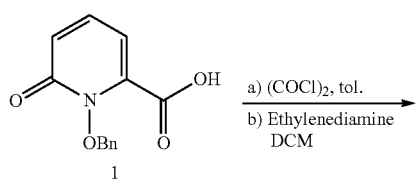

1

-continued

2

"HOPO Submonomer, 3." 3 was synthesized in an identical fashion to 2 above, using 1-benzyloxy-6-carboxy-2 (1H) pyridinone (J. Labelled Cpd. Radiopharm. 2001, 44, 13-19, CAS 210366-15-7, U.S. Pat. No. 6,846,915) as the starting material. The crude product was purified using silica column chromatography (10% NH$_4$OH (10%) in MeOH) in DCM, R$_f$=0.08). The desired fractions were combined, concentrated under reduced pressure, and dried under vacuum yielding the HOPO submonomer 3 as a sticky yellow oil in ~80% yield). $^1$H NMR (300 MHz, CDCl$_3$) δ 7.40-7.48 (3H, m, ArH), 7.35-7.38 (3H, m, ArH and NH), 7.24-7.29 (1H, m, ArH), 6.66 (1H, dd, J=9.0, 1.5 Hz, CHC$\underline{H}$CH), 6.45 (1H, dd, J=6.9, 1.8 Hz, CHCHC$\underline{H}$), 5.29 (2H, s, CH$_2$Ph), 3.36 (2H, q, J=6.0 Hz, NHC$\underline{H}_2$), 2.80 (2H, t, J=6.0 Hz, NH$_2$C$\underline{H}_2$). $^{13}$C NMR (75 MHz, CDCl$_3$) δ 160.3, 158.5, 142.5, 138.0, 133.2, 130.1, 129.4, 128.6, 124.0, 106.4, 79.3, 77.4, 77.0, 76.6, 42.7, 40.7. Calcd. For C$_{15}$H$_{17}$N$_3$O$_3$+H, 288.1328; found, 288.1361.

Example 2—Synthesis of Peptoids

Unless noted otherwise, all steps were carried out in fritted polypropylene syringes, which allowed for recovery of submonomer for re-use. Automatic peptoid synthesis was not an option for this work due to difficulty of sub-monomer preparation.

1. Add 100-150 mg of Rink amide resin to a fritted syringe. Swell the resin by adding 2 mL of DMF and rock for 30 minutes. Eject the solution to isolate the swelled resin.
2. Add 1 mL of 20% 4-methylpiperidine in DMF (v/v) to deprotect the Fmoc group. Agitate for 2 minutes, drain, and repeat for 12 minutes.
3. Rinse the resin with DMF (2 mL, 5 times for 1 minute)
4. Bromoacetylation. Premix 0.8 M bromoacetic acid in DMF with 0.8 M N,N-diisopropylcarbodiimide (DIC), 2 mL total solution with 0.4 M of each reagent. Draw the solution into the syringe, agitate for 5 minutes, and rinse (2 mL DMF 5×1 minute).
5. Displacement. Draw in 1.5 mL of submonomer solution (0.2 M in DMF), agitate for 1 hour at 45° C., then rinse (2 mL DMF 5×1 minute).
6. Repeat bromoacetylation and displacement until synthesis is finished. Wash with DCM (2 mL 3×1 minute) after last DMF wash and dry resin by pulling the plunger out and applying a gentle vacuum onto the syringe needle.

Example 3—Deprotection, Cleavage, and Purification

Dry resin (100-150 mg) was placed into a scintillation vial and was swollen in 9 mL of DCM by shaking for 30 minutes. 1 mL of 1.0 M BBr$_3$ in hexanes was added via a syringe, the vial was capped and shaken for 60 minutes ensuring that all of the resin was thoroughly submerged; this removes benzyl protecting groups from HOPO units. The solvent was carefully removed with a glass pipette and the resin was washed with DCM (2 mL) methanol (2×2 mL) followed by DCM (2×2 mL). The peptoid was then cleaved from resin by treatment with cleavage cocktail for 60 minutes (the treatment also deprotects CAM units). The cleavage cocktail (95% trifluoroacetic acid, 2.5% water, 2.5% triethylsilane) was filtered from resin and a small aliquot was removed and diluted with methanol for LC-MS analysis (1→30% MeCN in H$_2$O over 20 minutes, both with 0.1% formic acid); the resin was washed of TFA traces and discarded. Most LC-MS analyses showed a relatively clean desired compound; iron complexes were sometimes seen, which we believe came from stainless steel components of the instrument. Volatiles were then removed from the filtrate using a vacuum pump. The resulting residue was dissolved in 90/10 acetic acid/water (0.5-1 mL) and the resulting clear solution was stirred at 42° C. and treated with water in 0.5 mL increments. The solution turned turbid upon addition of water and slowly clarified with continued stirring (5-15 min between additions). A total of ~2.5 mL of water was added, at which point the solution remained turbid even with prolonged stirring.

The turbid solution was taken up into a syringe and injected onto reverse-phase prep-HPLC through a 0.45 µm filter in no more than 2.0 mL batches (~2 injections per peptoid).

Example 4—Reversed-Phase Preparative HPLC Method

| Time (min) | % Acetonitrile (with 0.1% TFA) | % Water (with 0.1% TFA) | Flow (ml/min) |
|---|---|---|---|
| 0 | 5 | 95 | 10 |
| 5 | 5 | 95 | 10 |
| 25 | 20 | 80 | 15 |
| 70 | 40 | 60 | 15 |
| 75 | 90 | 10 | 15 |
| 80 | 5 | 95 | 15 |
| 85 | 5 | 95 | 15 |

Most peptoids had peak maxima between 20 and 40 minutes, methods were typically terminated once the target material was collected. The column was flushed with 50/50 solvent composition for 5 minutes and equilibrated to initial condition for at least 20 minutes before every injection; insufficient equilibration leads to low column loading and very low yields. Peptoids with higher CAM compositions tended to be less polar and thus came out later than HOPO-heavy analogs. A representative reversed-phase preparative HPLC trace is presented in FIG. 14.

Example 5—Peptoid LC-MS of Purified Peptoids

LC traces of peptoids A@320. Ion counts along the entire peak including shoulders were used to generate mass spectra. Spectra were obtained in negative mode on Agilent 6530 mass spectrometer.

MS labels from left to right and are shown in FIG. 15A (HHHC Peptoid. MS1: free peptoid, MS2: peptoid-Na, MS3: peptoid-Fe and peptoid-Fe—K. FIG. 15B is the mass spectra for CHHH Peptoid. MS1: free peptoid and peptoid-K, MS2: peptoid-Na, peptoid-Fe, and possible impurity. FIG. 15C is the mass spectra for HCHH Peptoid. MS1: free peptoid and peptoid-K, MS2: peptoid-Na, peptoid-Fe. FIG. 15D is the mass spectra for HHCH Peptoid. MS1: free peptoid and possible impurity, MS2: peptoid-Na, MS3: Peptoid-Fe. FIG. 15E is the mass spectra for CHHC Peptoid. MS1: free peptoid only and peptoid-K, MS2: peptoid-Na and peptoid-Fe. FIG. 15F is the mass spectra for HHCC Peptoid. MS1: free peptoid and peptoid-Na, MS2: peptoid-Na, free peptoid, and peptoid-Fe. FIG. 15G is the mass spectra for CCHH Peptoid. MS1: free peptoid and peptoid-Na, MS2: Peptoid-Fe and possible trimer. FIG. 15H is the mass spectra for HCHC Peptoid. MS1: free peptoid, MS2: peptoid-Fe and peptoid-Na. FIG. 15I is the mass spectra for HCCH Peptoid. MS1: free peptoid and small amount trimer, MS2: peptoid-Fe, MS3: peptoid-Na and possible fragments. FIG. 15J is the mass spectra for CHCH Peptoid. MS1: free peptoid and peptoid-K, MS2: peptoid-Fe. FIG. 15K is the mass spectra for HCCC Peptoid. MS1: free peptoid and trimer-Fe trace, MS2: free peptoid and peptoid-Fe. FIG. 15L is the mass spectra for CHCC Peptoid. MS1: free peptoid and peptoid-Na, MS2: free peptoid and unidentified masses. FIG. 15M is the mass spectra for CCHC Peptoid. MS1: free peptoid, MS2: free peptoid and peptoid-Na. FIG. 15N is the mass spectra for CCCH Peptoid. MS1: free peptoid and peptoid-Na, MS2: free peptoid and peptoid-K/Na. FIG. 15O is the mass spectra for CCCH Peptoid. MS1: free peptoid and peptoid-Na, MS2: free peptoid and peptoid-K/Na. FIG. 15P is the mass spectra for HHHH Peptoid. MS1: free peptoid, MS2: peptoid-Fe/Na, MS3: Peptoid-Fe—Na.

Example 6—High Resolution Mass Spectrometry Data

FIGS. 16A-16C depict the spectra that were obtained in negative mode. All peptoids are 1:1 Fe$^{3+}$ complexes except for CCCC and HHHH. Top spectrum is calculated and bottom is obtained.

Example 7—TOF MSMS of Select Peptoids

FIG. 17 depicts the positive mode, fragmentation of molecular ion, masses of interest. Differences in peptoids are illustrated based on both composition and sequence. H and C units differ by a mass of 1 amu. FIGS. 18A-18D depict the NMR results.

REFERENCES (1) Baco, E.; Hoegy, F.; Schalk, I. J.; Mislin, G. L. A. *Org Biomol Chem* 2014, 12 (5), 749.

As will be understood by one of ordinary skill in the art, each embodiment disclosed herein can comprise, consist essentially of, or consist of its particular stated element, step, ingredient or component. Thus, the terms "include" or "including" should be interpreted to recite: "comprise, consist of, or consist essentially of." The transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the", and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. It is anticipated that one or more members of a group can be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents, printed publications, journal articles and other written text throughout this specification (referenced materials herein). Each of the referenced materials is individually incorporated herein by reference in their entirety for their referenced teaching.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention can be embodied in practice.

Definitions and explanations used in the present disclosure are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary, 3rd Edition or a dictionary known to those of ordinary skill in the art, such as the Oxford Dictionary of Biochemistry and Molecular Biology (Ed. Anthony Smith, Oxford University Press, Oxford, 2004).

In closing, it is to be understood that the embodiments of the invention disclosed herein are illustrative of the principles of the present invention. Other modifications that can be employed are within the scope of the invention. Thus, by way of example, but not of limitation, alternative configurations of the present invention can be utilized in accordance with the teachings herein. Accordingly, the present invention is not limited to that precisely as shown and described.

What is claimed is:

1. A composition having a structure comprising:

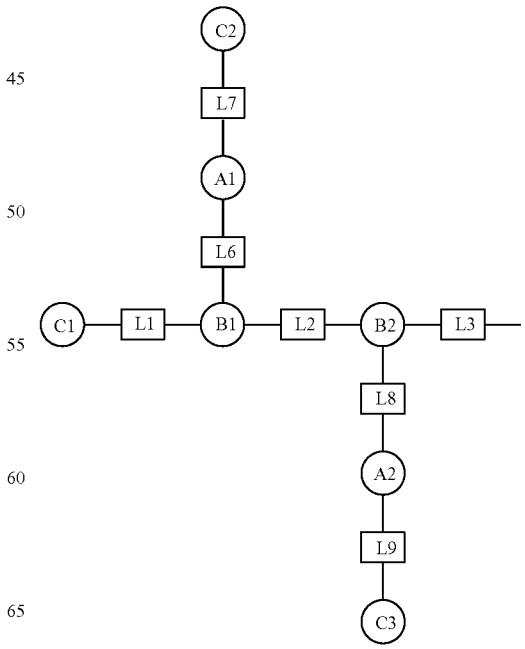

-continued

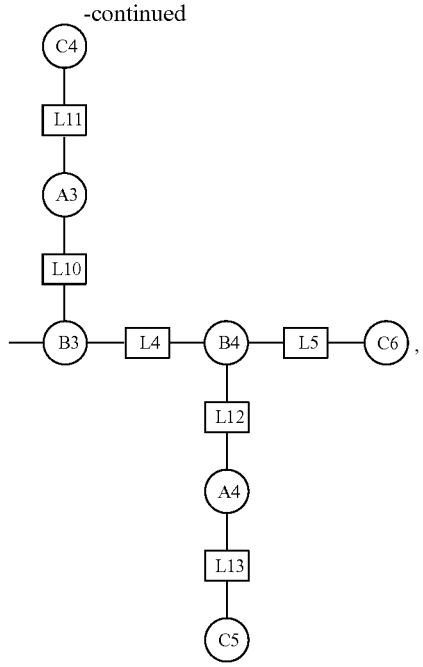

wherein:
(i) A1, A2, A3, and A4, are independently selected from the group consisting of a CAM group, a 1,2-HOPO group, and an HA group, wherein at least one of A1, A2, A3, and A4 is a 1,2-HOPO group, at least one of A1, A2, A3, and A4 is a CAM group, and at least one of A1, A2, A3, and A4 is an HA group;
(ii) B1, B2, B3, and B4, are independently selected from the group consisting of an amide group and an amine group;
(iii) C1, C2, C3, C4, C5, and C6 are conjugation groups, wherein C1-C6 is independently selected from the group consisting of $NH_2$, $C(=O)OH$, maleimide, dibromo-maleimide, isothiocyanate, alkyne, and azide;
(iv) at least another one of C1, C2, C3, C4, C5, or C6 is optional;
(v) L1, L2, L3, L4, L5, L6, L7, L8, L9, L10, L11, L12, and L13 are linking groups, wherein L1-L13 is independently selected from the group consisting of an alkyl group having 1 to 10 carbon atoms, an alkylamino group having 1 to 10 carbon atoms and 1 to 2 nitrogen atoms; an alkylamido group having 1 to 10 carbon atoms and 1 to 2 nitrogen atoms; an alkyl ether group having 1 to 10 carbon atoms, a hydroxy ester group, or an alkyl ester group having 1 to 10 carbon atoms; and
(vi) at least one of L1, L5, L6, L7, L8, L9, L10, L11, L12, or L13 is optional,
wherein the structure comprises a plurality of metal coordinating atoms, wherein the plurality of metal coordinating atoms is included in the 1,2-HOPO, CAM, and HA groups, wherein the metal coordinating atoms can bond with metals having cations with a +1, +2, +3, and/or +4 charge, wherein the 1,2-HOPO group is defined by a structure

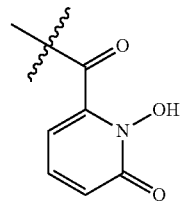 [SMILES: *C(=O)c1cccc(=O)n1O]

and comprises a pyridinone ring substituted by a hydroxyl group on the N atom,
wherein the CAM group is defined by a structure

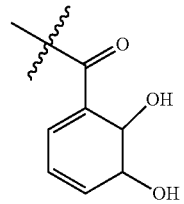 [SMILES: *C(=O)C1=CC=CC(O)C1O]

and comprises at least a phenyl ring substituted by hydroxyl groups on adjacent carbon atoms,
wherein the HA group is defined by a structure

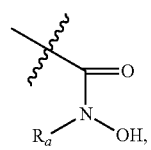

wherein $R_\alpha$ is H or an alkyl group including no greater than 5 carbon atoms, and
wherein the composition has at least one pharmaceutically acceptable carrier, wherein the at least one pharmaceutical acceptable carrier is selected from the group consisting of absorption delaying agents, antioxidants, binders, buffering agents, bulking agents or fillers, chelating agents, coatings, disintegration agents, dispersion media, gels, isotonic agents, lubricants, preservatives, pharmaceutically acceptable salts, solvents, stabilizers, and surfactants.

2. A composition of claim 1, wherein at least another one of L2, L3, or L4, is independently selected from the group consisting of an amine group or an amide group.

3. A composition of claim 1, wherein L1, C1, L7, C2, L9, C3, L11, C4, and L13, C5 are absent, L5 consists of an unsubstituted alkyl group having 1 to 5 carbon atoms, and C6 is selected from the group consisting of NH2, C(=O) OH, maleimide, dibromo-maleimide, isothiocyanate, alkyne, and azide.

4. A composition of claim 3, wherein L2, L3, L4, L6, L8, L10, and L12, independently, consist of an unsubstituted alkyl group having 1 to 5 carbon atoms.

5. A composition of claim 4, wherein A1 consists of a CAM group or a HOPO group; A2 consists of a HA group, A3 consists of a HA group, and A4 consists of a CAM group, a HOPO group, or a HA group.

6. A composition of claim 1, wherein at least one of L2, L3, or L4, independently, consists of an alkylamino or alkylamido group.

7. A composition of claim 1, wherein B1, B2, and B3, independently, consist of an amide group and B4 consists of an amino group, L2 and L3 consist of an amino group, and L4 consists of an alky group having 1 to 5 carbon atoms.

8. A composition of claim 7, wherein:
C1, C2, C3, C4, C5, L1, A1, A2, A3, L1, L6, L7, L8, L9, L10, L11, L12, and L13 are absent,
A4 consists of a CAM group, a HOPO group, or a HA group; and
L5 consists of an alkyl group having 1 to 5 carbon atoms.

9. A composition of claim 1, wherein B1, B2, and B3, independently, consist of an amide group and B4 consists of an amide group, L2 and L3, individually, consist of an amino group, and L4 consists of an alky group having 1 to 5 carbon atoms.

10. A composition of claim 9, wherein C1, C2, C3, C4, C5, A1, A2, A3, L1, L6, L7, L8, L9, L10, L11, and L13 are absent, L12 consists of an amino group, L5 consists of an ether group having 1 to 10 carbon atoms, and A4 consists of a CAM group, a HOPO group, or a HA group.

11. A composition of claim 1, wherein C1, C2, C5, C6, L1, L2, L3, L4, L5, L7, L13, B2, and B4 are absent, B1 and B3, independently, consist of an amide group, L6, L8, L10, and L12, independently, consist of an amino group, A1, A2, A3, and A4, independently, consist of a CAM group, a HOPO group, or a HA group, L9 and L11, independently, consist of an alkyl group having 1 to 5 carbon atoms.

12. A composition of claim 1, further comprising a metal, wherein the metal comprises a radionuclide.

13. A composition of claim 12, wherein the radionuclide comprises $^{225}$Ac, $^{226}$Ac, $^{228}$Ac, $^{105}$Ag, $^{106}$mAg, $^{110}$mAg, $^{111}$Ag, $^{112}$Ag, $^{113}$Ag, $^{239}$Am, $^{240}$Am, $^{242}$Am, $^{244}$Am, $^{37}$Ar, $^{71}$As, $^{72}$As, $^{73}$As, $^{74}$As, $^{76}$As, $^{77}$As, $^{209}$At, $^{210}$At, $^{191}$Au, $^{192}$Au, $^{193}$Au, $^{194}$Au, $^{195}$Au, $^{196}$Au, $^{196}$m$^2$Au, $^{198}$Au, $^{198}$mAu, $^{199}$Au, $^{200}$mAu, $^{128}$Ba, $^{131}$Ba, $^{133}$mBa, $^{135}$mBa, $^{140}$Ba, $^{7}$Be, $^{203}$Bi, $^{204}$Bi, $^{205}$Bi, $^{206}$Bi, $^{210}$Bi, $^{212}$Bi, $^{243}$Bk, $^{244}$Bk, $^{245}$Bk, $^{246}$Bk, $^{248}$mBk, $^{250}$Bk, $^{76}$Br, $^{77}$Br, $^{80}$mBr, $^{82}$Br, $^{11}$C, $^{14}$C, $^{45}$Ca, $^{47}$Ca, $^{107}$Cd, $^{115}$Cd, $^{115}$mCd, $^{117}$mCd, $^{132}$Ce, $^{133}$mCe, $^{134}$Ce, $^{135}$Ce, $^{137}$Ce, $^{137}$mCe, $^{139}$Ce, $^{141}$Ce, $^{143}$Ce, $^{144}$Ce, $^{246}$Cf, $^{247}$Cf, $^{253}$Cf, $^{254}$Cf, $^{240}$Cm, $^{241}$Cm, $^{242}$Cm, $^{252}$Cm, $^{55}$Co, $^{56}$Co, $^{57}$Co, $^{58}$Co, $^{58}$mCo, $^{60}$Co, $^{48}$Cr, $^{51}$Cr, $^{127}$Cs, $^{129}$Cs, $^{131}$Cs, $^{132}$Cs, $^{136}$Cs, $^{137}$Cs, $^{61}$Cu, $^{62}$Cu, $^{64}$Cu, $^{67}$Cu, $^{153}$Dy, $^{155}$Dy, $^{157}$Dy, $^{159}$Dy, $^{165}$Dy, $^{166}$Dy, $^{160}$Er, $^{161}$Er, $^{165}$Er, $^{169}$Er, $^{171}$Er, $^{172}$Er, $^{250}$Es, $^{251}$Es, $^{253}$Es, $^{254}$Es, $^{254}$mEs, $^{255}$Es, $^{256}$mEs, $^{145}$Eu, $^{146}$Eu, $^{147}$Eu, $^{148}$Eu, $^{149}$Eu, $^{150}$mEu, $^{152}$mEu, $^{156}$Eu, $^{157}$Eu, $^{52}$Fe, $^{59}$Fe, $^{251}$Fm, $^{252}$Fm, $^{253}$Fm, $^{254}$Fm, $^{255}$Fm, $^{257}$Fm, $^{66}$Ga, $^{67}$Ga, $^{68}$Ga, $^{72}$Ga, $^{73}$Ga, $^{146}$Gd, $^{147}$Gd, $^{149}$Gd, $^{151}$Gd, $^{153}$Gd, $^{159}$Gd, $^{68}$Ge, $^{69}$Ge, $^{71}$Ge, $^{77}$Ge, $^{170}$Hf, $^{171}$Hf, $^{173}$Hf, $^{175}$Hf, $^{179}$m$^2$Hf, $^{180}$mHf, $^{181}$Hf, $^{184}$Hf, $^{192}$Hg, $^{193}$Hg, $^{193}$mHg, $^{195}$Hg, $^{195}$mHg, $^{197}$Hg, $^{197}$mHg, $^{203}$Hg, $^{160}$mHo, $^{166}$Ho, $^{167}$Ho, $^{123}$I, $^{124}$I, $^{126}$I, $^{130}$I, $^{132}$I, $^{133}$I, $^{135}$I, $^{109}$In, $^{110}$In, $^{111}$In, $^{114}$mIn, $^{115}$mIn, $^{184}$Ir, $^{185}$Ir, $^{186}$Ir, $^{187}$Ir, $^{188}$Ir, $^{189}$Ir, $^{190}$Ir, $^{190}$m$^2$Ir, $^{192}$Ir, $^{193}$mIr, $^{194}$Ir, $^{194}$m$^2$Ir, $^{195}$mIr, $^{42}$K, $^{43}$K, $^{76}$Kr, $^{79}$Kr, $^{81}$mKr, $^{85}$mKr, $^{132}$La, $^{133}$La, $^{135}$La, $^{140}$La, $^{141}$La, $^{262}$Lr, $^{169}$Lu, $^{170}$Lu, $^{171}$Lu, $^{172}$Lu, $^{174}$mLu, $^{176}$mLu, $^{177}$Lu, $^{177}$mLu, $^{179}$Lu, $^{257}$Md, $^{258}$Md, $^{260}$Md, $^{28}$Mg, $^{52}$Mn, $^{90}$Mo, $^{93}$mMo, $^{99}$Mo, $^{13}$N, $^{24}$Na, $^{90}$Nb, $^{91}$mNb, $^{92}$mNb, $^{95}$Nb, $^{95}$mNb, $^{96}$Nb, $^{138}$Nd, $^{139}$mNd, $^{140}$Nd, $^{147}$Nd, $^{56}$Ni, $^{57}$Ni, $^{66}$Ni, $^{234}$Np, $^{236}$mNp, $^{238}$Np, $^{239}$Np, $^{15}$O, $^{182}$Os, $^{183}$Os, $^{183}$mOs, $^{185}$Os, $^{189}$mOs, $^{191}$Os, $^{191}$mOs, $^{193}$Os, $^{32}$P, $^{33}$P, $^{228}$Pa, $^{229}$Pa, $^{230}$Pa, $^{232}$Pa, $^{233}$Pa, $^{234}$Pa, $^{200}$Pb, $^{201}$Pb, $^{202}$mPb, $^{203}$Pb, $^{209}$Pb, $^{212}$Pb, $^{100}$Pd, $^{101}$Pd, $^{103}$Pd, $^{109}$Pd, $^{111}$mPd, $^{112}$Pd, $^{143}$Pm, $^{148}$Pm, $^{148}$mPm, $^{149}$Pm, $^{151}$Pm, $^{204}$Po, $^{206}$Po, $^{207}$Po, $^{210}$Po, $^{139}$Pr, $^{142}$Pr, $^{143}$Pr, $^{145}$Pr, $^{188}$Pt, $^{189}$Pt, $^{191}$Pt, $^{193}$mPt, $^{195}$mPt, $^{197}$Pt, $^{200}$Pt, $^{202}$Pt, $^{234}$Pu, $^{237}$Pu, $^{243}$Pu, $^{245}$Pu, $^{246}$Pu, $^{247}$Pu, $^{223}$Ra, $^{224}$Ra, $^{225}$Ra, $^{81}$Rb, $^{82}$Rb, $^{82}$mRb, $^{83}$Rb, $^{84}$Rb, $^{86}$Rb, $^{181}$Re, $^{182}$Re, $^{182}$mRe, $^{183}$Re, $^{184}$Re, $^{184}$mRe, $^{186}$Re, $^{188}$Re, $^{189}$Re, $^{190}$Re, $^{99}$Rh, $^{99}$mRh, $^{100}$Rh, $^{101}$mRh, $^{102}$Rh, $^{103}$mRh, $^{105}$Rh, $^{211}$Rn, $^{222}$Rn, $^{97}$Ru, $^{103}$Ru, $^{105}$Ru, $^{35}$S, $^{118}$mSb, $^{119}$Sb, $^{120}$Sb, $^{120}$mSb, $^{122}$Sb, $^{124}$Sb, $^{126}$Sb, $^{127}$Sb, $^{128}$Sb, $^{129}$Sb, $^{43}$Sc, $^{44}$Sc, $^{44}$mSc, $^{46}$Sc, $^{47}$Sc, $^{48}$Sc, $^{72}$Se, $^{73}$Se, $^{75}$Se, $^{153}$Sm, $^{156}$Sm, $^{110}$Sn, $^{113}$Sn, $^{117}$mSn, $^{119}$mSn, $^{121}$Sn, $^{123}$Sn, $^{125}$Sn, $^{82}$Sr, $^{83}$Sr, $^{85}$Sr, $^{89}$Sr, $^{91}$Sr, $^{173}$Ta, $^{175}$Ta, $^{176}$Ta, $^{177}$Ta, $^{180}$Ta, $^{182}$Ta, $^{183}$Ta, $^{184}$Ta, $^{149}$Tb, $^{150}$Tb, $^{151}$Tb, $^{152}$Tb, $^{153}$Tb, $^{154}$Tb, $^{154}$mTb, $^{154}$m$^2$Tb, $^{155}$Tb, $^{156}$Tb, $^{156}$mTb, $^{156}$m$^2$Tb, $^{160}$Tb, $^{161}$Tb, $^{94}$Tc, $^{95}$Tc, $^{95}$mTc, $^{96}$Tc, $^{97}$mTc, $^{9}$mTc, $^{118}$Te, $^{119}$Te, $^{119}$mTe, $^{121}$Te, $^{121}$mTe, $^{123}$mTe, $^{125}$mTe, $^{127}$Te, $^{127}$mTe, $^{129}$mTe, $^{131}$mTe, $^{132}$Te, $^{227}$Th, $^{231}$Th, $^{234}$Th, $^{45}$Ti, $^{198}$Tl, $^{199}$Tl, $^{200}$Tl, $^{201}$Tl, $^{202}$Tl, $^{204}$Tl, $^{165}$Tm, $^{166}$Tm, $^{167}$Tm, $^{168}$Tm, $^{170}$Tm, $^{172}$Tm, $^{173}$Tm, $^{230}$U, $^{231}$U, $^{237}$U, $^{240}$U, $^{48}$V, $^{178}$W, $^{181}$W, $^{185}$W, $^{187}$W, $^{188}$W, $^{122}$Xe, $^{125}$Xe, $^{127}$Xe, $^{129}$mXe, $^{131}$mXe, $^{133}$Xe, $^{133}$mXe, $^{135}$Xe, $^{85}$mY, $^{86}$Y, $^{87}$Y, $^{87}$mY, $^{88}$Y, $^{90}$Y, $^{90}$mY, $^{91}$Y, $^{92}$Y, $^{93}$Y, $^{166}$Yb, $^{169}$Yb, $^{175}$Yb, $^{62}$Zn, $^{65}$Zn, $^{69}$mZn, $^{71}$mZn, $^{72}$Zn, $^{86}$Zr, $^{88}$Zr, $^{89}$Zr, $^{95}$Zr, and $^{97}$Zr.

14. A composition of claim 13, wherein the radionuclide comprises $^{90}$Y, $^{67}$Cu, $^{213}$Bi, $^{212}$Bi, $^{186}$Re, $^{67}$Cu $^{90}$Y, $^{213}$Bi, $^{177}$Lu, $^{186}$Re, or $^{67}$Ga.

15. A composition of claim 13, wherein the radionuclide comprises $^{89}$Zr, $^{225}$Ac, or $^{227}$Th.

16. A composition of claim 12, wherein the metal comprises a daughter isotope of a radionuclide.

17. A composition of claim 16, wherein the daughter isotope of the radionuclide comprises $^{89}$Y, $^{18}$O, $^{221}$Fr, $^{213}$Bi, or $^{209}$Pb.

18. A kit comprising a composition of claim 1 and a metal.

19. A kit of claim 18, wherein the metal is a radionuclide.

20. A kit of claim 19, wherein the radionuclide comprises $^{225}$Ac, $^{226}$Ac, $^{228}$Ac, $^{105}$Ag, $^{106}$mAg, $^{110}$mAg, $^{111}$Ag, $^{112}$Ag, $^{113}$Ag, $^{239}$Am, $^{240}$Am, $^{242}$Am, $^{244}$Am, $^{37}$Ar, $^{71}$As, $^{72}$As, $^{73}$As, $^{74}$As, $^{76}$As, $^{77}$As, $^{209}$At, $^{210}$At, $^{191}$Au, $^{192}$Au, $^{193}$Au, $^{194}$Au, $^{195}$Au, $^{196}$Au, $^{196}$m$^2$Au, $^{198}$Au, $^{198}$mAu, $^{199}$Au, $^{200}$mAu, $^{128}$Ba, $^{131}$Ba, $^{133}$mBa, $^{135}$mBa, $^{140}$Ba, $^{7}$Be, $^{203}$Bi, $^{204}$Bi, $^{205}$Bi, $^{206}$Bi, $^{210}$Bi, $^{212}$Bi, $^{243}$Bk, $^{244}$Bk, $^{245}$Bk, $^{246}$Bk, $^{248}$mBk, $^{250}$Bk, $^{76}$Br, $^{77}$Br, $^{80}$mBr, $^{82}$Br, $^{11}$C, $^{14}$C, $^{45}$Ca, $^{47}$Ca, $^{107}$Cd, $^{115}$Cd, $^{115}$mCd, $^{117}$mCd, $^{132}$Ce, $^{133}$mCe, $^{134}$Ce, $^{135}$Ce, $^{137}$Ce, $^{137}$mCe, $^{139}$Ce, $^{141}$Ce, $^{143}$Ce, $^{144}$Ce, $^{246}$Cf, $^{247}$Cf, $^{253}$Cf, $^{254}$Cf, $^{240}$Cm, $^{241}$Cm, $^{242}$Cm, $^{252}$Cm, $^{55}$Co, $^{56}$Co, $^{57}$Co, $^{58}$Co, $^{58}$mCo, $^{60}$Co, $^{48}$Cr, $^{51}$Cr, $^{127}$Cs, $^{129}$Cs, $^{131}$Cs, $^{132}$Cs, $^{136}$Cs, $^{137}$Cs, $^{61}$Cu, $^{62}$Cu, $^{64}$Cu, $^{67}$Cu, $^{153}$Dy, $^{155}$Dy, $^{157}$Dy, $^{159}$Dy, $^{165}$Dy, $^{166}$Dy, $^{160}$Er, $^{161}$Er, $^{165}$Er, $^{169}$Er, $^{171}$Er, $^{172}$Er, $^{250}$Es, $^{251}$Es, $^{253}$Es, $^{254}$Es, $^{254}$mEs, $^{255}$Es, $^{256}$mEs, $^{145}$Eu, $^{146}$Eu, $^{147}$Eu, $^{148}$Eu, $^{149}$Eu, $^{150}$mEu, $^{152}$mEu, $^{156}$Eu, $^{157}$Eu, $^{52}$Fe, $^{59}$Fe, $^{251}$Fm, $^{252}$Fm, $^{253}$Fm, $^{254}$Fm, $^{255}$Fm, $^{257}$Fm, $^{66}$Ga, $^{67}$Ga, $^{68}$Ga, $^{72}$Ga, $^{73}$Ga, $^{146}$Gd, $^{147}$Gd, $^{149}$Gd, $^{151}$Gd, $^{153}$Gd, $^{159}$Gd, $^{68}$Ge, $^{69}$Ge, $^{71}$Ge, $^{77}$Ge, $^{170}$Hf, $^{171}$Hf, $^{173}$Hf, $^{175}$Hf, $^{179}$m$^2$Hf, $^{180}$mHf, $^{181}$Hf, $^{184}$Hf, $^{192}$Hg, $^{193}$Hg, $^{193}$mHg, $^{195}$Hg, $^{195}$mHg, $^{197}$Hg, $^{197}$mHg, $^{203}$Hg, $^{160}$mHo, $^{166}$Ho, $^{167}$Ho, $^{123}$I, $^{124}$I, $^{126}$I, $^{130}$I, $^{132}$I, $^{133}$I, $^{135}$I, $^{109}$In, $^{110}$In, $^{111}$In, $^{114}$mIn, $^{115}$mIn, $^{184}$Ir, $^{185}$Ir, $^{186}$Ir, $^{187}$Ir, $^{188}$Ir, $^{189}$Ir, $^{190}$Ir, $^{190}$m$^2$Ir, $^{192}$Ir, $^{193}$mIr, $^{194}$Ir, $^{194}$m$^2$Ir, $^{195}$mIr, $^{42}$K, $^{43}$K, $^{76}$Kr, $^{79}$Kr, $^{81}$mKr, $^{85}$mKr, $^{132}$La, $^{133}$La, $^{135}$La, $^{140}$La, $^{141}$La, $^{262}$Lr, $^{169}$Lu, $^{170}$Lu, $^{171}$Lu, $^{172}$Lu, $^{174}$mLu, $^{176}$mLu, $^{177}$Lu, $^{177}$mLu, $^{179}$Lu, $^{257}$Md, $^{258}$Md, $^{260}$Md, $^{28}$Mg, $^{52}$Mn, $^{90}$Mo, $^{93}$mMo, $^{99}$Mo, $^{13}$N, $^{24}$Na, $^{90}$Nb, $^{91}$mNb, $^{92}$mNb, $^{95}$Nb, $^{95}$mNb, $^{9}$%Nb, $^{138}$Nd, $^{139}$mNd, $^{140}$Nd, $^{147}$Nd, $^{56}$Ni, $^{57}$Ni, $^{66}$Ni, $^{234}$Np, $^{236}$mNp, $^{238}$Np, $^{239}$Np, $^{15}$O, $^{182}$Os, $^{183}$Os, $^{183}$mOs, $^{185}$Os, $^{189}$mOs, $^{191}$Os, $^{191}$mOs, $^{193}$Os, $^{32}$P, $^{33}$P, $^{228}$Pa, $^{229}$Pa, $^{230}$Pa, $^{232}$Pa, $^{233}$Pa, $^{234}$Pa, $^{200}$Pb, $^{201}$Pb, $^{202}$mPb, $^{203}$Pb, $^{209}$Pb, $^{212}$Pb, $^{100}$Pd, $^{101}$Pd, $^{103}$Pd, $^{109}$Pd, $^{111}$mPd, $^{112}$Pd, $^{143}$Pm, $^{148}$Pm, $^{148}$mPm, $^{149}$Pm, $^{151}$Pm, $^{204}$Po, $^{206}$Po, $^{207}$Po, $^{210}$Po, $^{139}$Pr, $^{142}$Pr, $^{143}$Pr, $^{145}$Pr, $^{188}$Pt, $^{189}$Pt, $^{191}$Pt, $^{193}$mPt, $^{195}$mPt, $^{197}$Pt, $^{200}$Pt, $^{202}$Pt, $^{234}$Pu, $^{237}$Pu, $^{243}$Pu, $^{245}$Pu, $^{246}$Pu, $^{247}$Pu, $^{223}$Ra, $^{224}$Ra, $^{225}$Ra, $^{81}$Rb, $^{82}$Rb, $^{82m}$Rb, $^{83}$Rb, $^{84}$Rb, $^{86}$Rb, $^{181}$Re, $^{182}$Re, $^{182m}$Re, $^{183}$Re, $^{184}$Re, $^{184m}$Re, $^{186}$Re, $^{188}$Re, $^{189}$Re, $^{190}$Re, $^{190m}$Re, $^{99}$Rh, $^{99m}$Rh, $^{100}$Rh, $^{101m}$Rh, $^{102}$Rh, $^{103m}$Rh, $^{105}$Rh, $^{211}$Rn, $^{222}$Rn, $^{97}$Ru, $^{103}$Ru, $^{105}$Ru, $^{35}$S, $^{118m}$Sb, $^{119}$Sb, $^{120}$Sb, $^{120m}$Sb, $^{122}$Sb, $^{124}$Sb, $^{126}$Sb, $^{127}$Sb, $^{128}$Sb, $^{129}$Sb, $^{43}$Sc, $^{44}$Sc, $^{44m}$Sc, $^{46}$Sc, $^{47}$Sc, $^{48}$Sc, $^{72}$Se, $^{73}$Se, $^{75}$Se, $^{153}$Sm, $^{156}$Sm, $^{110}$Sn, $^{113}$Sn, $^{117m}$Sn, $^{119m}$Sn, $^{121}$Sn, $^{123}$Sn, $^{125}$Sn, $^{82}$Sr, $^{83}$Sr, $^{85}$Sr, $^{89}$Sr, $^{91}$Sr, $^{173}$Ta, $^{175}$Ta, $^{176}$Ta, $^{177}$Ta, $^{180}$Ta, $^{182}$Ta, $^{183}$Ta, $^{184}$Ta, $^{149}$Tb, $^{150}$Tb, $^{151}$Tb, $^{152}$Tb, $^{153}$Tb, $^{154}$Tb, $^{154m}$Tb, $^{154m2}$Tb, $^{155}$Tb, $^{156}$Tb, $^{156m}$Tb, $^{156m2}$Tb, $^{160}$Tb, $^{161}$Tb, $^{94}$Tc, $^{95}$Tc, $^{95m}$Tc, $^{96}$Tc, $^{97m}$Tc, $^{99m}$Tc, $^{118}$Te, $^{119}$Te, $^{119m}$Te, $^{121}$Te, $^{121m}$Te, $^{123m}$Te, $^{125m}$Te, $^{127}$Te, $^{127m}$Te, $^{129m}$Te, $^{131m}$Te, $^{132}$Te, $^{227}$Th, $^{231}$Th, $^{234}$Th, $^{45}$Ti, $^{198}$Tl, $^{199}$Tl, $^{200}$Tl, $^{201}$Tl, $^{202}$Tl, $^{204}$Tl, $^{165}$Tm, $^{166}$Tm, $^{167}$Tm, $^{168}$Tm, $^{170}$Tm, $^{172}$Tm, $^{173}$Tm, $^{230}$U, $^{231}$U, $^{237}$U, $^{240}$U, $^{48}$V, $^{178}$W, $^{181}$W, $^{185}$W, $^{187}$W, $^{188}$W, $^{122}$Xe, $^{125}$Xe, $^{127}$Xe, $^{129m}$Xe, $^{131m}$Xe, $^{133}$Xe, $^{133m}$Xe, $^{135}$Xe, $^{85m}$Y, $^{36}$Y, $^{87}$Y, $^{87m}$Y, $^{88}$Y, $^{90}$Y, $^{90m}$Y, $^{91}$Y, $^{92}$Y, $^{93}$Y, $^{166}$Yb, $^{169}$Yb, $^{175}$Yb, $^{62}$Zn, $^{65}$Zn, $^{69m}$Zn, $^{71m}$Zn, $^{72}$Zn, $^{86}$Zr, $^{88}$Zr, $^{89}$Zr, $^{95}$Zr, and $^{97}$Zr.

\* \* \* \* \*